US012631790B2

(12) United States Patent
Tsai et al.

(10) Patent No.: US 12,631,790 B2
(45) Date of Patent: May 19, 2026

(54) PLASTIC LENS ELEMENT, OPTICAL IMAGING MODULE AND ELECTRONIC DEVICE

(71) Applicant: LARGAN PRECISION CO., LTD., Taichung (TW)

(72) Inventors: Chun-Hua Tsai, Taichung (TW); Ming-Ta Chou, Taichung (TW); Wei-Hung Weng, Taichung (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 280 days.

(21) Appl. No.: 18/442,172

(22) Filed: Feb. 15, 2024

(65) Prior Publication Data

US 2024/0280726 A1 Aug. 22, 2024

Related U.S. Application Data

(60) Provisional application No. 63/485,577, filed on Feb. 17, 2023.

(51) Int. Cl.
| | |
|---|---|
| *G02B 1/04* | (2006.01) |
| *G02B 3/00* | (2006.01) |
| *G02B 7/02* | (2021.01) |

(52) U.S. Cl.
CPC .............. *G02B 1/041* (2013.01); *G02B 3/00* (2013.01); *G02B 7/021* (2013.01); *G02B 2003/0093* (2013.01)

(58) Field of Classification Search
CPC .......... G02B 1/041; G02B 3/00; G02B 7/021; G02B 2003/0093; G02B 7/022; G02B 3/02; B29D 11/00403; B29D 11/00432; B29D 11/0048; G03B 30/00
See application file for complete search history.

(56) References Cited

U.S. PATENT DOCUMENTS

| | | | | |
|---|---|---|---|---|
| 10,996,421 B2* | 5/2021 | Yang | .......................... | G02B 7/02 |
| 2021/0088698 A1* | 3/2021 | Chou | ...................... | G02B 5/003 |

* cited by examiner

*Primary Examiner* — James C. Jones
(74) *Attorney, Agent, or Firm* — McClure, Qualey & Rodack, LLP

(57) ABSTRACT

A plastic lens element includes an optical effective region and a peripheral region. The peripheral region is circularly disposed on a periphery of the optical effective region, and the peripheral region includes a protrusive structure, an indented shape and a drafting part. The protrusive structure is disposed on an outer diameter surface and adjacent to an annular lateral surface. The indented shape is dented from the outer diameter surface towards the optical effective region. The drafting part is raised from a base surface towards the direction away from an optical axis, and the drafting part has a top surface and a bottom surface via the section, wherein the top surface and the bottom surface are arranged along an extending direction parallel to the optical axis, and a conical surface is located between the top surface and the bottom surface.

32 Claims, 108 Drawing Sheets

1101

1140

1110

1120

1142

11B

11B

1201

1240

1210

1220

1242

12B

12B

1421

1400

θ

1610

1600

1600

1610

1610

1610

1610

1600

PLASTIC LENS ELEMENT, OPTICAL IMAGING MODULE AND ELECTRONIC DEVICE

RELATED APPLICATIONS

This application claims priority to U.S. Provisional Application Ser. No. 63/485,577 filed Feb. 17, 2023, which is herein incorporated by reference.

BACKGROUND

Technical Field

The present disclosure relates to a plastic lens element and an optical imaging module. More particularly, the present disclosure relates to a plastic lens element and an optical imaging module applicable to portable electronic devices.

Description of Related Art

In recent years, portable electronic devices have developed rapidly. For example, intelligent electronic devices and tablets have been filled in the lives of modern people, and optical imaging modules and plastic lens elements thereof mounted on portable electronic devices have also prospered. However, as technology advances, the quality requirements of the plastic lens element are becoming higher and higher. Therefore, a plastic lens element, which can enhance the molding yield, needs to be developed.

SUMMARY

According to one aspect of the present disclosure, a plastic lens element has a section passing through an optical axis, and the plastic lens element includes an optical effective region and a peripheral region. The optical axis passes through the optical effective region. The peripheral region is circularly disposed on a periphery of the optical effective region, and the peripheral region has an outer diameter surface and an annular lateral surface, wherein the outer diameter surface is farther away from the optical effective region than the annular lateral surface from the optical effective region, and the annular lateral surface is located between the outer diameter surface and the optical effective region. The peripheral region includes a protrusive structure, an indented shape and a drafting part. The protrusive structure is disposed on the outer diameter surface and adjacent to the annular lateral surface, and the protrusive structure extends towards a direction away from the optical axis. The indented shape is dented from the outer diameter surface towards the optical effective region, and the indented shape has a base surface. The drafting part is raised from the base surface towards the direction away from the optical axis, and the drafting part has a top surface and a bottom surface via the section, wherein the top surface and the bottom surface are arranged along an extending direction parallel to the optical axis, a conical surface is located between the top surface and the bottom surface, the conical surface is tapered from the top surface towards the optical axis in a direction towards the bottom surface, and the top surface, the conical surface, the bottom surface and the protrusive structure are arranged in order along a direction parallel to the optical axis.

According to one aspect of the present disclosure, a plastic lens element has a section passing through an optical axis, and the plastic lens element includes an optical effective region and a peripheral region. The optical axis passes through the optical effective region. The peripheral region is circularly disposed on a periphery of the optical effective region, and the peripheral region has an outer diameter surface and an annular lateral surface, wherein the outer diameter surface is farther away from the optical effective region than the annular lateral surface from the optical effective region, and the annular lateral surface is located between the outer diameter surface and the optical effective region. The peripheral region includes a protrusive structure, an indented shape and a release notch. The protrusive structure is disposed on the outer diameter surface and adjacent to the annular lateral surface, and the protrusive structure extends towards a direction away from the optical axis. The indented shape is dented from the outer diameter surface towards the optical effective region, and the indented shape has a base surface. The release notch is dented from the base surface towards the optical axis, and the release notch has a top surface and a bottom surface via the section, wherein the top surface and the bottom surface are arranged along an extending direction of the optical axis, a conical surface is located between the top surface and the bottom surface, the conical surface is tapered from the top surface towards the optical axis in a direction towards the bottom surface, and the top surface, the conical surface, the bottom surface and the protrusive structure are arranged in order along a direction parallel to the optical axis.

According to one aspect of the present disclosure, a plastic lens element has a section passing through an optical axis, and the plastic lens element includes an optical effective region and a peripheral region. The optical axis passes through the optical effective region. The peripheral region is circularly disposed on a periphery of the optical effective region, and the peripheral region has an outer diameter surface and an annular lateral surface, wherein the outer diameter surface is farther away from the optical effective region than the annular lateral surface from the optical effective region, and the annular lateral surface is located between the outer diameter surface and the optical effective region. The peripheral region includes an indented shape, a release notch and an air gap. The indented shape is dented from the outer diameter surface towards the optical effective region, and the indented shape has a base surface. The release notch is dented from the base surface towards the optical axis, and the release notch has a top surface and a bottom surface via the section, wherein the top surface and the bottom surface are arranged along an extending direction of the optical axis, a conical surface is located between the top surface and the bottom surface, and the conical surface is tapered from the top surface towards the optical axis in a direction towards the bottom surface. The air gap is formed on the indented shape via the conical surface and the bottom surface, so that an overlap between the air gap and the indented shape is in extending directions parallel to the optical axis towards both an object side and an image side.

According to one aspect of the present disclosure, an optical imaging module has the optical axis, and the optical imaging module includes a plurality of lens elements, wherein at least one of the lens elements is the plastic lens element of any one of the aforementioned aspects.

According to one aspect of the present disclosure, an electronic device includes the optical imaging module of the aforementioned aspect.

DETAILED DESCRIPTION

Figure 1A:
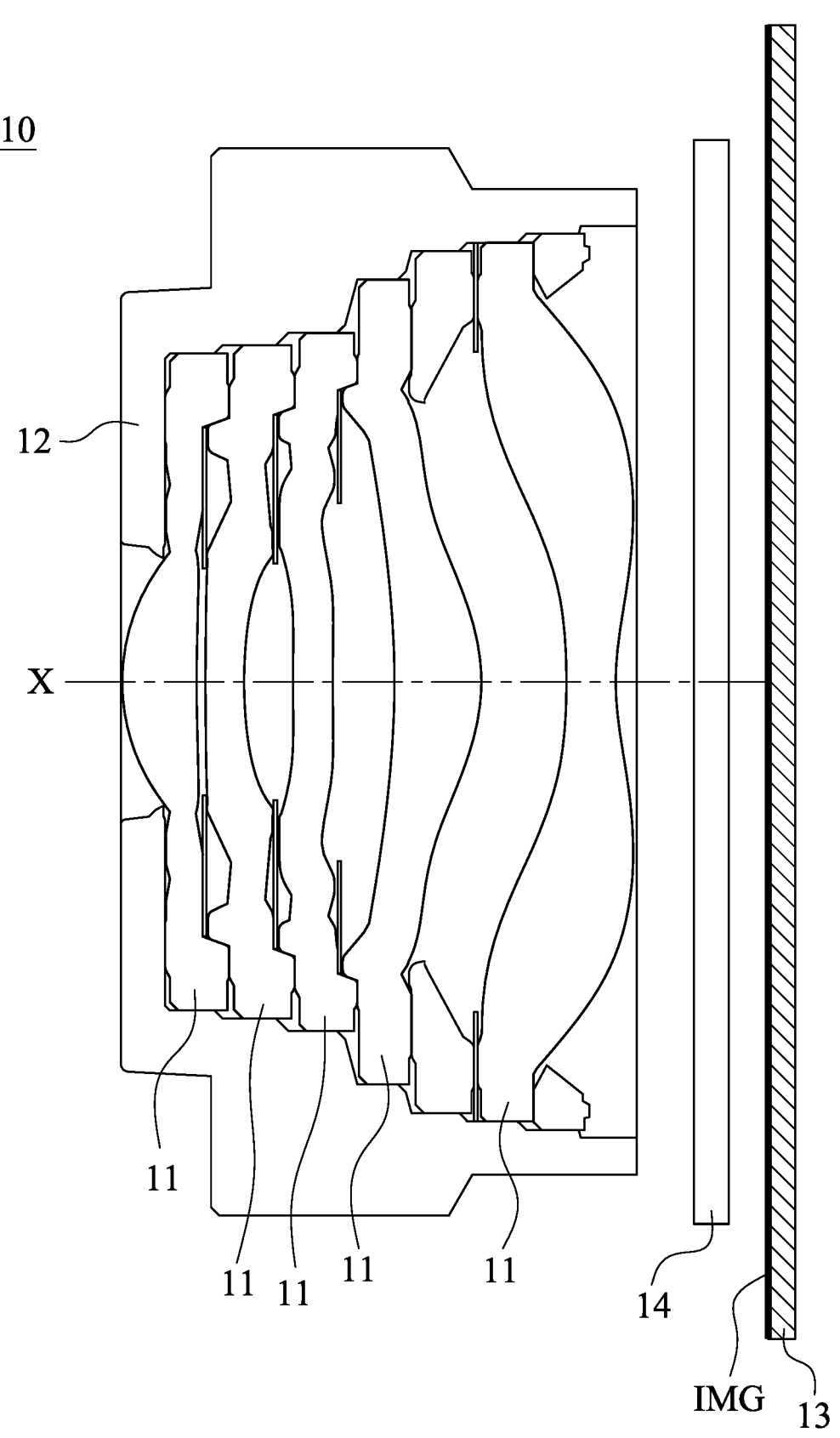
FIG. 1A is a schematic view of an optical imaging module according to the 1A example of the 1st embodiment of the present disclosure.

The present disclosure provides a plastic lens element, which has a section passing through an optical axis, and the plastic lens element includes an optical effective region and a peripheral region, wherein the optical axis passes through the optical effective region, the peripheral region is circularly disposed on a periphery of the optical effective region, and the peripheral region has an outer diameter surface and an annular lateral surface. Moreover, the outer diameter surface is farther away from the optical effective region than the annular lateral surface from the optical effective region, the annular lateral surface is located between the outer diameter surface and the optical effective region, and the peripheral region includes an indented shape, wherein the indented shape is dented from the outer diameter surface towards the optical effective region, and the indented shape has a base surface.

The peripheral region can include a protrusive structure and a drafting part, wherein the protrusive structure is disposed on the outer diameter surface and adjacent to the annular lateral surface, the protrusive structure extends towards a direction away from the optical axis, the drafting part is raised from the base surface towards the direction away from the optical axis, and the drafting part has a top surface and a bottom surface via the section. The top surface and the bottom surface are arranged along an extending direction parallel to the optical axis, a conical surface is located between the top surface and the bottom surface, the conical surface is tapered from the top surface towards the optical axis in a direction towards the bottom surface, and the top surface, the conical surface, the bottom surface and the protrusive structure are arranged in order along a direction parallel to the optical axis. Furthermore, the conical surface can be tapered towards the optical axis in a direction towards a direction adjacent to the protrusive structure, and the protrusive structure can be a burr, a parting line, an annular structure, wherein the protrusive structure is usually the annular structure, but the present disclosure is not limited thereto.

In particular, the slight demolding resistance may be caused via the conical surface during the demolding process of the plastic lens element after the injection molding, so that the stress caused during the demolding and the deformation caused by the stress are gathered at the peripheral region. Therefore, the deformation of the optical effective region can be prevented.

Moreover, a set of the molds is usually configured to simultaneously form a plurality of plastic lens elements, and each of the plastic lens elements is fixed on the male mold via the demolding resistance caused by the conical surface during removing the male mold and the female mold after the injection molding so as to prevent a portion of the plastic lens elements from attaching on the female mold during the demolding process for avoiding the pulling. Therefore, the molding yield of the plastic lens elements can be enhanced.

Or, the peripheral region can include a release notch and an air gap, wherein the release notch is dented from the base surface towards the optical axis, and the release notch has a top surface and a bottom surface via the section, a conical surface is located between the top surface and the bottom surface, the air gap is formed on the indented shape via the conical surface and the bottom surface, so that an overlap between the air gap and the indented shape is in extending directions parallel to the optical axis towards both an object side and an image side. Moreover, the top surface and the bottom surface are arranged along an extending direction of the optical axis, the conical surface is tapered from the top surface towards the optical axis in a direction towards the bottom surface, and the top surface, the conical surface, the bottom surface and the protrusive structure are arranged in order along a direction parallel to the optical axis, wherein the conical surface can be tapered towards the optical axis in a direction adjacent to the protrusive structure.

The indented shape can include two drafting parts protruding from the base surface towards a direction away from the optical axis, and a gap is located between the drafting parts to form the release notch. In particular, the release notch can be defined via the protruding structures.

The indented shape can include a gate. In particular, the gate, which easily causes the assembling tolerance, is disposed on the indented shape, so that the gate can be prevented from being the outermost structure of the plastic lens element. Therefore, the assembling accuracy can be enhanced and the assembling tolerance can be decreased.

A first step valley is formed between the conical surface and the bottom surface, and the first step valley has an obtuse angle, and an angle range of the obtuse angle can be between 160 degrees and 179.5 degrees. By defining the angle of the conical surface as the gentle slope, the proper demolding resistance can be provided so as to avoid the condition of the reverse draft.

The conical surface can include a first step surface, a second step surface and a third step surface, and the first step surface, the second step surface and the third step surface are arranged in order along the optical axis, wherein the first step surface is located between the top surface and the second step surface, the second step surface is located between the first step surface and the third step surface, and the third step surface is located between the bottom surface and the second step surface. Further, a second step valley is formed between the first step surface and the second step surface, the second step valley has an obtuse angle, and an angle range of the obtuse angle can be between 160 degrees and 179.5 degrees. The conical surface is formed via a plurality of step surfaces, so that the stress is dispersed to the position of the first step valley and the position of the second step valley. Therefore, the excessive concentration of the stress can be prevented so as to avoid the problem of the demolding difficulty.

The optical effective region has a lens thickness adjacent to the optical axis, an extending direction of the lens thickness is parallel to the optical axis, and the plastic lens element has an outer diameter length passing through and vertical to the optical axis, wherein the lens thickness is CT, the outer diameter length is L, and the following condition can be satisfied: $9.1 < L/CT < 40$. Therefore, the larger outer diameter of the plastic lens elements can be formed so as to provide the higher optical imaging quality. Further, the following condition can be satisfied: 9.5<L/CT<35. Further, the following condition can be satisfied: 17<L/CT<30. Further, L/CT can be 20.14.

The peripheral region has a plurality of peripheral thicknesses parallel to the optical axis, wherein the lens thickness is CT, a smallest one of the peripheral thicknesses is ETmin, and the following condition can be satisfied: 0.01<ETmin/CT<0.5. Therefore, the better distribution of the refractive power can be obtained so as to provide the better light gathering ability. Further, the following condition can be satisfied: 0.01<ETmin/CT<0.45. Further, the following condition can be satisfied: 0.18<ETmin/CT<0.39. Further, ETmin/CT can be 0.35.

Each of the aforementioned features of the plastic lens element can be utilized in various combinations for achieving the corresponding effects.

The present disclosure provides an optical imaging module, which includes a plurality of lens elements, wherein at least one of the lens elements is the aforementioned plastic lens element, and the optical imaging module has the optical axis.

The present disclosure provides an electronic device, which includes the aforementioned optical imaging module.

According to the aforementioned embodiment, specific embodiments and examples are provided, and illustrated via figures.

1st Embodiment

FIG. 1A is a schematic view of an optical imaging module 10 according to the 1A example of the 1st embodiment of the present disclosure. In FIG. 1A, the optical imaging module 10 includes a plurality of lens elements 11, a lens barrel 12, an image sensor 13 and a filter 14, and the optical imaging module 10 has an optical axis X. Moreover, at least one of the lens elements 11 is a plastic lens element (its reference numeral is omitted), and the image sensor 13 is disposed on an image surface IMG, and the filter 14 is disposed on an image side of the lens barrel 12. It should be mentioned that the lens elements and another optical elements can be disposed according to different imaging demands, such as the numbers, the structures, the surface shapes, and so on, and is not limited thereto.

Figure 1B:
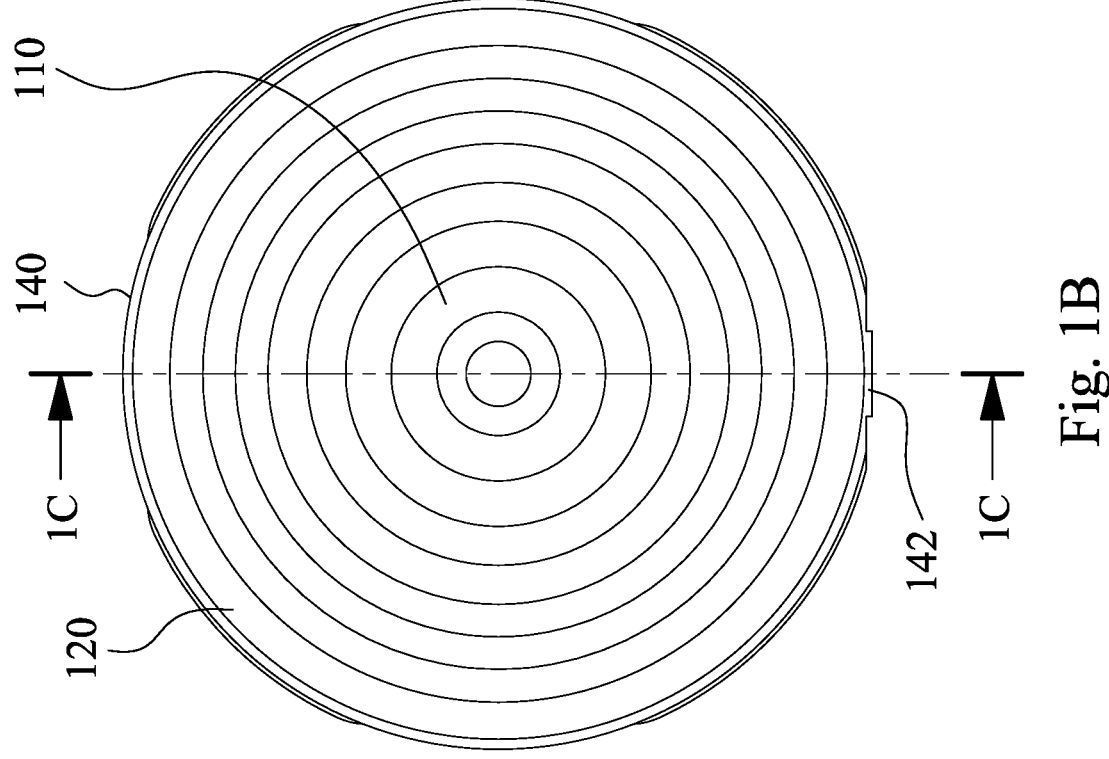
FIG. 1B is a schematic view of the plastic lens element according to the 1A example of the 1st embodiment in FIG. 1A.
Figure 1C:
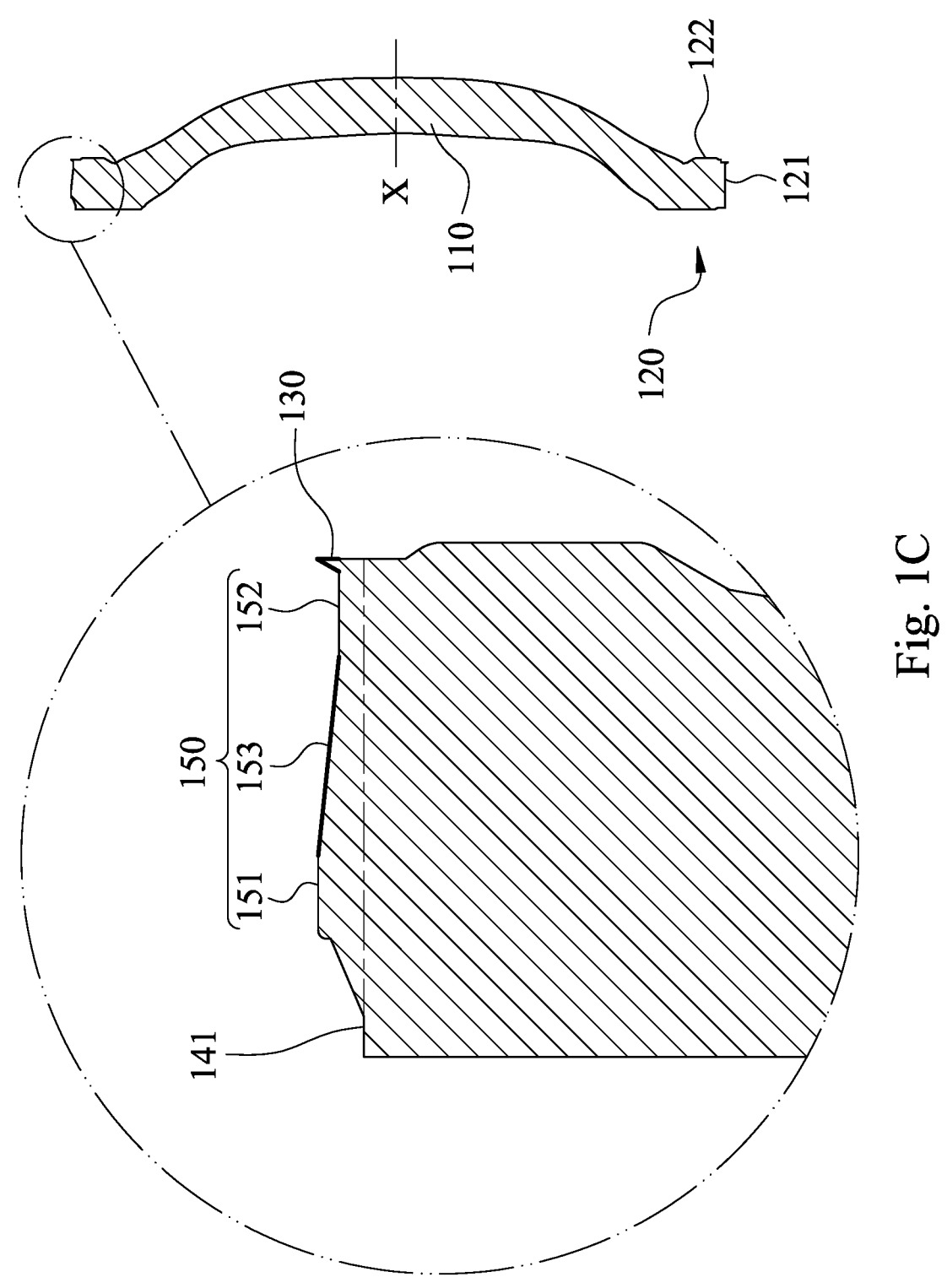
FIG. 1C is a cross-sectional view of the plastic lens element along line 1C-1C in FIG. 1B.
Figure 1D:
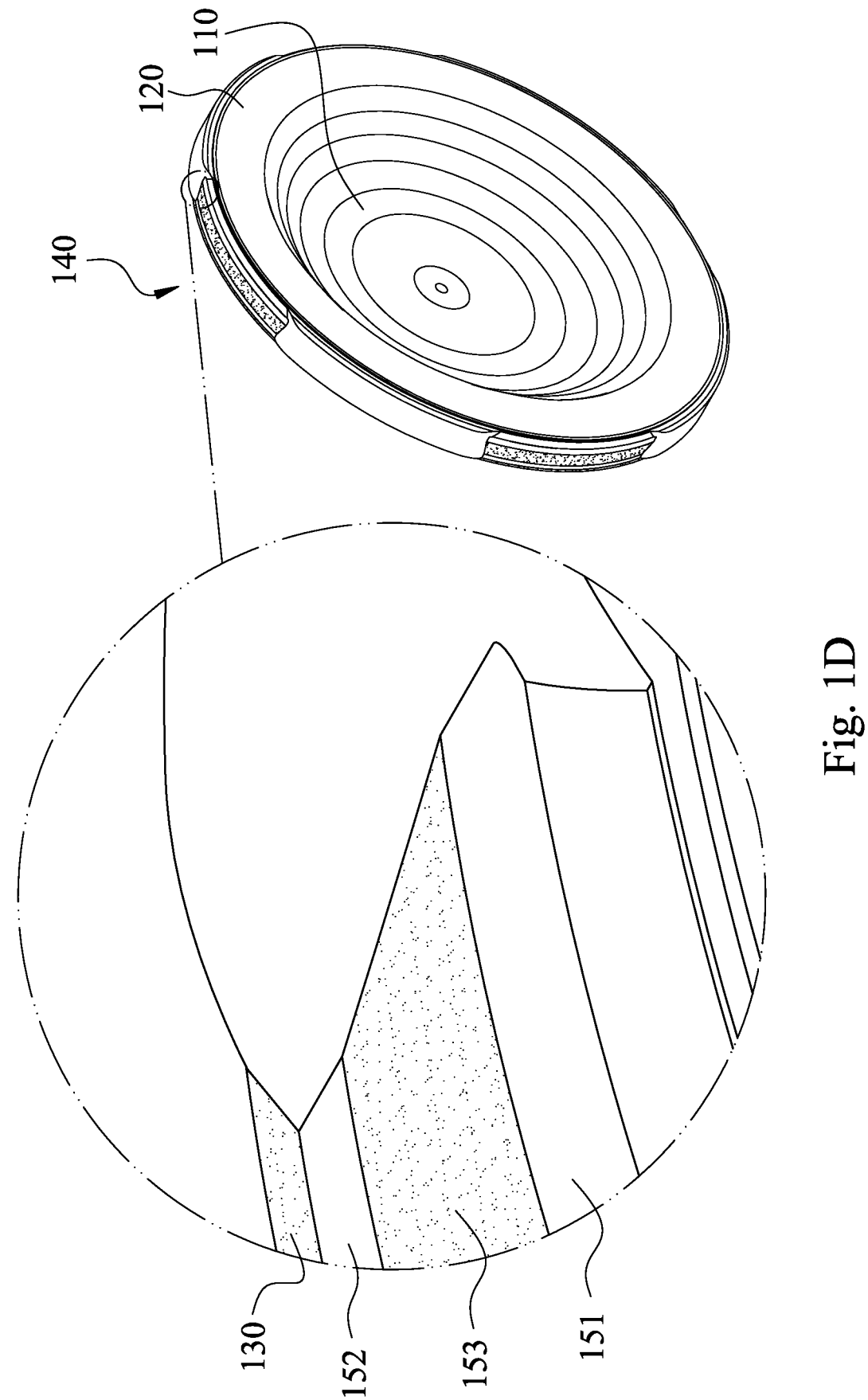
FIG. 1D is a partial enlarged view of the plastic lens element according to the 1A example of the 1st embodiment in FIG. 1A.

FIG. 1B is a schematic view of the plastic lens element according to the 1A example of the 1st embodiment in FIG. 1A. FIG. 1C is a cross-sectional view of the plastic lens element along line 1C-1C in FIG. 1B. FIG. 1D is a partial enlarged view of the plastic lens element according to the 1A example of the 1st embodiment in FIG. 1A. In FIGS. 1B to 1D, the plastic lens element has a section passing through the optical axis X, and the plastic lens element includes an optical effective region 110 and a peripheral region 120, wherein the optical axis X passes through the optical effective region 110, the peripheral region 120 is circularly disposed on a periphery of the optical effective region 110, and the peripheral region 120 has an outer diameter surface 121 and an annular lateral surface 122. The outer diameter surface 121 is farther away from the optical effective region 110 than the annular lateral surface 122 from the optical effective region 110, and the annular lateral surface 122 is located between the outer diameter surface 121 and the optical effective region 110. Furthermore, the peripheral region 120 includes a protrusive structure 130, an indented shape 140 and a drafting part 150.

The protrusive structure 130 is disposed on the outer diameter surface 121 and adjacent to the annular lateral surface 122, and the protrusive structure 130 extends towards a direction away from the optical axis X.

The indented shape 140 is dented from the outer diameter surface 121 towards the optical effective region 110, and the indented shape 140 has a base surface 141.

The drafting part 150 is raised from the base surface 141 towards the direction away from the optical axis X, and the drafting part 150 has a top surface 151 and a bottom surface 152 via the section, wherein the top surface 151 and the bottom surface 152 are arranged along an extending direction parallel to the optical axis X, a conical surface 153 is located between the top surface 151 and the bottom surface 152, the conical surface 153 is tapered from the top surface 151 towards the optical axis X in a direction towards the bottom surface 152, and the top surface 151, the conical surface 153, the bottom surface 152 and the protrusive structure 130 are arranged in order along a direction parallel to the optical axis X.

The conical surface 153 can be tapered towards the optical axis X in a direction towards a direction adjacent to the protrusive structure 130, the conical surface 153 faces towards an image side, and the protrusive structure 130 can be a burr, a parting line, an annular structure, wherein the protrusive structure 130 is usually the annular structure, but the present disclosure is not limited thereto.

In particular, the slight demolding resistance may be caused via the conical surface 153 during the demolding process of the plastic lens element after the injection molding, so that the stress caused during the demolding and the deformation caused by the stress are gathered at the peripheral region 120. Therefore, the deformation of the optical effective region 110 can be prevented.

Moreover, a set of the molds is usually configured to simultaneously form a plurality of plastic lens elements, and each of the plastic lens elements is fixed on the male mold via the demolding resistance caused by the conical surface 153 during removing the male mold and the female mold after the injection molding so as to prevent a portion of the plastic lens elements from attaching on the female mold during the demolding process for avoiding the pulling. Therefore, the molding yield of the plastic lens elements can be enhanced.

In FIGS. 1B and 1C, the indented shape 140 can include a gate 142. In particular, the gate 142, which easily causes the assembling tolerance, is disposed on the indented shape 140, so that the gate 142 can be prevented from being the outermost structure of the plastic lens element. Therefore, the assembling accuracy can be enhanced and the assembling tolerance can be decreased.

Figure 1E:
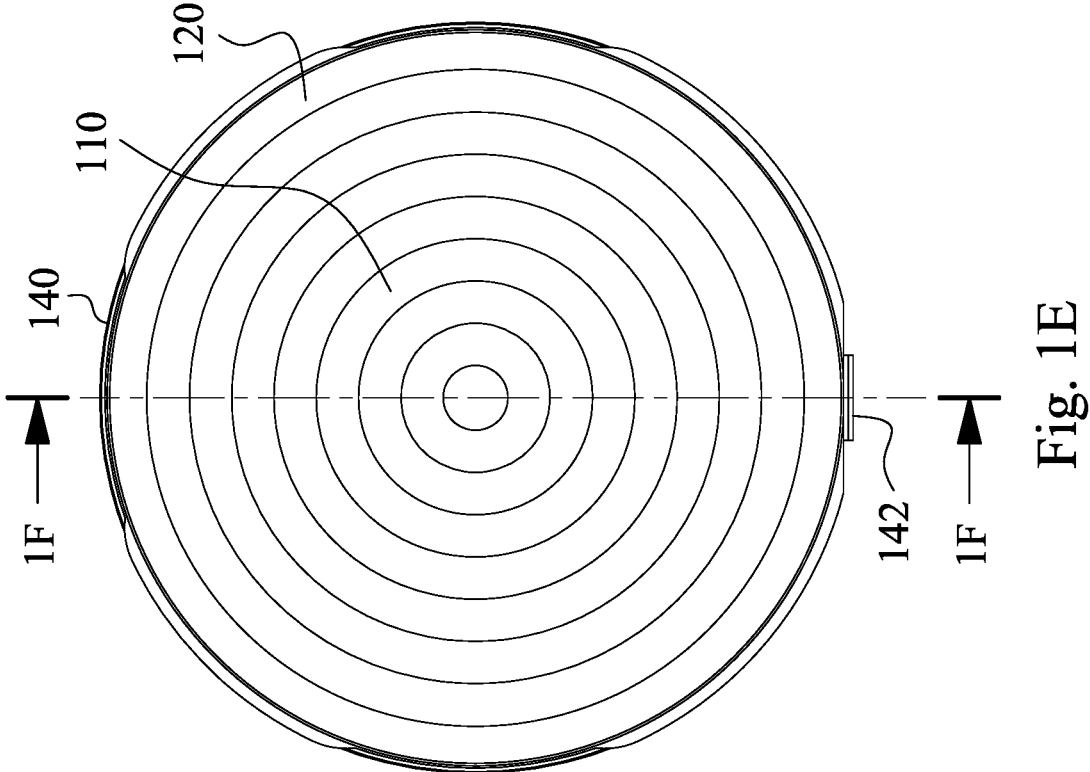
FIG. 1E is a schematic view of the plastic lens element according to the 1B example of the 1st embodiment in FIG. 1A.
Figure 1F:
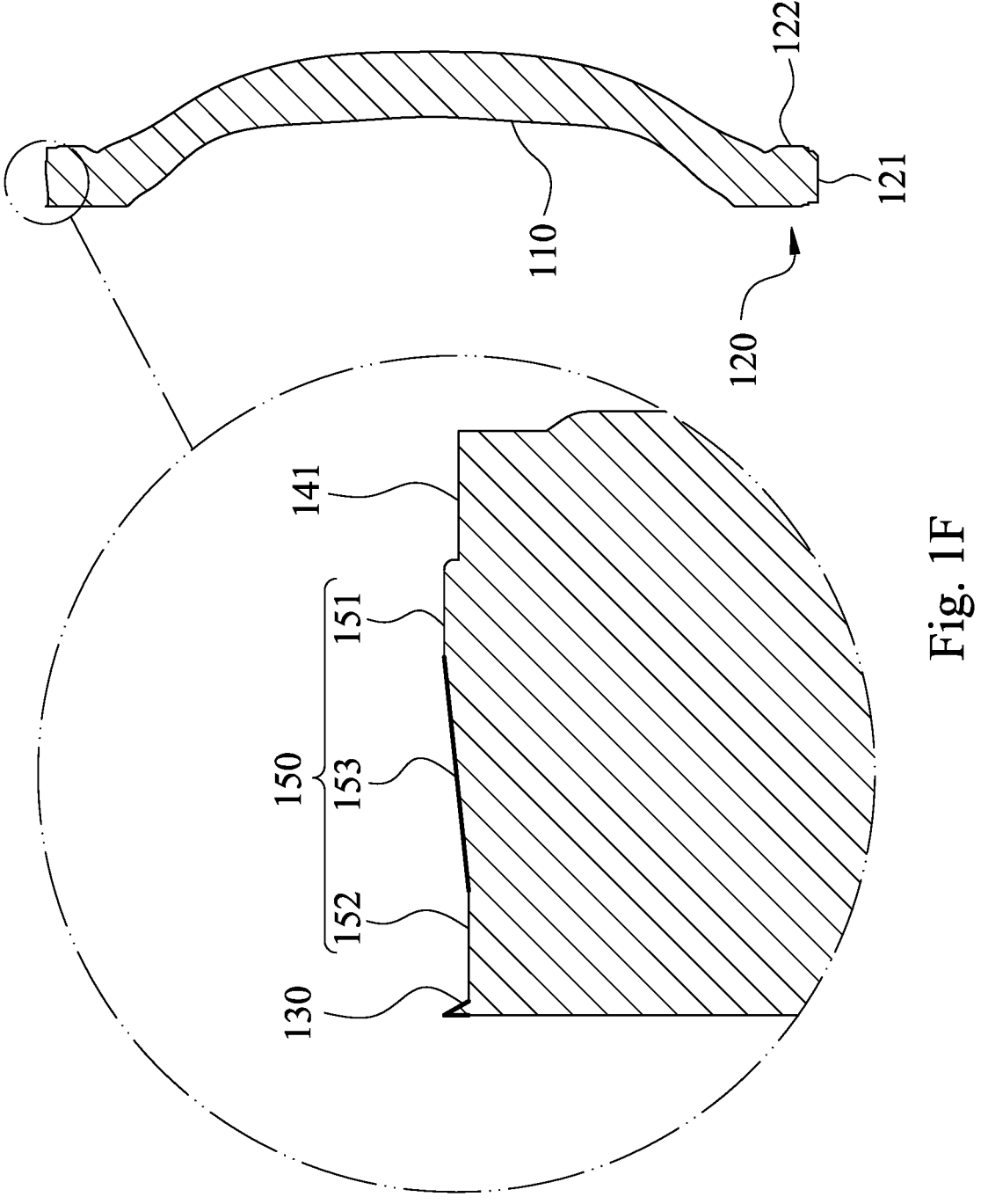
FIG. 1F is a cross-sectional view of the plastic lens element along line 1F-1F in FIG. 1E.
Figure 1G:
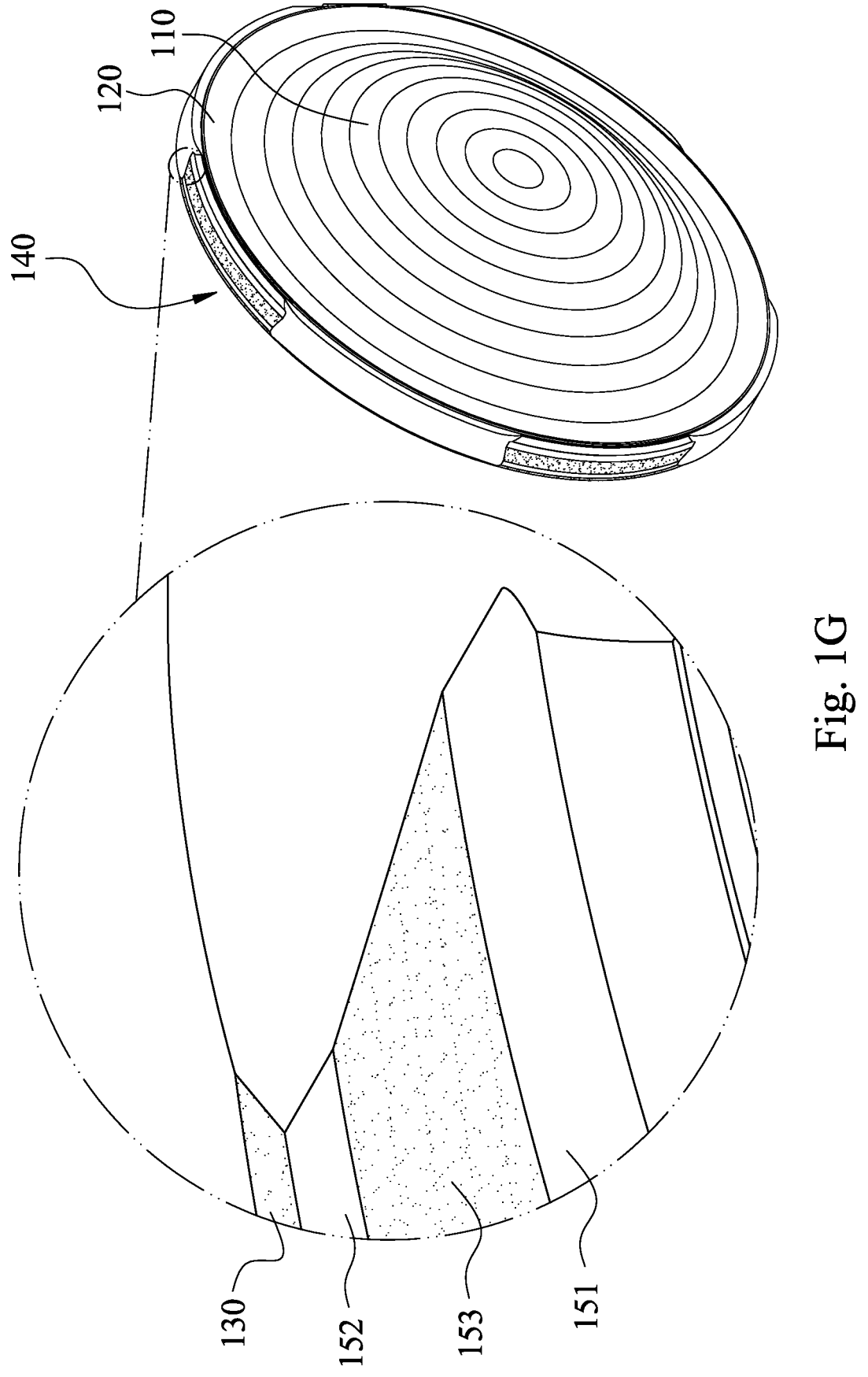
FIG. 1G is a partial enlarged view of the plastic lens element according to the 1B example of the 1st embodiment in FIG. 1E.

FIG. 1E is a schematic view of the plastic lens element according to the 1B example of the 1st embodiment in FIG. 1A. FIG. 1F is a cross-sectional view of the plastic lens element along line 1F-1F in FIG. 1E. FIG. 1G is a partial enlarged view of the plastic lens element according to the 1B example of the 1st embodiment in FIG. 1E. In FIGS. 1E to 1G, the conical surface 153 of the drafting part 150 faces towards an object side, wherein the difference between the 1A example of the 1st embodiment and the 1B example of the 1st embodiment is that the conical surface 153 faces towards the image side and the object side, respectively.

It should be mentioned that the straight line with thicker width in FIGS. 1C and 1F is configured to indicate the range of the conical surface 153, and the tip line segment with thicker width is configured to indicate the range of the protrusive structure 130.

Further, all of other structures and dispositions according to the 1B example of the 1st embodiment are the same as the structures and the dispositions according to the 1A example of the 1st embodiment, and will not be described again herein.

Figure 2A:
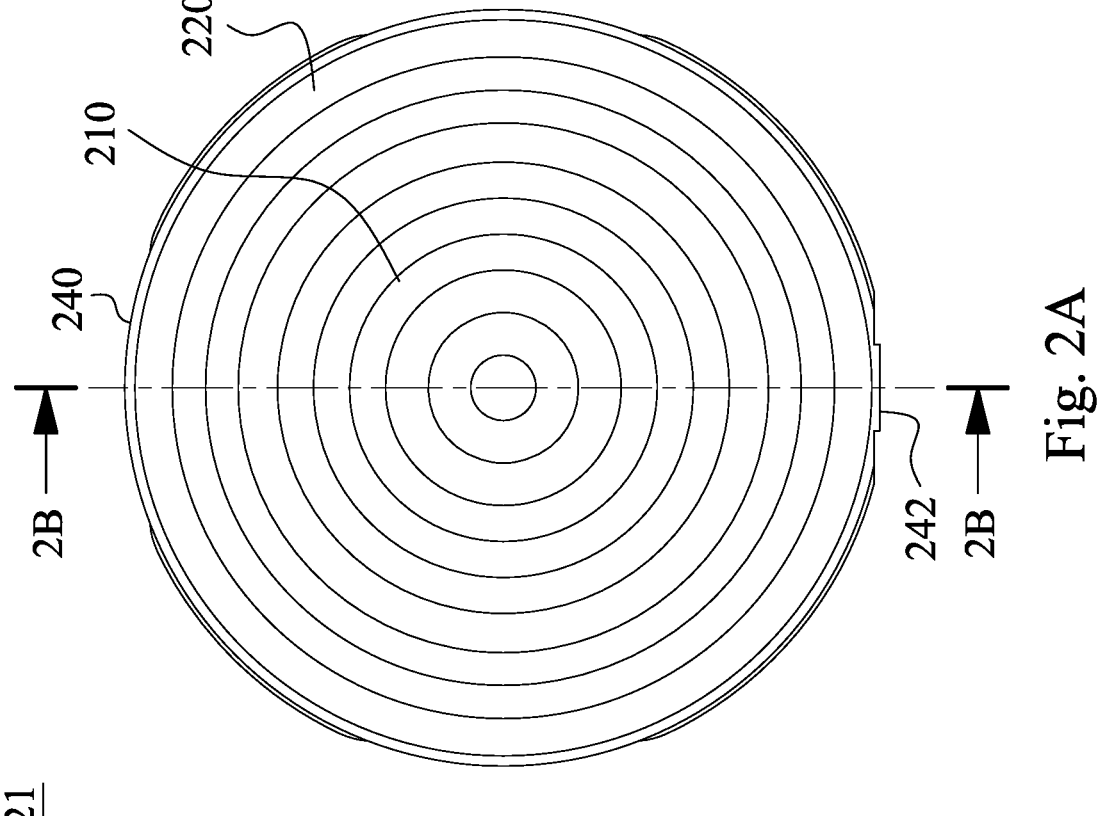
FIG. 2A is a schematic view of a plastic lens element according to the 1C example of the 1st embodiment of the present disclosure.
Figure 2B:
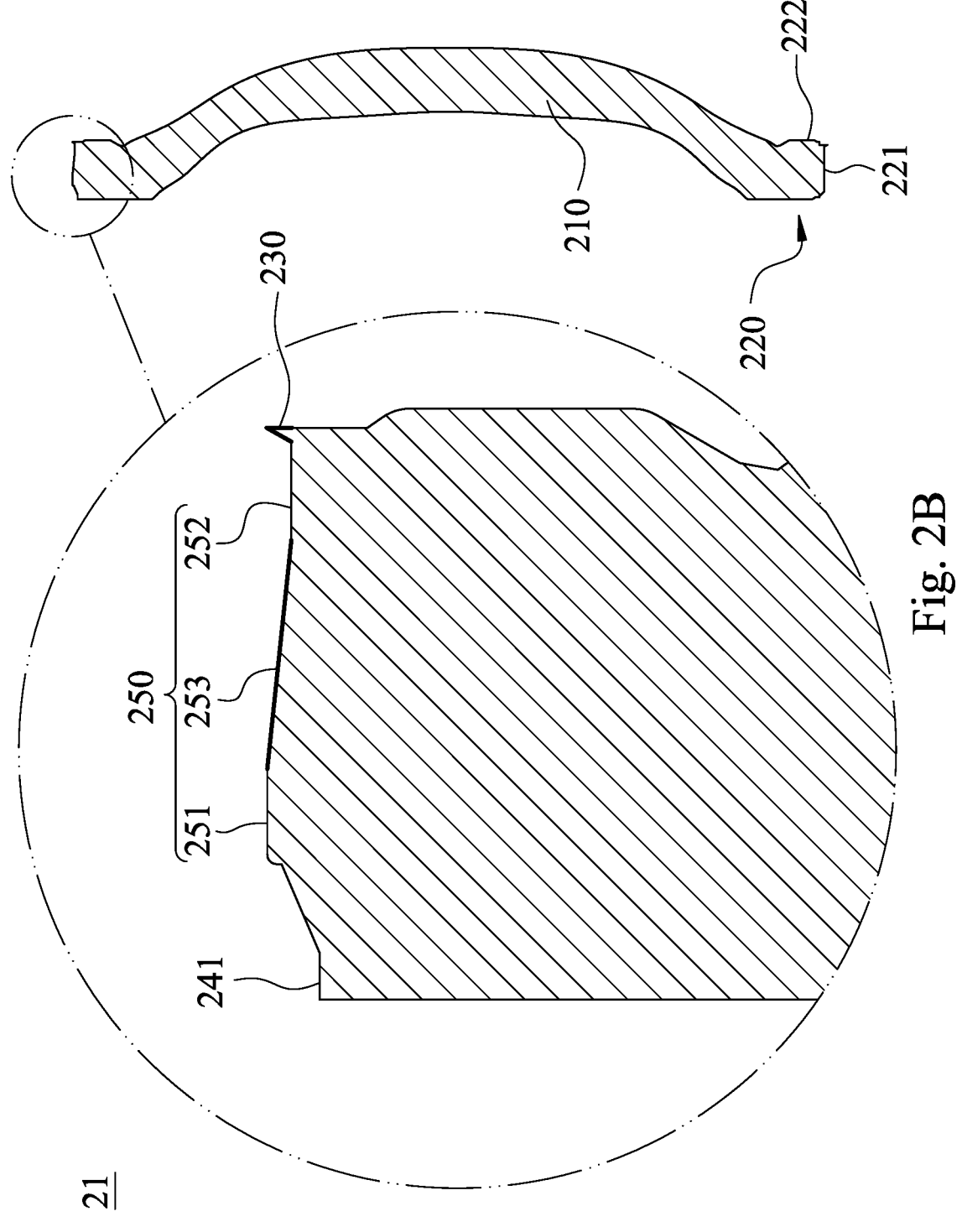
FIG. 2B is a cross-sectional view of the plastic lens element along line 2B-2B in FIG. 2A.

FIG. 2A is a schematic view of a plastic lens element 21 according to the 1C example of the 1st embodiment of the present disclosure. FIG. 2B is a cross-sectional view of the plastic lens element 21 along line 2B-2B in FIG. 2A. In FIGS. 2A and 2B, the plastic lens element 21 has a section passing through an optical axis (its reference numeral is omitted), and the plastic lens element 21 includes an optical effective region 210 and a peripheral region 220, wherein the optical axis passes through the optical effective region 210, the peripheral region 220 is circularly disposed on a periphery of the optical effective region 210, and the peripheral region 220 has an outer diameter surface 221 and an annular lateral surface 222. The outer diameter surface 221 is farther away from the optical effective region 210 than the annular lateral surface 222 from the optical effective region 210, and the annular lateral surface 222 is located between the outer diameter surface 221 and the optical effective region 210. Furthermore, the peripheral region 220 includes a protrusive structure 230, an indented shape 240 and a drafting part 250.

The protrusive structure 230 is disposed on the outer diameter surface 221 and adjacent to the annular lateral surface 222, and the protrusive structure 230 extends towards a direction away from the optical axis.

The indented shape 240 is dented from the outer diameter surface 221 towards the optical effective region 210, and the indented shape 240 has a base surface 241.

The drafting part 250 is raised from the base surface 241 towards the direction away from the optical axis, and the drafting part 250 has a top surface 251 and a bottom surface 252 via the section, wherein the top surface 251 and the bottom surface 252 are arranged along an extending direction parallel to the optical axis, a conical surface 253 is located between the top surface 251 and the bottom surface 252, the conical surface 253 is tapered from the top surface 251 towards the optical axis in a direction towards the bottom surface 252, and the top surface 251, the conical surface 253, the bottom surface 252 and the protrusive structure 230 are arranged in order along a direction parallel to the optical axis.

The conical surface 253 can be tapered towards the optical axis in a direction towards a direction adjacent to the protrusive structure 230, and the conical surface 253 faces towards an image side, wherein the protrusive structure 230 is a burr, and a number of the burr is one, but the present disclosure is not limited thereto.

The indented shape 240 can include a gate 242. In particular, the gate 242, which easily causes the assembling tolerance, is disposed on the indented shape 240, so that the gate 242 can be prevented from being the outermost structure of the plastic lens element 21. Therefore, the assembling accuracy can be enhanced and the assembling tolerance can be decreased.

Figure 2C:
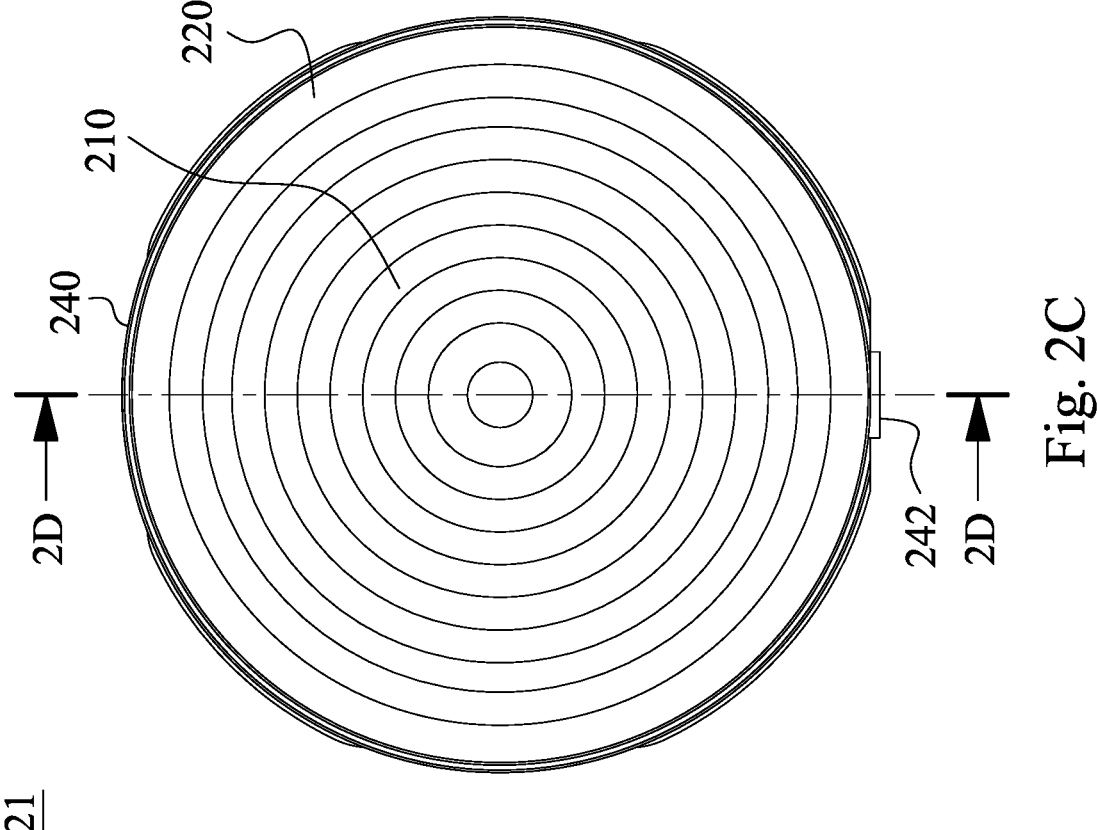
FIG. 2C is a schematic view of the plastic lens element according to the 1D example of the 1st embodiment in FIG. 2A.
Figure 2D:
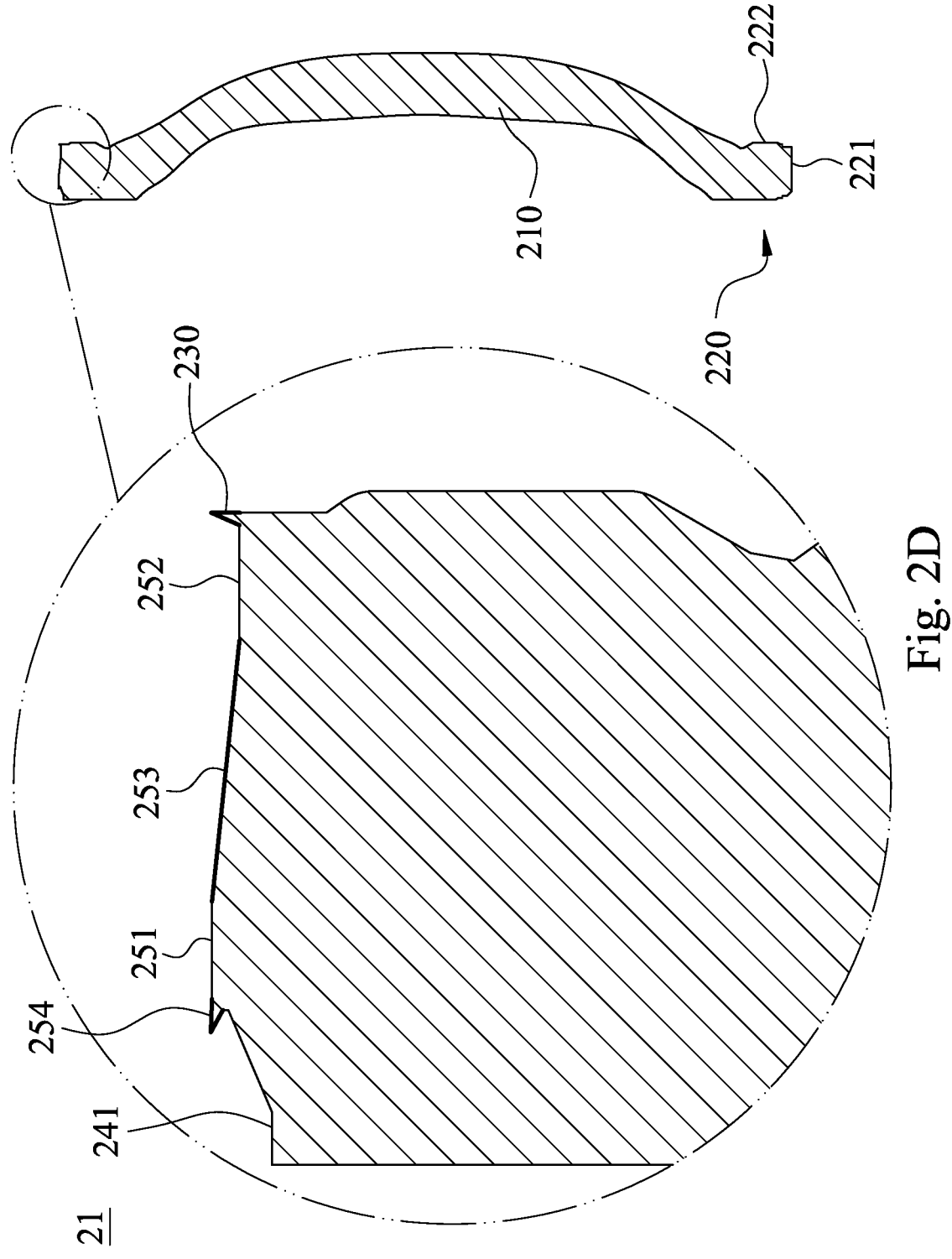
FIG. 2D is a cross-sectional view of the plastic lens element along line 2D-2D in FIG. 2C.

FIG. 2C is a schematic view of the plastic lens element 21 according to the 1D example of the 1st embodiment in FIG. 2A. FIG. 2D is a cross-sectional view of the plastic lens element 21 along line 2D-2D in FIG. 2C. In FIGS. 2C and 2D, the protrusive structure 230 is a burr, a number of the burr is one, and the drafting part 250 can further have a demold pulling drafting part 254. It should be mentioned that the pulling is caused during the demolding process owing to the demolding resistance, so that the demold pulling drafting part 254 is formed on the periphery.

In particular, the difference between the 1C example of the 1st embodiment and the 1D example of the 1st embodiment is whether the demold pulling drafting part is formed on the periphery.

It should be mentioned that the straight line with thicker width in FIGS. 2B and 2D is configured to indicate the range of the conical surface 253, and the tip line segment with thicker width is configured to indicate the range of the protrusive structure 230. Further, the bevel tip line segment with thicker width in FIG. 2D is configured to indicate the range of the demold pulling drafting part 254.

Further, all of other structures and dispositions according to the 1D example of the 1st embodiment are the same as the structures and the dispositions according to the 1C example of the 1st embodiment, and will not be described again herein.

Figure 3A:
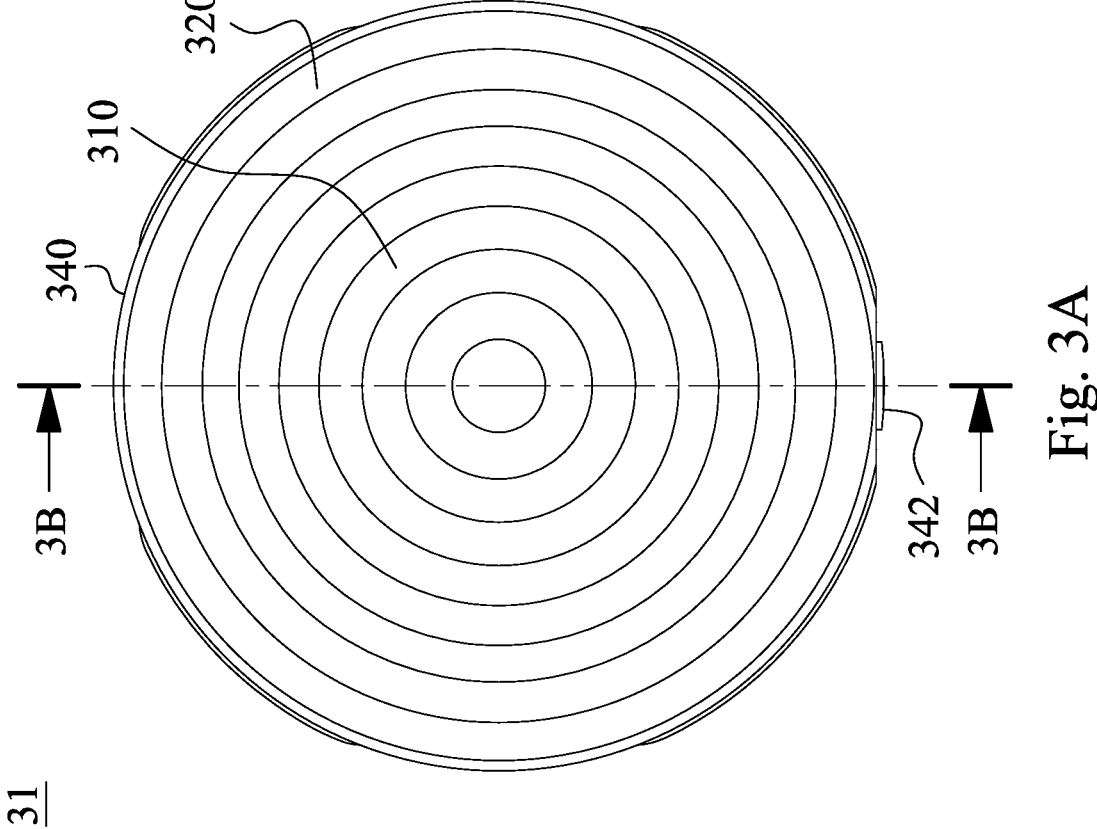
FIG. 3A is a schematic view of a plastic lens element according to the 1E example of the 1st embodiment of the present disclosure.
Figure 3B:
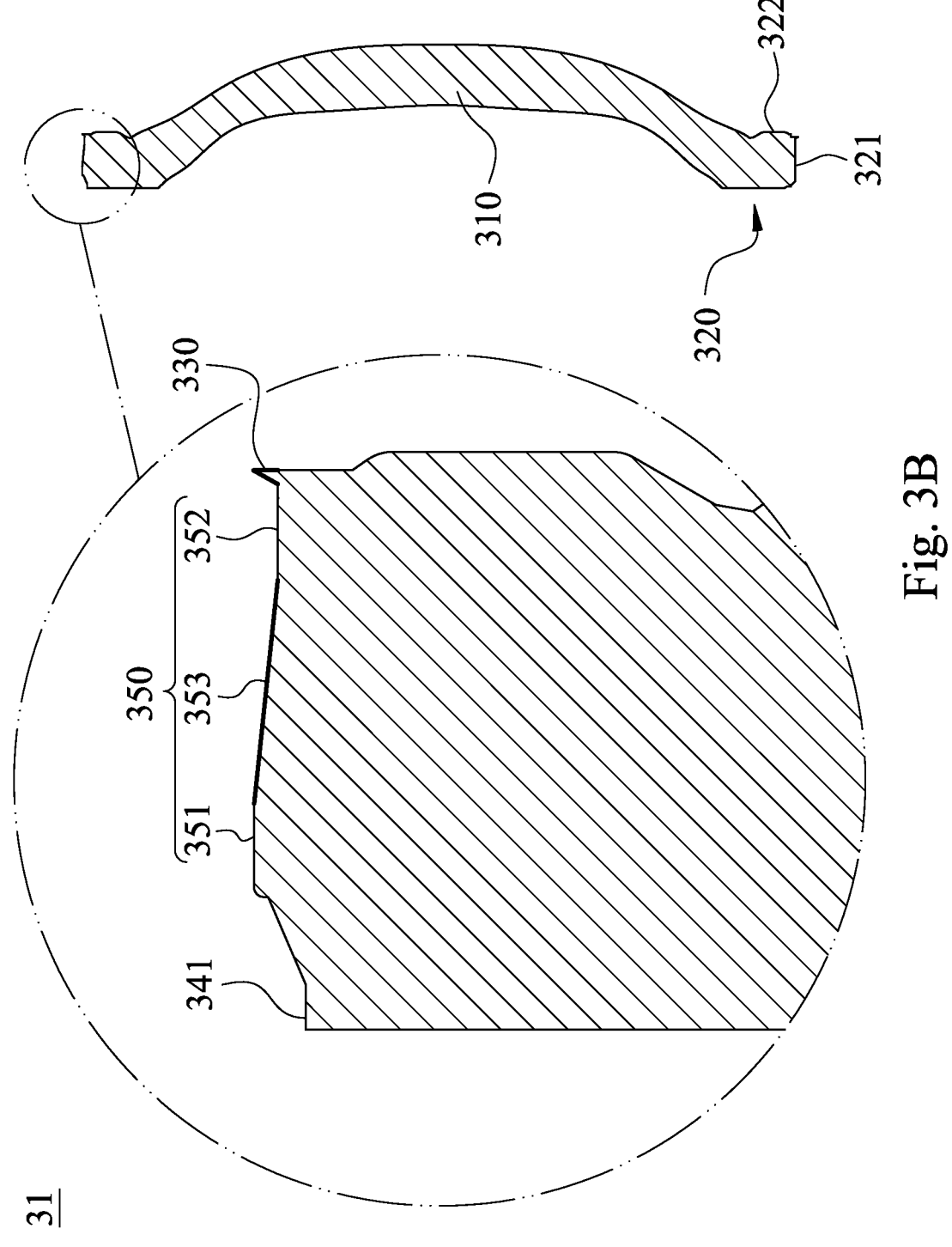
FIG. 3B is a cross-sectional view of the plastic lens element along line 3B-3B in FIG. 3A.

FIG. 3A is a schematic view of a plastic lens element 31 according to the 1E example of the 1st embodiment of the present disclosure. FIG. 3B is a cross-sectional view of the plastic lens element 31 along line 3B-3B in FIG. 3A. In FIGS. 3A and 3B, the plastic lens element 31 has a section passing through an optical axis X (labeled in FIG. 3D), and the plastic lens element 31 includes an optical effective region 310 and a peripheral region 320, wherein the optical axis X passes through the optical effective region 310, the peripheral region 320 is circularly disposed on a periphery of the optical effective region 310, and the peripheral region 320 has an outer diameter surface 321 and an annular lateral surface 322. The outer diameter surface 321 is farther away from the optical effective region 310 than the annular lateral surface 322 from the optical effective region 310, and the annular lateral surface 322 is located between the outer diameter surface 321 and the optical effective region 310. Furthermore, the peripheral region 320 includes a protrusive structure 330, an indented shape 340 and a drafting part 350.

The protrusive structure 330 is disposed on the outer diameter surface 321 and adjacent to the annular lateral surface 322, and the protrusive structure 330 extends towards a direction away from the optical axis X.

The indented shape 340 is dented from the outer diameter surface 321 towards the optical effective region 310, and the indented shape 340 has a base surface 341.

The drafting part 350 is raised from the base surface 341 towards the direction away from the optical axis X, and the drafting part 350 has a top surface 351 and a bottom surface 352 via the section, wherein the top surface 351 and the bottom surface 352 are arranged along an extending direction parallel to the optical axis X, a conical surface 353 is located between the top surface 351 and the bottom surface 352, the conical surface 353 is tapered from the top surface 351 towards the optical axis X in a direction towards the bottom surface 352, and the top surface 351, the conical surface 353, the bottom surface 352 and the protrusive structure 330 are arranged in order along a direction parallel to the optical axis X.

The conical surface 353 can be tapered towards the optical axis X in a direction towards a direction adjacent to the protrusive structure 330, and the conical surface 353 faces towards an image side, wherein the protrusive structure 330 can be a burr, a parting line, an annular structure, wherein the protrusive structure 330 is usually the annular structure, but the present disclosure is not limited thereto.

The indented shape 340 can include a gate 342. In particular, the gate 342, which easily causes the assembling tolerance, is disposed on the indented shape 340, so that the gate 342 can be prevented from being the outermost structure of the plastic lens element 31. Therefore, the assembling accuracy can be enhanced and the assembling tolerance can be decreased.

Figure 3C:
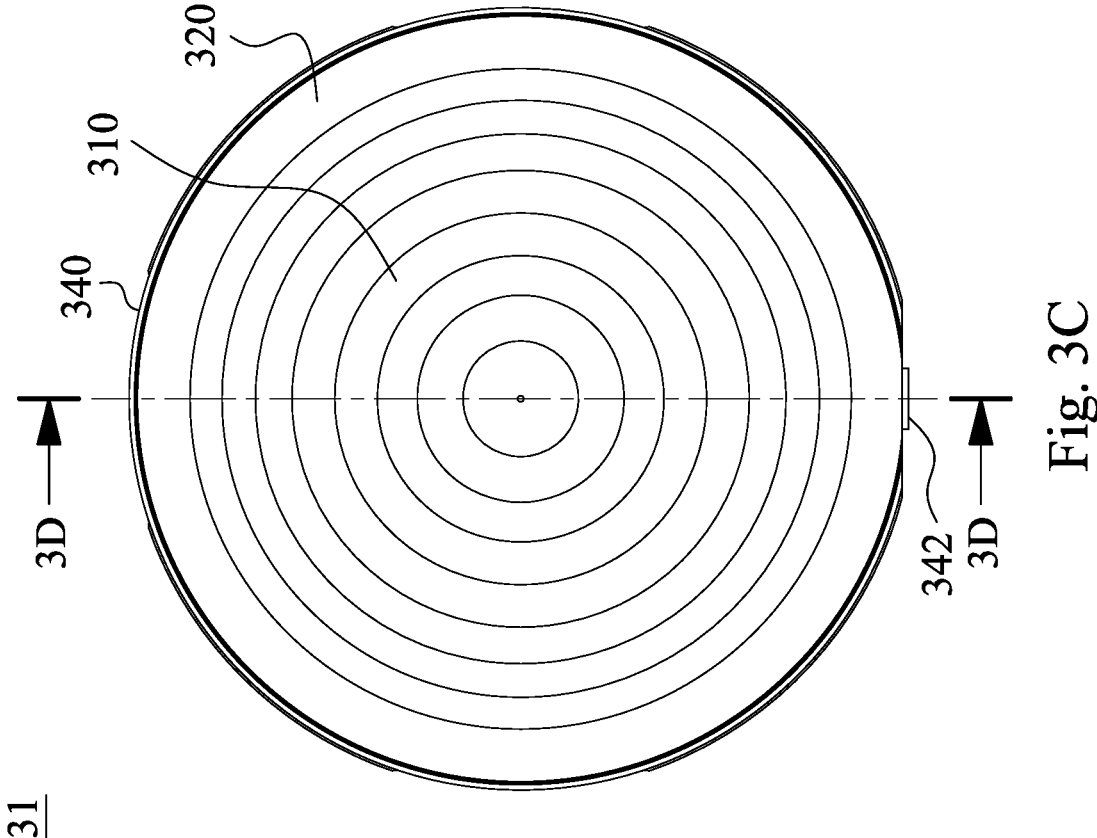
FIG. 3C is a schematic view of the plastic lens element according to the 1F example of the 1st embodiment in FIG. 3A.
Figure 3D:
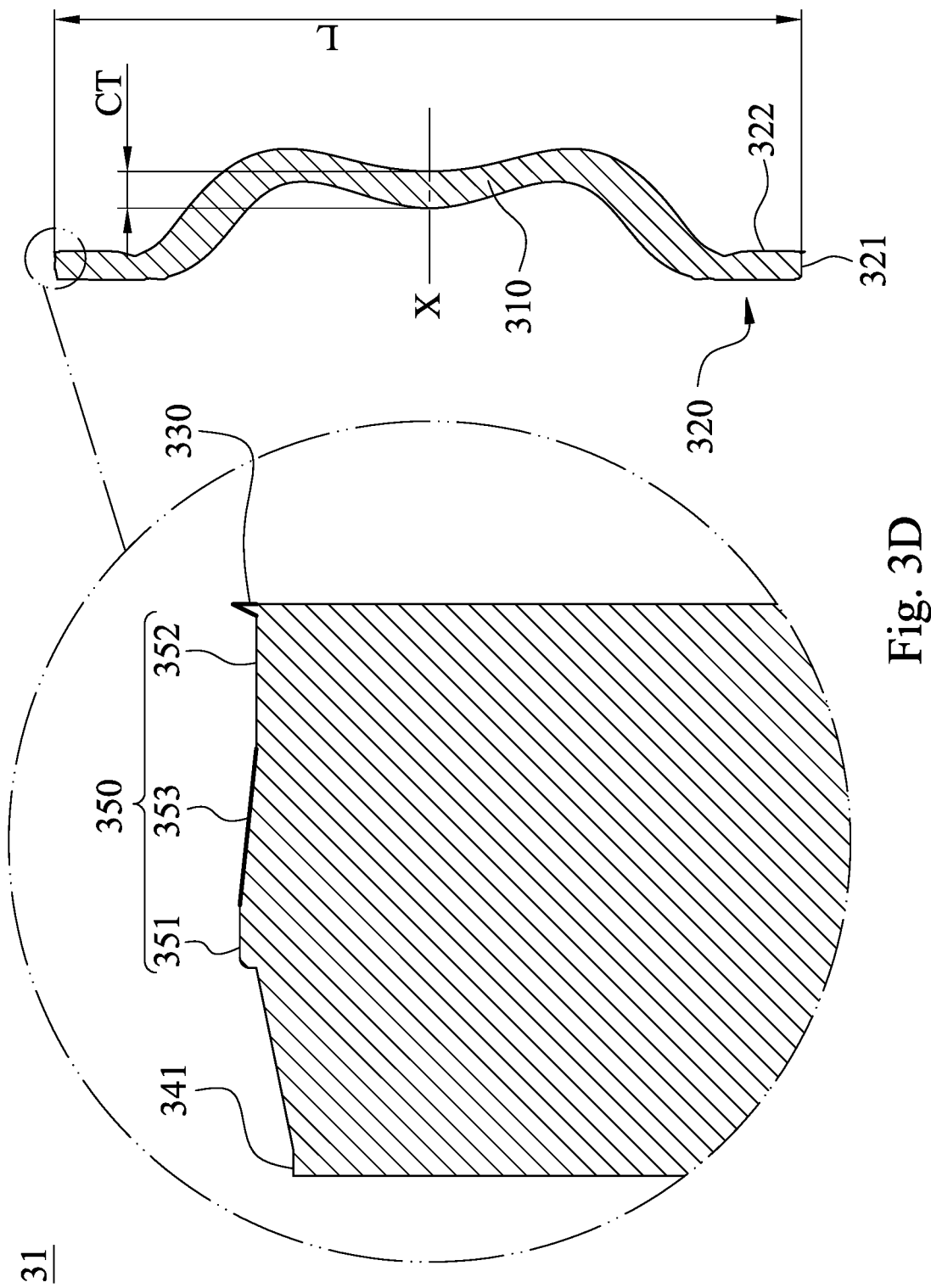
FIG. 3D is a cross-sectional view of the plastic lens element along line 3D-3D in FIG. 3C.

FIG. 3C is a schematic view of the plastic lens element 31 according to the 1F example of the 1st embodiment in FIG. 3A. FIG. 3D is a cross-sectional view of the plastic lens element 31 along line 3D-3D in FIG. 3C. In FIGS. 3C and 3D, a middle thickness of the plastic lens element 31 is thinner than a peripheral thickness of the plastic lens element 31. In particular, the optical effective region 310 has a lens thickness adjacent to the optical axis X, an extending direction of the lens thickness is parallel to the optical axis X, and the plastic lens element 31 has an outer diameter length passing through and vertical to the optical axis X, wherein the lens thickness is CT, the outer diameter length is L, and the following conditions of Table 3A are satisfied.

TABLE 3A

| the 1F example of the 1st embodiment | | | |
| --- | --- | --- | --- |
| CT (mm) | 0.568 | L/CT | 20.21 |
| L (mm) | 11.4783 | | |

Figure 3E:
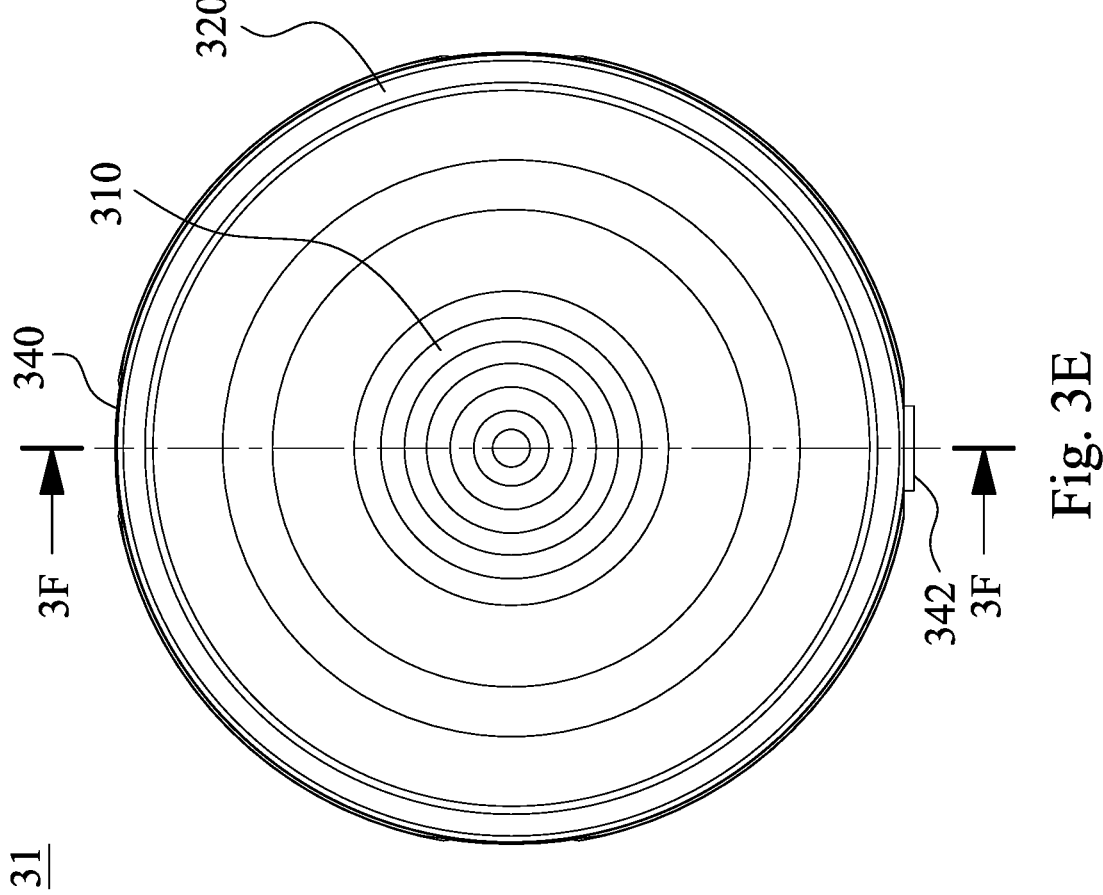
FIG. 3E is a schematic view of the plastic lens element according to the 1G example of the 1st embodiment in FIG. 3A.
Figure 3F:
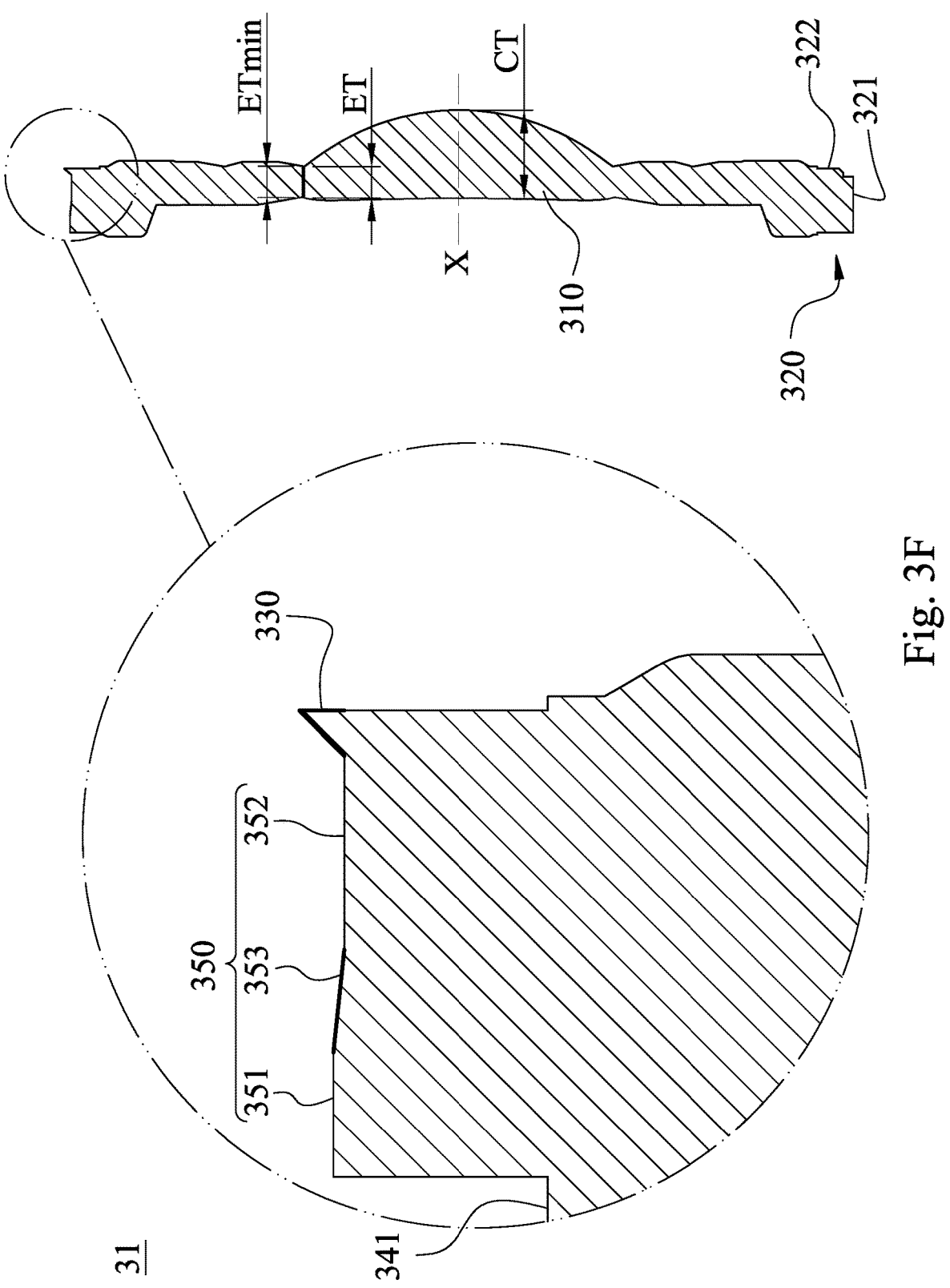
FIG. 3F is a cross-sectional view of the plastic lens element along line 3F-3F in FIG. 3E.

FIG. 3E is a schematic view of the plastic lens element 31 according to the 1G example of the 1st embodiment in FIG. 3A. FIG. 3F is a cross-sectional view of the plastic lens element 31 along line 3F-3F in FIG. 3E. In FIGS. 3E and 3F, a middle thickness of the plastic lens element 31 is thicker than a peripheral thickness of the plastic lens element 31. In particular, the optical effective region 310 has a lens thickness adjacent to the optical axis X, an extending direction of the lens thickness is parallel to the optical axis X, and the peripheral region 320 has a plurality of peripheral thicknesses parallel to the optical axis X, wherein the lens thickness is CT, each of the peripheral thicknesses is ET, a smallest one of the peripheral thicknesses is ETmin, and the following conditions of Table 3B are satisfied.

TABLE 3B

| the 1G example of the 1st embodiment | | | |
| --- | --- | --- | --- |
| CT (mm) | 1.3514 | ETmin (mm) | 0.4785 |
| ET (mm) | 0.4833 | ETmin/CT | 0.35 |

In particular, the difference among the 1E example of the 1st embodiment, the 1F example of the 1st embodiment and the 1G example of the 1st embodiment is the thickness distribution of the optical effective region 310.

It should be mentioned that the straight line with thicker width in FIGS. 3B and 3D to 3F is configured to indicate the range of the conical surface 353, and the tip line segment with thicker width is configured to indicate the range of the protrusive structure 330.

Further, all of other structures and dispositions according to the 1F example of the 1st embodiment and the 1G example of the 1st embodiment are the same as the structures and the dispositions according to the 1E example of the 1st embodiment, and will not be described again herein.

Figure 4A:
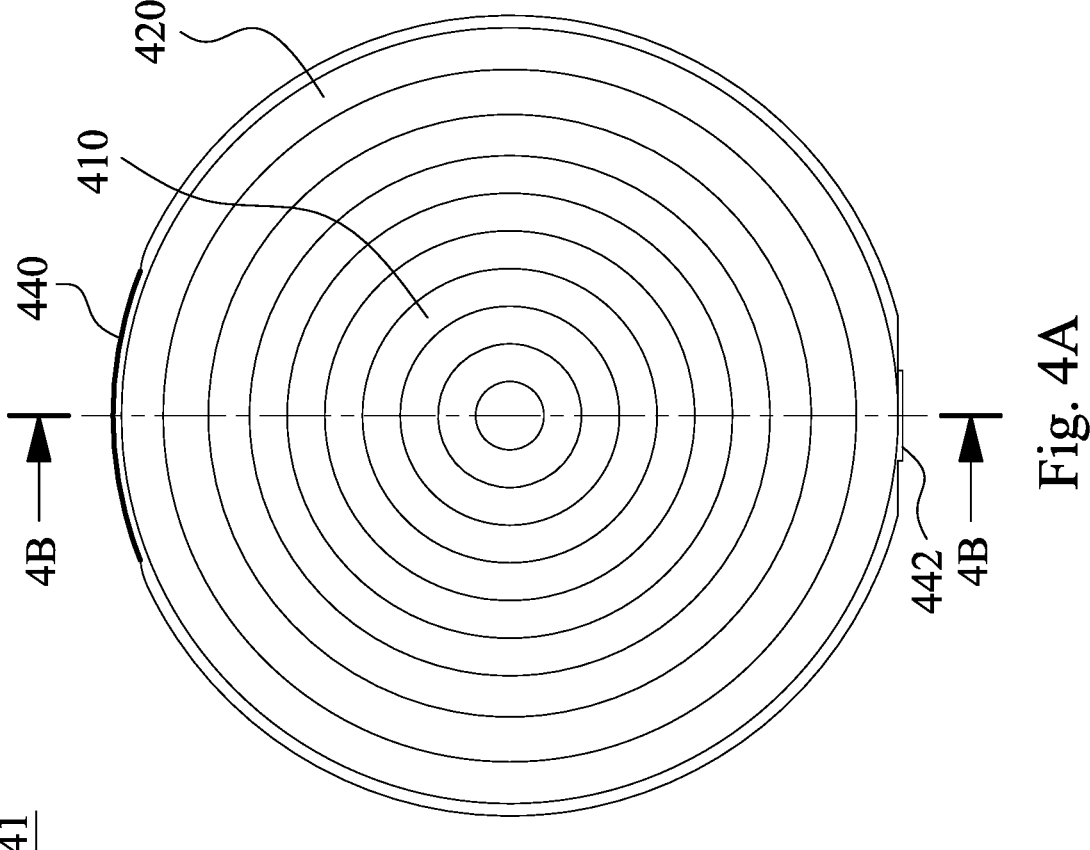
FIG. 4A is a schematic view of a plastic lens element according to the 1H example of the 1st embodiment of the present disclosure.
Figure 4B:
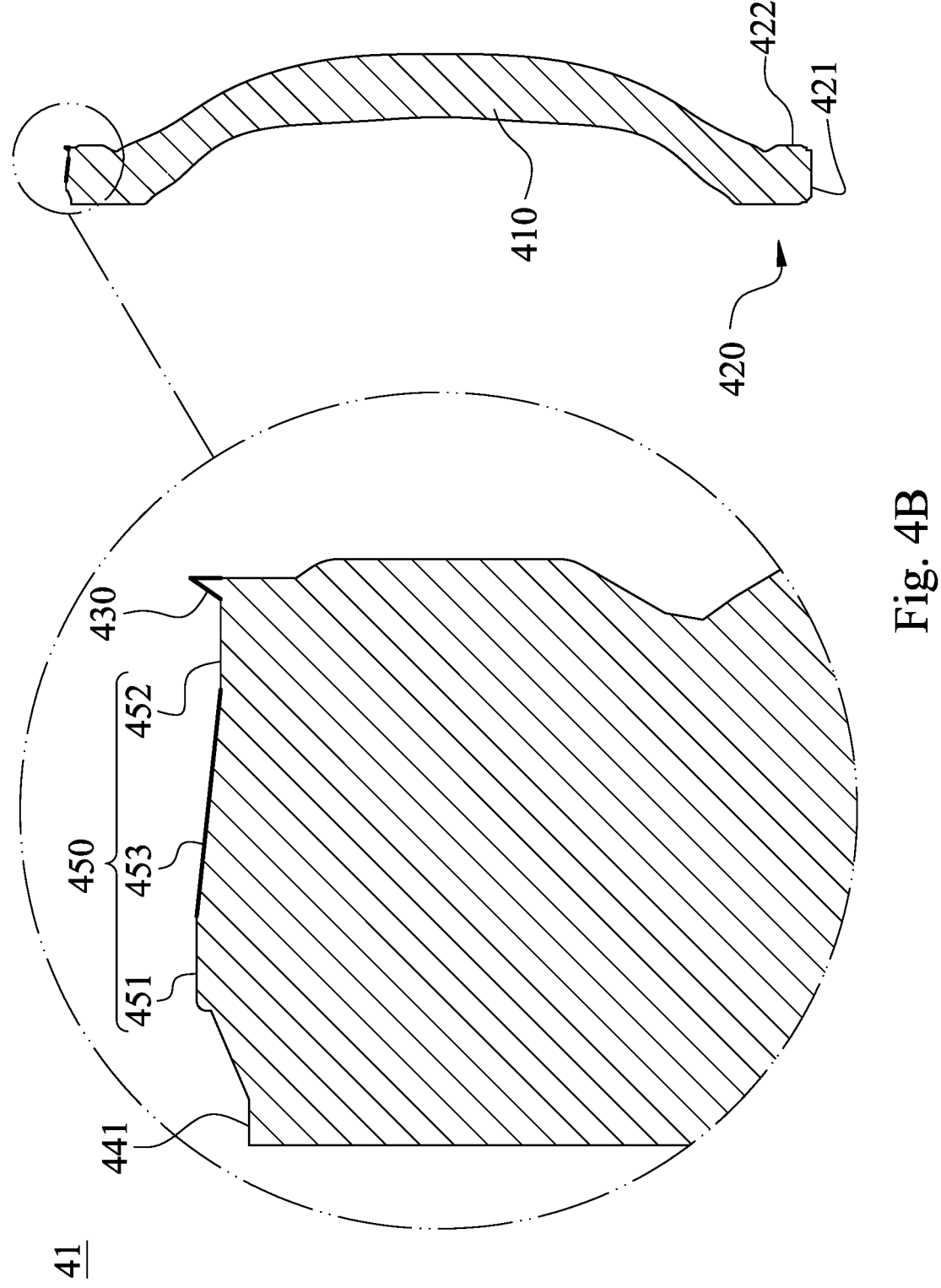
FIG. 4B is a cross-sectional view of the plastic lens element along line 4B-4B in FIG. 4A.

FIG. 4A is a schematic view of a plastic lens element 41 according to the 1H example of the 1st embodiment of the present disclosure. FIG. 4B is a cross-sectional view of the plastic lens element 41 along line 4B-4B in FIG. 4A. In FIGS. 4A and 4B, the plastic lens element 41 has a section passing through an optical axis (its reference numeral is omitted), and the plastic lens element 41 includes an optical effective region 410 and a peripheral region 420, wherein the optical axis passes through the optical effective region 410, the peripheral region 420 is circularly disposed on a periphery of the optical effective region 410, and the peripheral region 420 has an outer diameter surface 421 and an annular lateral surface 422. The outer diameter surface 421 is farther away from the optical effective region 410 than the annular lateral surface 422 from the optical effective region 410, and the annular lateral surface 422 is located between the outer diameter surface 421 and the optical effective region 410. Furthermore, the peripheral region 420 includes a protrusive structure 430, an indented shape 440 and a drafting part 450.

The protrusive structure 430 is disposed on the outer diameter surface 421 and adjacent to the annular lateral surface 422, and the protrusive structure 430 extends towards a direction away from the optical axis.

The indented shape 440 is dented from the outer diameter surface 421 towards the optical effective region 410, and the indented shape 440 has a base surface 441.

The drafting part 450 is raised from the base surface 441 towards the direction away from the optical axis, and the drafting part 450 has a top surface 451 and a bottom surface 452 via the section, wherein the top surface 451 and the bottom surface 452 are arranged along an extending direction parallel to the optical axis, a conical surface 453 is located between the top surface 451 and the bottom surface 452, the conical surface 453 is tapered from the top surface 451 towards the optical axis in a direction towards the bottom surface 452, and the top surface 451, the conical surface 453, the bottom surface 452 and the protrusive structure 430 are arranged in order along a direction parallel to the optical axis.

The conical surface 453 can be tapered towards the optical axis in a direction towards a direction adjacent to the protrusive structure 430, and the conical surface 453 faces towards an image side, wherein the protrusive structure 430 can be a burr, a parting line, an annular structure, wherein the protrusive structure 430 is usually the annular structure, but the present disclosure is not limited thereto.

The indented shape 440 can include a gate 442. In particular, the gate 442, which easily causes the assembling tolerance, is disposed on the indented shape 440, so that the gate 442 can be prevented from being the outermost structure of the plastic lens element 41. Therefore, the assembling accuracy can be enhanced and the assembling tolerance can be decreased.

According to the 1H example of the 1st embodiment, a number of the indented shape 440 is one.

Figure 4C:
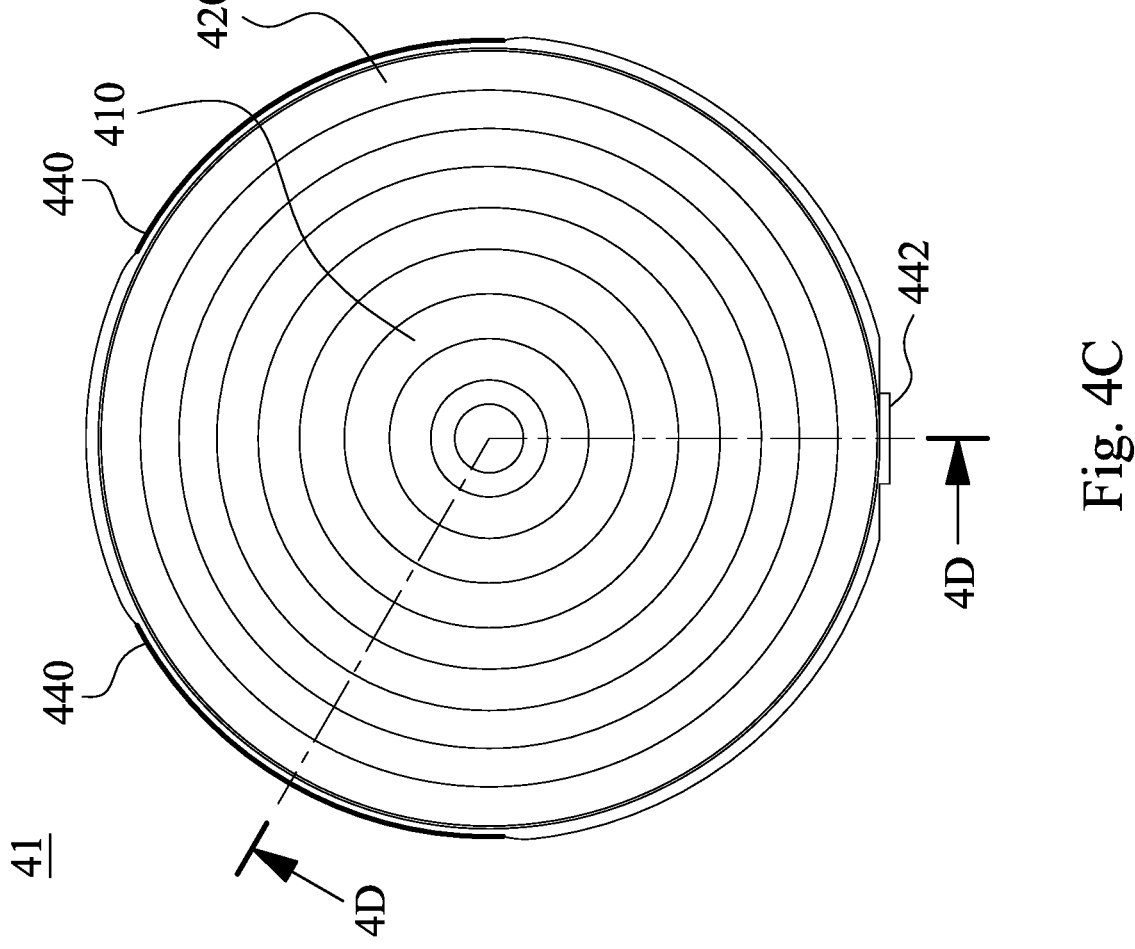
FIG. 4C is a schematic view of the plastic lens element according to the 1I example of the 1st embodiment in FIG. 4A.
Figure 4D:
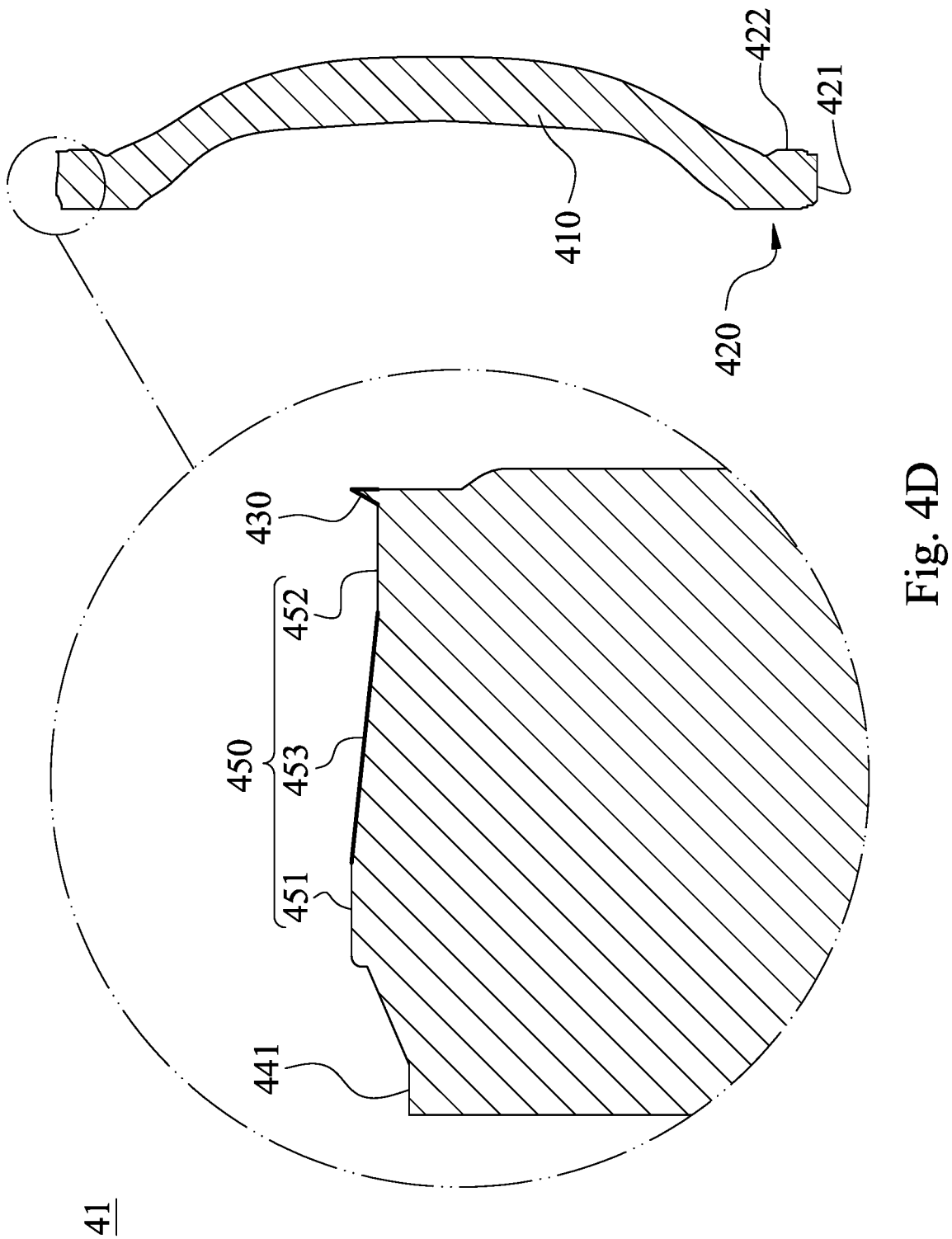
FIG. 4D is a cross-sectional view of the plastic lens element along line 4D-4D in FIG. 4C.

FIG. 4C is a schematic view of the plastic lens element 41 according to the 1I example of the 1st embodiment in FIG. 4A. FIG. 4D is a cross-sectional view of the plastic lens element 41 along line 4D-4D in FIG. 4C. In FIGS. 4C and 4D, a number of the indented shape 440 is two.

Figure 4E:
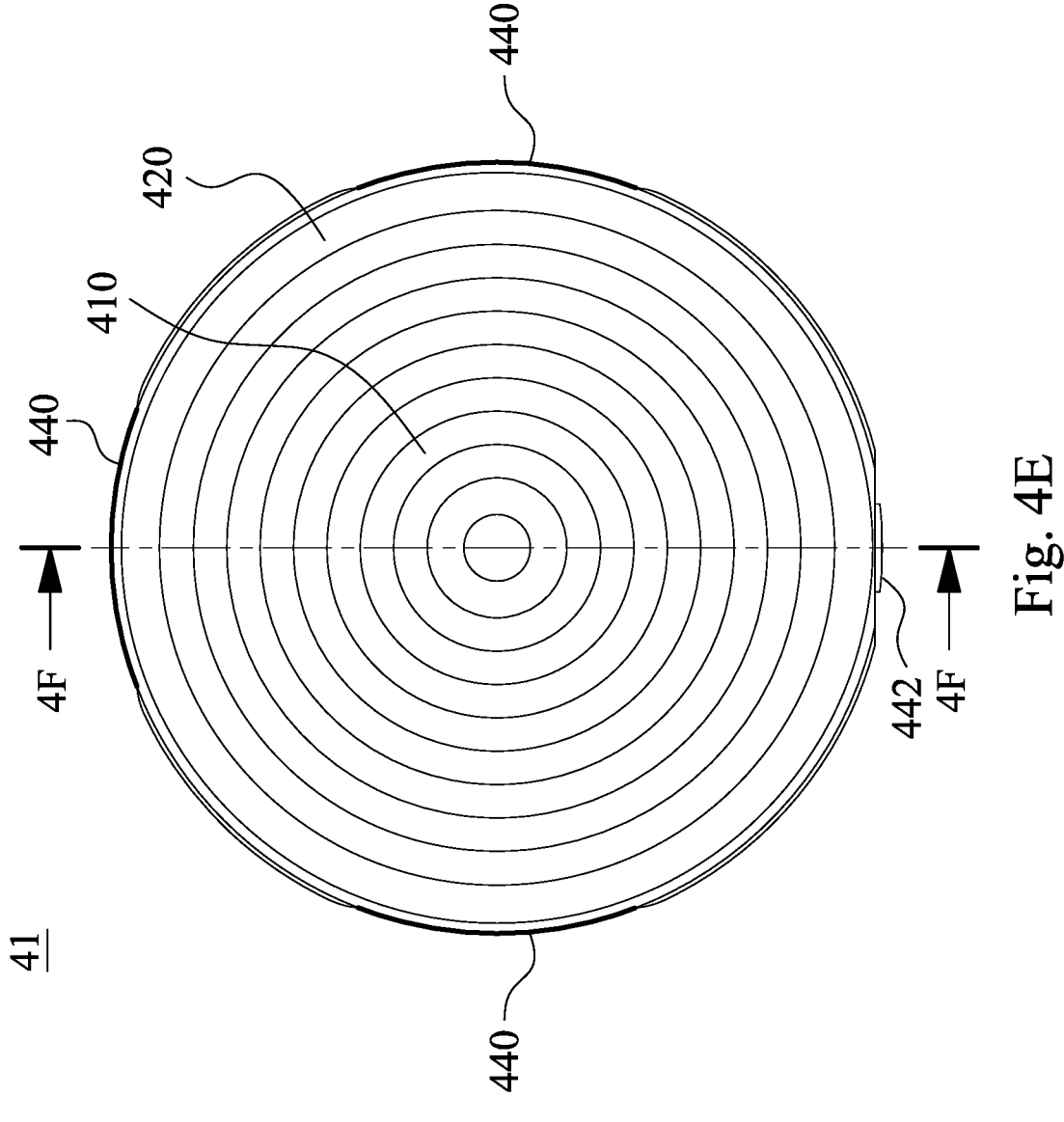
FIG. 4E is a schematic view of the plastic lens element according to the 1J example of the 1st embodiment in FIG. 4A.
Figure 4F:
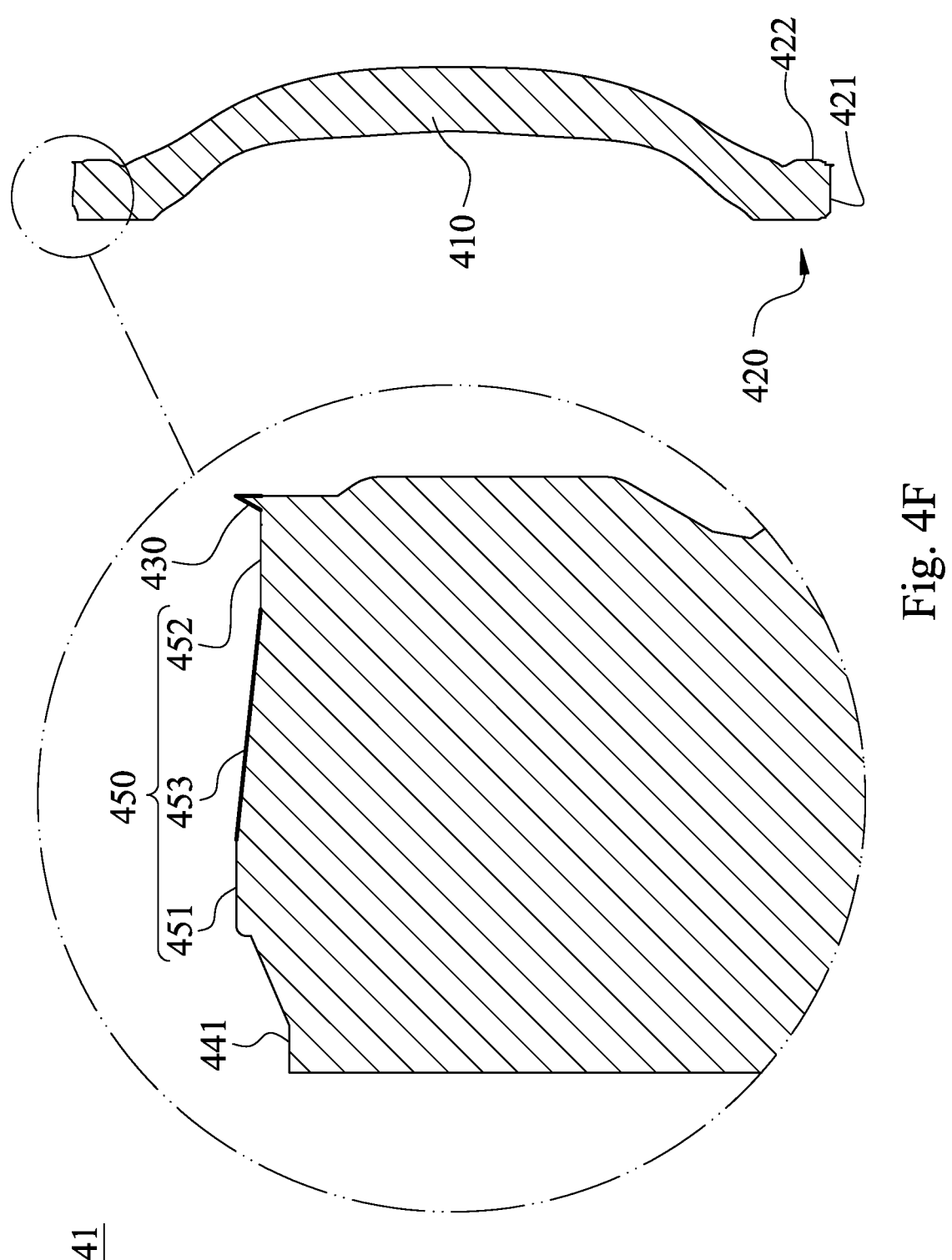
FIG. 4F is a cross-sectional view of the plastic lens element along line 4F-4F in FIG. 4E.

FIG. 4E is a schematic view of the plastic lens element 41 according to the 1J example of the 1st embodiment in FIG. 4A. FIG. 4F is a cross-sectional view of the plastic lens element 41 along line 4F-4F in FIG. 4E. In FIGS. 4E and 4F, a number of the indented shape 440 is three.

Figure 4G:
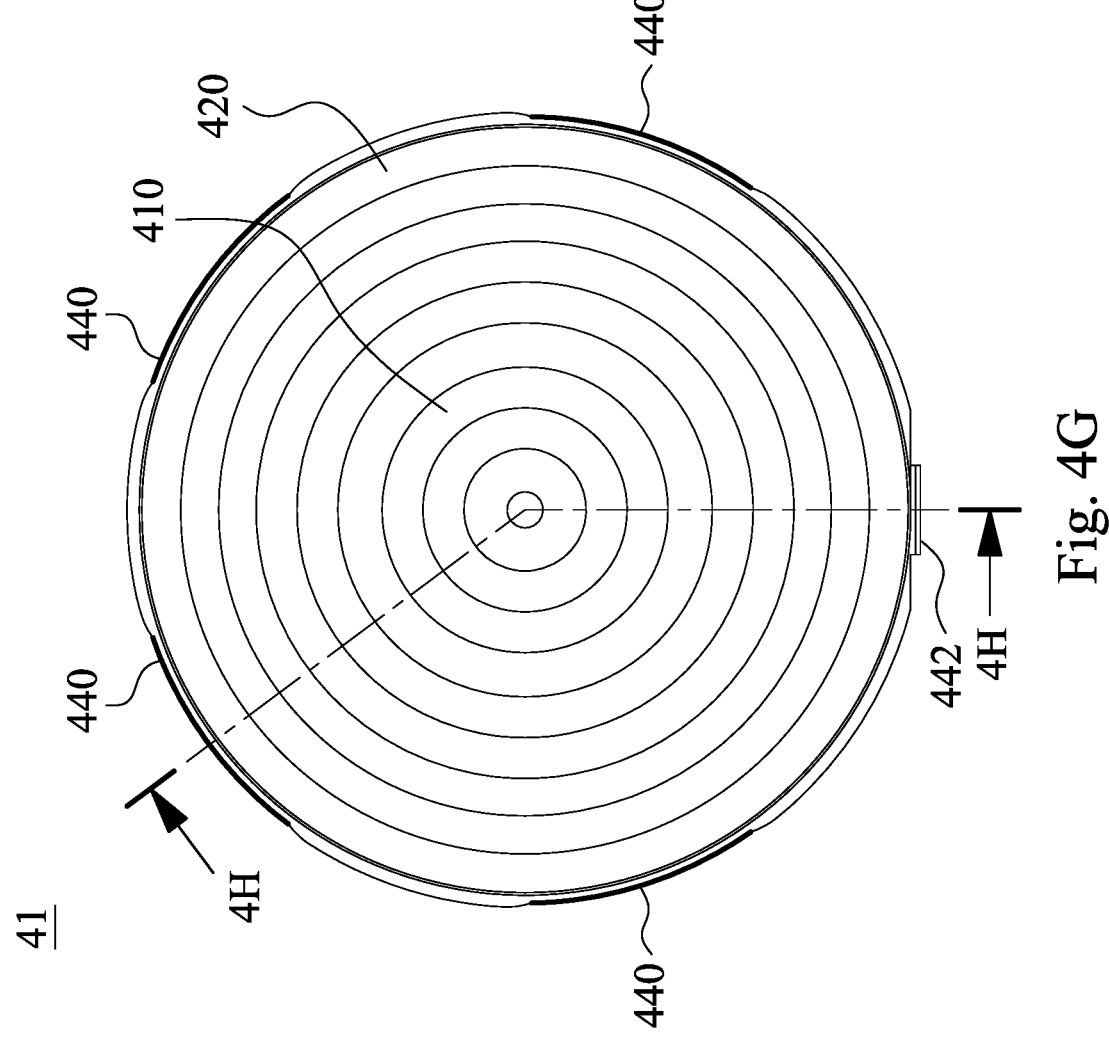
FIG. 4G is a schematic view of the plastic lens element according to the 1K example of the 1st embodiment in FIG. 4A.
Figure 4H:
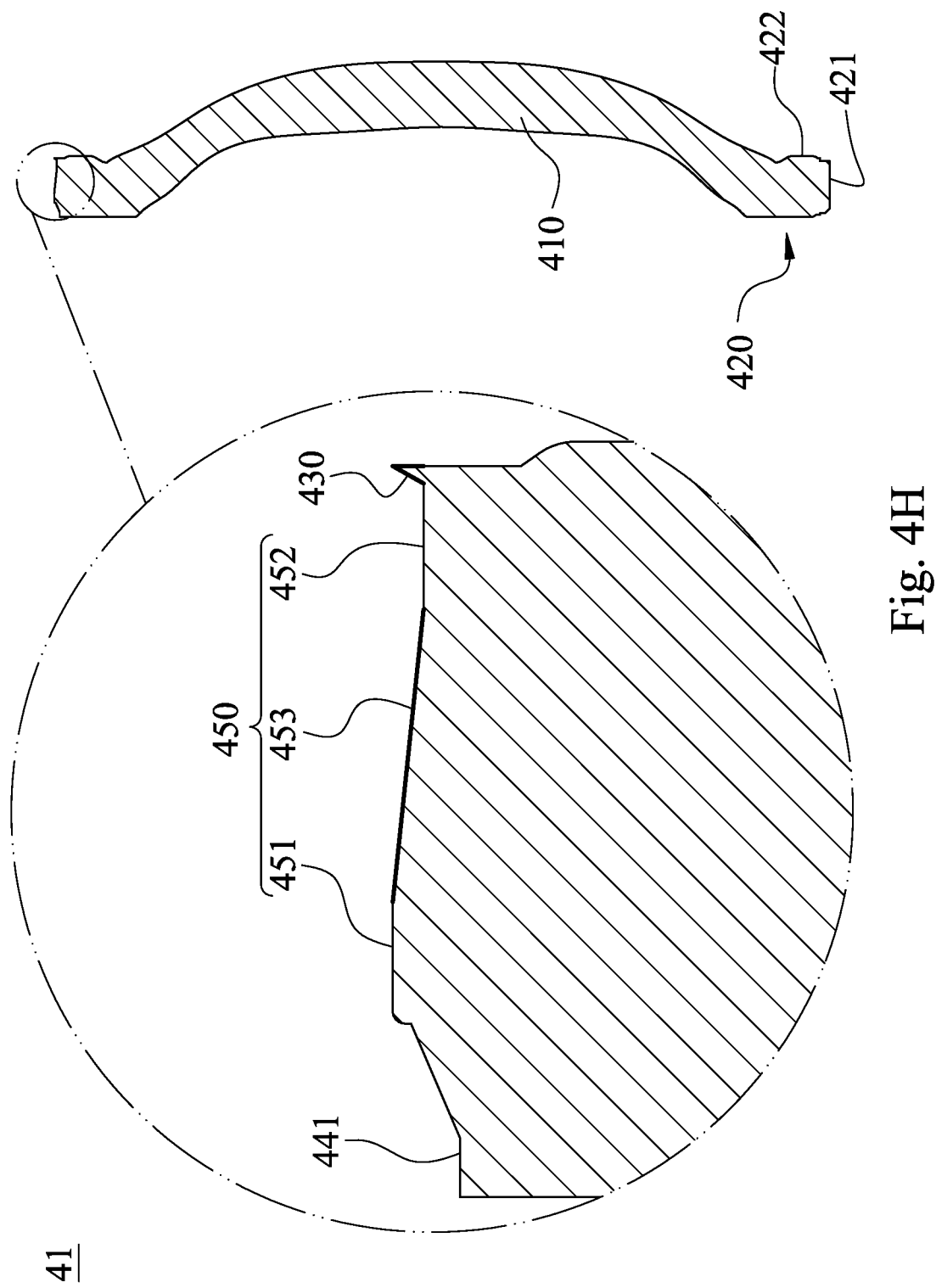
FIG. 4H is a cross-sectional view of the plastic lens element along line 4H-4H in FIG. 4G.

FIG. 4G is a schematic view of the plastic lens element 41 according to the 1K example of the 1st embodiment in FIG. 4A. FIG. 4H is a cross-sectional view of the plastic lens element 41 along line 4H-4H in FIG. 4G. In FIGS. 4G and 4H, a number of the indented shape 440 is four.

Figure 4I:
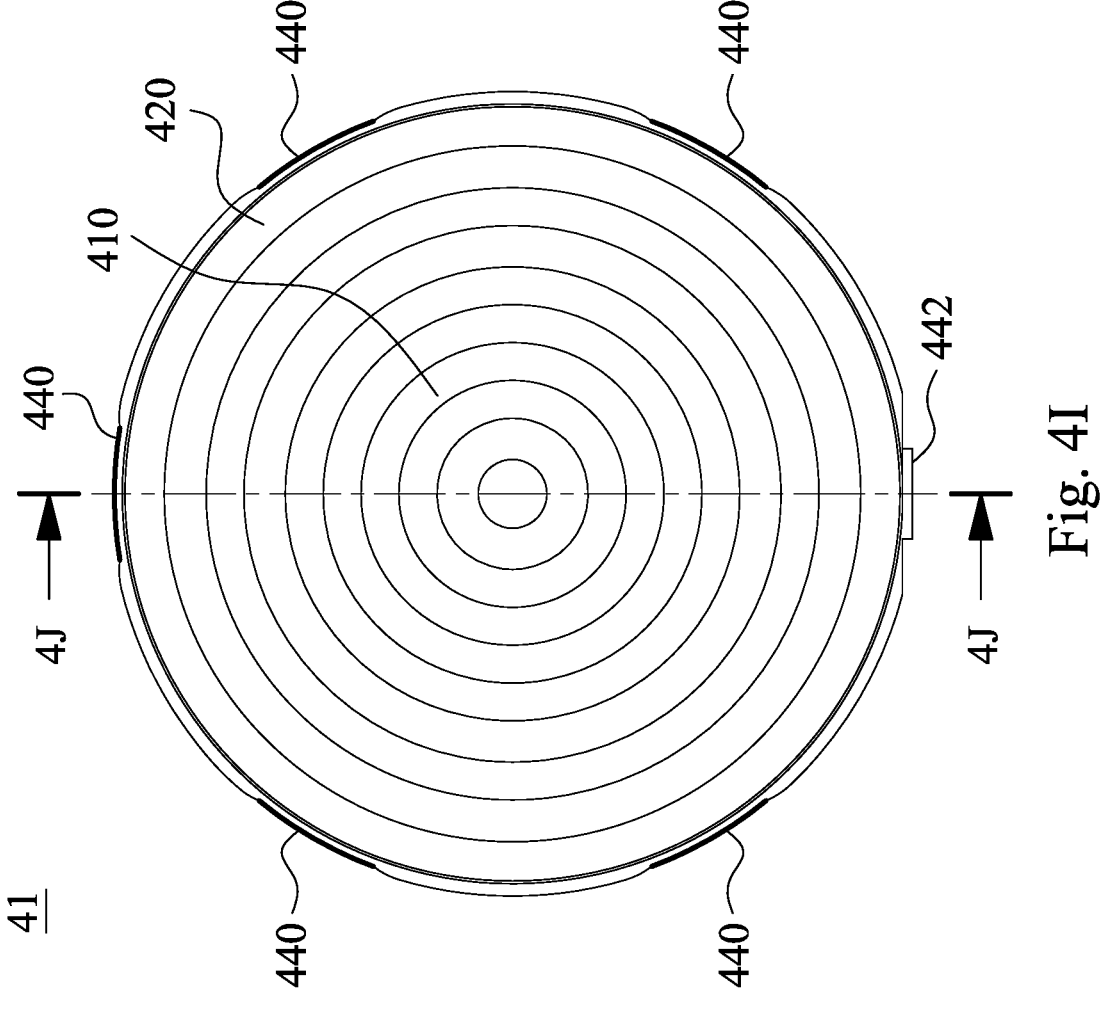
FIG. 4I is a schematic view of the plastic lens element according to the 1L example of the 1st embodiment in FIG. 4A.
Figure 4J:
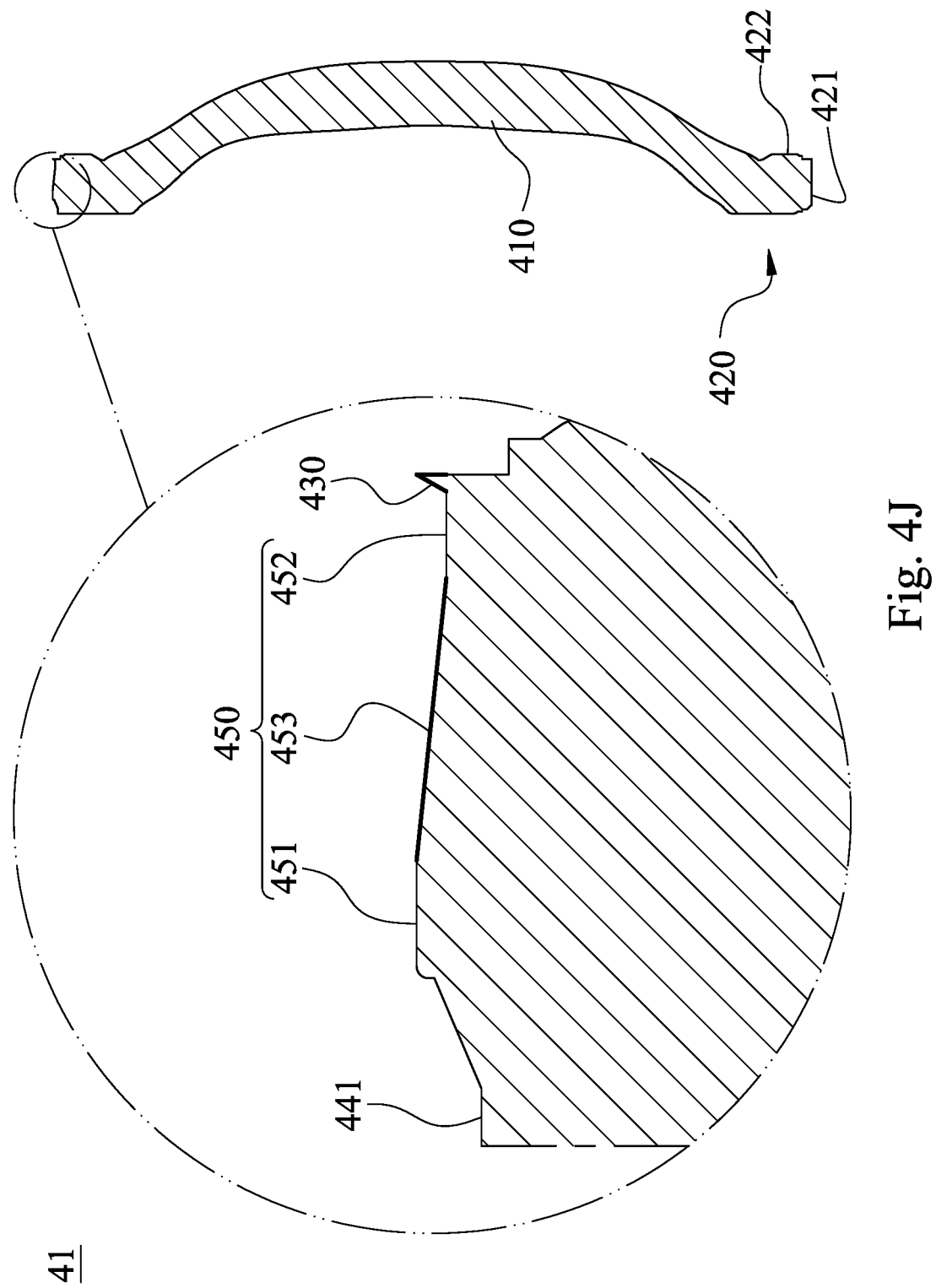
FIG. 4J is a cross-sectional view of the plastic lens element along line 4J-4J in FIG. 4I.

FIG. 4I is a schematic view of the plastic lens element 41 according to the 1L example of the 1st embodiment in FIG. 4A. FIG. 4J is a cross-sectional view of the plastic lens element 41 along line 4J-4J in FIG. 4I. In FIGS. 41 and 4J, a number of the indented shape 440 is five.

Figure 4K:
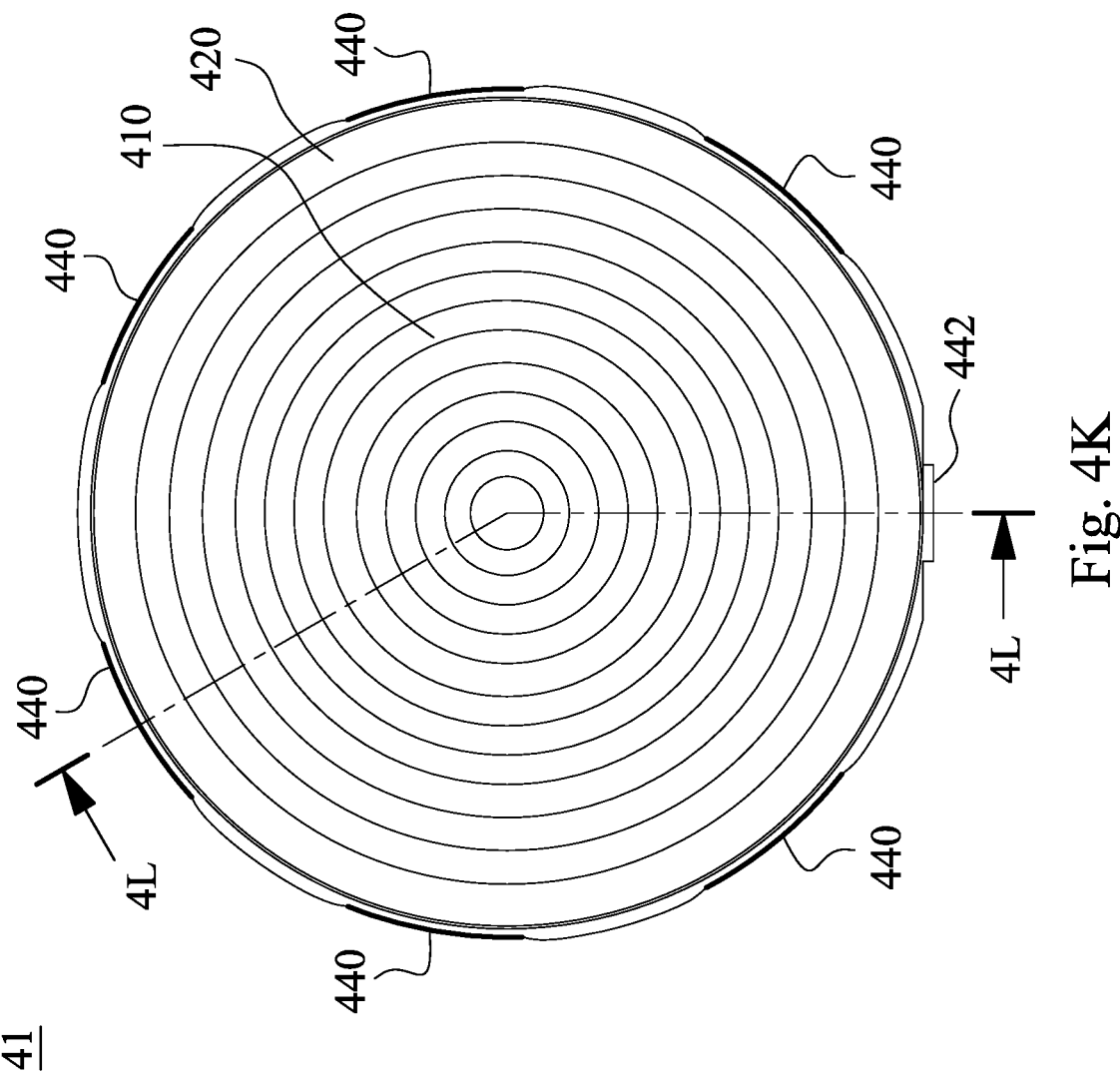
FIG. 4K is a schematic view of the plastic lens element according to the 1M example of the 1st embodiment in FIG. 4A.
Figure 4L:
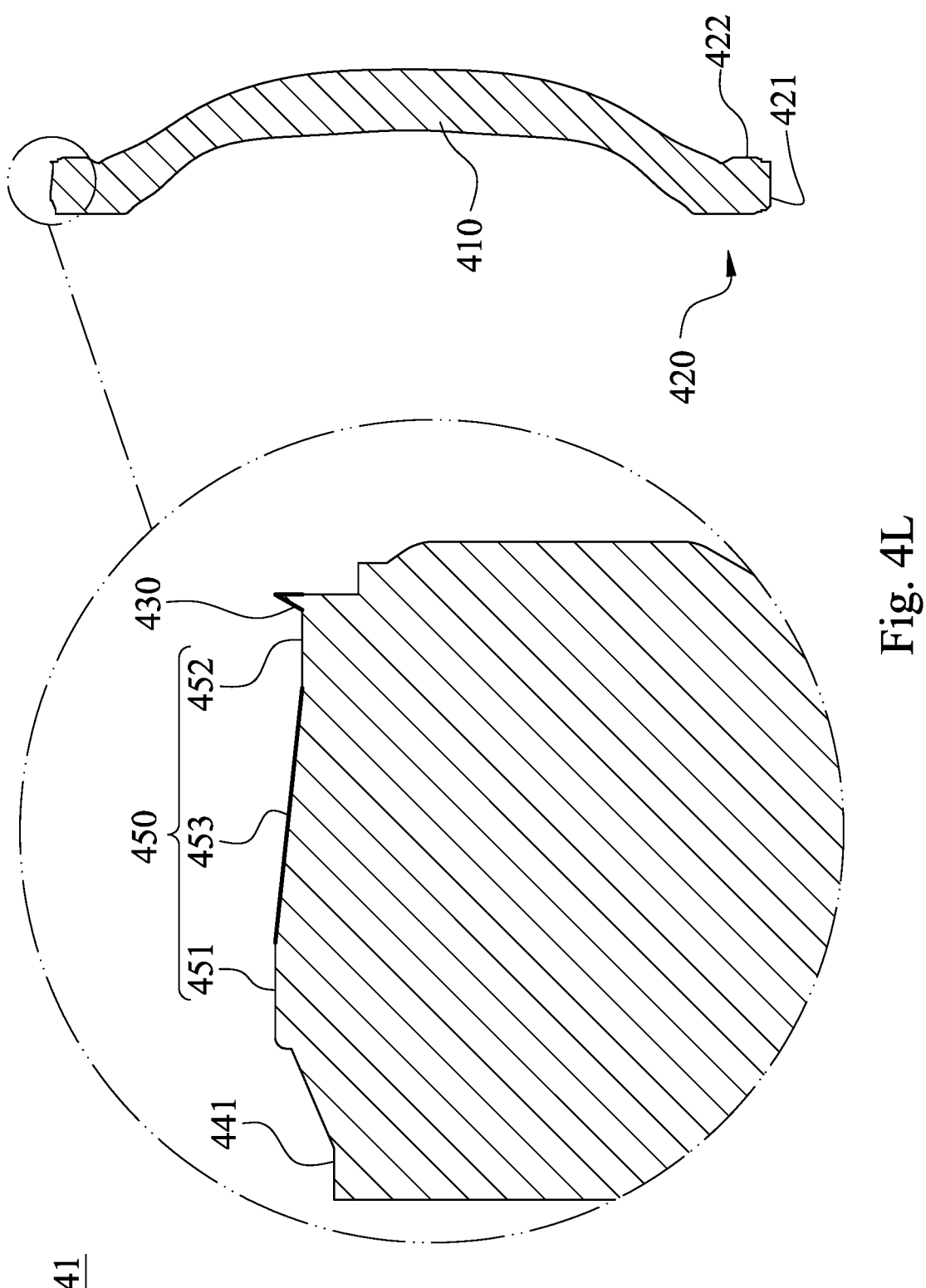
FIG. 4L is a cross-sectional view of the plastic lens element along line 4L-4L in FIG. 4K.

FIG. 4K is a schematic view of the plastic lens element 41 according to the 1M example of the 1st embodiment in FIG. 4A. FIG. 4L is a cross-sectional view of the plastic lens element 41 along line 4L-4L in FIG. 4K. In FIGS. 4K and 4L, a number of the indented shape 440 is six.

In particular, the difference among the 1H example of the 1st embodiment to the 1M example of the 1st embodiment is the number of the indented shape 440.

It should be mentioned that the straight line with thicker width in FIGS. 4B, 4D, 4F, 4H, 4J and 4L is configured to indicate the range of the conical surface 453, and the tip line segment with thicker width is configured to indicate the range of the protrusive structure 430.

Further, all of other structures and dispositions according to the 1I example of the 1st embodiment to the 1M example of the 1st embodiment are the same as the structures and the dispositions according to the 1H example of the 1st embodiment, and will not be described again herein.

Figure 5A:
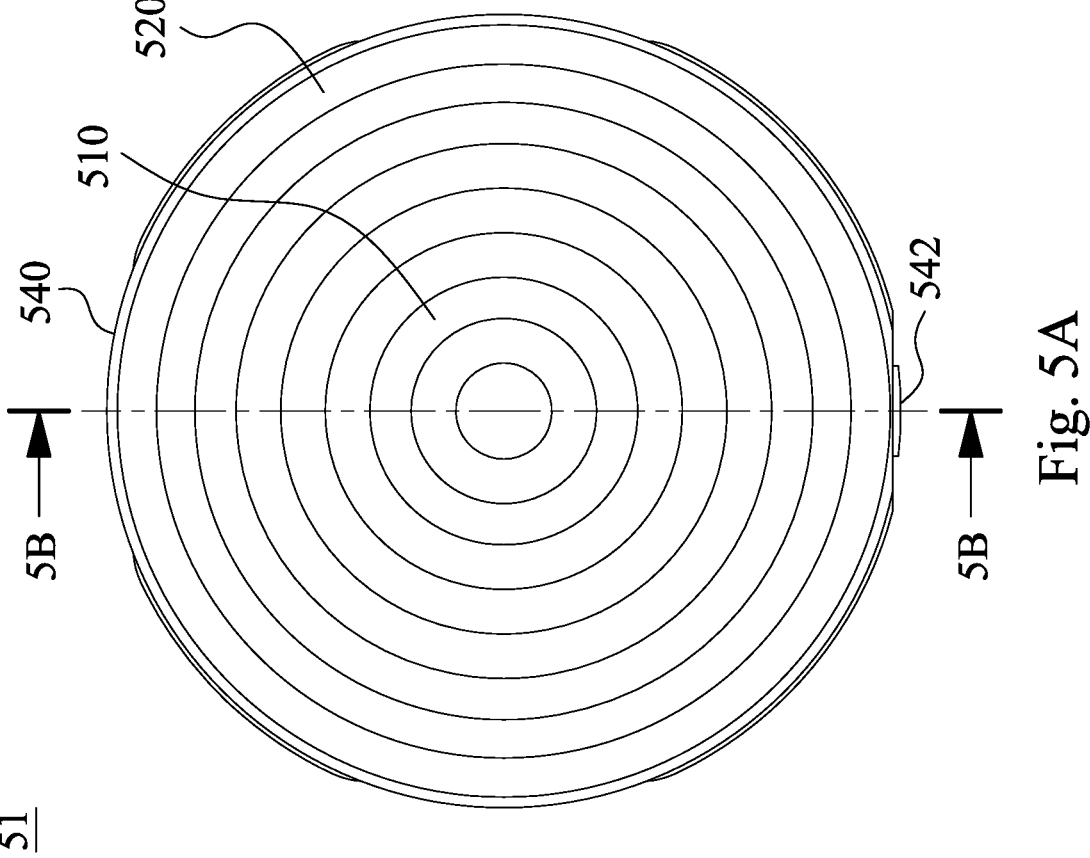
FIG. 5A is a schematic view of a plastic lens element according to the 1N example of the 1st embodiment of the present disclosure.
Figure 5B:
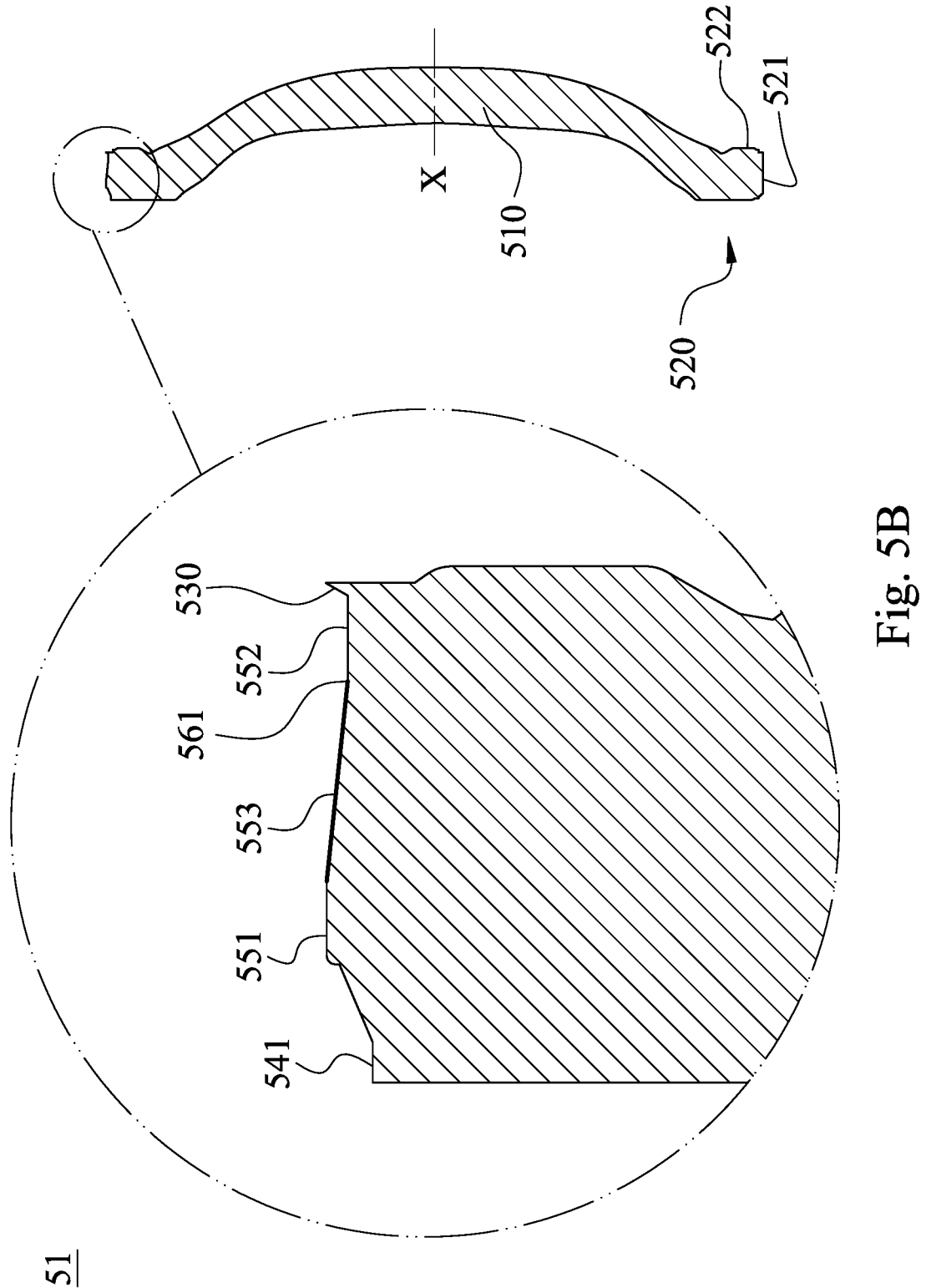
FIG. 5B is a cross-sectional view of the plastic lens element along line 5B-5B in FIG. 5A.

FIG. 5A is a schematic view of a plastic lens element 51 according to the 1N example of the 1st embodiment of the present disclosure. FIG. 5B is a cross-sectional view of the plastic lens element 51 along line 5B-5B in FIG. 5A. In FIGS. 5A and 5B, the plastic lens element 51 has a section passing through an optical axis X, and the plastic lens element 51 includes an optical effective region 510 and a peripheral region 520, wherein the optical axis X passes through the optical effective region 510, the peripheral region 520 is circularly disposed on a periphery of the optical effective region 510, and the peripheral region 520 has an outer diameter surface 521 and an annular lateral surface 522. The outer diameter surface 521 is farther away from the optical effective region 510 than the annular lateral surface 522 from the optical effective region 510, and the annular lateral surface 522 is located between the outer diameter surface 521 and the optical effective region 510. Furthermore, the peripheral region 520 includes a protrusive structure 530, an indented shape 540 and a drafting part (its reference numeral is omitted).

The protrusive structure 530 is disposed on the outer diameter surface 521 and adjacent to the annular lateral surface 522, and the protrusive structure 530 extends towards a direction away from the optical axis X.

The indented shape 540 is dented from the outer diameter surface 521 towards the optical effective region 510, and the indented shape 540 has a base surface 541.

The drafting part is raised from the base surface 541 towards the direction away from the optical axis X, and the drafting part has a top surface 551 and a bottom surface 552 via the section, wherein the top surface 551 and the bottom surface 552 are arranged along an extending direction parallel to the optical axis X, a conical surface 553 is located between the top surface 551 and the bottom surface 552, the conical surface 553 is tapered from the top surface 551 towards the optical axis X in a direction towards the bottom surface 552, and the top surface 551, the conical surface 553, the bottom surface 552 and the protrusive structure 530 are arranged in order along a direction parallel to the optical axis X.

The conical surface 553 can be tapered towards the optical axis X in a direction towards a direction adjacent to the protrusive structure 530, and the conical surface 553 faces towards an image side, wherein the protrusive structure 530 can be a burr, a parting line, an annular structure, wherein the protrusive structure 530 is usually the annular structure, but the present disclosure is not limited thereto.

The indented shape 540 can include a gate 542. In particular, the gate 542, which easily causes the assembling tolerance, is disposed on the indented shape 540, so that the gate 542 can be prevented from being the outermost structure of the plastic lens element 51. Therefore, the assembling accuracy can be enhanced and the assembling tolerance can be decreased.

Moreover, a first step valley 561 is formed between the conical surface 553 and the bottom surface 552, and the first step valley 561 has an obtuse angle, and an angle range of the obtuse angle can be between 160 degrees and 179.5 degrees. By defining the angle of the conical surface 553 as the gentle slope, the proper demolding resistance can be provided so as to avoid the condition of the reverse draft.

Figure 5C:
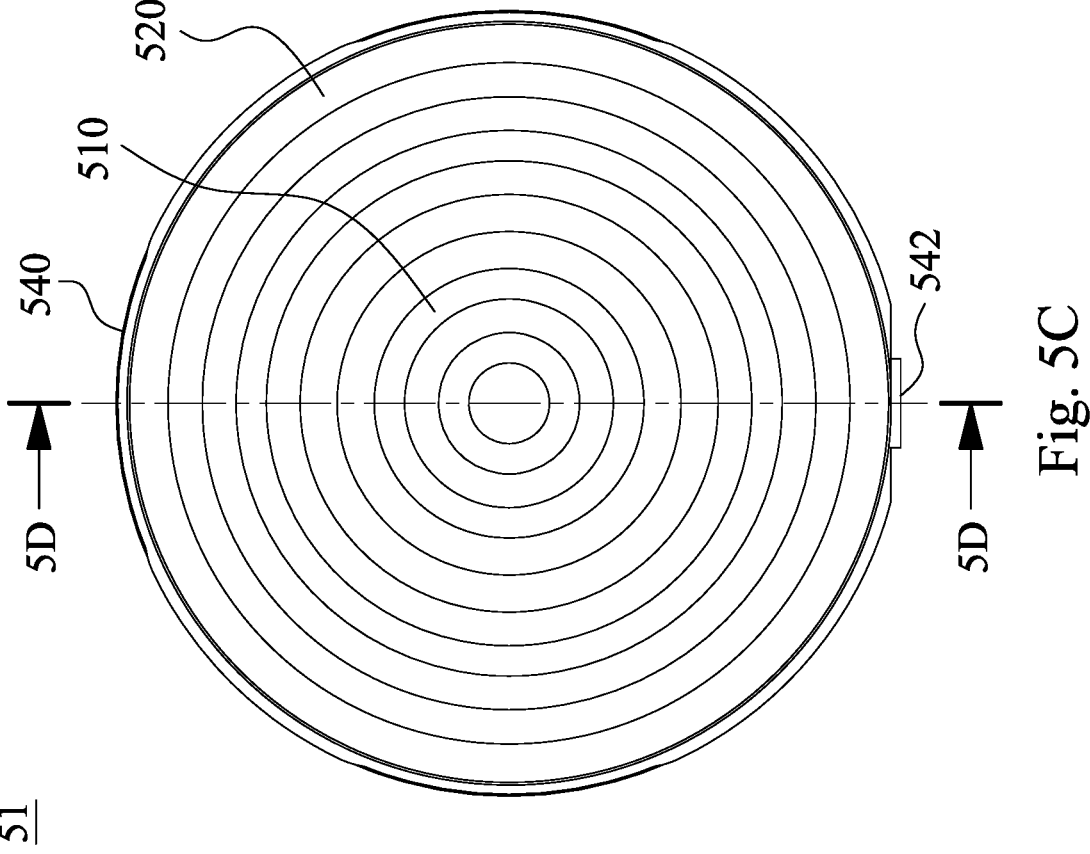
FIG. 5C is a schematic view of the plastic lens element according to the 1O example of the 1st embodiment in FIG. 5A.
Figure 5D:
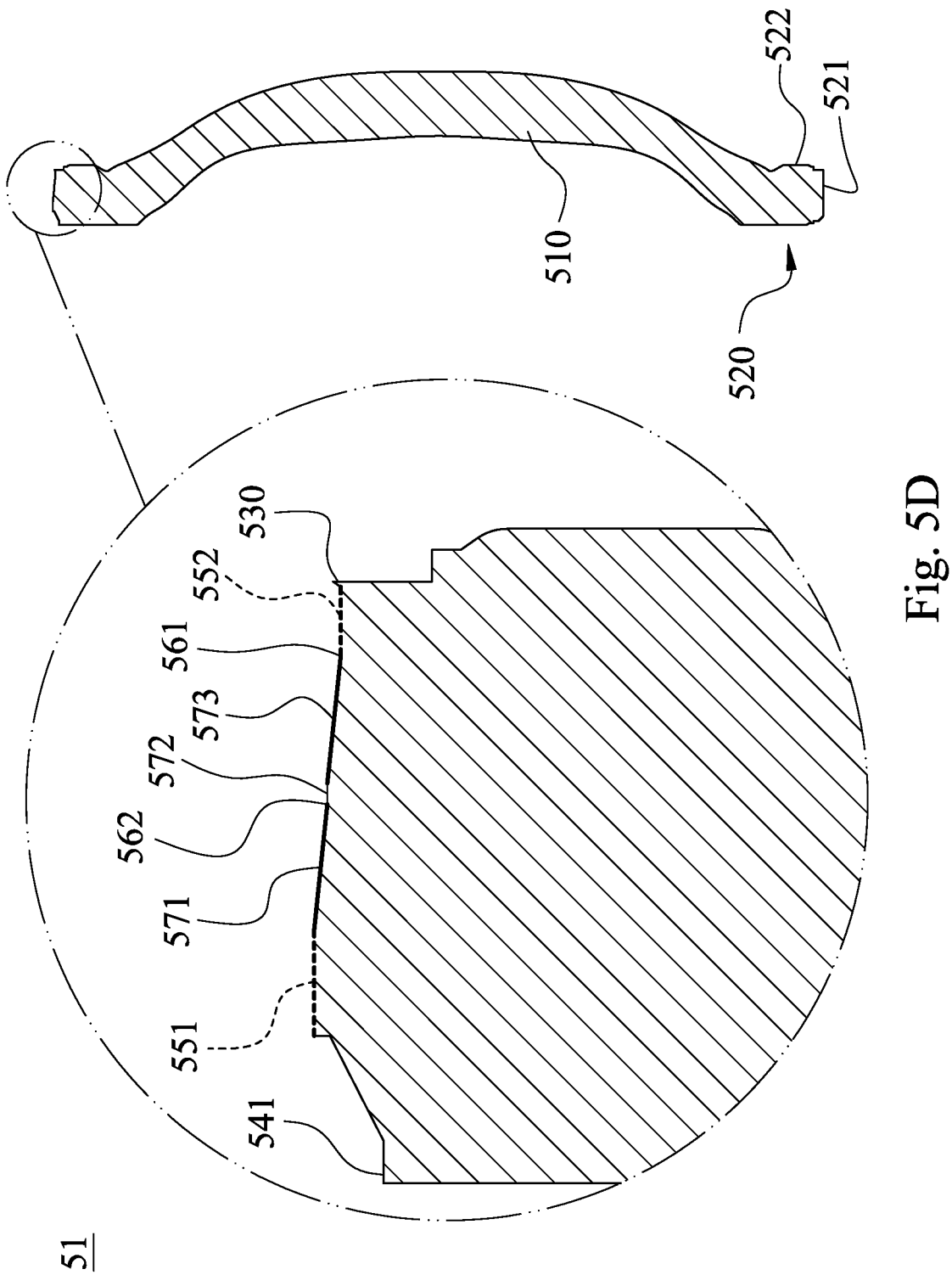
FIG. 5D is a cross-sectional view of the plastic lens element along line 5D-5D in FIG. 5C.

FIG. 5C is a schematic view of the plastic lens element 51 according to the 1O example of the 1st embodiment in FIG. 5A. FIG. 5D is a cross-sectional view of the plastic lens element 51 along line 5D-5D in FIG. 5C. In FIGS. 5C and 5D, the conical surface 553 can include a first step surface 571, a second step surface 572 and a third step surface 573, and the first step surface 571, the second step surface 572 and the third step surface 573 are arranged in order along the optical axis X, wherein the first step surface 571 is located between the top surface 551 and the second step surface 572, the second step surface 572 is located between the first step surface 571 and the third step surface 573, and the third step surface 573 is located between the bottom surface 552 and the second step surface 572.

Further, a second step valley 562 is formed between the first step surface 571 and the second step surface 572, the second step valley 562 has an obtuse angle, and an angle range of the obtuse angle can be between 160 degrees and 179.5 degrees. The conical surface 553 is formed via a plurality of step surfaces, so that the stress is dispersed to the position of the first step valley 561 and the position of the second step valley 562. Therefore, the excessive concentration of the stress can be prevented so as to avoid the problem of the demolding difficulty.

In particular, the difference between the 1N example of the 1st embodiment and the 1O example of the 1st embodiment is the step surface number of the conical surface 553.

It should be mentioned that the straight line with thicker width in FIG. 5B is configured to indicate the range of the conical surface 553, the straight line with thicker width in FIG. 5D is configured to indicate the range of the first step surface 571 and the range of the third step surface 573, and the dotted line is configured to indicate the range of the top surface 551 and the range of the bottom surface 552.

Further, all of other structures and dispositions according to the 1O example of the 1st embodiment are the same as the structures and the dispositions according to the 1N example of the 1st embodiment, and will not be described again herein.

2nd Embodiment

Figure 6A:
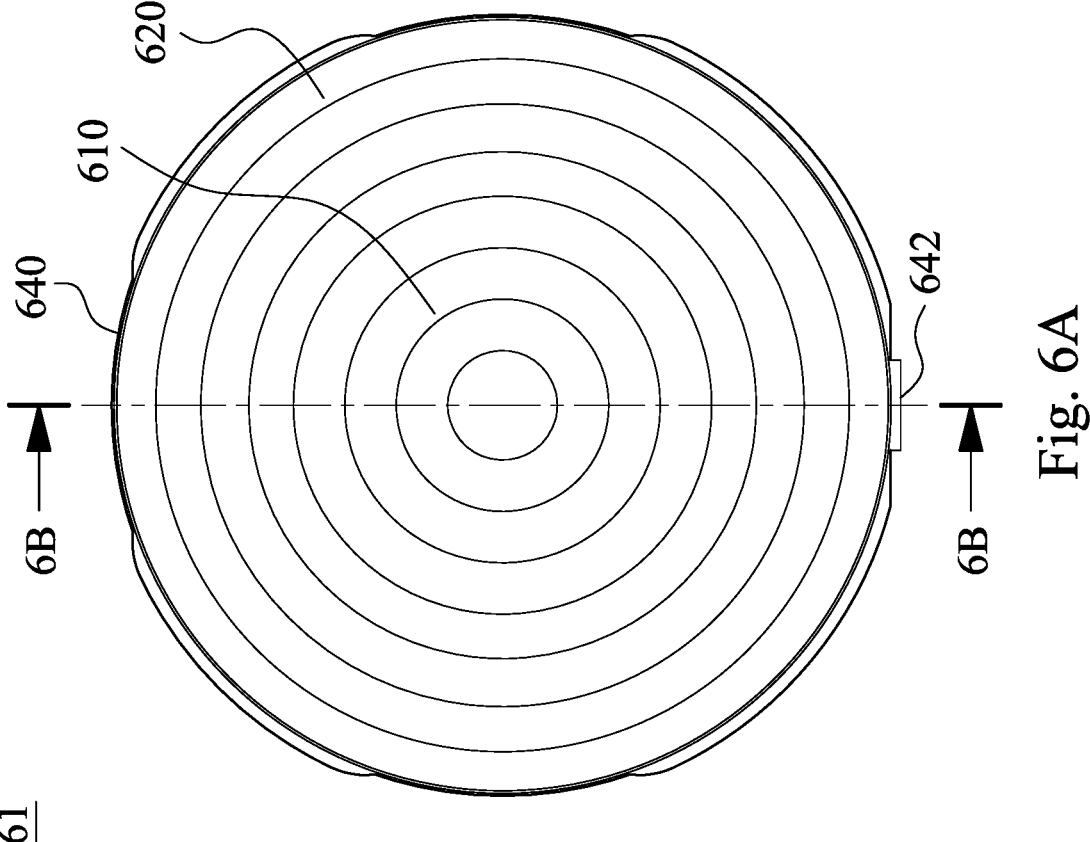
FIG. 6A is a schematic view of a plastic lens element according to the 2A example of the 2nd embodiment of the present disclosure.
Figure 6B:
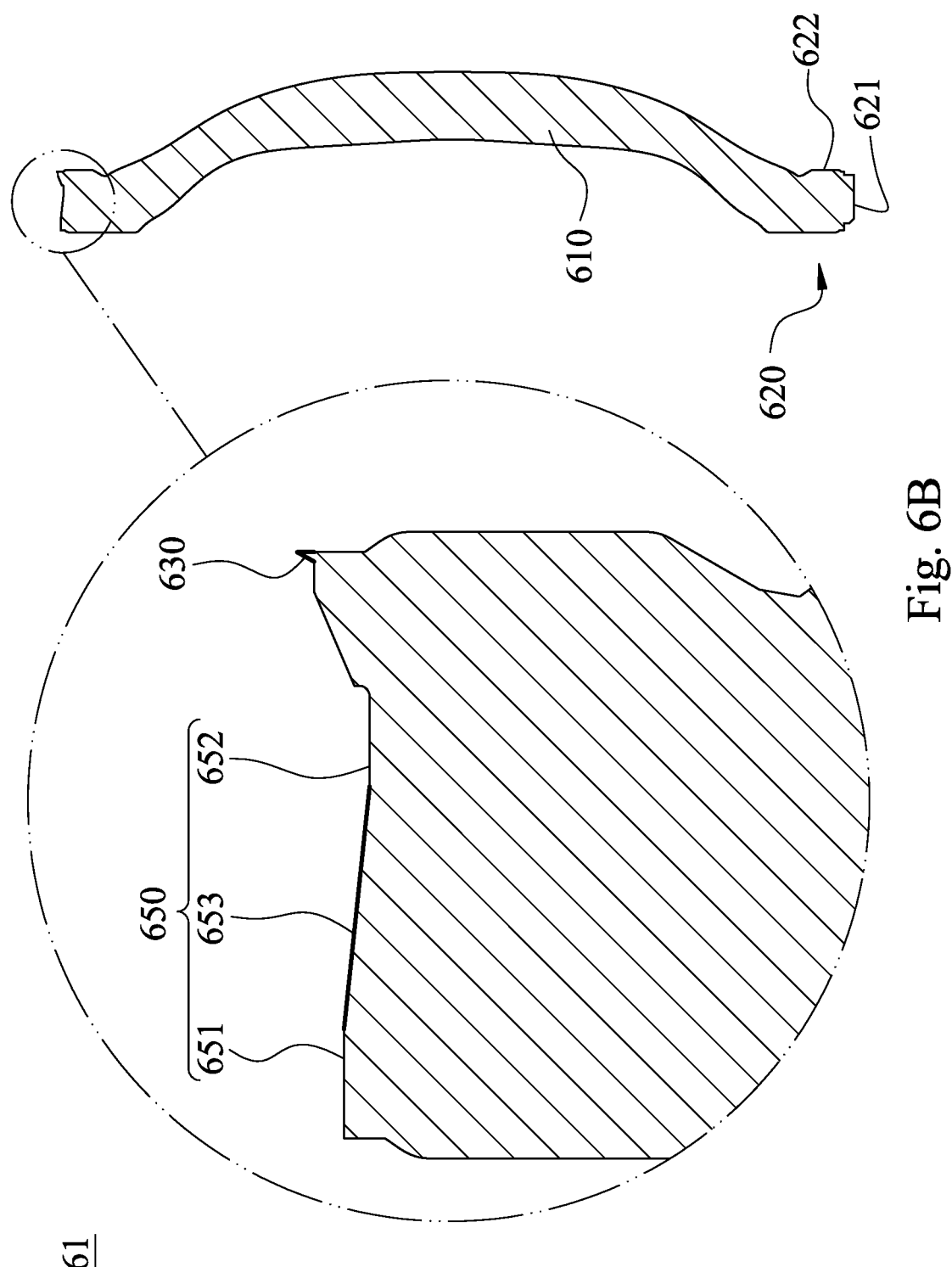
FIG. 6B is a cross-sectional view of the plastic lens element along line 6B-6B in FIG. 6A.
Figure 6C:
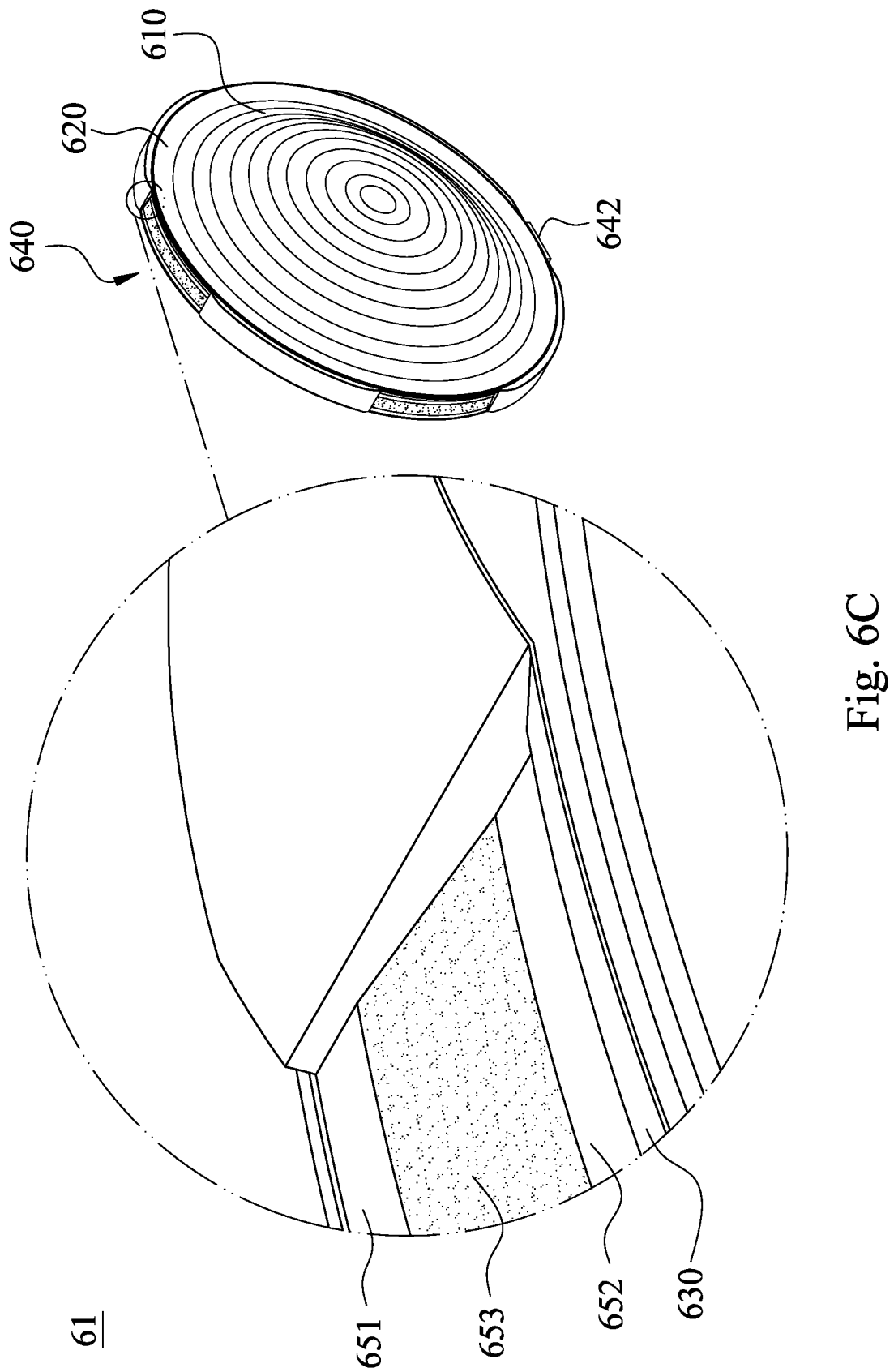
FIG. 6C is a partial enlarged view of the plastic lens element according to the 2A example of the 2nd embodiment in FIG. 6A.

FIG. 6A is a schematic view of a plastic lens element 61 according to the 2A example of the 2nd embodiment of the present disclosure. FIG. 6B is a cross-sectional view of the plastic lens element 61 along line 6B-6B in FIG. 6A. FIG. 6C is a partial enlarged view of the plastic lens element 61 according to the 2A example of the 2nd embodiment in FIG. 6A. In FIGS. 6A to 6C, the plastic lens element 61 has a section passing through an optical axis (its reference numeral is omitted), and the plastic lens element 61 includes an optical effective region 610 and a peripheral region 620, wherein the optical axis passes through the optical effective region 610, the peripheral region 620 is circularly disposed on a periphery of the optical effective region 610, and the peripheral region 620 has an outer diameter surface 621 and an annular lateral surface 622. The outer diameter surface 621 is farther away from the optical effective region 610 than the annular lateral surface 622 from the optical effective region 610, and the annular lateral surface 622 is located between the outer diameter surface 621 and the optical effective region 610. Furthermore, the peripheral region 620 includes a protrusive structure 630, an indented shape 640 and a release notch 650.

The protrusive structure 630 is disposed on the outer diameter surface 621 and adjacent to the annular lateral surface 622, and the protrusive structure 630 extends towards a direction away from the optical axis.

The indented shape 640 is dented from the outer diameter surface 621 towards the optical effective region 610, and the indented shape 640 has a base surface (its reference numeral is omitted).

The release notch 650 is dented from the base surface towards the optical axis, and the release notch 650 has a top surface 651 and a bottom surface 652 via the section, wherein the top surface 651 and the bottom surface 652 are arranged along an extending direction of the optical axis, a conical surface 653 is located between the top surface 651 and the bottom surface 652, the conical surface 653 is tapered from the top surface 651 towards the optical axis in a direction towards the bottom surface 652, and the top surface 651, the conical surface 653, the bottom surface 652 and the protrusive structure 630 are arranged in order along a direction parallel to the optical axis. The conical surface 653 can be tapered towards the optical axis along a direction adjacent to the protrusive structure 630, and the conical surface 653 faces towards an image side.

In particular, the slight demolding resistance may be caused via the conical surface 653 during the demolding process of the plastic lens element 61 after the injection molding, so that the stress caused during the demolding and the deformation caused by the stress are gathered at the peripheral region 620. Therefore, the deformation of the optical effective region 610 can be prevented.

Moreover, a set of the molds is usually configured to simultaneously form a plurality of plastic lens elements, and the plastic lens element 61 is fixed on the male mold via the demolding resistance caused by the conical surface 653 during removing the male mold and the female mold after the injection molding so as to prevent a portion of the plastic lens element 61 from attaching on the female mold during the demolding process for avoiding the pulling. Therefore, the molding yield of the plastic lens element 61 can be enhanced.

The indented shape 640 can include a gate 642. In particular, the gate 642, which easily causes the assembling tolerance, is disposed on the indented shape 640, so that the gate 642 can be prevented from being the outermost structure of the plastic lens element 61. Therefore, the assembling accuracy can be enhanced and the assembling tolerance can be decreased.

Figure 6D:
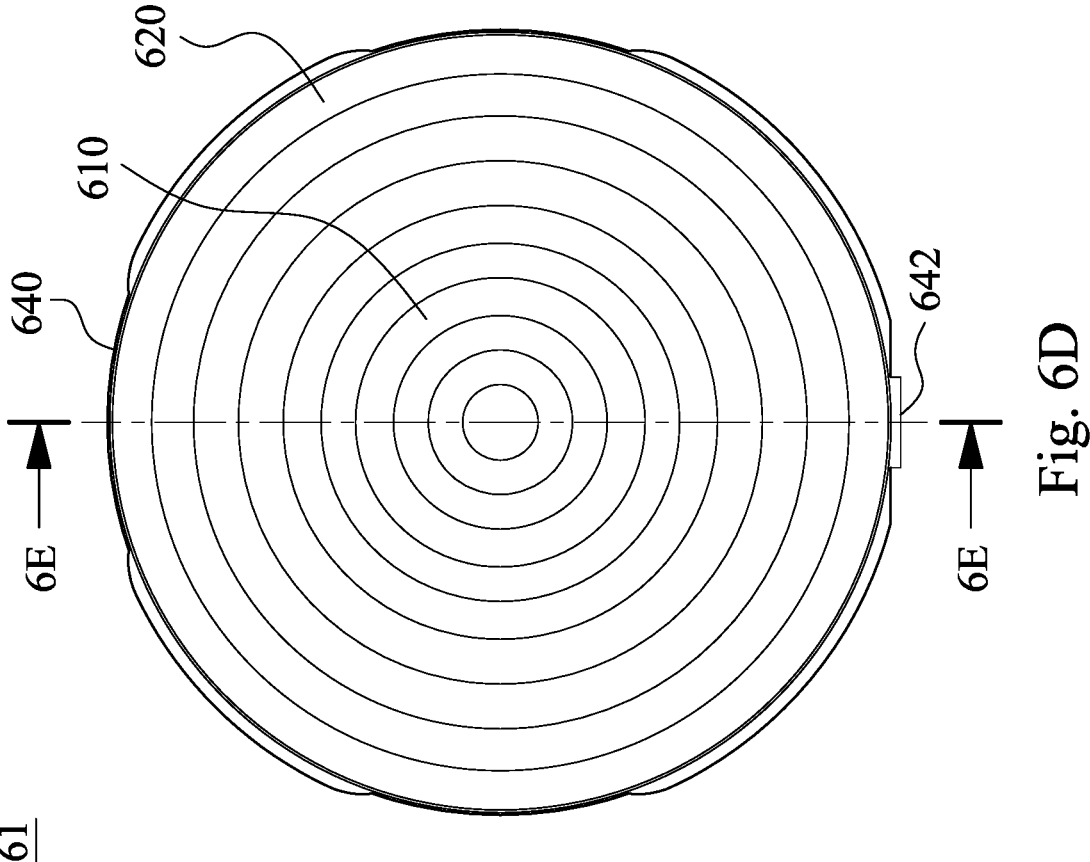
FIG. 6D is a schematic view of the plastic lens element according to the 2B example of the 2nd embodiment in FIG. 6A.
Figure 6E:
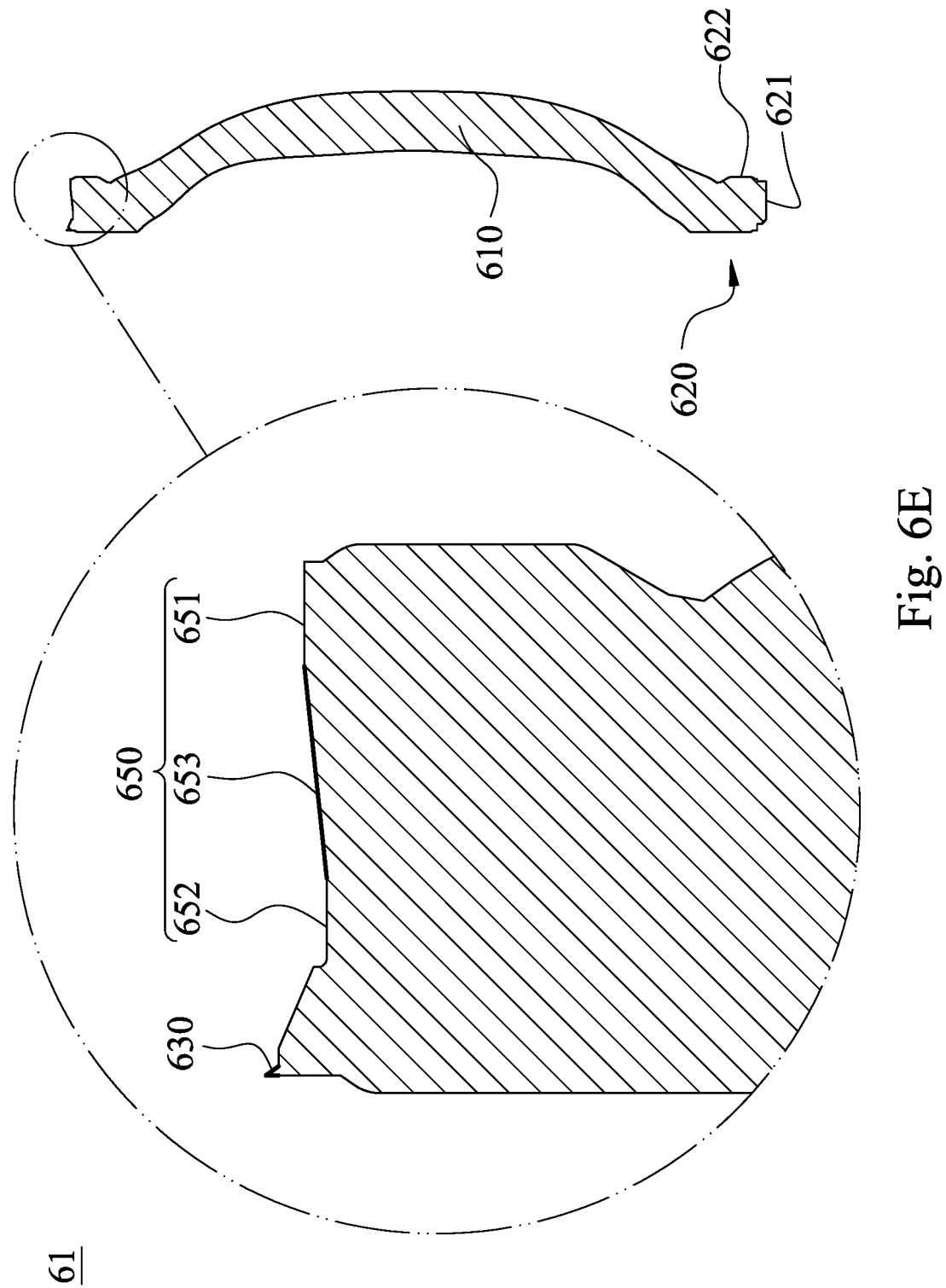
FIG. 6E is a cross-sectional view of the plastic lens element along line 6E-6E in FIG. 6D.
Figure 6F:
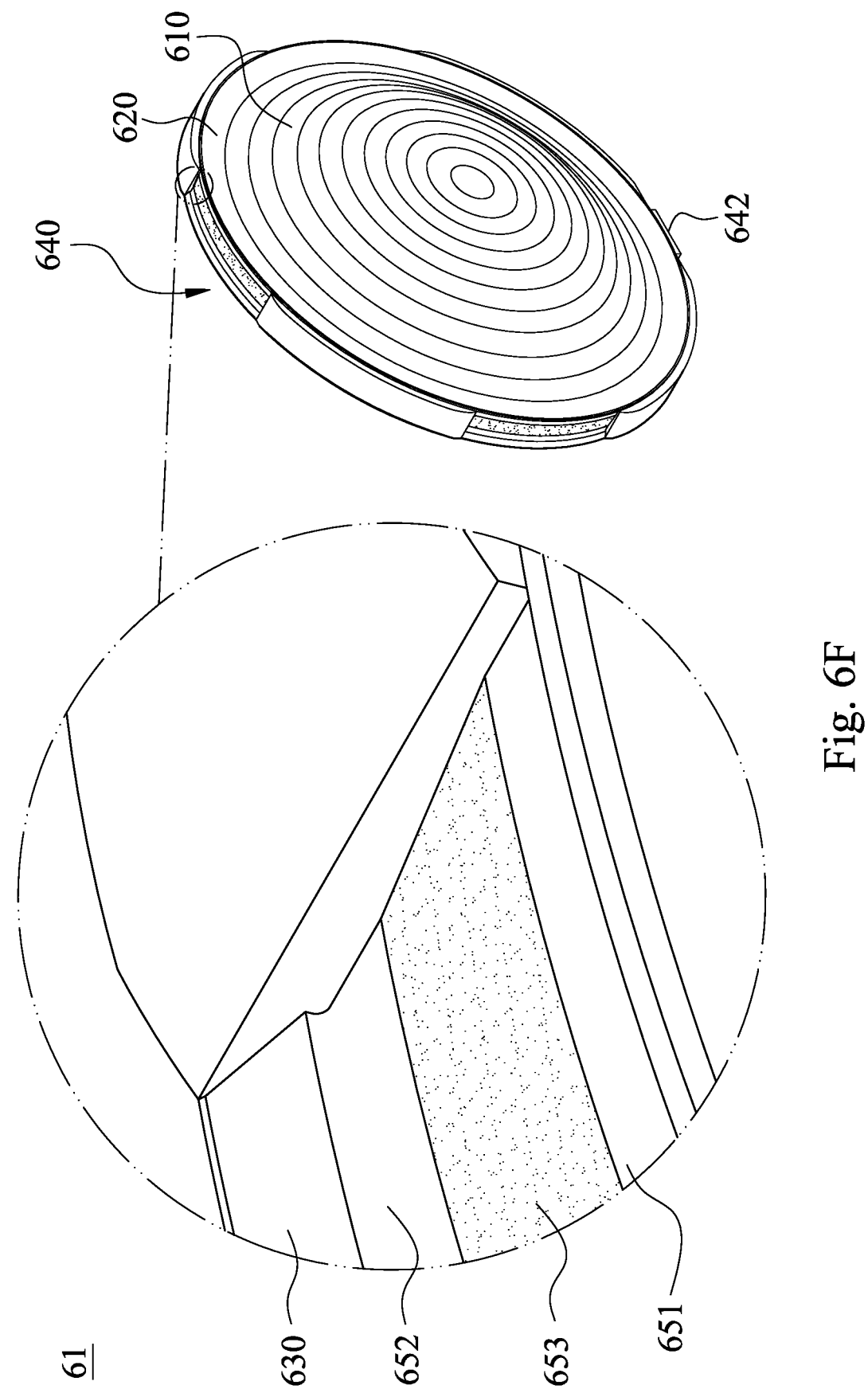
FIG. 6F is a partial enlarged view of the plastic lens element according to the 2B example of the 2nd embodiment in FIG. 6D.

FIG. 6D is a schematic view of the plastic lens element 61 according to the 2B example of the 2nd embodiment in FIG. 6A. FIG. 6E is a cross-sectional view of the plastic lens element 61 along line 6E-6E in FIG. 6D. FIG. 6F is a partial enlarged view of the plastic lens element 61 according to the 2B example of the 2nd embodiment in FIG. 6D. In FIGS. 6D to 6F, the conical surface 653 of the release notch 650 faces towards an object side, wherein the difference between the 2A example of the 2nd embodiment and the 2B example of the 2nd embodiment is that the conical surface 653 faces towards the image side and the object side, respectively.

It should be mentioned that the straight line with thicker width in FIGS. 6B and 6E is configured to indicate the range of the conical surface 653, and the tip line segment with thicker width is configured to indicate the range of the protrusive structure 630.

Further, all of other structures and dispositions according to the 2B example of the 2nd embodiment are the same as the structures and the dispositions according to the 2A example of the 2nd embodiment, and will not be described again herein.

Figure 7A:
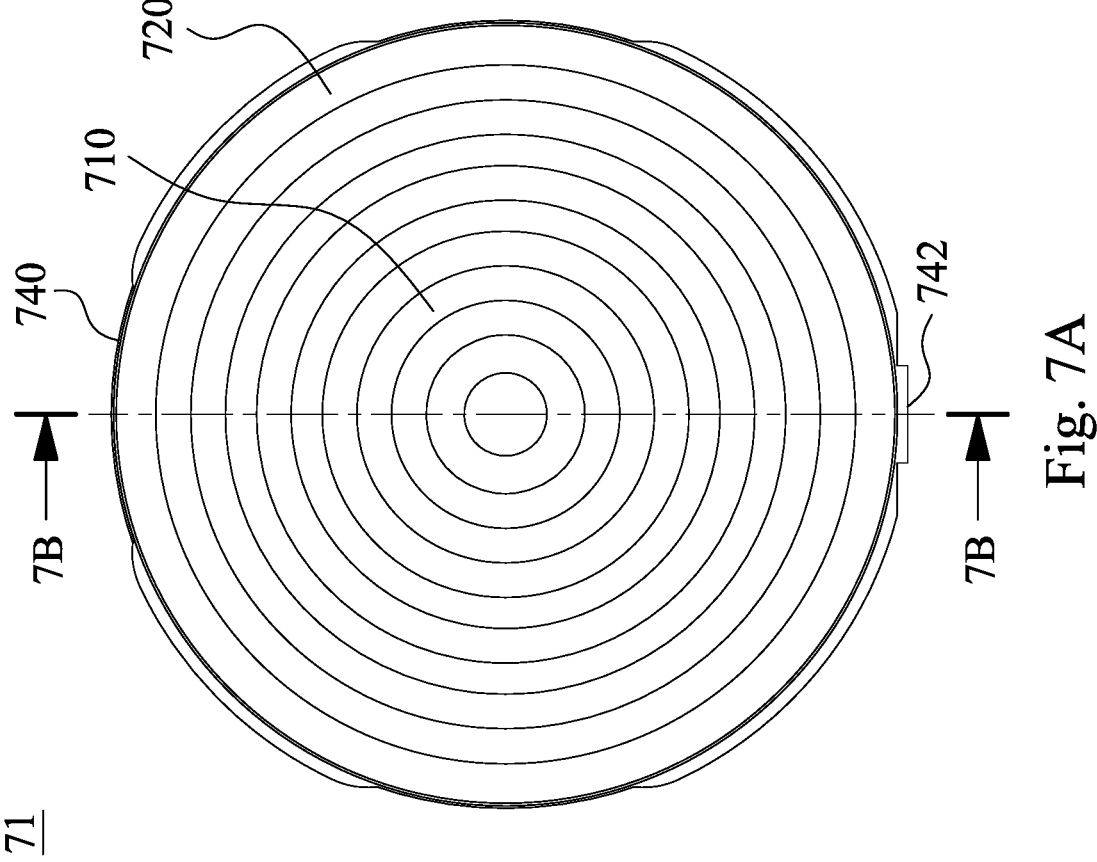
FIG. 7A is a schematic view of a plastic lens element according to the 2C example of the 2nd embodiment of the present disclosure.
Figure 7B:
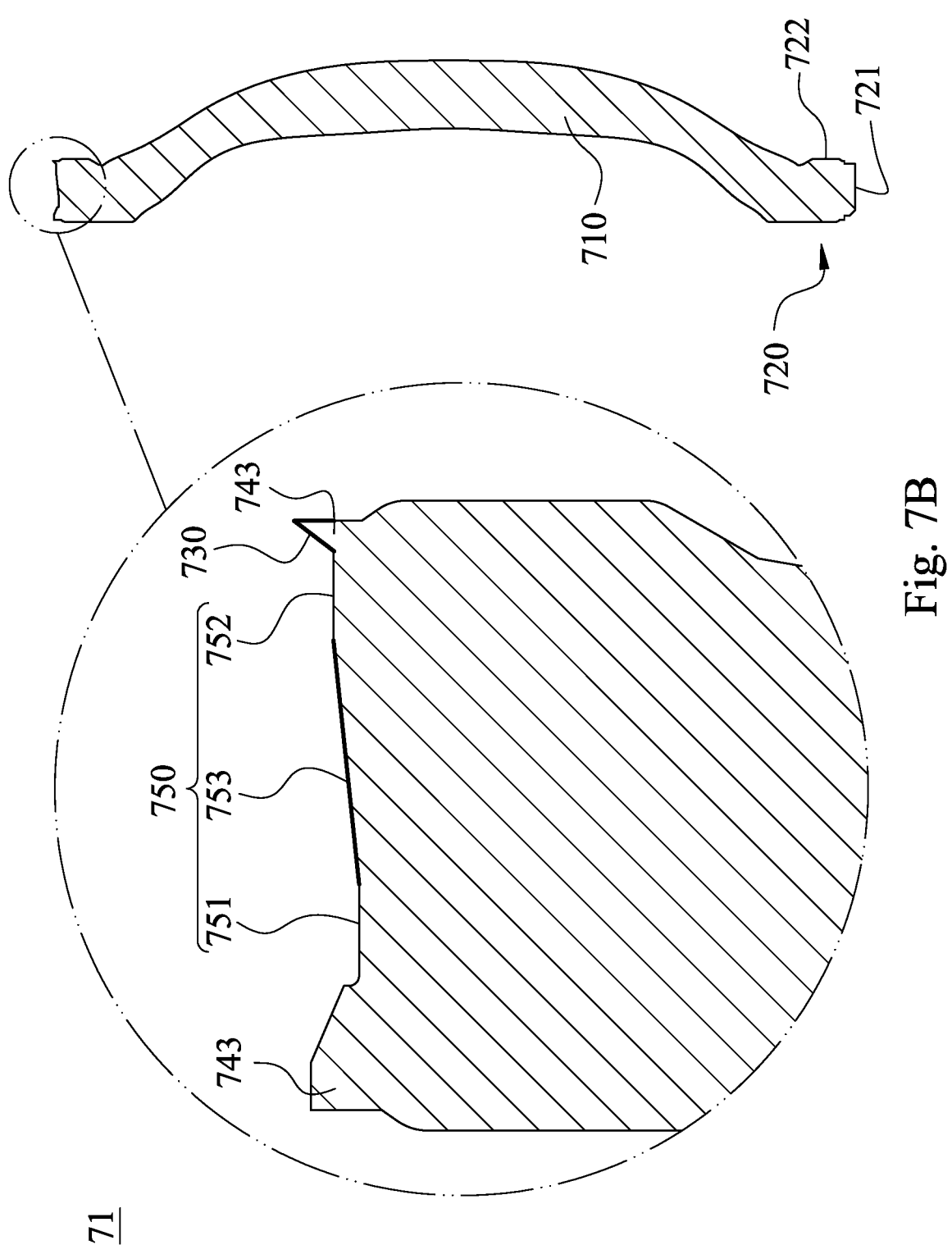
FIG. 7B is a cross-sectional view of the plastic lens element along line 7B-7B in FIG. 7A.
Figure 7C:
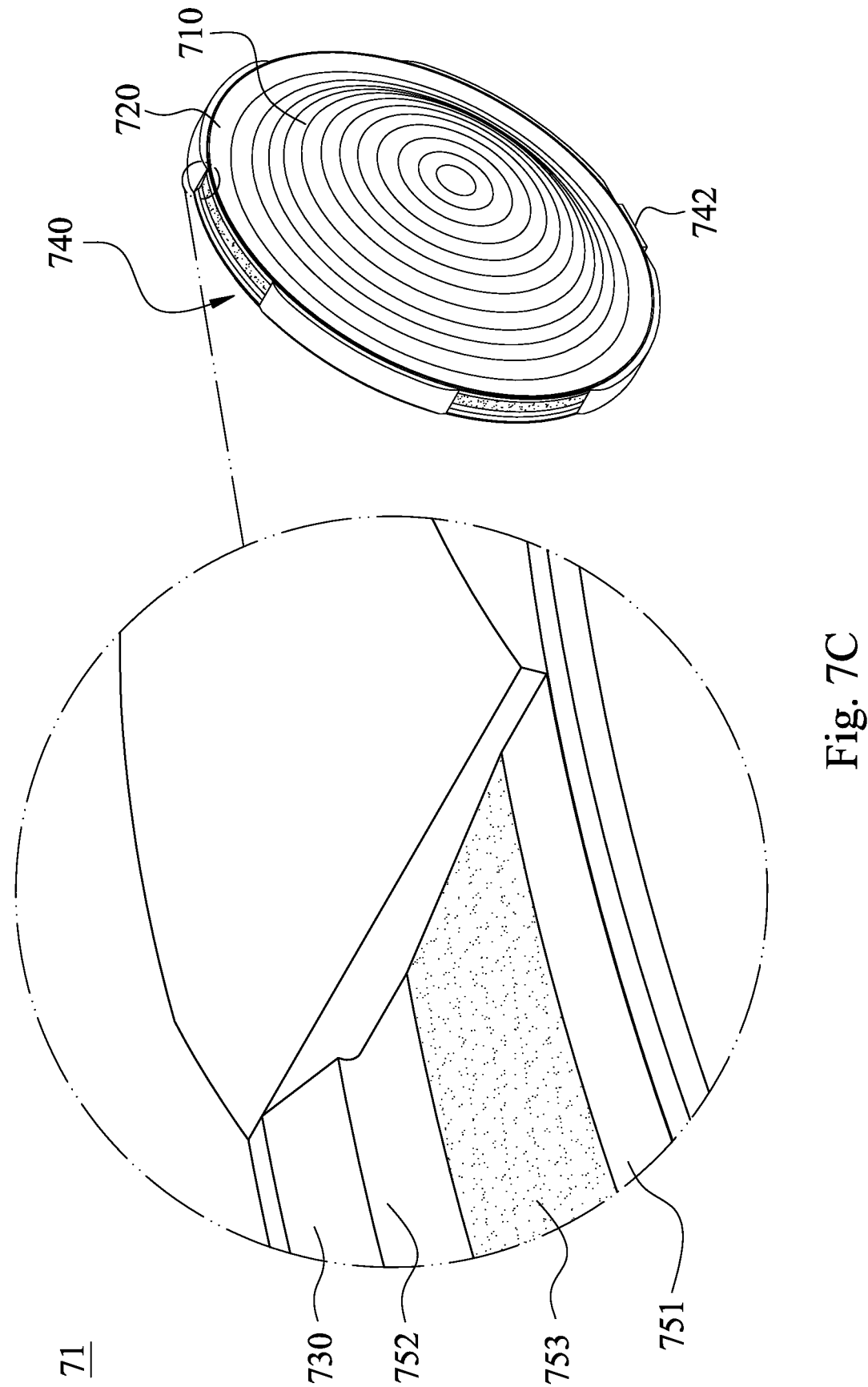
FIG. 7C is a partial enlarged view of the plastic lens element according to the 2C example of the 2nd embodiment in FIG. 7A.

FIG. 7A is a schematic view of a plastic lens element 71 according to the 2C example of the 2nd embodiment of the present disclosure. FIG. 7B is a cross-sectional view of the plastic lens element 71 along line 7B-7B in FIG. 7A. FIG. 7C is a partial enlarged view of the plastic lens element 71 according to the 2C example of the 2nd embodiment in FIG. 7A. In FIGS. 7A to 7C, the plastic lens element 71 has a section passing through an optical axis (its reference numeral is omitted), and the plastic lens element 71 includes an optical effective region 710 and a peripheral region 720, wherein the optical axis passes through the optical effective region 710, the peripheral region 720 is circularly disposed on a periphery of the optical effective region 710, and the peripheral region 720 has an outer diameter surface 721 and an annular lateral surface 722. The outer diameter surface 721 is farther away from the optical effective region 710 than the annular lateral surface 722 from the optical effective region 710, and the annular lateral surface 722 is located between the outer diameter surface 721 and the optical effective region 710. Furthermore, the peripheral region 720 includes a protrusive structure 730, an indented shape 740 and a release notch 750.

The protrusive structure 730 is disposed on the outer diameter surface 721 and adjacent to the annular lateral surface 722, and the protrusive structure 730 extends towards a direction away from the optical axis.

The indented shape 740 is dented from the outer diameter surface 721 towards the optical effective region 710, and the indented shape 740 has a base surface (its reference numeral is omitted).

The release notch 750 is dented from the base surface towards the optical axis, and the release notch 750 has a top surface 751 and a bottom surface 752 via the section, wherein the top surface 751 and the bottom surface 752 are arranged along an extending direction of the optical axis, a conical surface 753 is located between the top surface 751 and the bottom surface 752, the conical surface 753 is tapered from the top surface 751 towards the optical axis in a direction towards the bottom surface 752, and the top surface 751, the conical surface 753, the bottom surface 752 and the protrusive structure 730 are arranged in order along a direction parallel to the optical axis. The conical surface 753 can be tapered towards the optical axis along a direction adjacent to the protrusive structure 730.

The indented shape 740 can include a gate 742. In particular, the gate 742, which easily causes the assembling tolerance, is disposed on the indented shape 740, so that the gate 742 can be prevented from being the outermost structure of the plastic lens element 71. Therefore, the assembling accuracy can be enhanced and the assembling tolerance can be decreased.

Moreover, the indented shape 740 can include two drafting parts 743 protruding from the base surface towards a direction away from the optical axis, and a gap is located between the drafting parts 743 to form the release notch 750. In particular, the release notch 750 can be defined via the protruding structures.

Figure 7D:
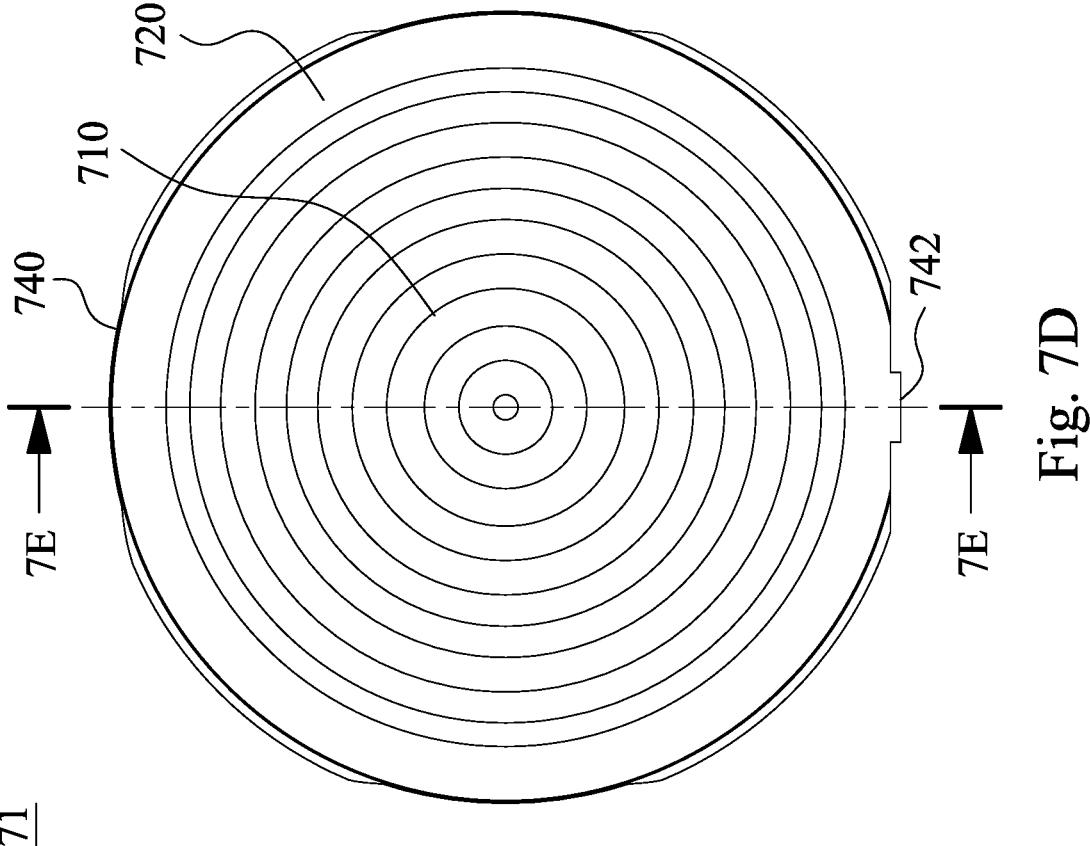
FIG. 7D is a schematic view of the plastic lens element according to the 2D example of the 2nd embodiment in FIG. 7A.
Figure 7E:
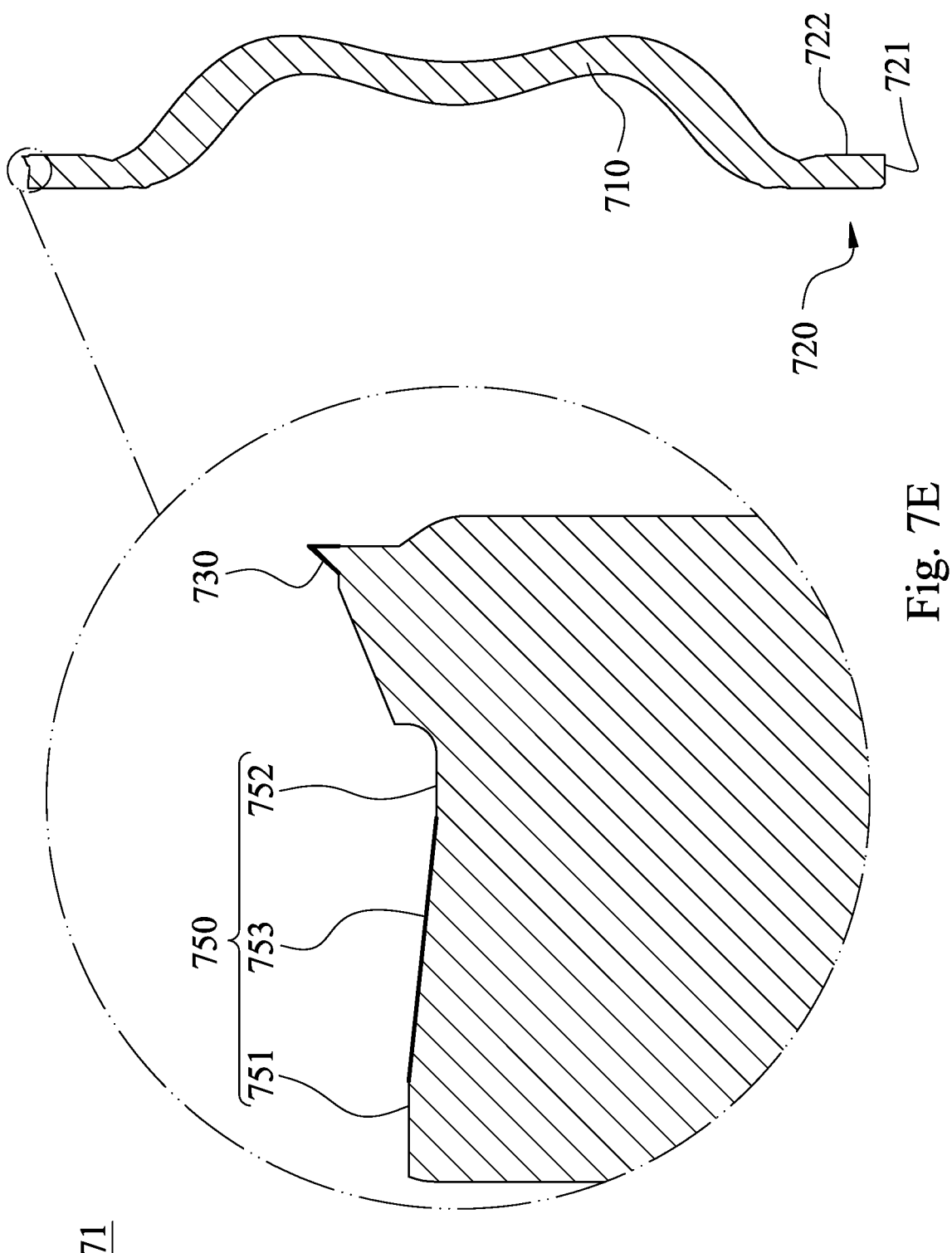
FIG. 7E is a cross-sectional view of the plastic lens element along line 7E-7E in FIG. 7D.
Figure 7F:
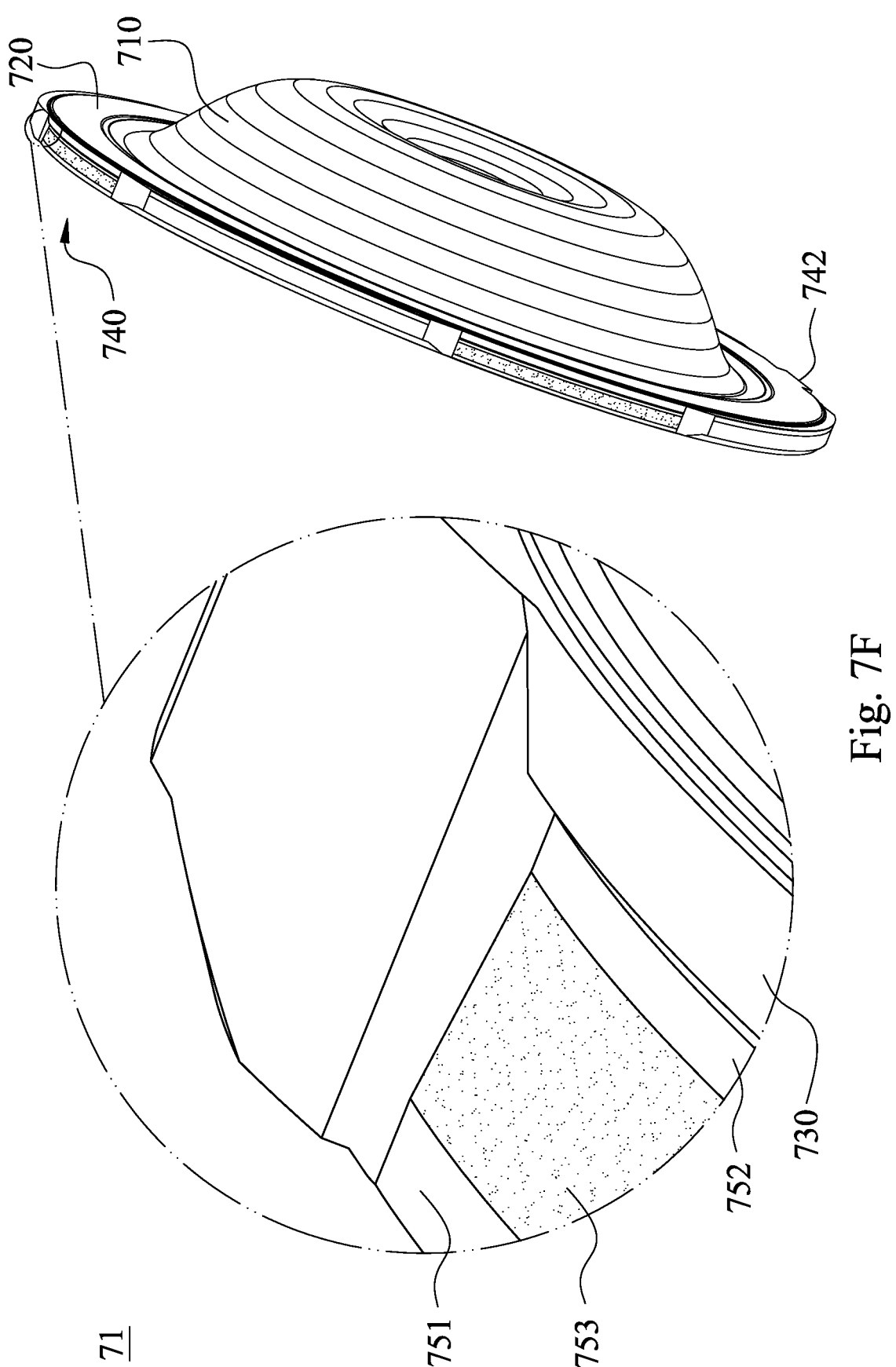
FIG. 7F is a partial enlarged view of the plastic lens element according to the 2D example of the 2nd embodiment in FIG. 7D.

FIG. 7D is a schematic view of the plastic lens element 71 according to the 2D example of the 2nd embodiment in FIG. 7A. FIG. 7E is a cross-sectional view of the plastic lens element 71 along line 7E-7E in FIG. 7D. FIG. 7F is a partial enlarged view of the plastic lens element 71 according to the 2D example of the 2nd embodiment in FIG. 7D. In FIGS. 7D to 7F, a middle thickness of the plastic lens element 71 is thinner than a peripheral thickness of the plastic lens element 71.

Figure 7G:
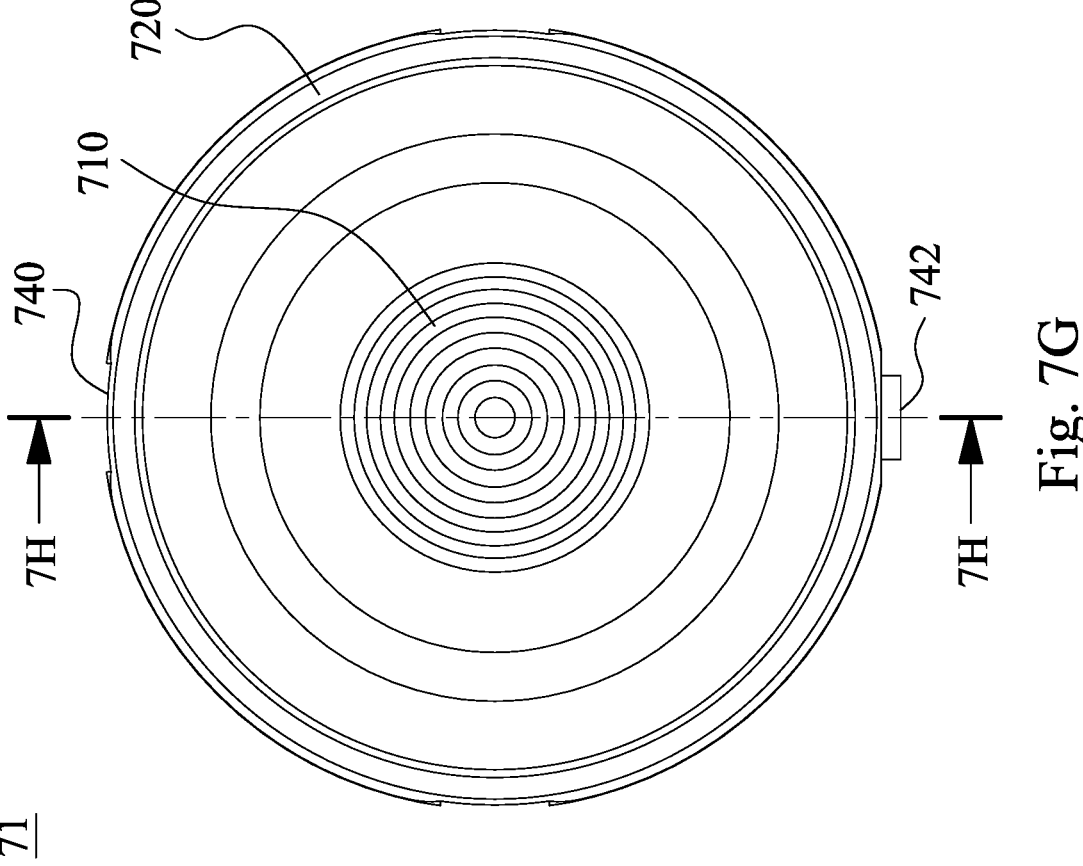
FIG. 7G is a schematic view of the plastic lens element according to the 2E example of the 2nd embodiment in FIG. 7A.
Figure 7H:
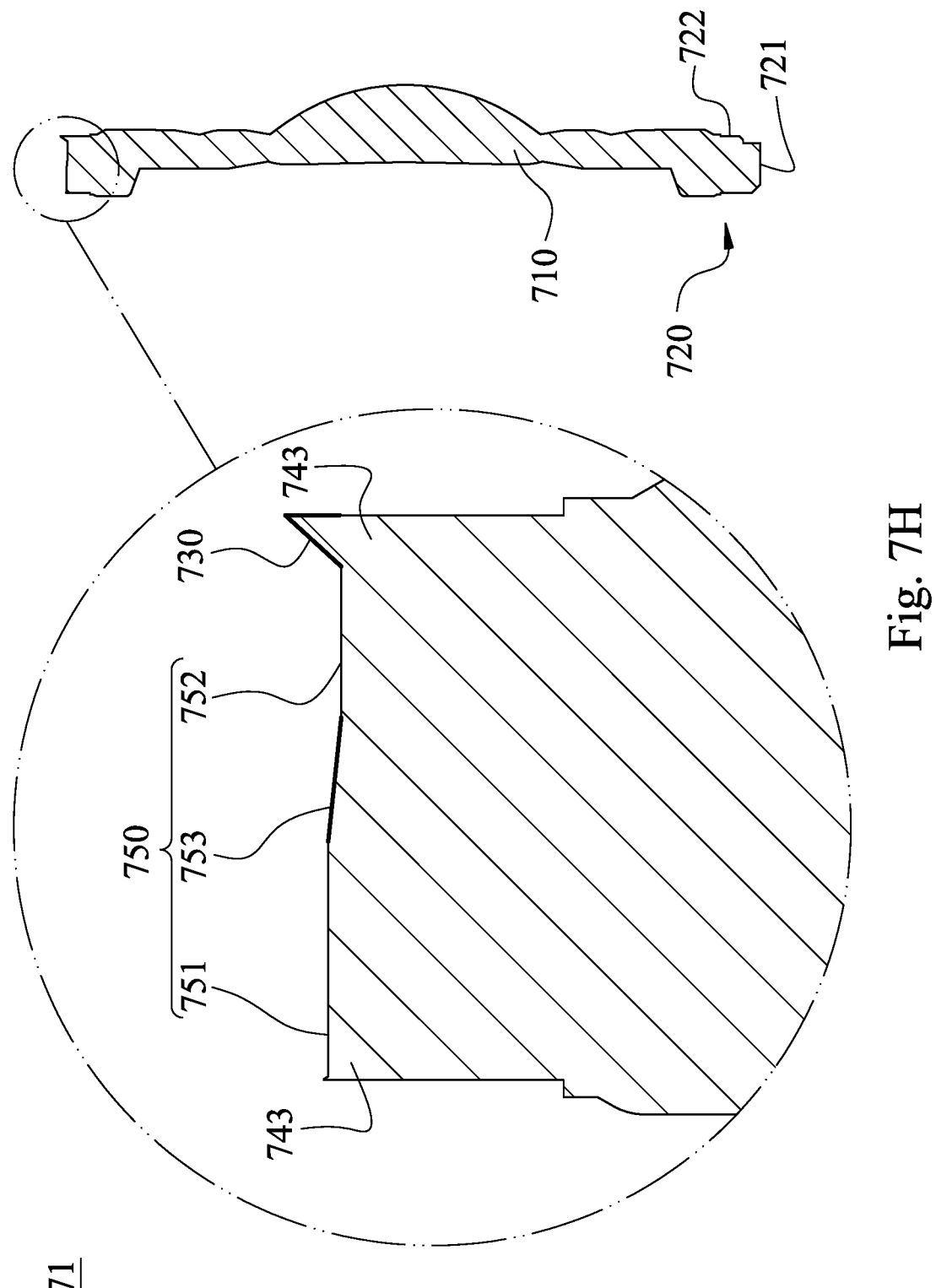
FIG. 7H is a cross-sectional view of the plastic lens element along line 7H-7H in FIG. 7G.
Figure 7I:
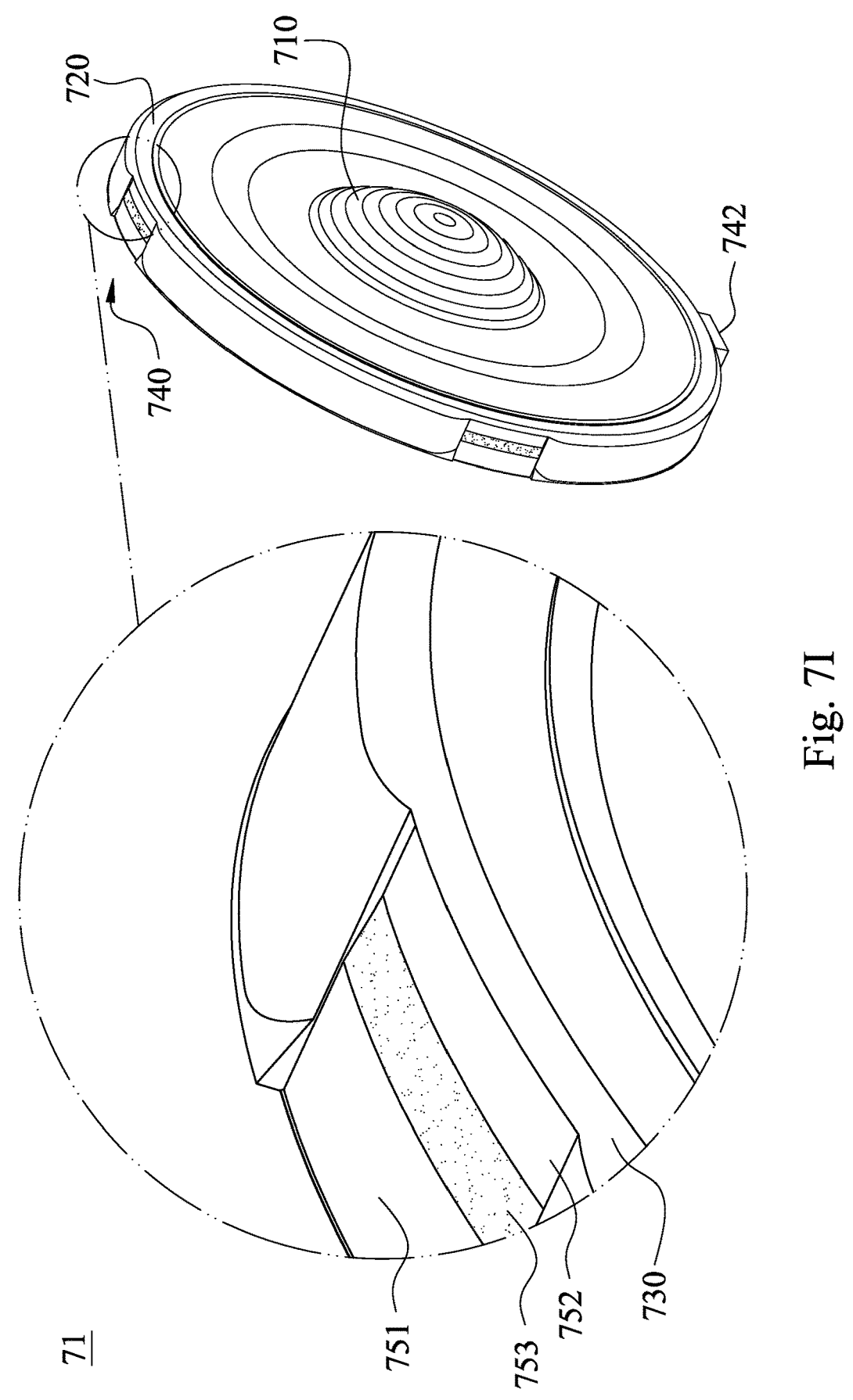
FIG. 7I is a partial enlarged view of the plastic lens element according to the 2E example of the 2nd embodiment in FIG. 7G.

FIG. 7G is a schematic view of the plastic lens element 71 according to the 2E example of the 2nd embodiment in FIG. 7A. FIG. 7H is a cross-sectional view of the plastic lens element 71 along line 7H-7H in FIG. 7G. FIG. 7I is a partial enlarged view of the plastic lens element 71 according to the 2E example of the 2nd embodiment in FIG. 7G. In FIGS. 7G to 7I, a middle thickness of the plastic lens element 71 is thicker than a peripheral thickness of the plastic lens element 71.

In particular, the difference among the 2C example of the 2nd embodiment, the 2D example of the 2nd embodiment and the 2E example of the 2nd embodiment is the thickness distribution of the optical effective region 710.

It should be mentioned that the straight line with thicker width in FIGS. 7B, 7E and 7H is configured to indicate the range of the conical surface 753, and the tip line segment with thicker width is configured to indicate the range of the protrusive structure 730.

Further, all of other structures and dispositions according to the 2D example of the 2nd embodiment and the 2E example of the 2nd embodiment are the same as the structures and the dispositions according to the 2C example of the 2nd embodiment, and will not be described again herein.

Figure 8A:
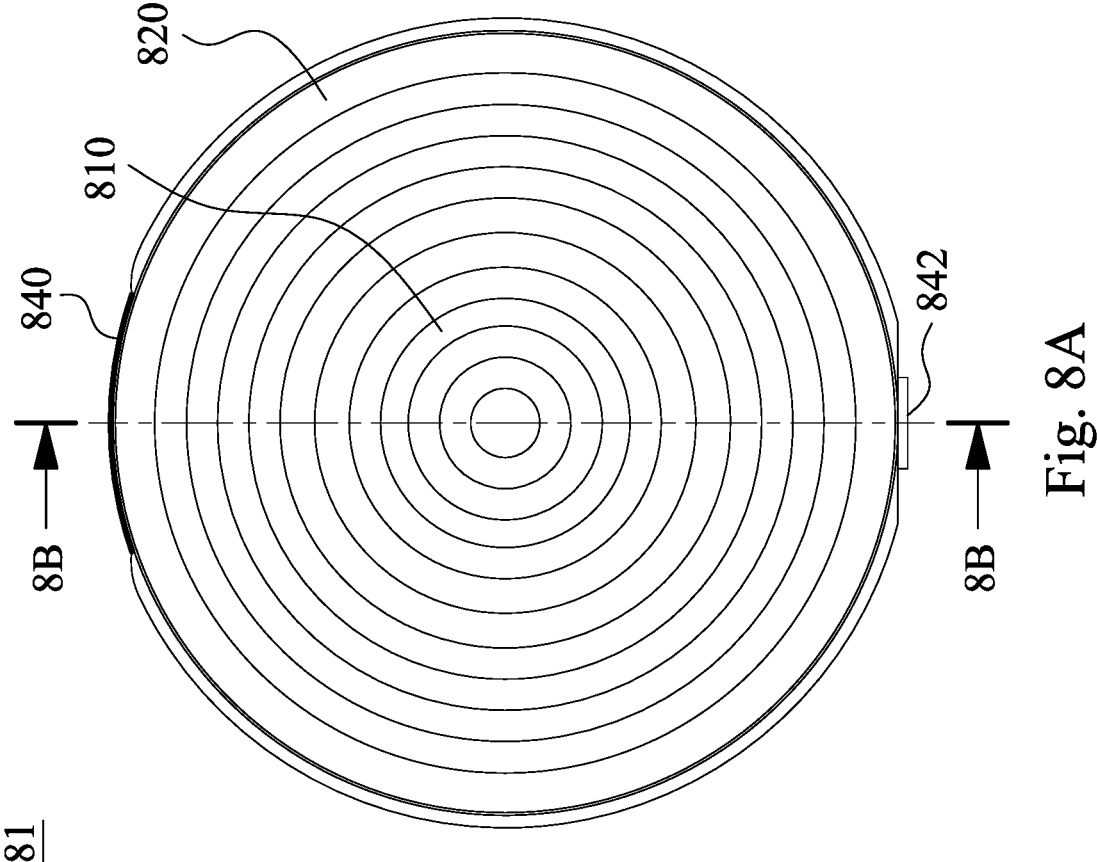
FIG. 8A is a schematic view of a plastic lens element according to the 2F example of the 2nd embodiment of the present disclosure.
Figure 8B:
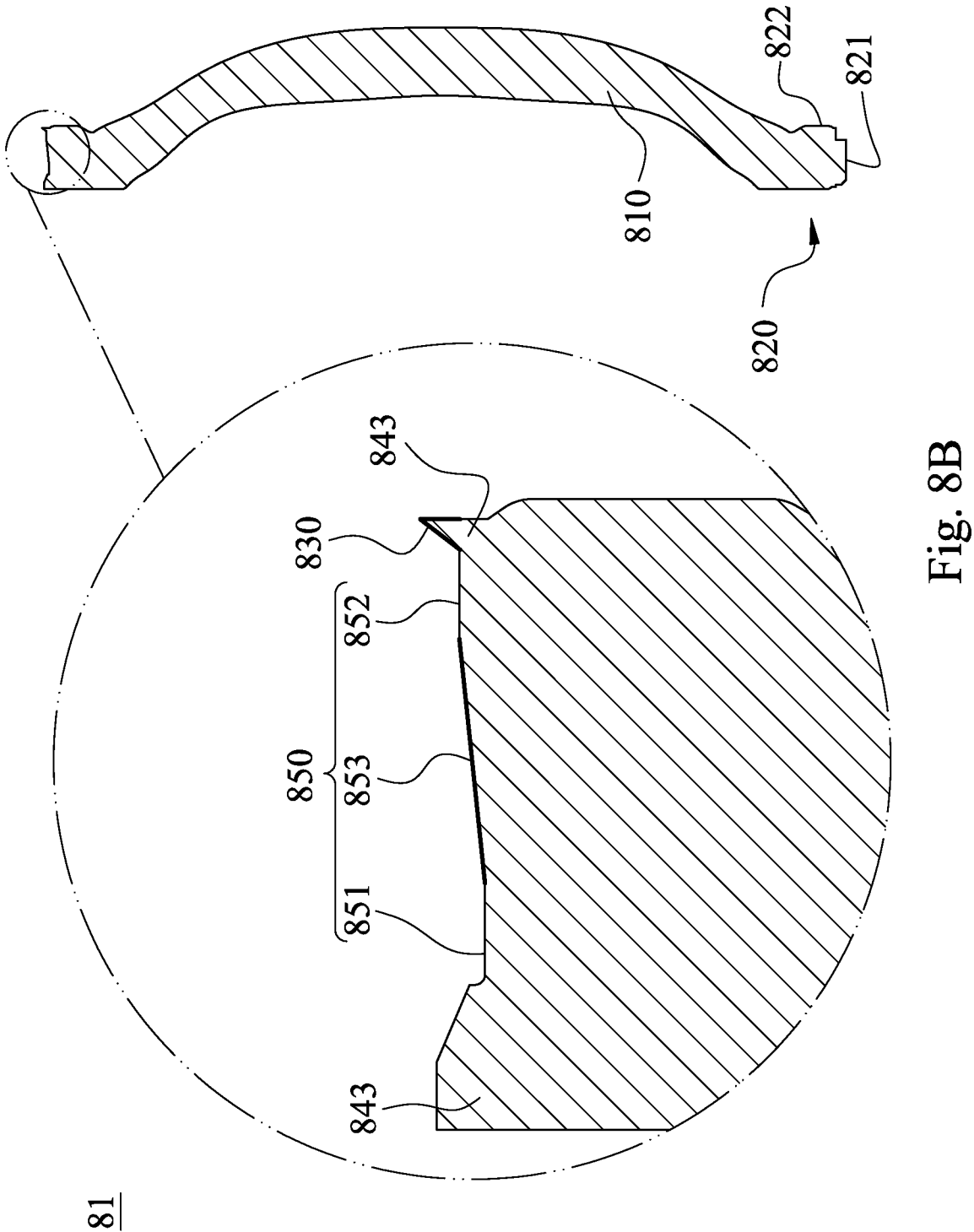
FIG. 8B is a cross-sectional view of the plastic lens element along line 8B-8B in FIG. 8A.

FIG. 8A is a schematic view of a plastic lens element 81 according to the 2F example of the 2nd embodiment of the present disclosure. FIG. 8B is a cross-sectional view of the plastic lens element 81 along line 8B-8B in FIG. 8A. In FIGS. 8A and 8B, the plastic lens element 81 has a section passing through an optical axis (its reference numeral is omitted), and the plastic lens element 81 includes an optical effective region 810 and a peripheral region 820, wherein the optical axis passes through the optical effective region 810, the peripheral region 820 is circularly disposed on a periphery of the optical effective region 810, and the peripheral region 820 has an outer diameter surface 821 and an annular lateral surface 822. The outer diameter surface 821 is farther away from the optical effective region 810 than the annular lateral surface 822 from the optical effective region 810, and the annular lateral surface 822 is located between the outer diameter surface 821 and the optical effective region 810. Furthermore, the peripheral region 820 includes a protrusive structure 830, an indented shape 840 and a release notch 850.

The protrusive structure 830 is disposed on the outer diameter surface 821 and adjacent to the annular lateral surface 822, and the protrusive structure 830 extends towards a direction away from the optical axis.

The indented shape 840 is dented from the outer diameter surface 821 towards the optical effective region 810, and the indented shape 840 has a base surface (its reference numeral is omitted).

The release notch 850 is dented from the base surface towards the optical axis, and the release notch 850 has a top surface 851 and a bottom surface 852 via the section, wherein the top surface 851 and the bottom surface 852 are arranged along an extending direction of the optical axis, a conical surface 853 is located between the top surface 851 and the bottom surface 852, the conical surface 853 is tapered from the top surface 851 towards the optical axis in a direction towards the bottom surface 852, and the top surface 851, the conical surface 853, the bottom surface 852 and the protrusive structure 830 are arranged in order along a direction parallel to the optical axis. The conical surface 853 can be tapered towards the optical axis along a direction adjacent to the protrusive structure 830.

The indented shape 840 can include a gate 842. In particular, the gate 842, which easily causes the assembling tolerance, is disposed on the indented shape 840, so that the gate 842 can be prevented from being the outermost structure of the plastic lens element 81. Therefore, the assembling accuracy can be enhanced and the assembling tolerance can be decreased.

Moreover, the indented shape 840 can include two drafting parts 843 protruding from the base surface towards a direction away from the optical axis, and a gap is located between the drafting parts 843 to form the release notch 850. In particular, the release notch 850 can be defined via the protruding structures.

According to the 2F example of the 2nd embodiment, a number of the indented shape 840 is one.

Figure 8C:
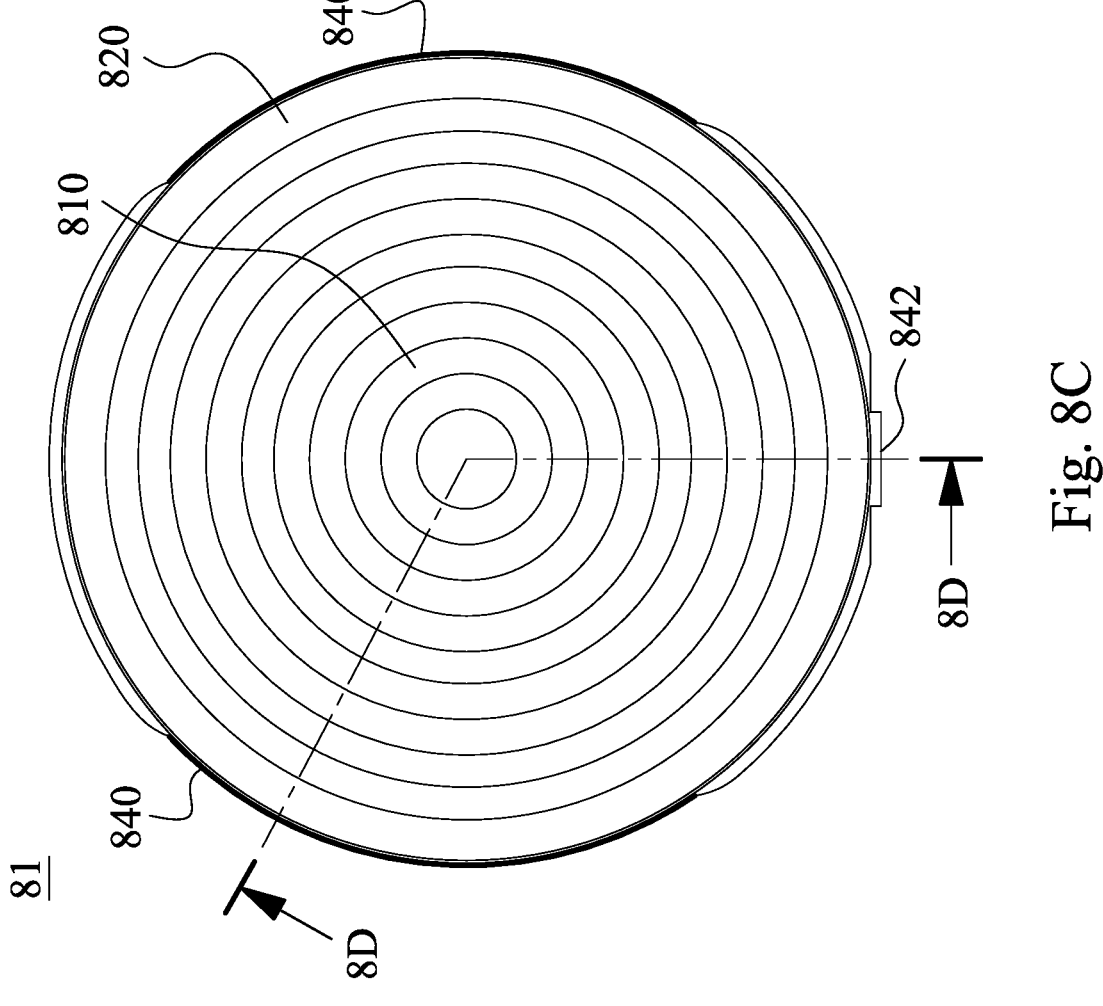
FIG. 8C is a schematic view of the plastic lens element according to the 2G example of the 2nd embodiment in FIG. 8A.
Figure 8D:
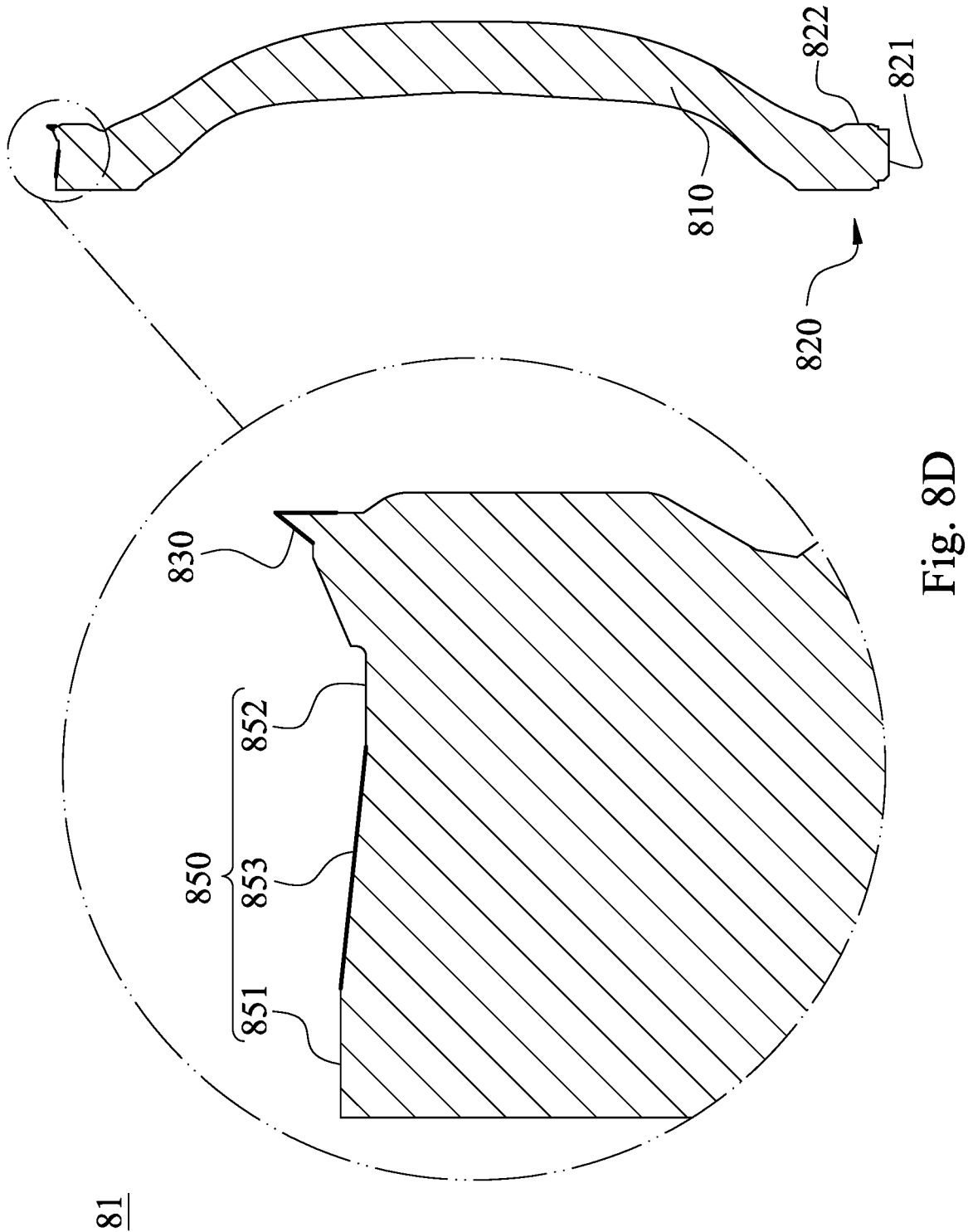
FIG. 8D is a cross-sectional view of the plastic lens element along line 8D-8D in FIG. 8C.

FIG. 8C is a schematic view of the plastic lens element 81 according to the 2G example of the 2nd embodiment in FIG. 8A. FIG. 8D is a cross-sectional view of the plastic lens element 81 along line 8D-8D in FIG. 8C. In FIGS. 8C and 8D, a number of the indented shape 840 is two.

Figure 8E:
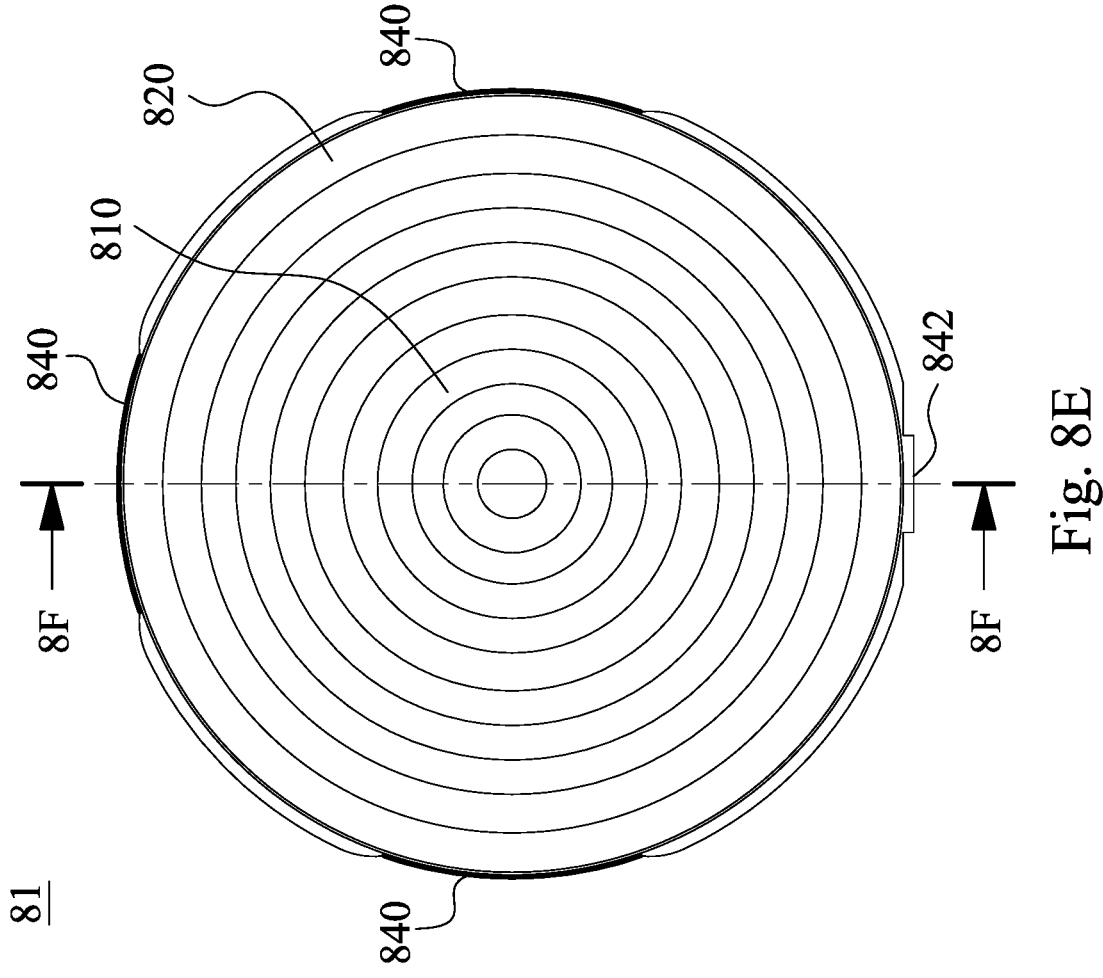
FIG. 8E is a schematic view of the plastic lens element according to the 2H example of the 2nd embodiment in FIG. 8A.
Figure 8F:
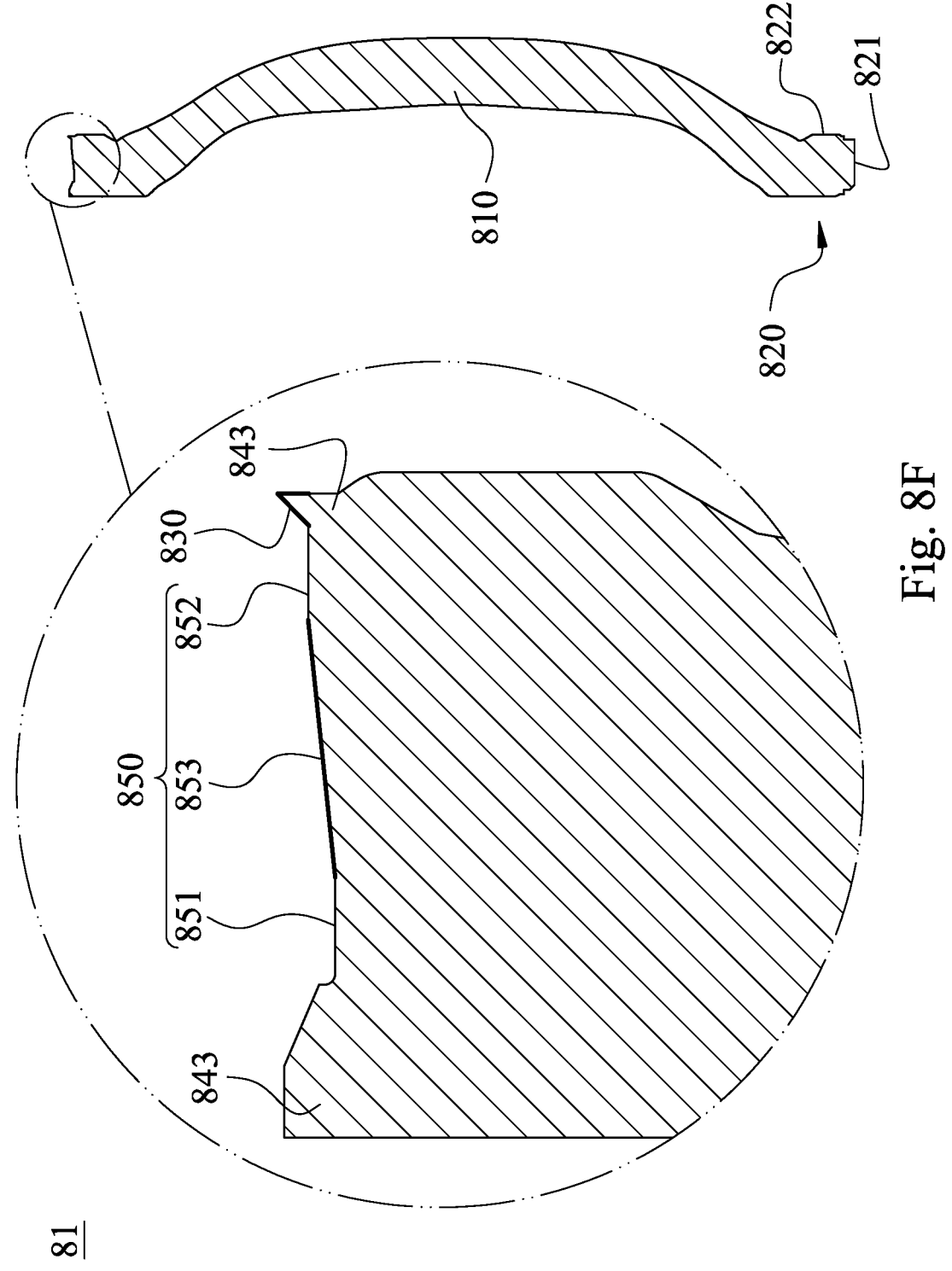
FIG. 8F is a cross-sectional view of the plastic lens element along line 8F-8F in FIG. 8E.

FIG. 8E is a schematic view of the plastic lens element 81 according to the 2H example of the 2nd embodiment in FIG. 8A. FIG. 8F is a cross-sectional view of the plastic lens element 81 along line 8F-8F in FIG. 8E. In FIGS. 8E and 8F, a number of the indented shape 840 is three.

Figure 8G:
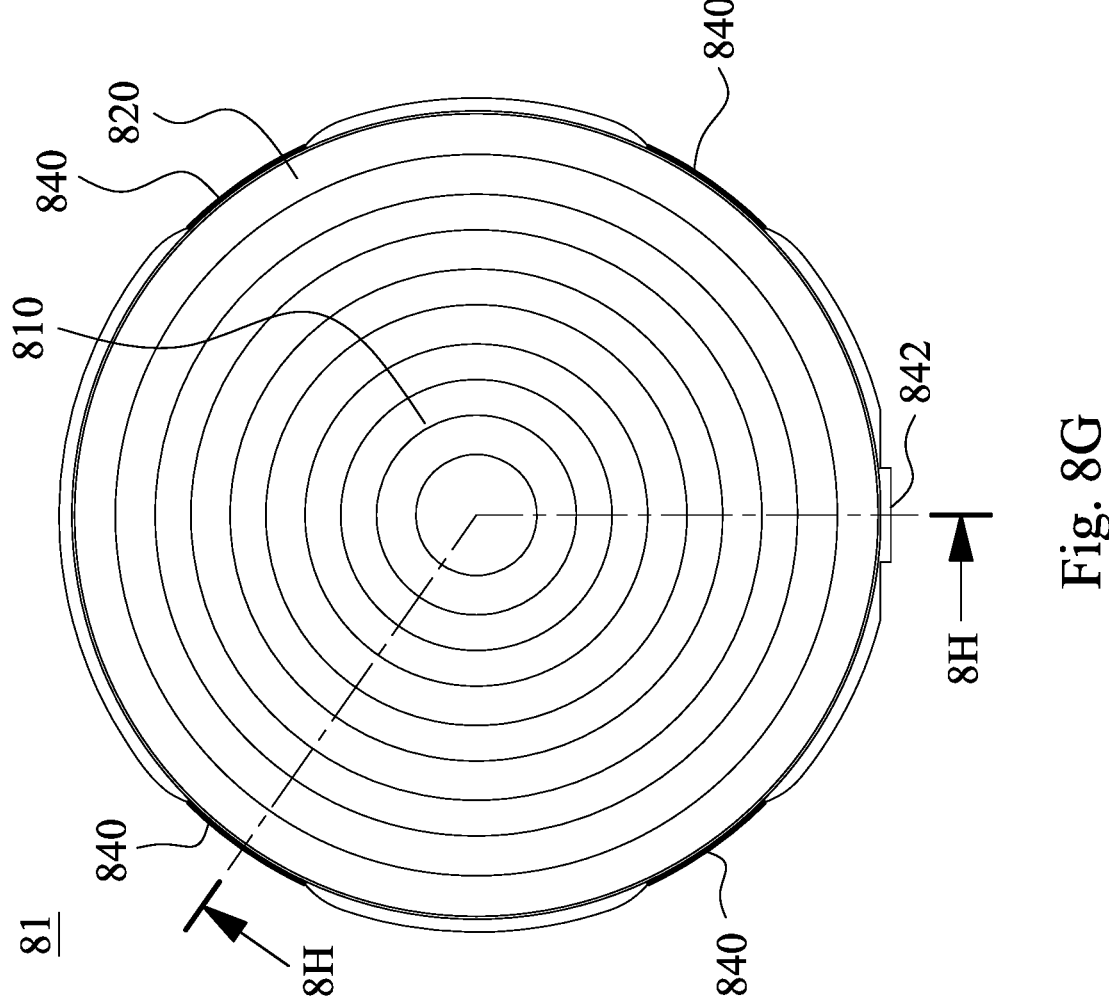
FIG. 8G is a schematic view of the plastic lens element according to the 2I example of the 2nd embodiment in FIG. 8A.
Figure 8H:
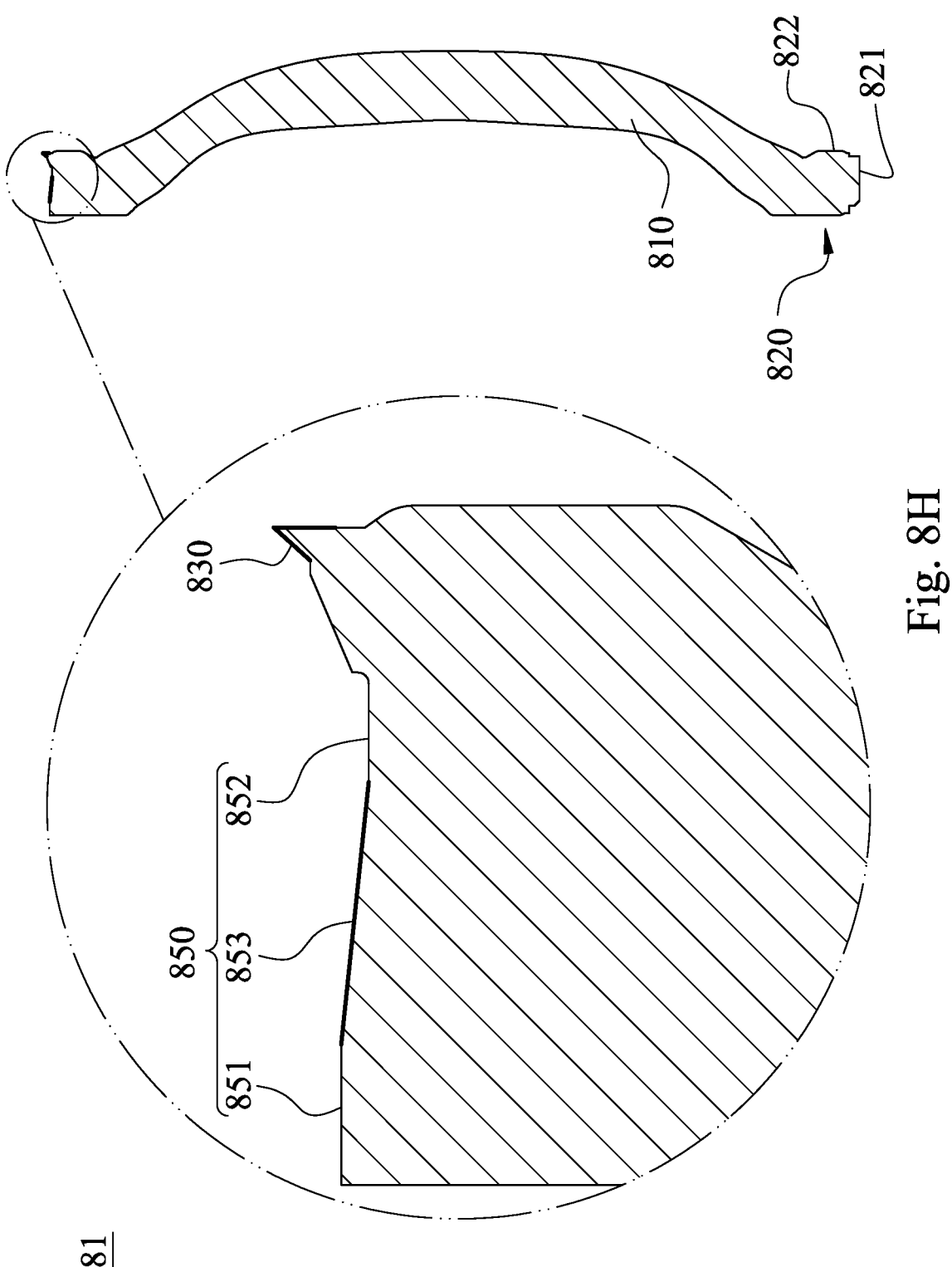
FIG. 8H is a cross-sectional view of the plastic lens element along line 8H-8H in FIG. 8G.

FIG. 8G is a schematic view of the plastic lens element 81 according to the 2I example of the 2nd embodiment in FIG. 8A. FIG. 8H is a cross-sectional view of the plastic lens element 81 along line 8H-8H in FIG. 8G. In FIGS. 8G and 8H, a number of the indented shape 840 is four.

Figure 8I:
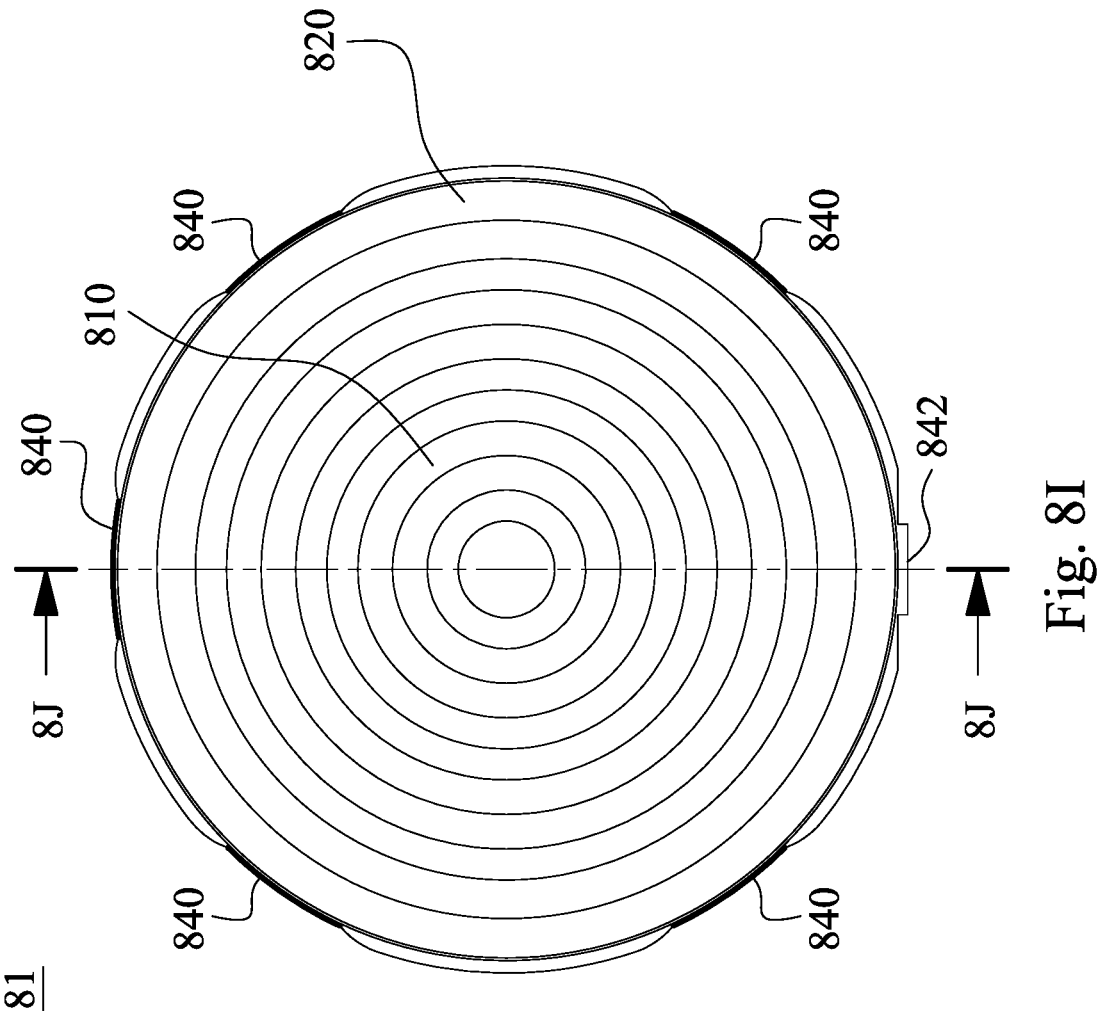
FIG. 8I is a schematic view of the plastic lens element according to the 2J example of the 2nd embodiment in FIG. 8A.
Figure 8J:
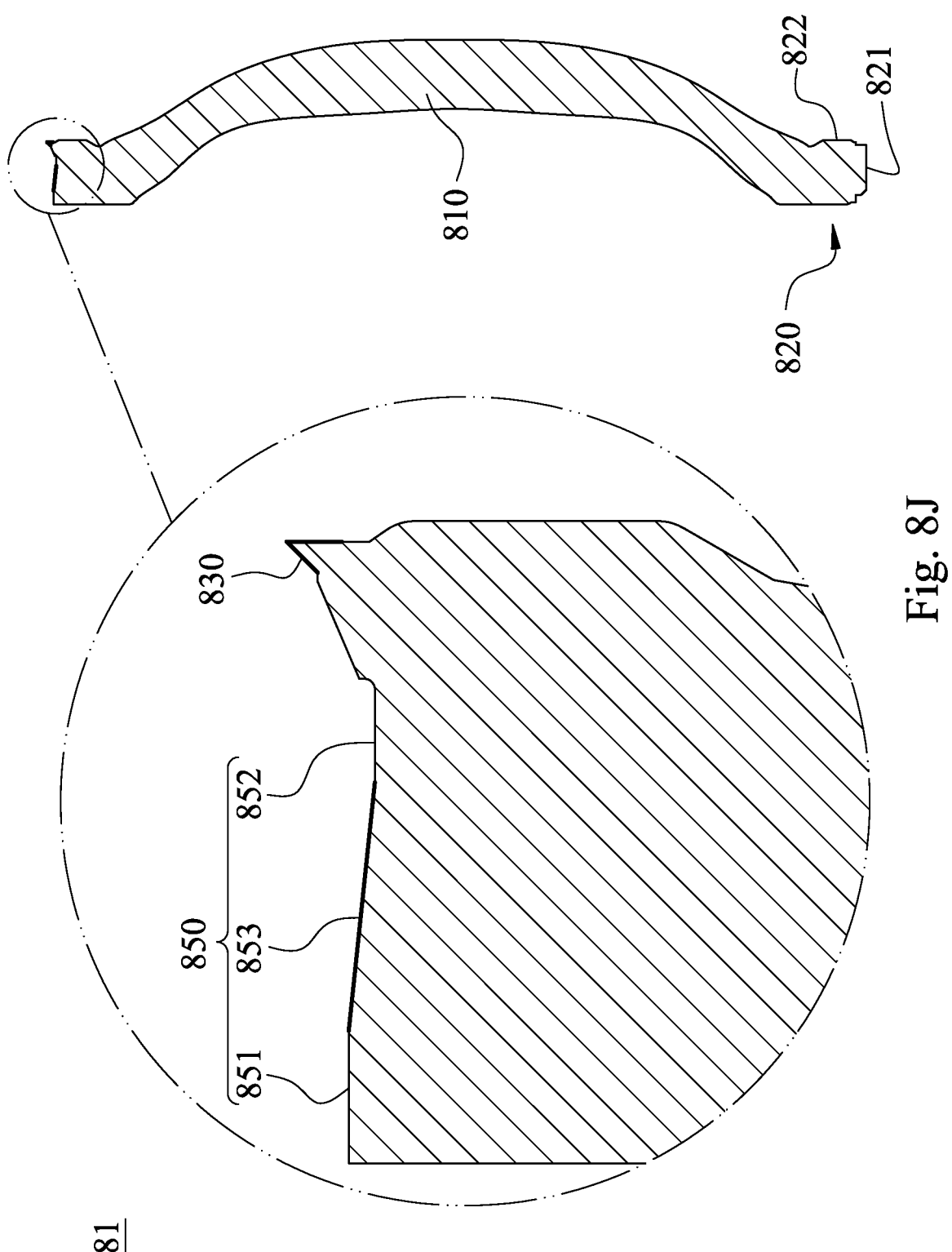
FIG. 8J is a cross-sectional view of the plastic lens element along line 8J-8J in FIG. 8I.

FIG. 8I is a schematic view of the plastic lens element 81 according to the 2J example of the 2nd embodiment in FIG. 8A. FIG. 8J is a cross-sectional view of the plastic lens element 81 along line 8J-8J in FIG. 8I. In FIGS. 8I and 8J, a number of the indented shape 840 is five.

Figure 8K:
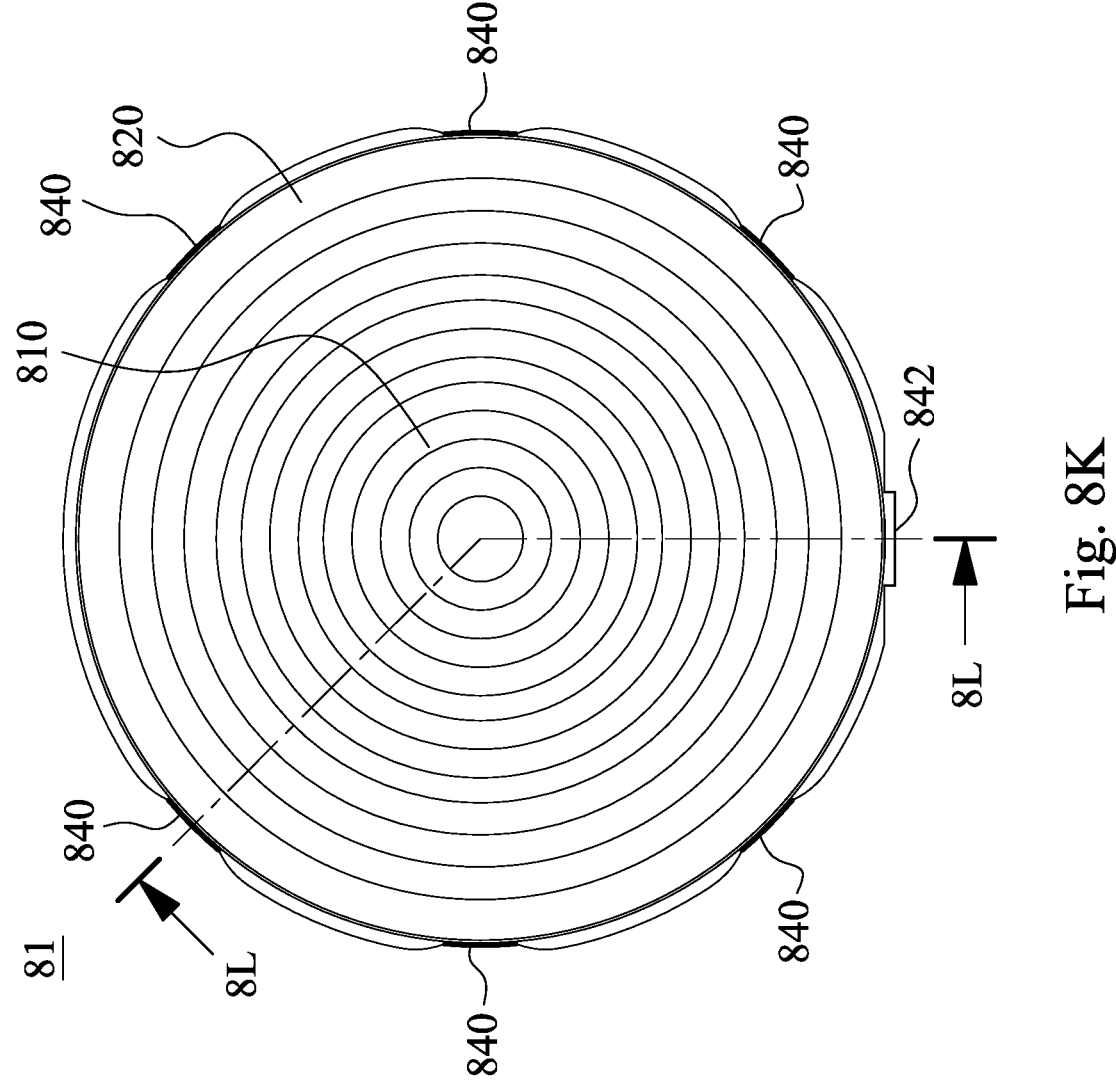
FIG. 8K is a schematic view of the plastic lens element according to the 2K example of the 2nd embodiment in FIG. 8A.
Figure 8L:
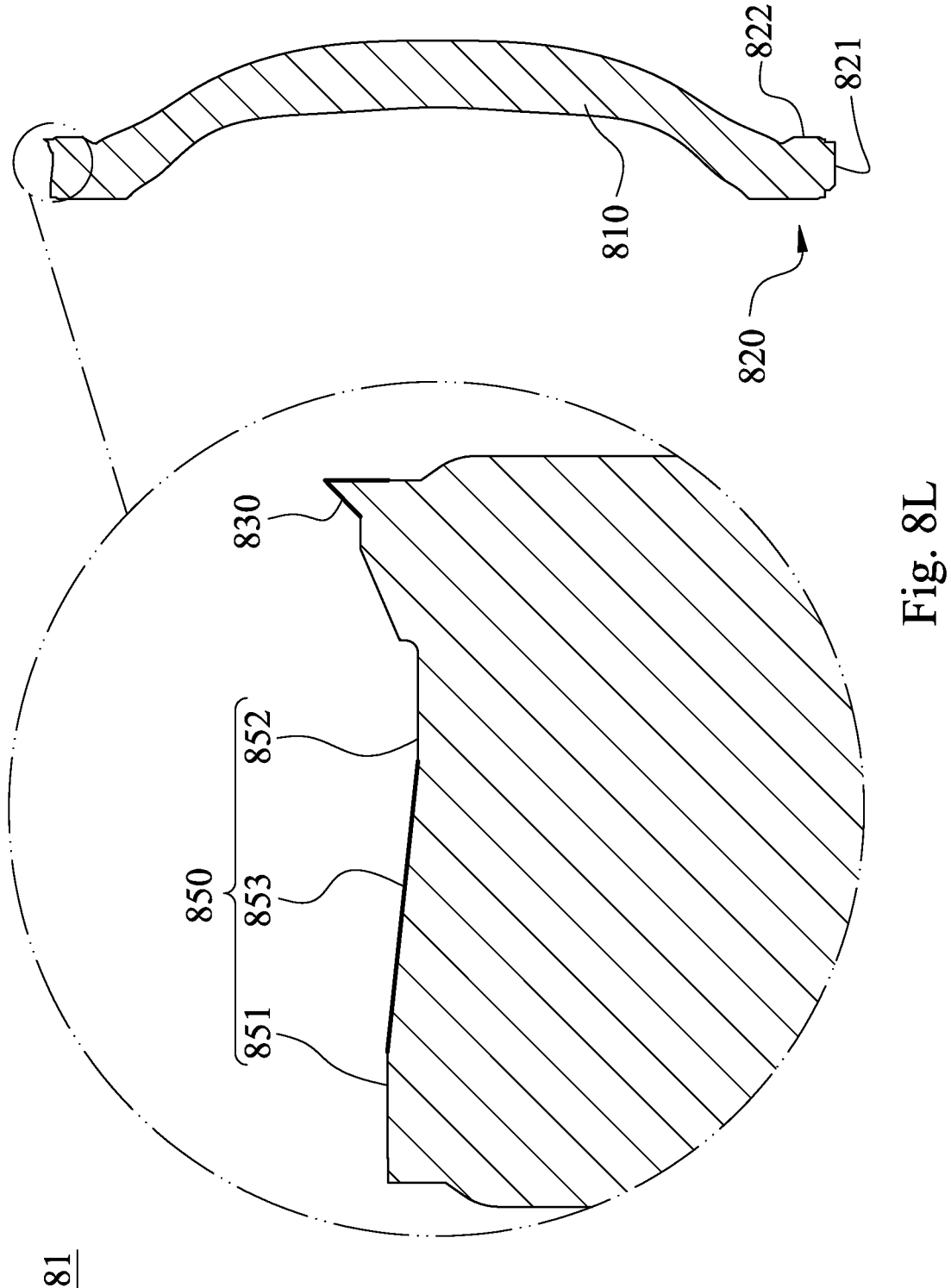
FIG. 8L is a cross-sectional view of the plastic lens element along line 8L-8L in FIG. 8K.

FIG. 8K is a schematic view of the plastic lens element 81 according to the 2K example of the 2nd embodiment in FIG. 8A. FIG. 8L is a cross-sectional view of the plastic lens element 81 along line 8L-8L in FIG. 8K. In FIGS. 8K and 8L, a number of the indented shape 840 is six.

In particular, the difference among the 2F example of the 2nd embodiment, the 2G example of the 2nd embodiment, the 2H example of the 2nd embodiment, the 2I example of the 2nd embodiment, the 2J example of the 2nd embodiment and the 2K example of the 2nd embodiment is the number of the indented shape 840.

It should be mentioned that the straight line with thicker width in FIGS. 8B, 8D, 8F, 8H, 8J and 8L is configured to indicate the range of the conical surface 853, and the tip line segment with thicker width is configured to indicate the range of the protrusive structure 830.

Further, all of other structures and dispositions according to the 2G example of the 2nd embodiment, the 2H example of the 2nd embodiment, the 2I example of the 2nd embodiment, the 2J example of the 2nd embodiment and the 2K example of the 2nd embodiment are the same as the structures and the dispositions according to the 2F example of the 2nd embodiment, and will not be described again herein.

Figure 9A:
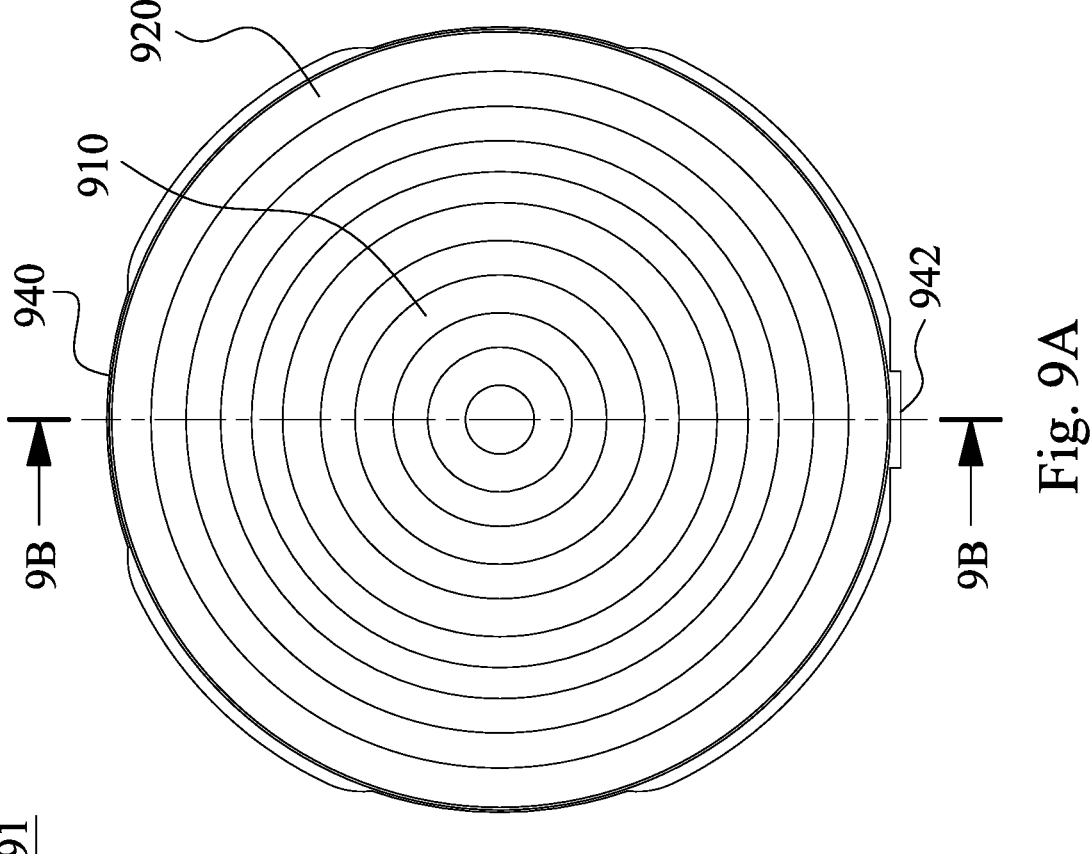
FIG. 9A is a schematic view of a plastic lens element according to the 2L example of the 2nd embodiment of the present disclosure.
Figure 9B:
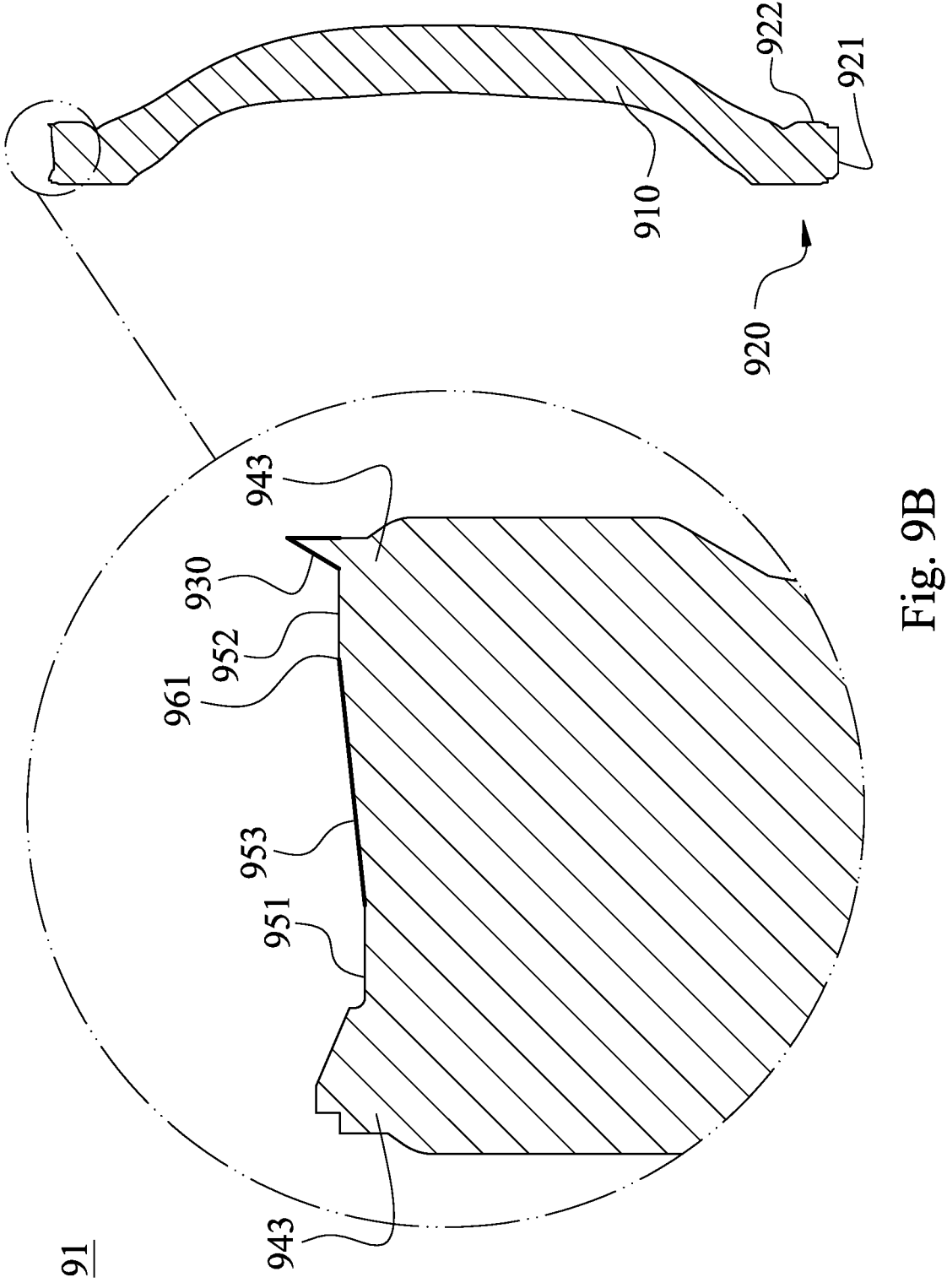
FIG. 9B is a cross-sectional view of the plastic lens element along line 9B-9B in FIG. 9A.
Figure 9C:
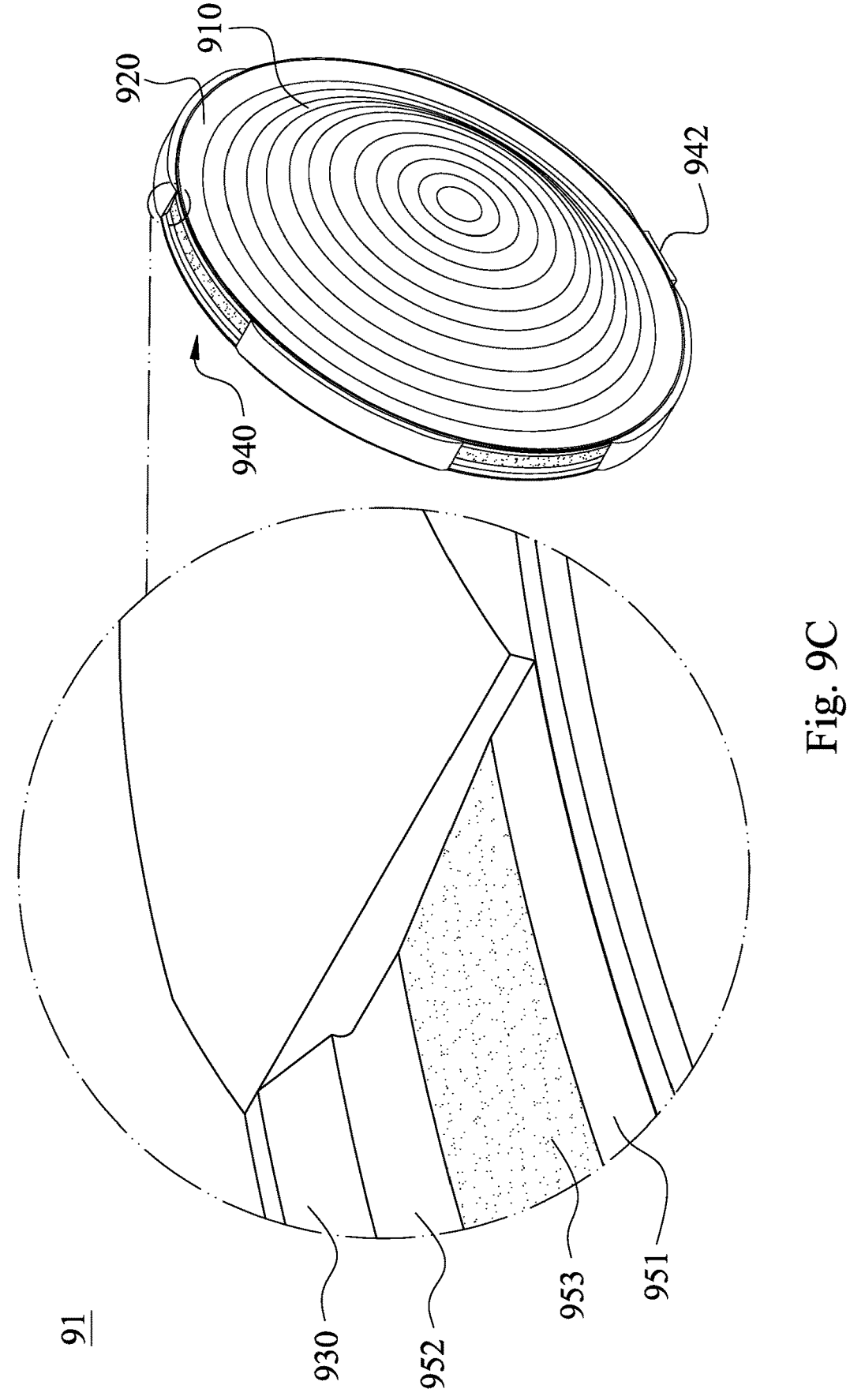
FIG. 9C is a partial enlarged view of the plastic lens element according to the 2L example of the 2nd embodiment in FIG. 9A.

FIG. 9A is a schematic view of a plastic lens element 91 according to the 2L example of the 2nd embodiment of the present disclosure. FIG. 9B is a cross-sectional view of the plastic lens element 91 along line 9B-9B in FIG. 9A. FIG. 9C is a partial enlarged view of the plastic lens element 91 according to the 2L example of the 2nd embodiment in FIG. 9A. In FIGS. 9A to 9C, the plastic lens element 91 has a section passing through an optical axis (its reference numeral is omitted), and the plastic lens element 91 includes an optical effective region 910 and a peripheral region 920, wherein the optical axis passes through the optical effective region 910, the peripheral region 920 is circularly disposed on a periphery of the optical effective region 910, and the peripheral region 920 has an outer diameter surface 921 and an annular lateral surface 922. The outer diameter surface 921 is farther away from the optical effective region 910 than the annular lateral surface 922 from the optical effective region 910, and the annular lateral surface 922 is located between the outer diameter surface 921 and the optical effective region 910. Furthermore, the peripheral region 920 includes a protrusive structure 930, an indented shape 940 and a release notch (its reference numeral is omitted).

The protrusive structure 930 is disposed on the outer diameter surface 921 and adjacent to the annular lateral surface 922, and the protrusive structure 930 extends towards a direction away from the optical axis.

The indented shape 940 is dented from the outer diameter surface 921 towards the optical effective region 910, and the indented shape 940 has a base surface (its reference numeral is omitted).

The release notch is dented from the base surface towards the optical axis, and the release notch has a top surface 951 and a bottom surface 952 via the section, wherein the top surface 951 and the bottom surface 952 are arranged along an extending direction of the optical axis, a conical surface 953 is located between the top surface 951 and the bottom surface 952, the conical surface 953 is tapered from the top surface 951 towards the optical axis in a direction towards the bottom surface 952, and the top surface 951, the conical surface 953, the bottom surface 952 and the protrusive structure 930 are arranged in order along a direction parallel to the optical axis. The conical surface 953 can be tapered towards the optical axis along a direction adjacent to the protrusive structure 930.

The indented shape 940 can include a gate 942. In particular, the gate 942, which easily causes the assembling tolerance, is disposed on the indented shape 940, so that the gate 942 can be prevented from being the outermost structure of the plastic lens element 91. Therefore, the assembling accuracy can be enhanced and the assembling tolerance can be decreased.

The indented shape 940 can include two drafting parts 943 protruding from the base surface towards a direction away from the optical axis, and a gap is located between the drafting parts 943 to form the release notch. In particular, the release notch can be defined via the protruding structures.

Further, a first step valley 961 is formed between the conical surface 953 and the bottom surface 952, and the first step valley 961 has an obtuse angle, and an angle range of the obtuse angle can be between 160 degrees and 179.5 degrees. By defining the angle of the conical surface 953 as the gentle slope, the proper demolding resistance can be provided so as to avoid the condition of the reverse draft.

Figure 9D:
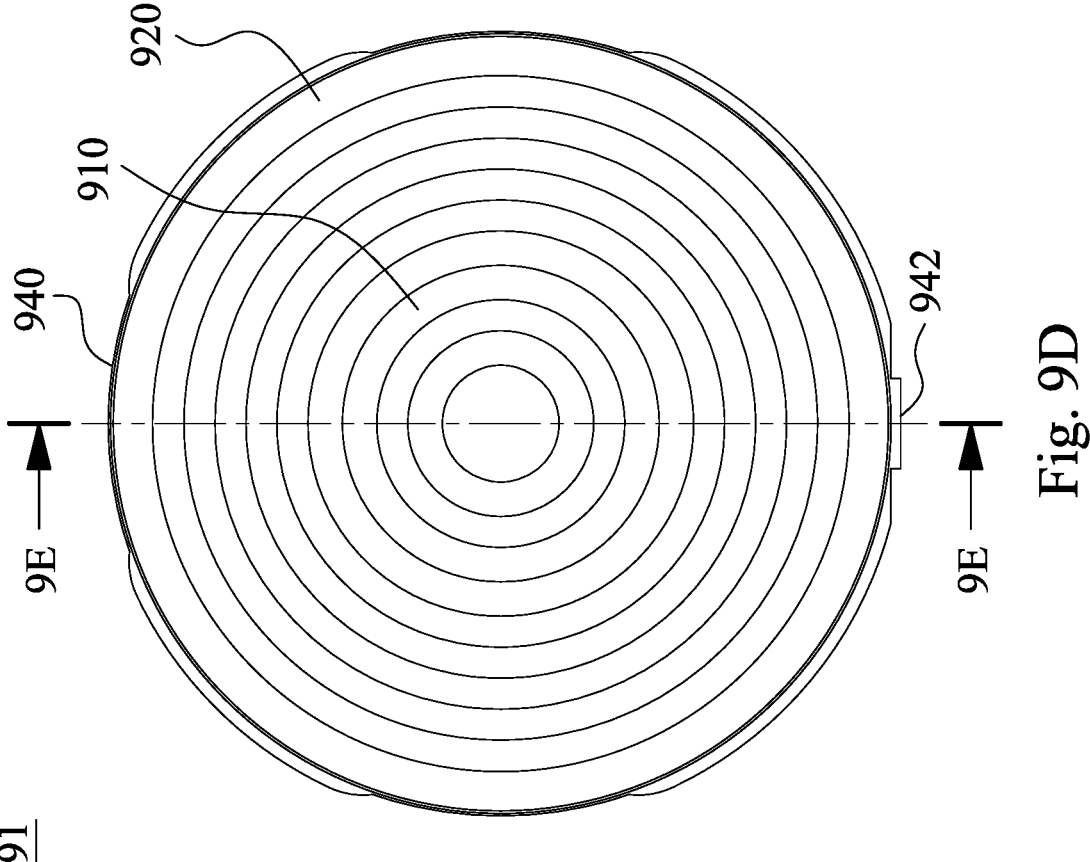
FIG. 9D is a schematic view of the plastic lens element according to the 2M example of the 2nd embodiment in FIG. 9A.
Figure 9E:
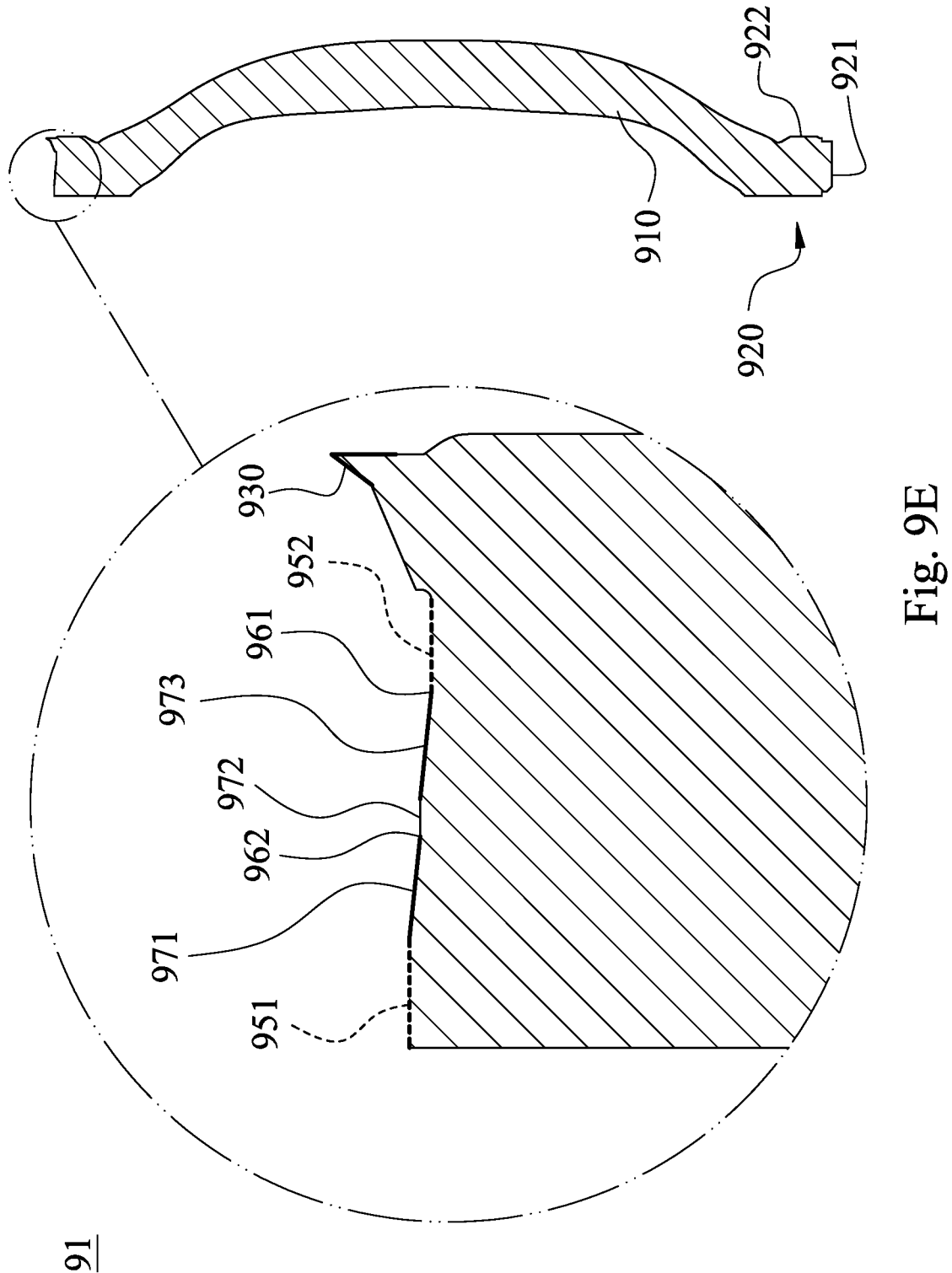
FIG. 9E is a cross-sectional view of the plastic lens element along line 9E-9E in FIG. 9D.
Figure 9F:
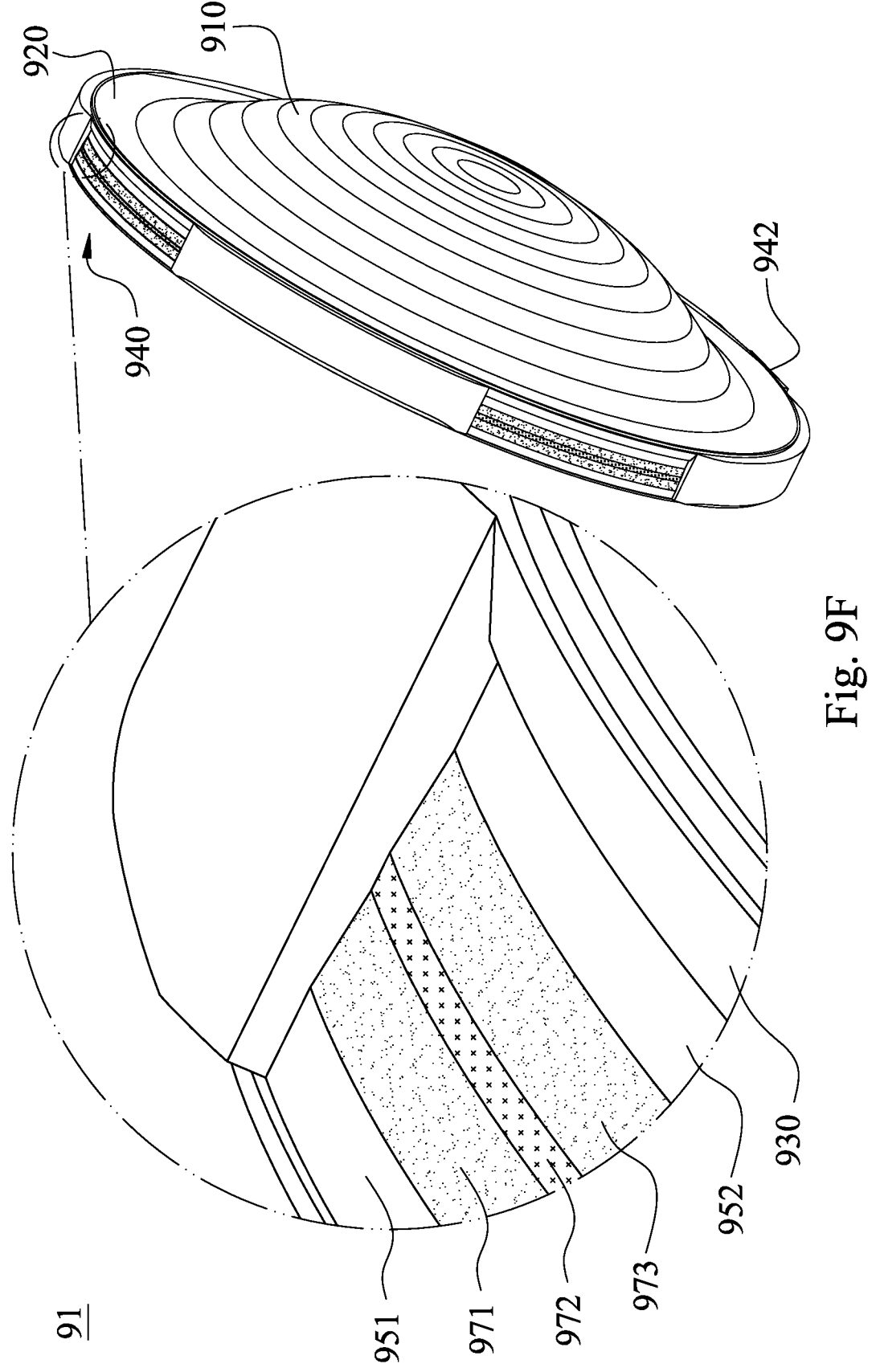
FIG. 9F is a partial enlarged view of the plastic lens element according to the 2M example of the 2nd embodiment in FIG. 9D.

FIG. 9D is a schematic view of the plastic lens element 91 according to the 2M example of the 2nd embodiment in FIG. 9A. FIG. 9E is a cross-sectional view of the plastic lens element 91 along line 9E-9E in FIG. 9D. FIG. 9F is a partial enlarged view of the plastic lens element 91 according to the 2M example of the 2nd embodiment in FIG. 9D. In FIGS.

9D to 9F, the conical surface 953 can include a first step surface 971, a second step surface 972 and a third step surface 973, and the first step surface 971, the second step surface 972 and the third step surface 973 are arranged in order along the optical axis, wherein the first step surface 971 is located between the top surface 951 and the second step surface 972, the second step surface 972 is located between the first step surface 971 and the third step surface 973, and the third step surface 973 is located between the bottom surface 952 and the second step surface 972.

Further, a second step valley 962 is formed between the first step surface 971 and the second step surface 972, the second step valley 962 has an obtuse angle, and an angle range of the obtuse angle can be between 160 degrees and 179.5 degrees. The conical surface 953 is formed via a plurality of step surfaces, so that the stress is dispersed to the position of the first step valley 961 and the position of the second step valley 962. Therefore, the excessive concentration of the stress can be prevented so as to avoid the problem of the demolding difficulty.

In particular, the difference between the 2L example of the 2nd embodiment and the 2M example of the 2nd embodiment is the step surface number of the conical surface 953.

It should be mentioned that the straight line with thicker width in FIG. 9B is configured to indicate the range of the conical surface 953, and the tip line segment with thicker width is configured to indicate the range of the protrusive structure 930; the straight line with thicker width in FIG. 9E is configured to indicate the range of the first step surface 971 and the range of the third step surface 973, the dotted line is configured to indicate the range of the top surface 951 and the range of the bottom surface 952, and the tip line segment with thicker width is configured to indicate the range of the protrusive structure 930.

Further, all of other structures and dispositions according to the 2M example of the 2nd embodiment are the same as the structures and the dispositions according to the 2L example of the 2nd embodiment, and will not be described again herein.

3rd Embodiment

Figure 10A:
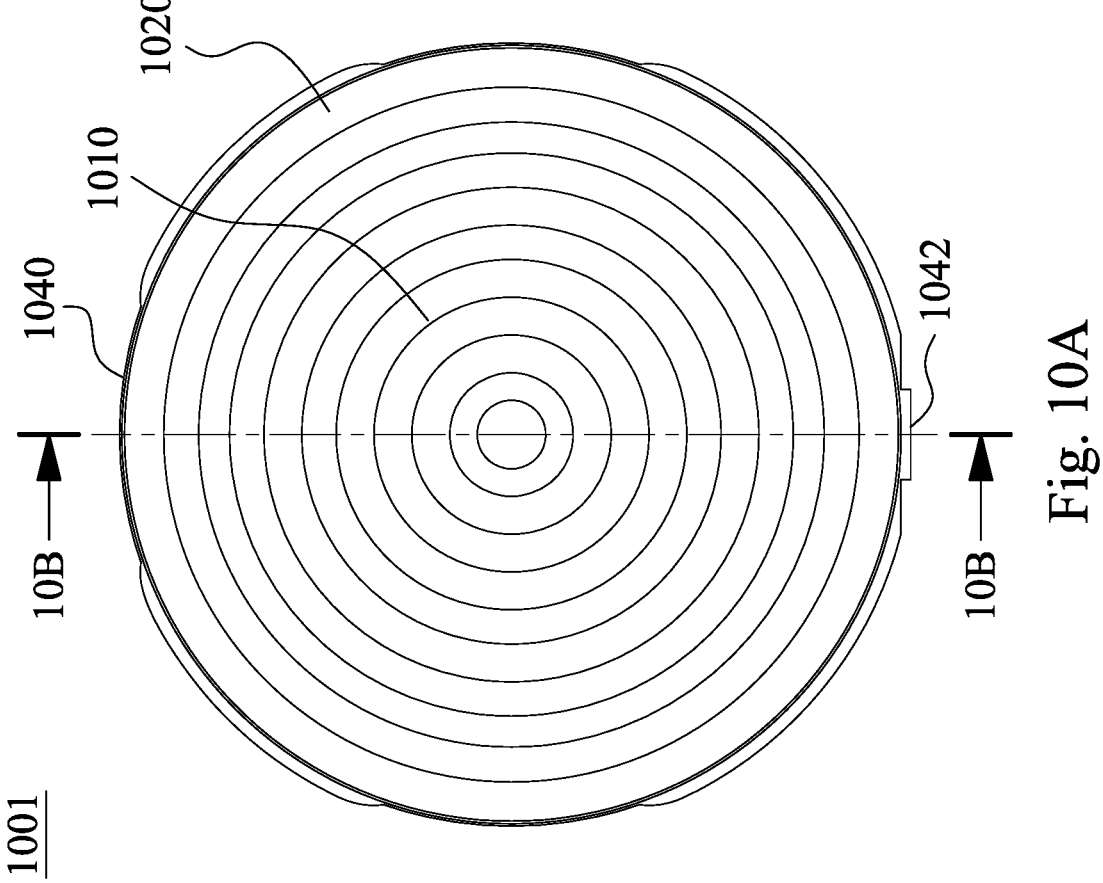
FIG. 10A is a schematic view of a plastic lens element according to the 3A example of the 3rd embodiment of the present disclosure.
Figure 10B:
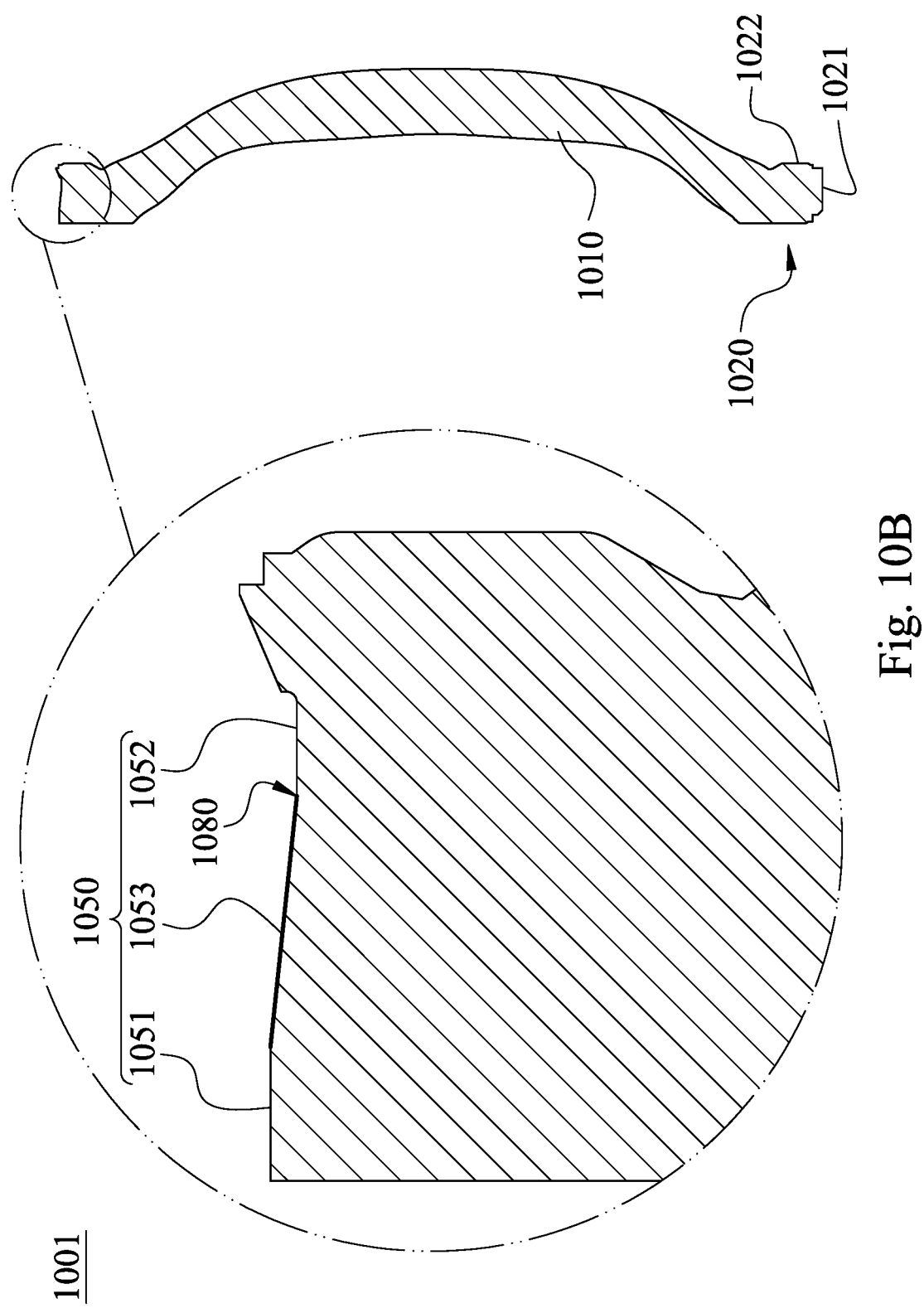
FIG. 10B is a cross-sectional view of the plastic lens element along line 10B-10B in FIG. 10A.
Figure 10C:
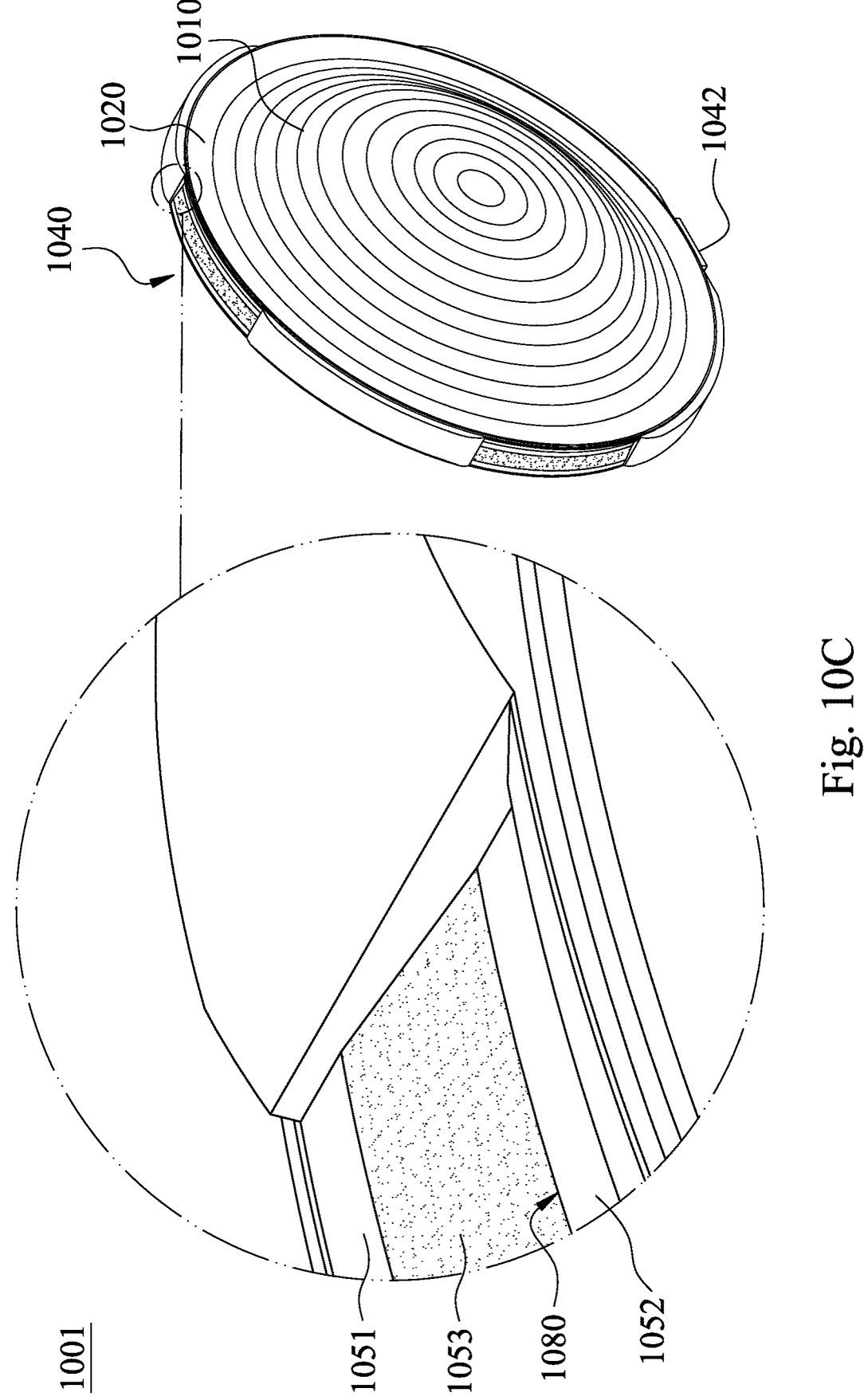
FIG. 10C is a partial enlarged view of the plastic lens element according to the 3A example of the 3rd embodiment in FIG. 10A.

FIG. 10A is a schematic view of a plastic lens element 1001 according to the 3A example of the 3rd embodiment of the present disclosure. FIG. 10B is a cross-sectional view of the plastic lens element 1001 along line 10B-10B in FIG. 10A. FIG. 10C is a partial enlarged view of the plastic lens element 1001 according to the 3A example of the 3rd embodiment in FIG. 10A. In FIGS. 10A to 10C, the plastic lens element 1001 has a section passing through an optical axis (its reference numeral is omitted), and the plastic lens element 1001 includes an optical effective region 1010 and a peripheral region 1020, wherein the optical axis passes through the optical effective region 1010, the peripheral region 1020 is circularly disposed on a periphery of the optical effective region 1010, and the peripheral region 1020 has an outer diameter surface 1021 and an annular lateral surface 1022. The outer diameter surface 1021 is farther away from the optical effective region 1010 than the annular lateral surface 1022 from the optical effective region 1010, and the annular lateral surface 1022 is located between the outer diameter surface 1021 and the optical effective region 1010. Furthermore, the peripheral region 1020 includes an indented shape 1040, a release notch 1050 and an air gap 1080.

The indented shape 1040 is dented from the outer diameter surface 1021 towards the optical effective region 1010, and the indented shape 1040 has a base surface (its reference numeral is omitted).

The release notch 1050 is dented from the base surface towards the optical axis, and the release notch 1050 has a top surface 1051 and a bottom surface 1052 via the section, wherein the top surface 1051 and the bottom surface 1052 are arranged along an extending direction of the optical axis, a conical surface 1053 is located between the top surface 1051 and the bottom surface 1052, the conical surface 1053 is tapered from the top surface 1051 towards the optical axis in a direction towards the bottom surface 1052, and the conical surface 1053 faces towards an image side.

The air gap 1080 is formed on the indented shape 1040 via the conical surface 1053 and the bottom surface 1052, so that an overlap between the air gap 1080 and the indented shape 1040 is in extending directions parallel to the optical axis towards both an object side and an image side.

In particular, the slight demolding resistance may be caused via the conical surface 1053 during the demolding process of the plastic lens element 1001 after the injection molding, so that the stress caused during the demolding and the deformation caused by the stress are gathered at the peripheral region 1020. Therefore, the deformation of the optical effective region 1010 can be prevented.

Moreover, a set of the molds is usually configured to simultaneously form a plurality of plastic lens elements, and the plastic lens element 1001 is fixed on the male mold via the demolding resistance caused by the conical surface 1053 during removing the male mold and the female mold after the injection molding so as to prevent a portion of the plastic lens element 1001 from attaching on the female mold during the demolding process for avoiding the pulling. Therefore, the molding yield of the plastic lens element 1001 can be enhanced.

The indented shape 1040 can include a gate 1042. In particular, the gate 1042, which easily causes the assembling tolerance, is disposed on the indented shape 1040, so that the gate 1042 can be prevented from being the outermost structure of the plastic lens element 1001. Therefore, the assembling accuracy can be enhanced and the assembling tolerance can be decreased.

Figure 10D:
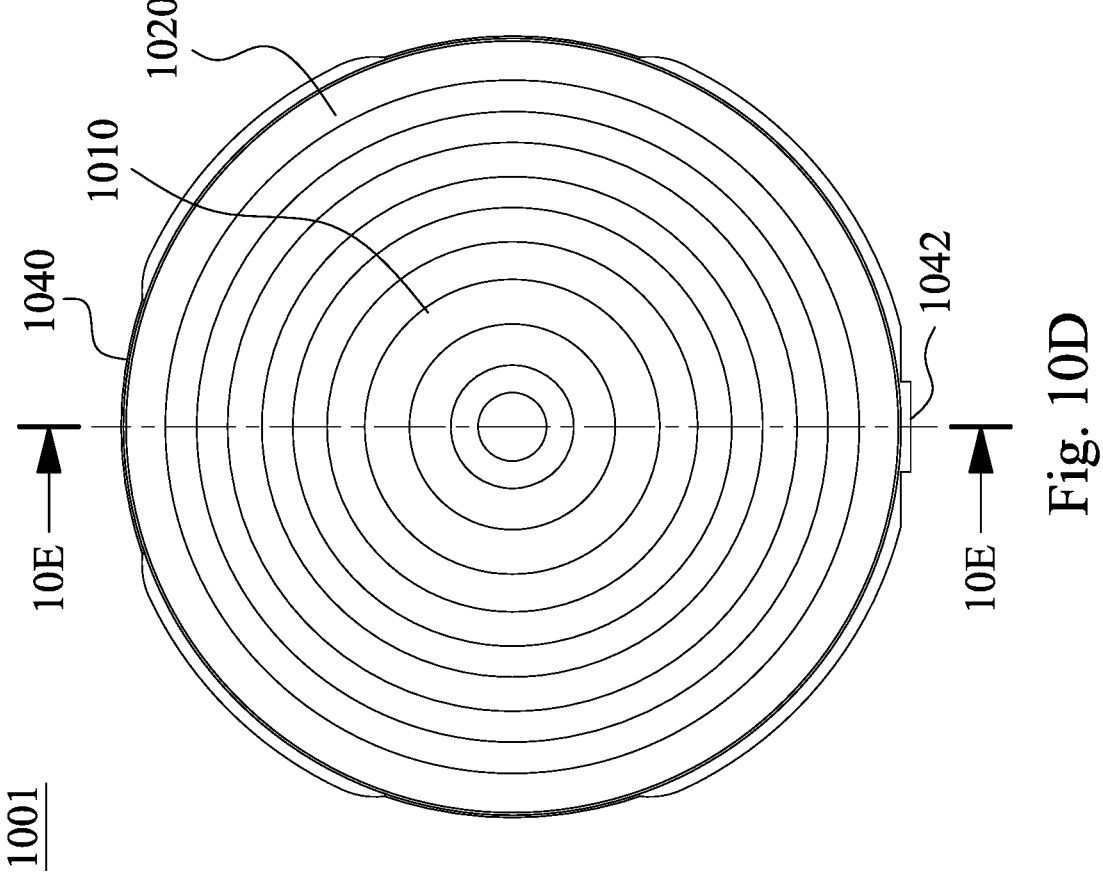
FIG. 10D is a schematic view of the plastic lens element according to the 3B example of the 3rd embodiment in FIG. 10A.
Figure 10E:
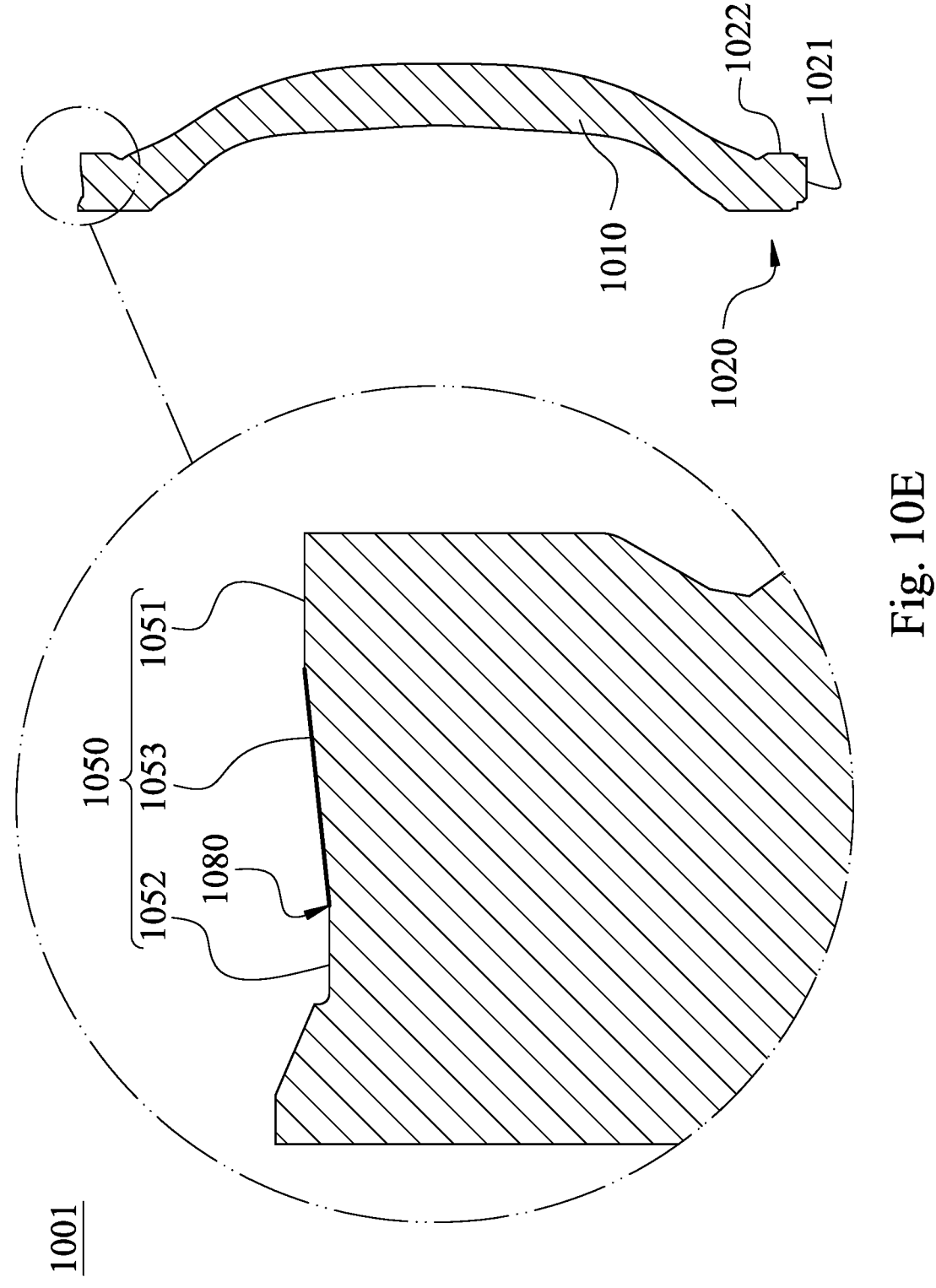
FIG. 10E is a cross-sectional view of the plastic lens element along line 10E-10E in FIG. 10D.
Figure 10F:
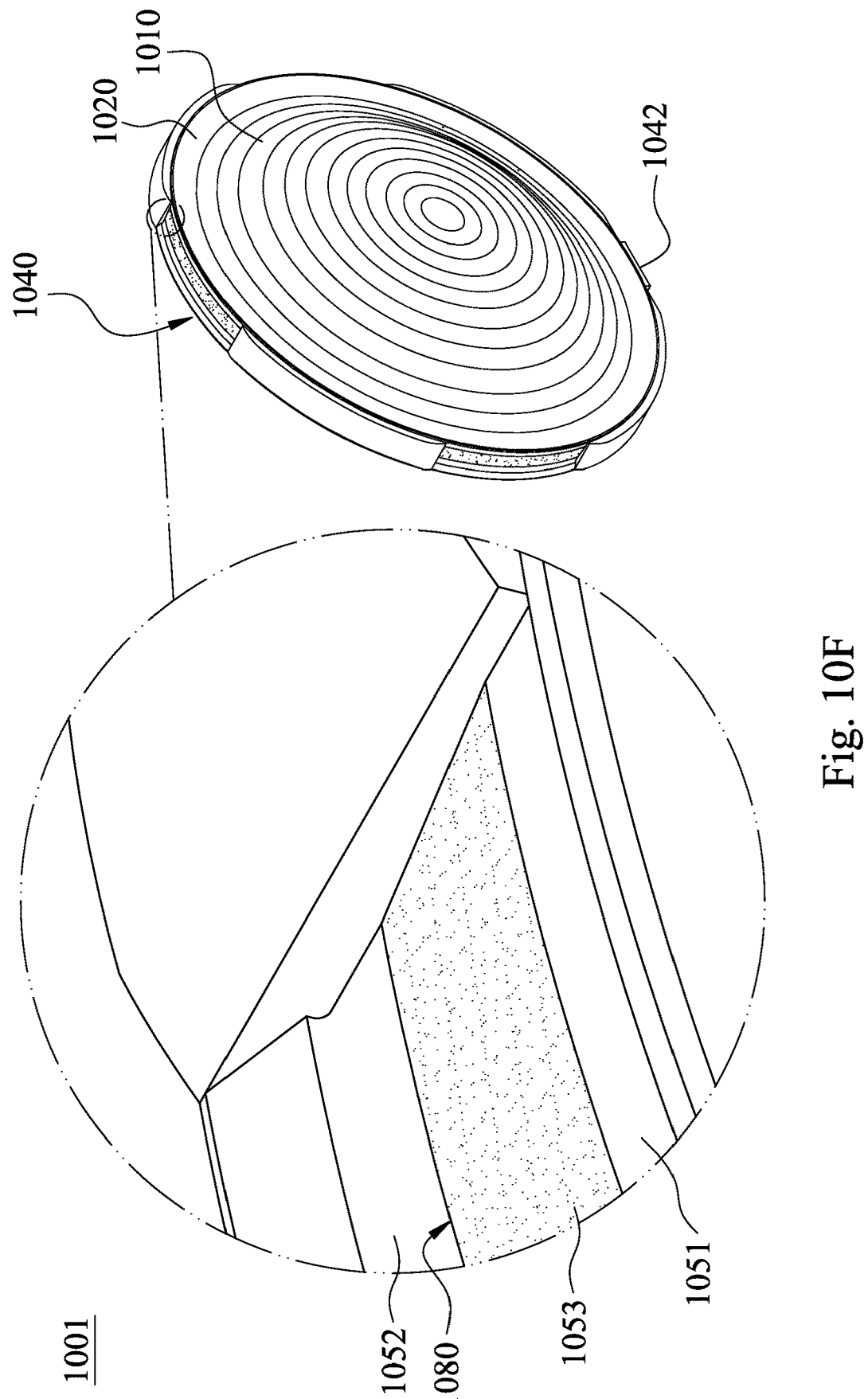
FIG. 10F is a partial enlarged view of the plastic lens element according to the 3B example of the 3rd embodiment in FIG. 10D.

FIG. 10D is a schematic view of the plastic lens element 1001 according to the 3B example of the 3rd embodiment in FIG. 10A. FIG. 10E is a cross-sectional view of the plastic lens element 1001 along line 10E-10E in FIG. 10D. FIG. 10F is a partial enlarged view of the plastic lens element 1001 according to the 3B example of the 3rd embodiment in FIG. 10D. In FIGS. 10D to 10F, the conical surface 1053 of the release notch 1050 faces towards an object side, wherein the difference between the 3A example of the 3rd embodiment and the 3B example of the 3rd embodiment is that the conical surface 1053 faces towards the image side and the object side, respectively.

It should be mentioned that the straight line with thicker width in FIGS. 10B and 10E is configured to indicate the range of the conical surface 1053.

Further, all of other structures and dispositions according to the 3B example of the 3rd embodiment are the same as the structures and the dispositions according to the 3A example of the 3rd embodiment, and will not be described again herein.

Figure 11A:
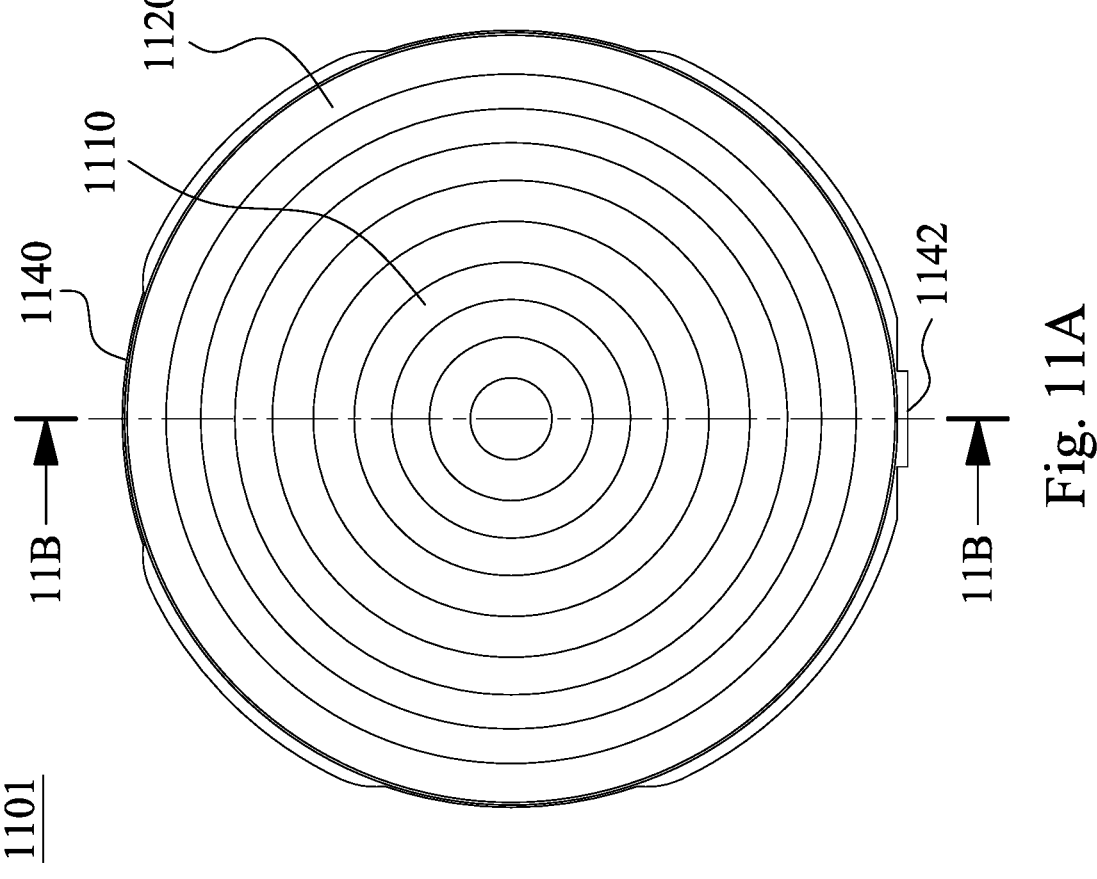
FIG. 11A is a schematic view of a plastic lens element according to the 3C example of the 3rd embodiment of the present disclosure.
Figure 11B:
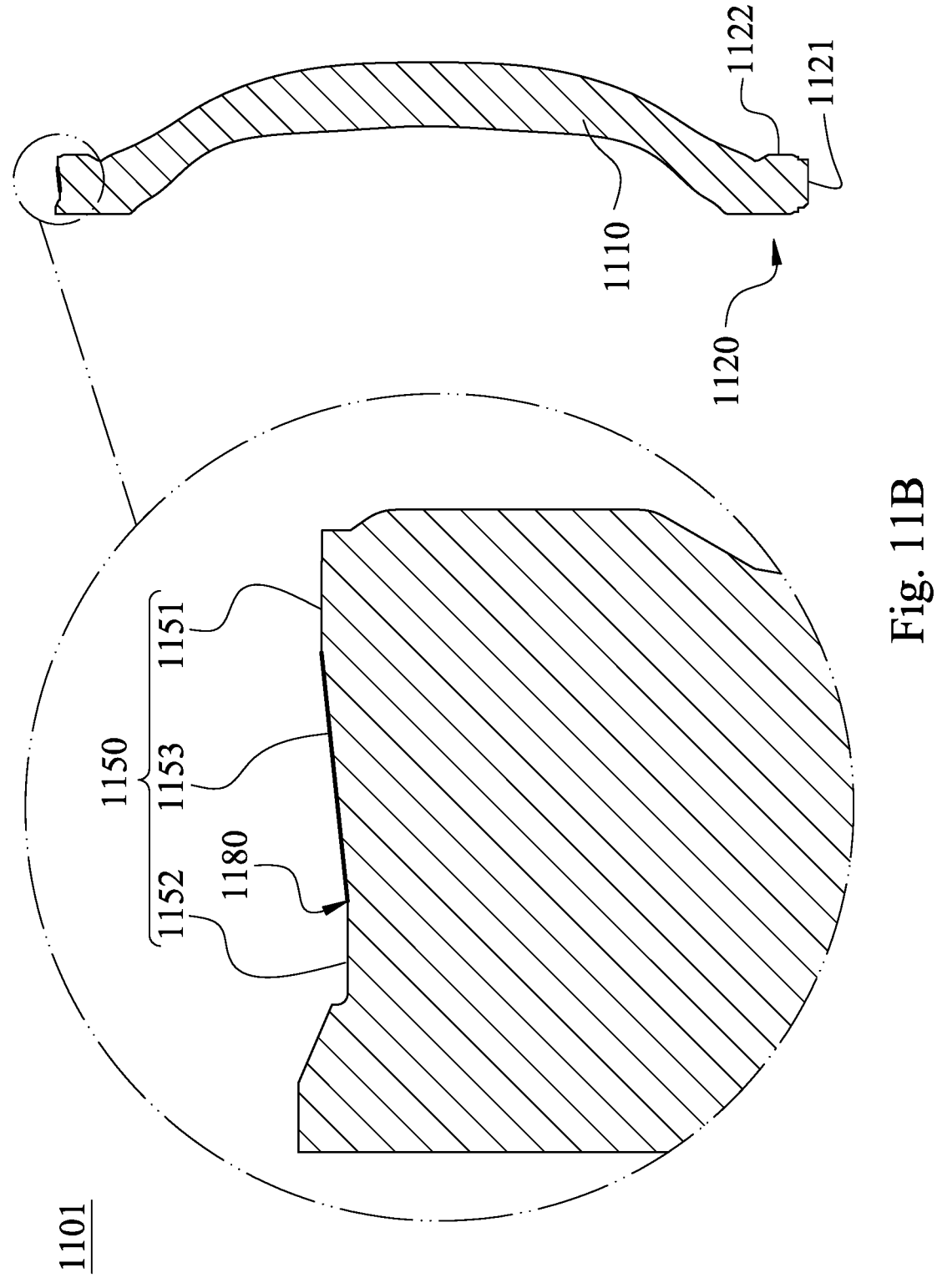
FIG. 11B is a cross-sectional view of the plastic lens element along line 11B-11B in FIG. 11A.

FIG. 11A is a schematic view of a plastic lens element 1101 according to the 3C example of the 3rd embodiment of the present disclosure. FIG. 11B is a cross-sectional view of the plastic lens element 1101 along line 11B-11B in FIG.

Figure 11C:
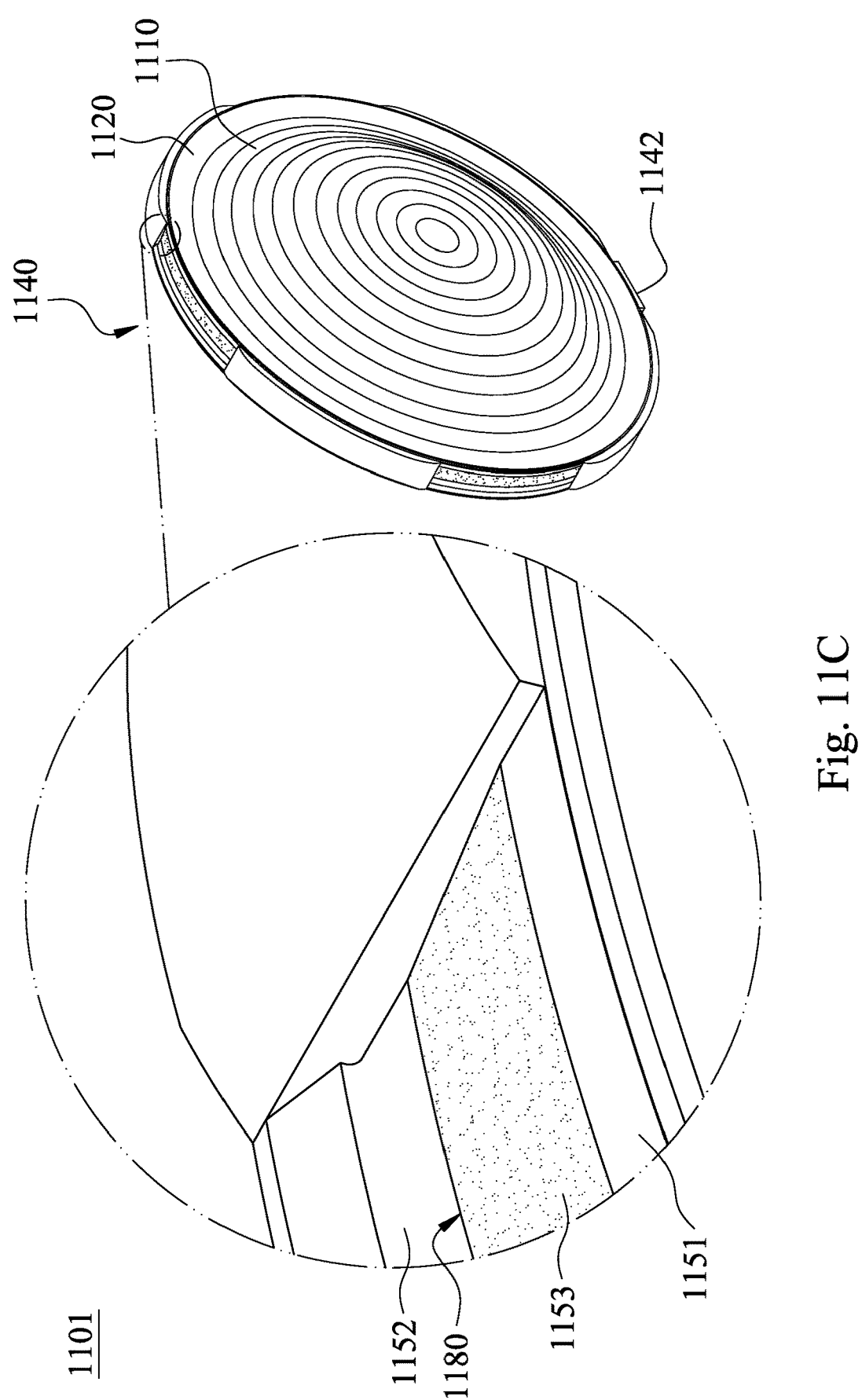
FIG. 11C is a partial enlarged view of the plastic lens element according to the 3C example of the 3rd embodiment in FIG. 11A.

11A. FIG. 11C is a partial enlarged view of the plastic lens element 1101 according to the 3C example of the 3rd embodiment in FIG. 11A. In FIGS. 11A to 11C, the plastic lens element 1101 has a section passing through an optical axis (its reference numeral is omitted), and the plastic lens element 1101 includes an optical effective region 1110 and a peripheral region 1120, wherein the optical axis passes through the optical effective region 1110, the peripheral region 1120 is circularly disposed on a periphery of the optical effective region 1110, and the peripheral region 1120 has an outer diameter surface 1121 and an annular lateral surface 1122. The outer diameter surface 1121 is farther away from the optical effective region 1110 than the annular lateral surface 1122 from the optical effective region 1110, and the annular lateral surface 1122 is located between the outer diameter surface 1121 and the optical effective region 1110. Furthermore, the peripheral region 1120 includes an indented shape 1140, a release notch 1150 and an air gap 1180.

The indented shape 1140 is dented from the outer diameter surface 1121 towards the optical effective region 1110, and the indented shape 1140 has a base surface (its reference numeral is omitted).

The release notch 1150 is dented from the base surface towards the optical axis, and the release notch 1150 has a top surface 1151 and a bottom surface 1152 via the section, wherein the top surface 1151 and the bottom surface 1152 are arranged along an extending direction of the optical axis, a conical surface 1153 is located between the top surface 1151 and the bottom surface 1152, and the conical surface 1153 is tapered from the top surface 1151 towards the optical axis in a direction towards the bottom surface 1152.

The air gap 1180 is formed on the indented shape 1140 via the conical surface 1153 and the bottom surface 1152, so that an overlap between the air gap 1180 and the indented shape 1140 is in extending directions parallel to the optical axis towards both an object side and an image side.

The indented shape 1140 can include a gate 1142. In particular, the gate 1142, which easily causes the assembling tolerance, is disposed on the indented shape 1140, so that the gate 1142 can be prevented from being the outermost structure of the plastic lens element 1101. Therefore, the assembling accuracy can be enhanced and the assembling tolerance can be decreased.

Figure 11D:
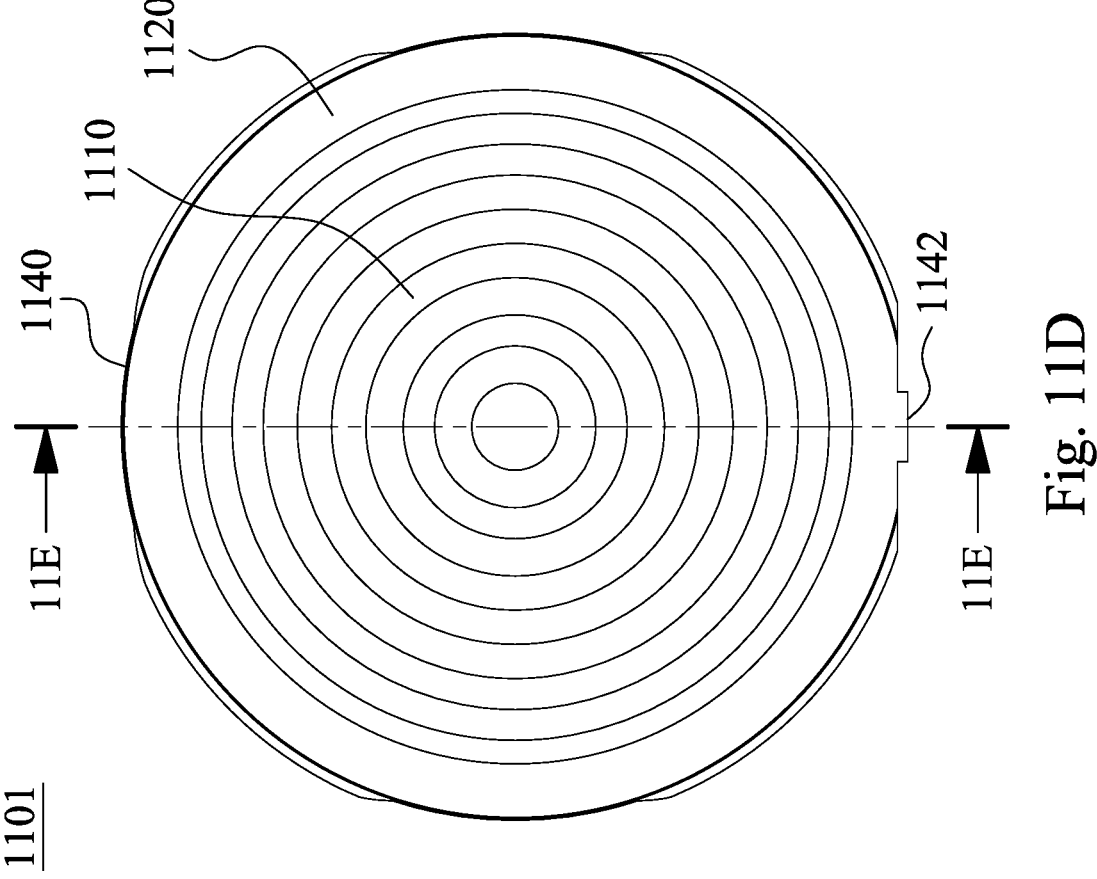
FIG. 11D is a schematic view of the plastic lens element according to the 3D example of the 3rd embodiment in FIG. 11A.
Figure 11E:
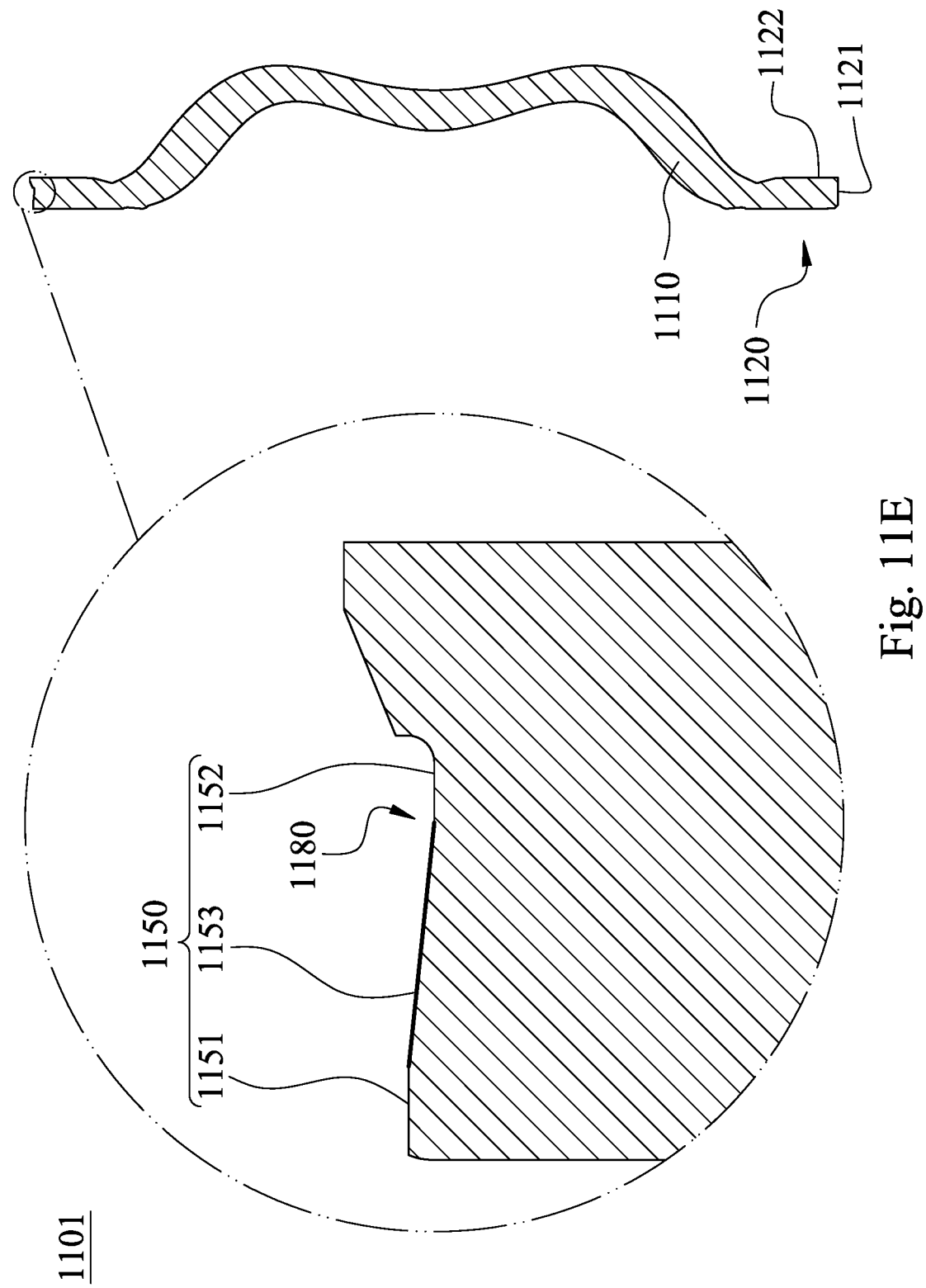
FIG. 11E is a cross-sectional view of the plastic lens element along line 11E-11E in FIG. 11D.
Figure 11F:
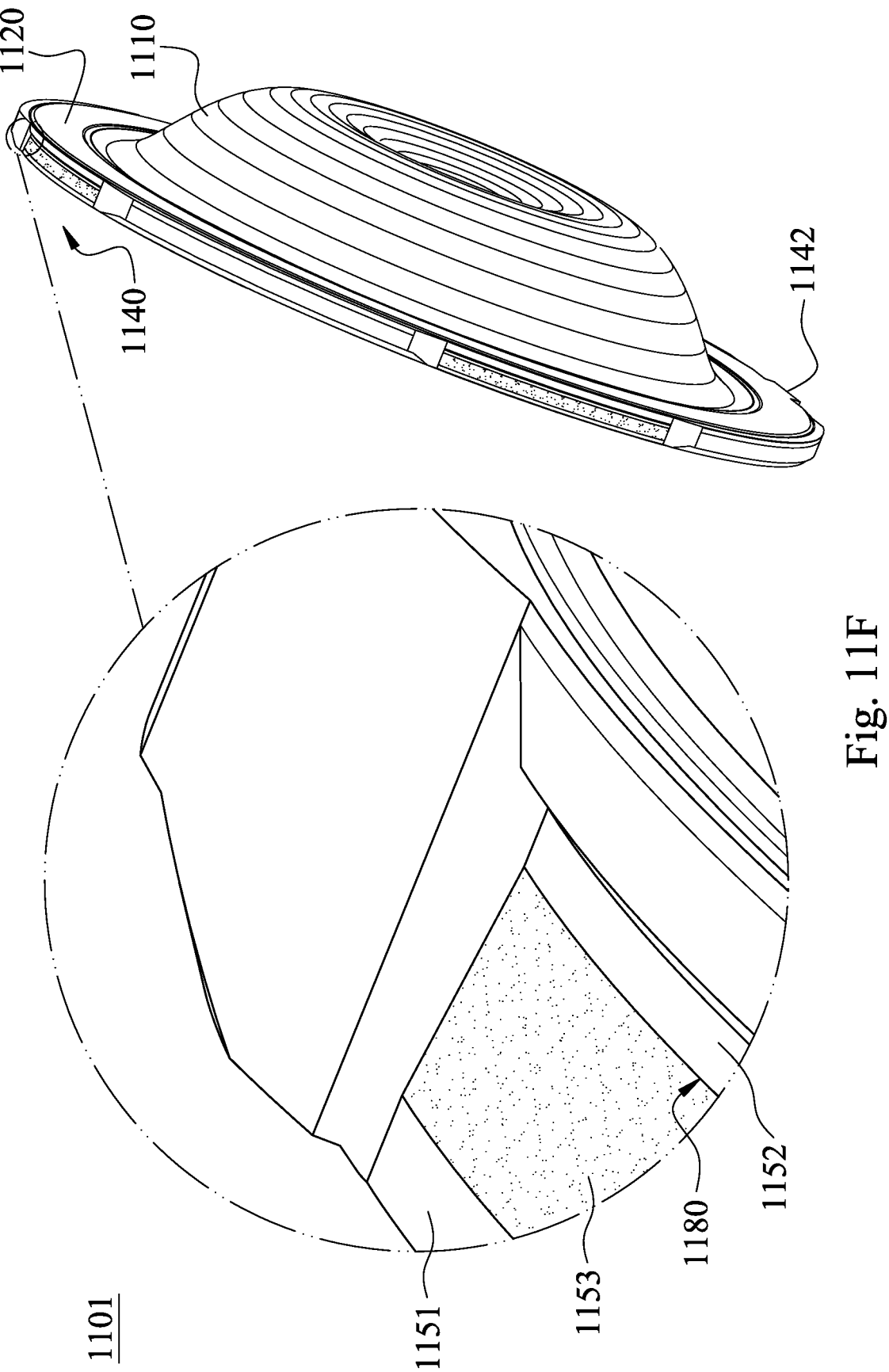
FIG. 11F is a partial enlarged view of the plastic lens element according to the 3D example of the 3rd embodiment in FIG. 11D.

FIG. 11D is a schematic view of the plastic lens element 1101 according to the 3D example of the 3rd embodiment in FIG. 11A. FIG. 11E is a cross-sectional view of the plastic lens element 1101 along line 11E-11E in FIG. 11D. FIG. 11F is a partial enlarged view of the plastic lens element 1101 according to the 3D example of the 3rd embodiment in FIG. 11D. In FIGS. 11D to 11F, a middle thickness of the plastic lens element 1101 is thinner than a peripheral thickness of the plastic lens element 1101.

Figure 11G:
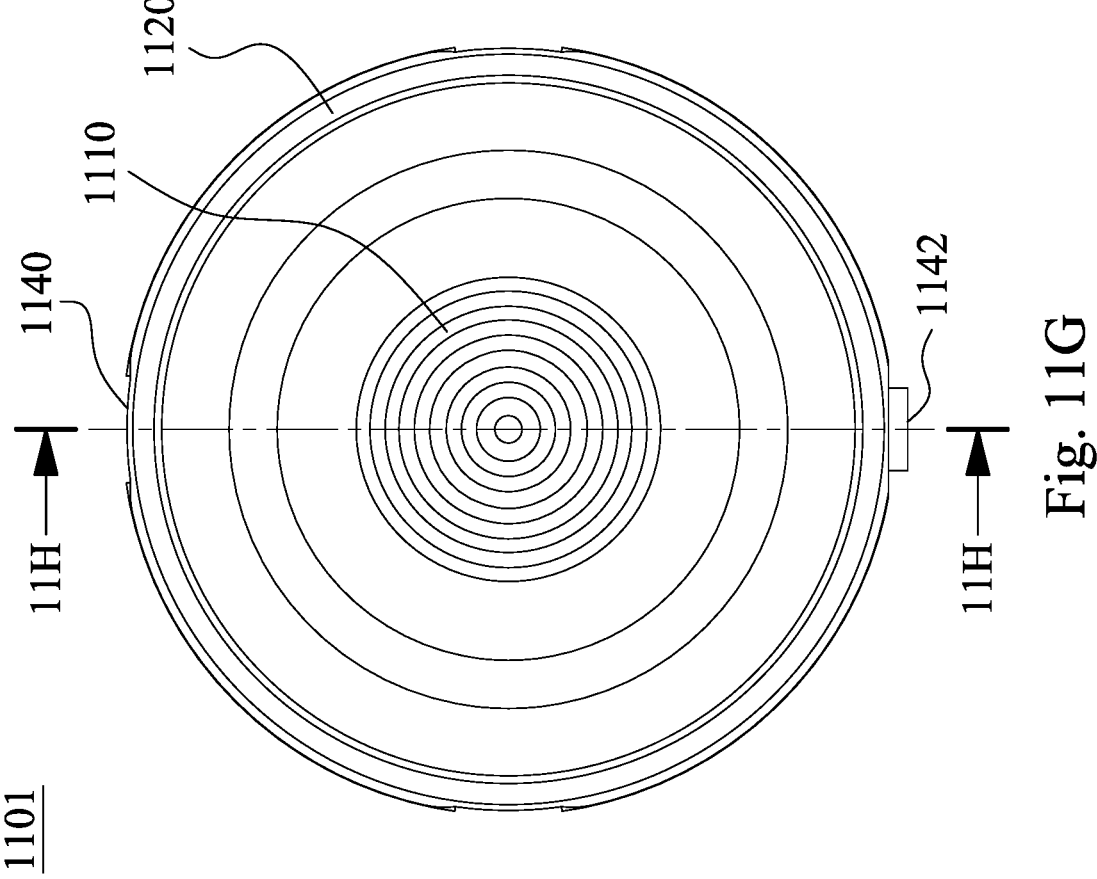
FIG. 11G is a schematic view of the plastic lens element according to the 3E example of the 3rd embodiment in FIG. 11A.
Figure 11H:
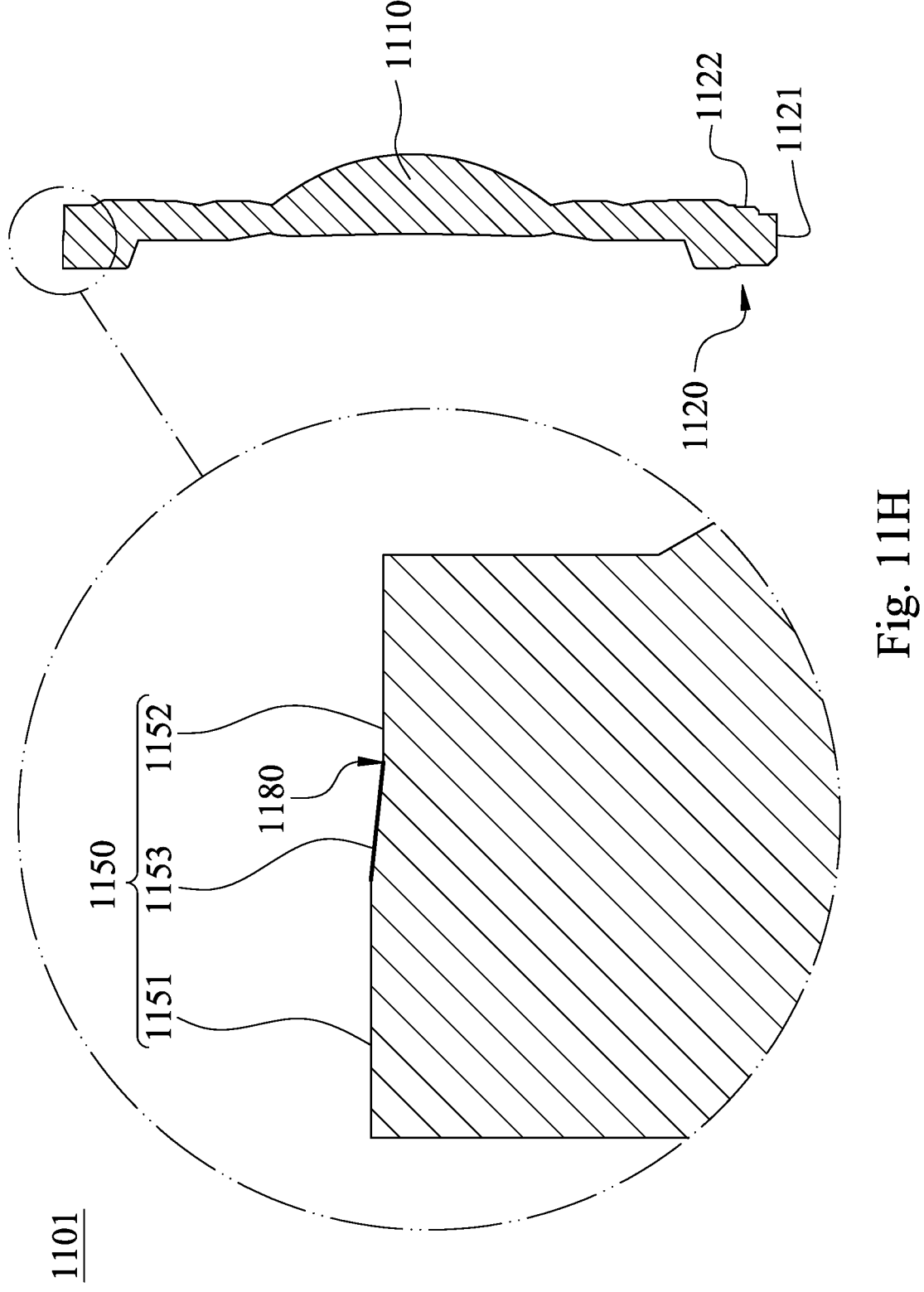
FIG. 11H is a cross-sectional view of the plastic lens element along line 11H-11H in FIG. 11G.
Figure 11I:
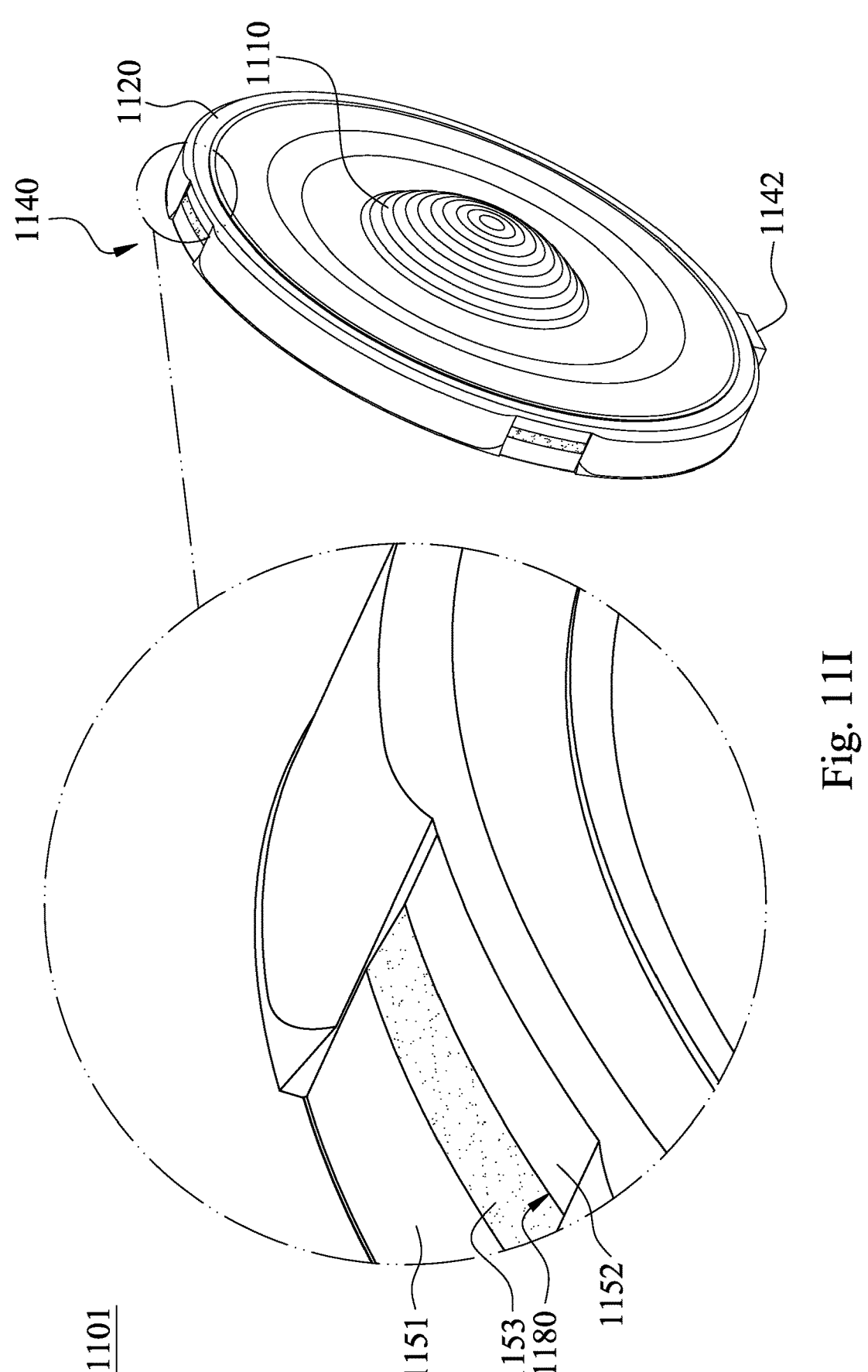
FIG. 11I is a partial enlarged view of the plastic lens element according to the 3E example of the 3rd embodiment in FIG. 11G.

FIG. 11G is a schematic view of the plastic lens element 1101 according to the 3E example of the 3rd embodiment in FIG. 11A. FIG. 11H is a cross-sectional view of the plastic lens element 1101 along line 11H-11H in FIG. 11G. FIG. 11I is a partial enlarged view of the plastic lens element 1101 according to the 3E example of the 3rd embodiment in FIG. 11G. In FIGS. 11G to 11I, a middle thickness of the plastic lens element 1101 is thicker than a peripheral thickness of the plastic lens element 1101.

In particular, the difference among the 3C example of the 3rd embodiment, the 3D example of the 3rd embodiment and the 3E example of the 3rd embodiment is the thickness distribution of the optical effective region 1110.

It should be mentioned that the straight line with thicker width in FIGS. 11B, 11E and 11H is configured to indicate the range of the conical surface 1153.

Further, all of other structures and dispositions according to the 3D example of the 3rd embodiment and the 3E example of the 3rd embodiment are the same as the structures and the dispositions according to the 3C example of the 3rd embodiment, and will not be described again herein.

Figure 12A:
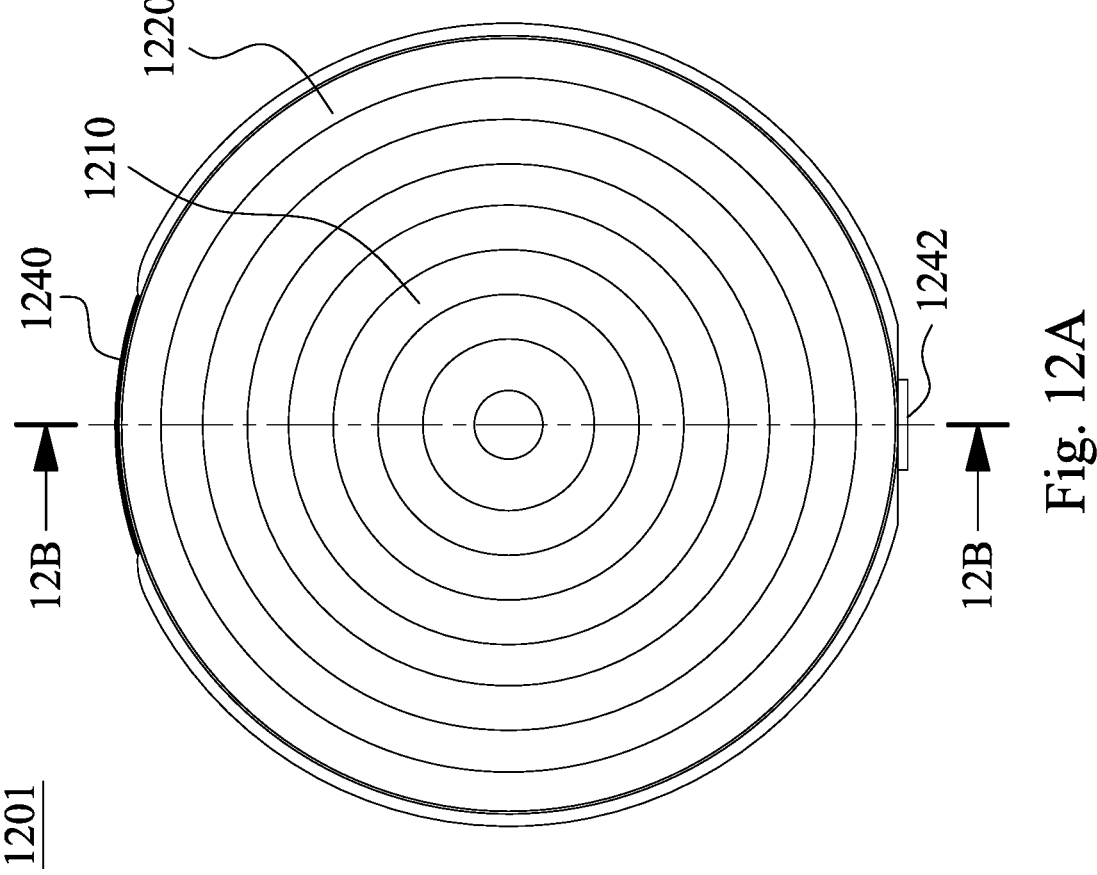
FIG. 12A is a schematic view of a plastic lens element according to the 3F example of the 3rd embodiment of the present disclosure.
Figure 12B:
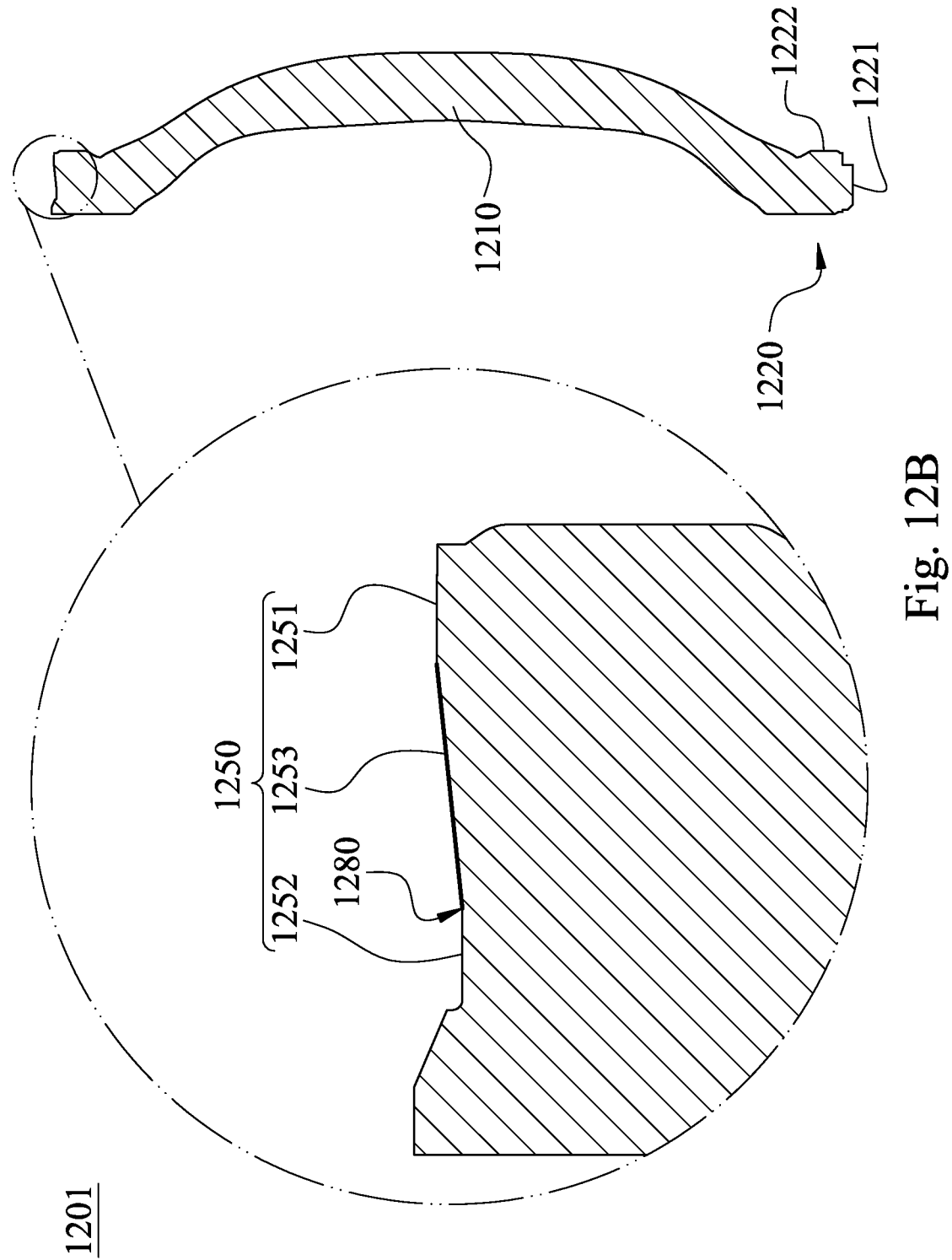
FIG. 12B is a cross-sectional view of the plastic lens element along line 12B-12B in FIG. 12A.

FIG. 12A is a schematic view of a plastic lens element 1201 according to the 3F example of the 3rd embodiment of the present disclosure. FIG. 12B is a cross-sectional view of the plastic lens element 1201 along line 12B-12B in FIG. 12A. In FIGS. 12A and 12B, the plastic lens element 1201 has a section passing through an optical axis (its reference numeral is omitted), and the plastic lens element 1201 includes an optical effective region 1210 and a peripheral region 1220, wherein the optical axis passes through the optical effective region 1210, the peripheral region 1220 is circularly disposed on a periphery of the optical effective region 1210, and the peripheral region 1220 has an outer diameter surface 1221 and an annular lateral surface 1222. The outer diameter surface 1221 is farther away from the optical effective region 1210 than the annular lateral surface 1222 from the optical effective region 1210, and the annular lateral surface 1222 is located between the outer diameter surface 1221 and the optical effective region 1210. Furthermore, the peripheral region 1220 includes an indented shape 1240, a release notch 1250 and an air gap 1280.

The indented shape 1240 is dented from the outer diameter surface 1221 towards the optical effective region 1210, and the indented shape 1240 has a base surface (its reference numeral is omitted).

The release notch 1250 is dented from the base surface towards the optical axis, and the release notch 1250 has a top surface 1251 and a bottom surface 1252 via the section, wherein the top surface 1251 and the bottom surface 1252 are arranged along an extending direction of the optical axis, a conical surface 1253 is located between the top surface 1251 and the bottom surface 1252, and the conical surface 1253 is tapered from the top surface 1251 towards the optical axis in a direction towards the bottom surface 1252.

The air gap 1280 is formed on the indented shape 1240 via the conical surface 1253 and the bottom surface 1252, so that an overlap between the air gap 1280 and the indented shape 1240 is in extending directions parallel to the optical axis towards both an object side and an image side.

The indented shape 1240 can include a gate 1242. In particular, the gate 1242, which easily causes the assembling tolerance, is disposed on the indented shape 1240, so that the gate 1242 can be prevented from being the outermost structure of the plastic lens element 1201. Therefore, the assembling accuracy can be enhanced and the assembling tolerance can be decreased.

According to the 3F example of the 3rd embodiment, a number of the indented shape 1240 is one.

Figure 12C:
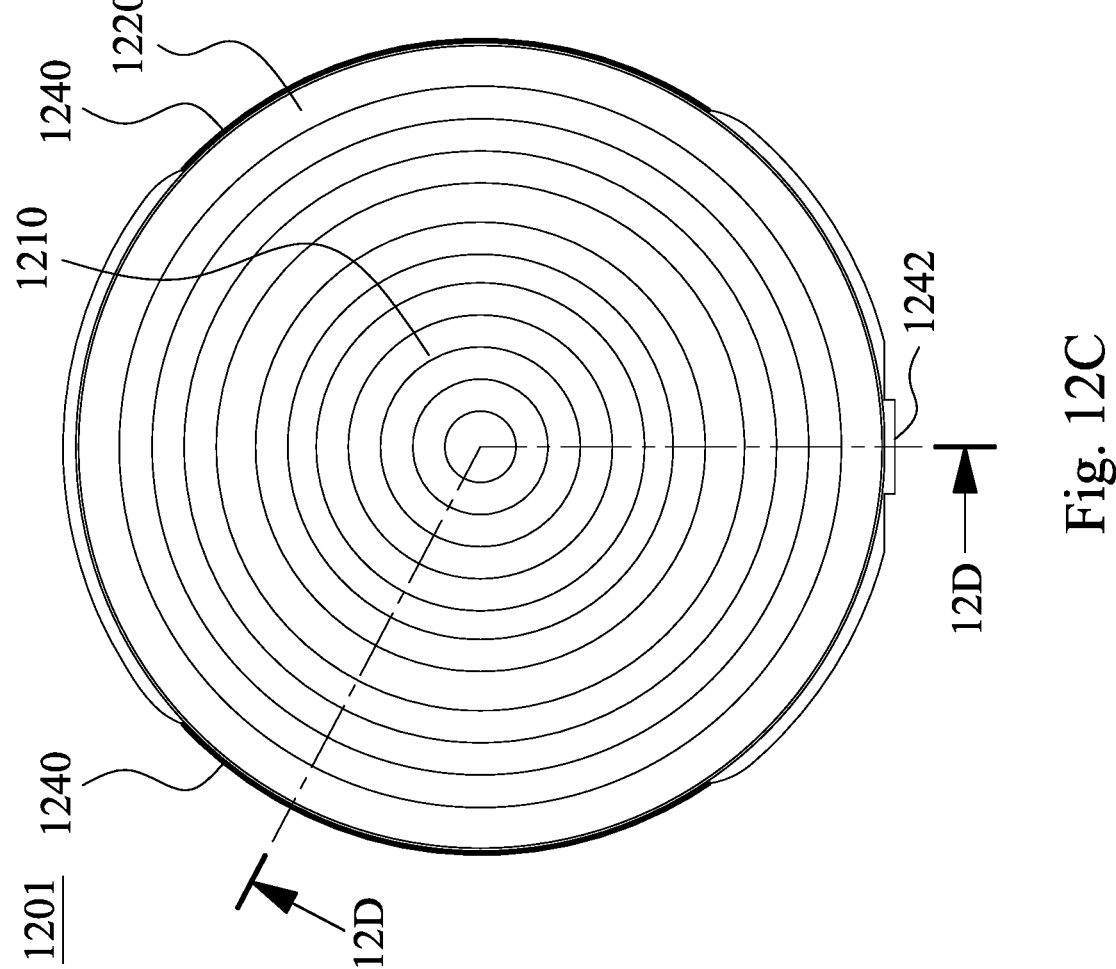
FIG. 12C is a schematic view of the plastic lens element according to the 3G example of the 3rd embodiment in FIG. 12A.
Figure 12D:
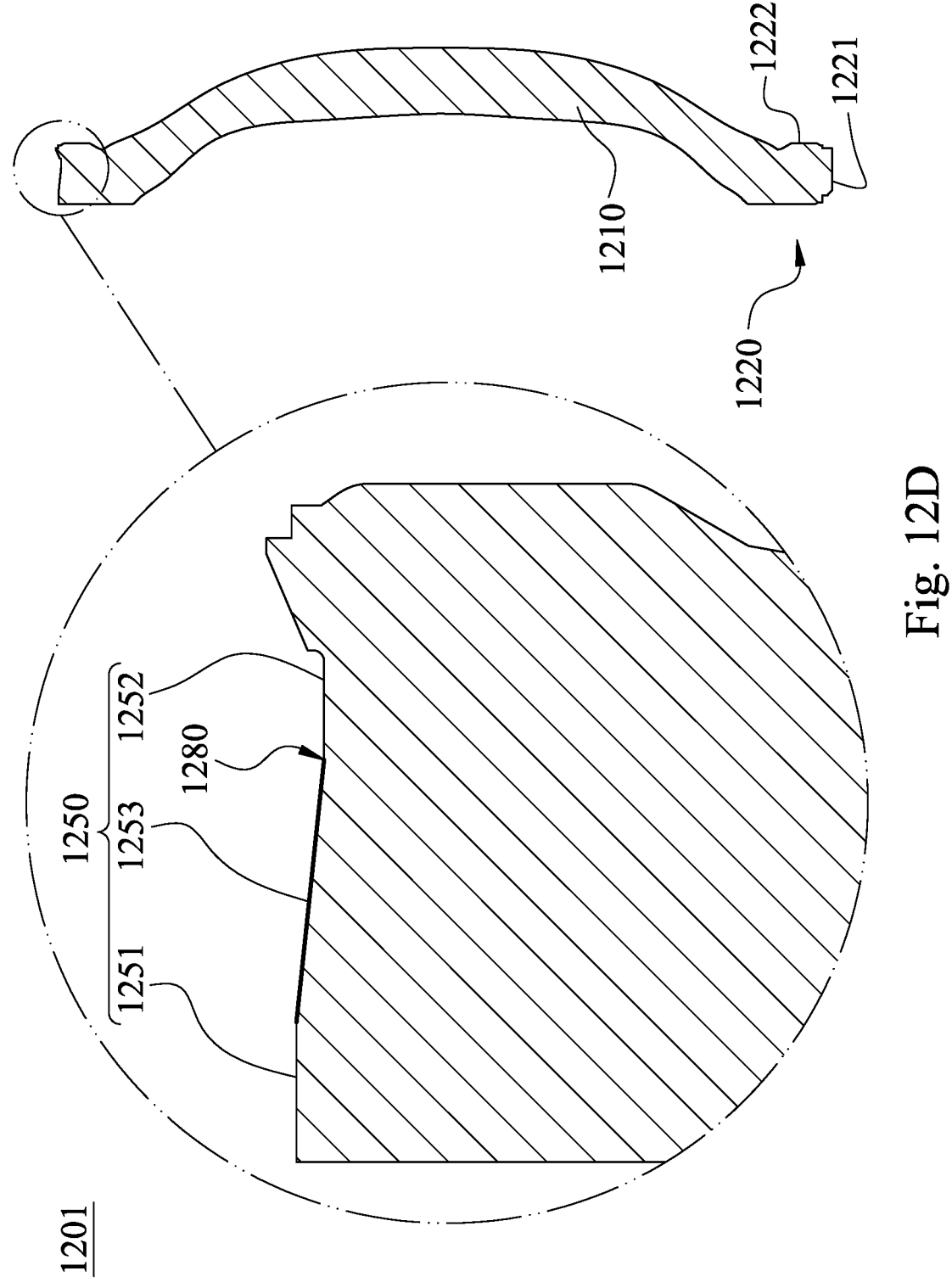
FIG. 12D is a cross-sectional view of the plastic lens element along line 12D-12D in FIG. 12C.

FIG. 12C is a schematic view of the plastic lens element 1201 according to the 3G example of the 3rd embodiment in FIG. 12A. FIG. 12D is a cross-sectional view of the plastic lens element 1201 along line 12D-12D in FIG. 12C. In FIGS. 12C and 12D, a number of the indented shape 1240 is two.

Figure 12E:
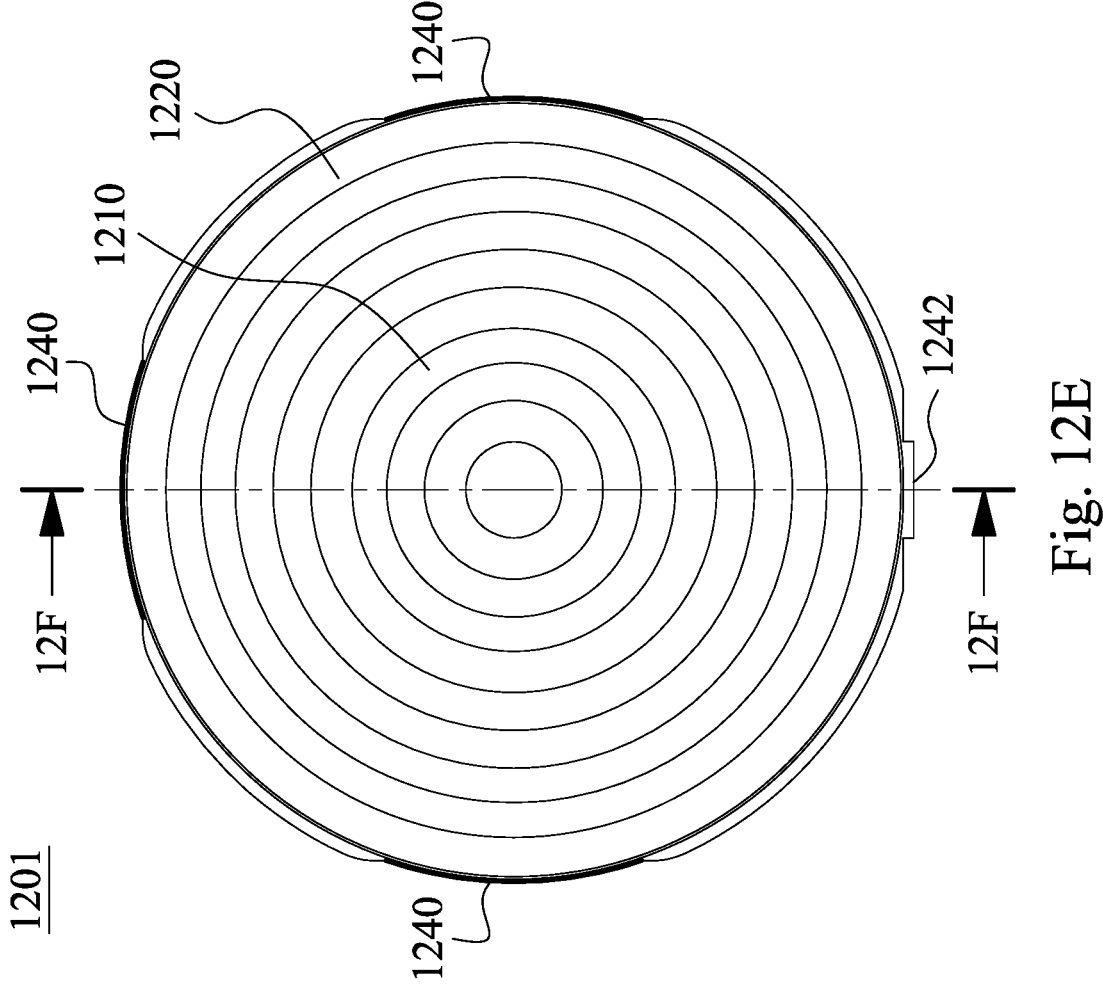
FIG. 12E is a schematic view of the plastic lens element according to the 3H example of the 3rd embodiment in FIG. 12A.
Figure 12F:
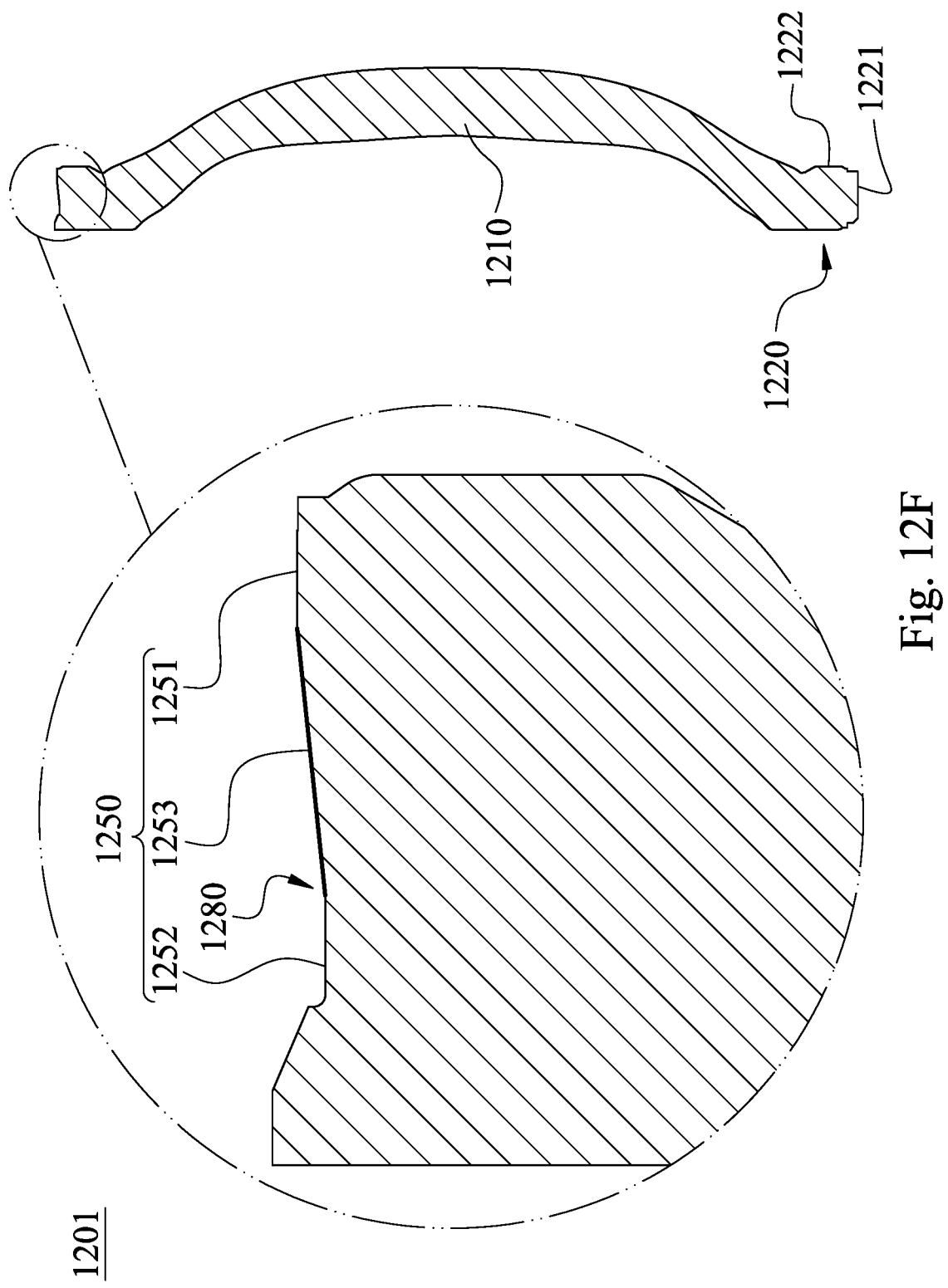
FIG. 12F is a cross-sectional view of the plastic lens element along line 12F-12F in FIG. 12E.

FIG. 12E is a schematic view of the plastic lens element 1201 according to the 3H example of the 3rd embodiment in FIG. 12A. FIG. 12F is a cross-sectional view of the plastic lens element 1201 along line 12F-12F in FIG. 12E. In FIGS. 12E and 12F, a number of the indented shape 1240 is three.

Figure 12G:
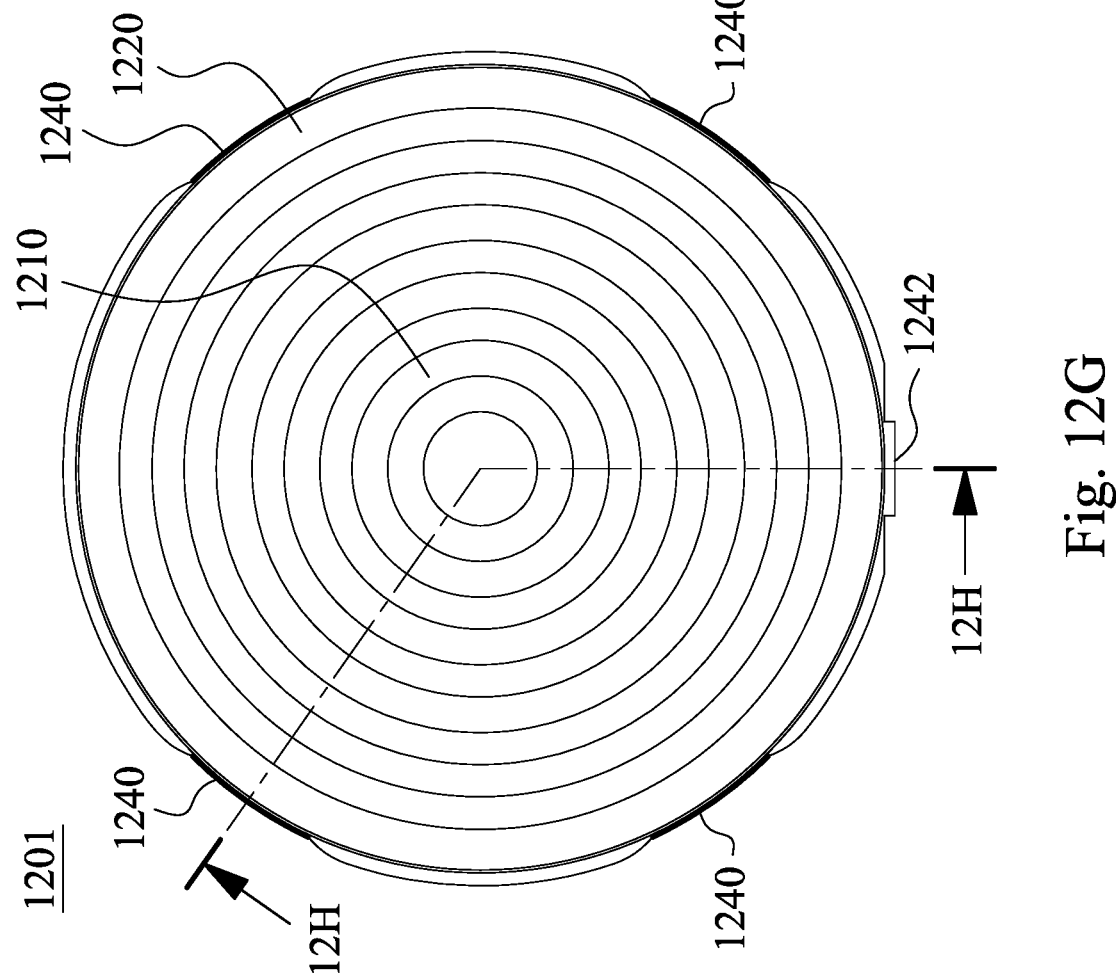
FIG. 12G is a schematic view of the plastic lens element according to the 3I example of the 3rd embodiment in FIG. 12A.
Figure 12H:
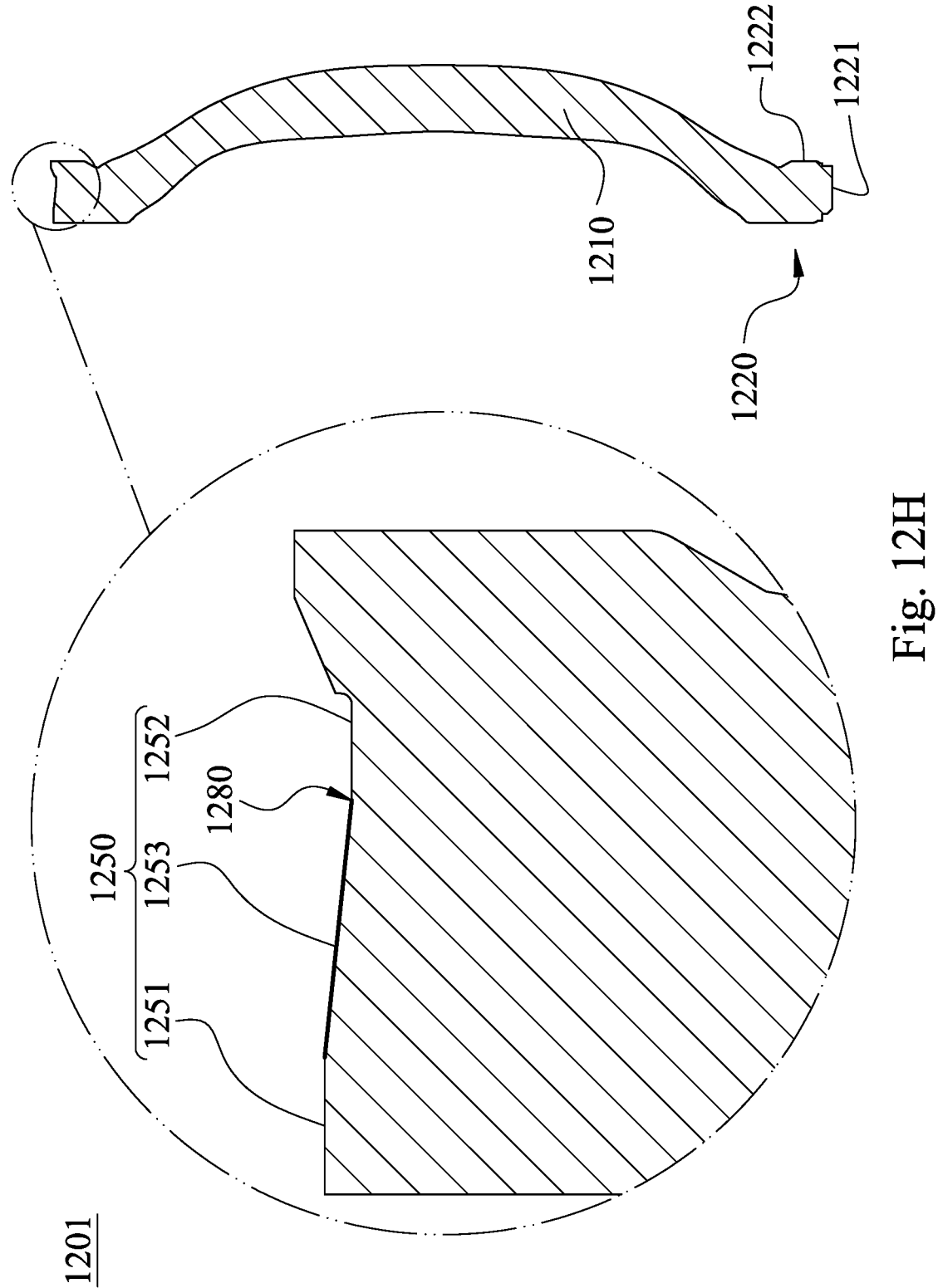
FIG. 12H is a cross-sectional view of the plastic lens element along line 12H-12H in FIG. 12G.

FIG. 12G is a schematic view of the plastic lens element 1201 according to the 3I example of the 3rd embodiment in FIG. 12A. FIG. 12H is a cross-sectional view of the plastic lens element 1201 along line 12H-12H in FIG. 12G. In FIGS. 12G and 12H, a number of the indented shape 1240 is four.

Figure 12I:
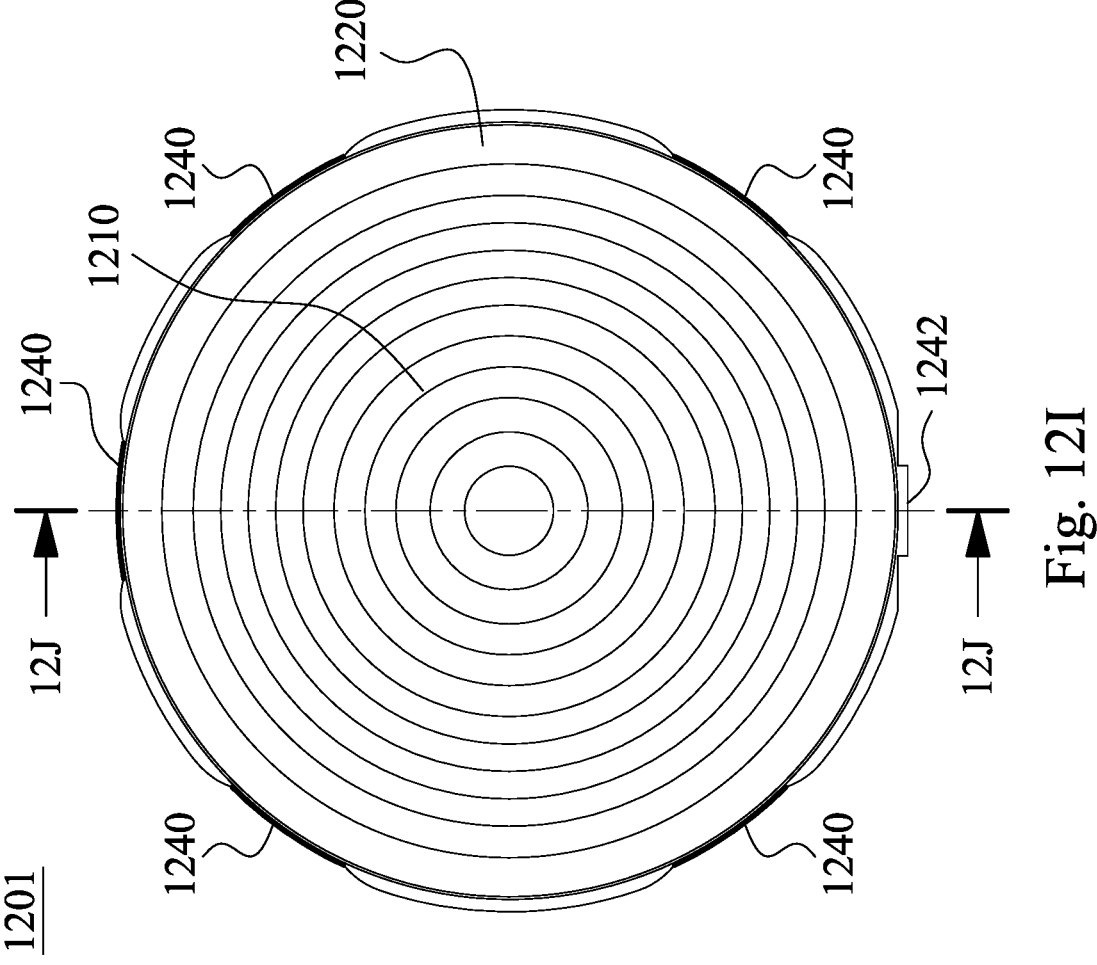
FIG. 12I is a schematic view of the plastic lens element according to the 3J example of the 3rd embodiment in FIG. 12A.
Figure 12J:
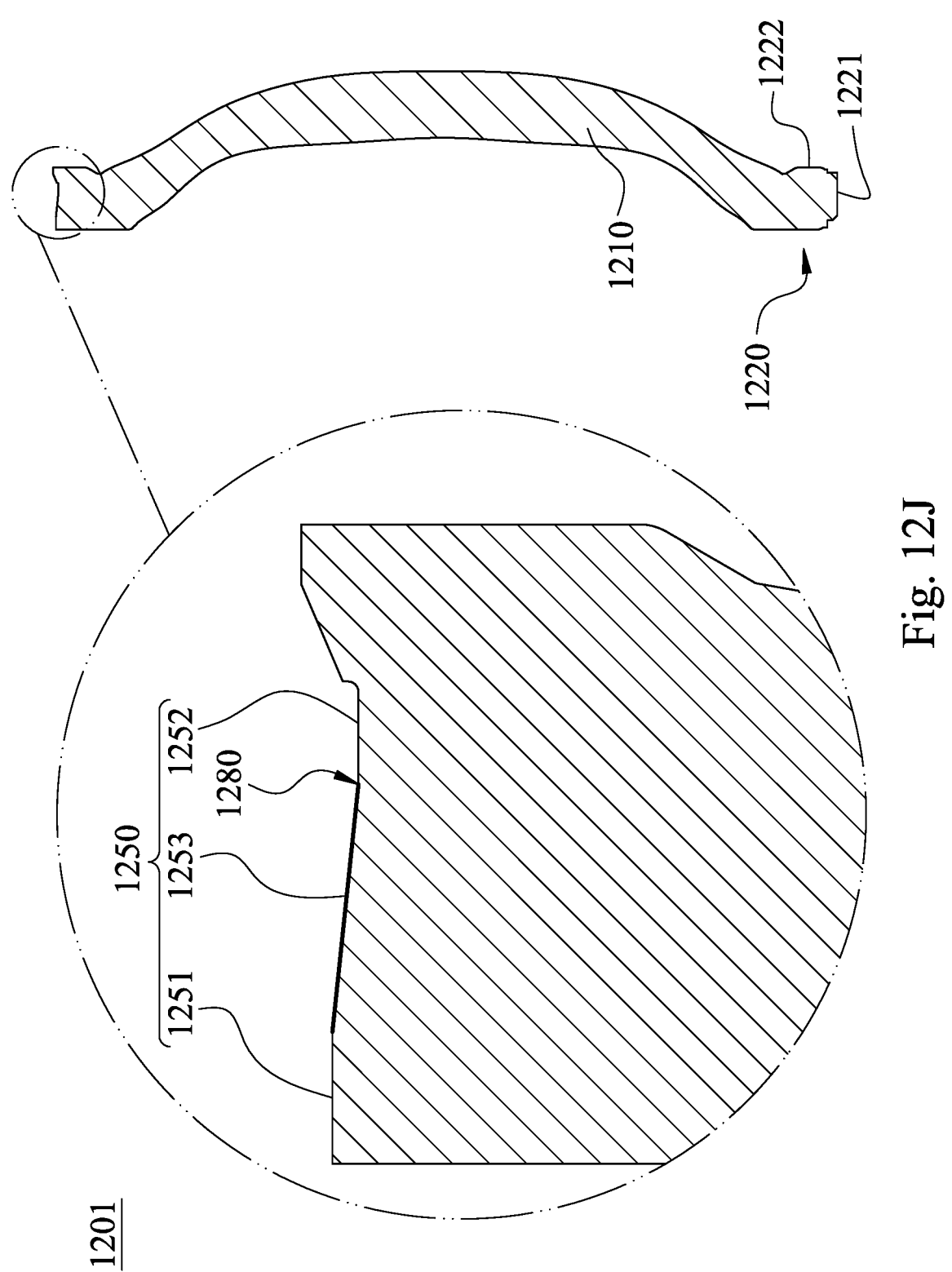
FIG. 12J is a cross-sectional view of the plastic lens element along line 12J-12J in FIG. 12I.

FIG. 12I is a schematic view of the plastic lens element 1201 according to the 3J example of the 3rd embodiment in FIG. 12A. FIG. 12J is a cross-sectional view of the plastic lens element 1201 along line 12J-12J in FIG. 12I. In FIGS. 121 and 12J, a number of the indented shape 1240 is five.

Figure 12K:
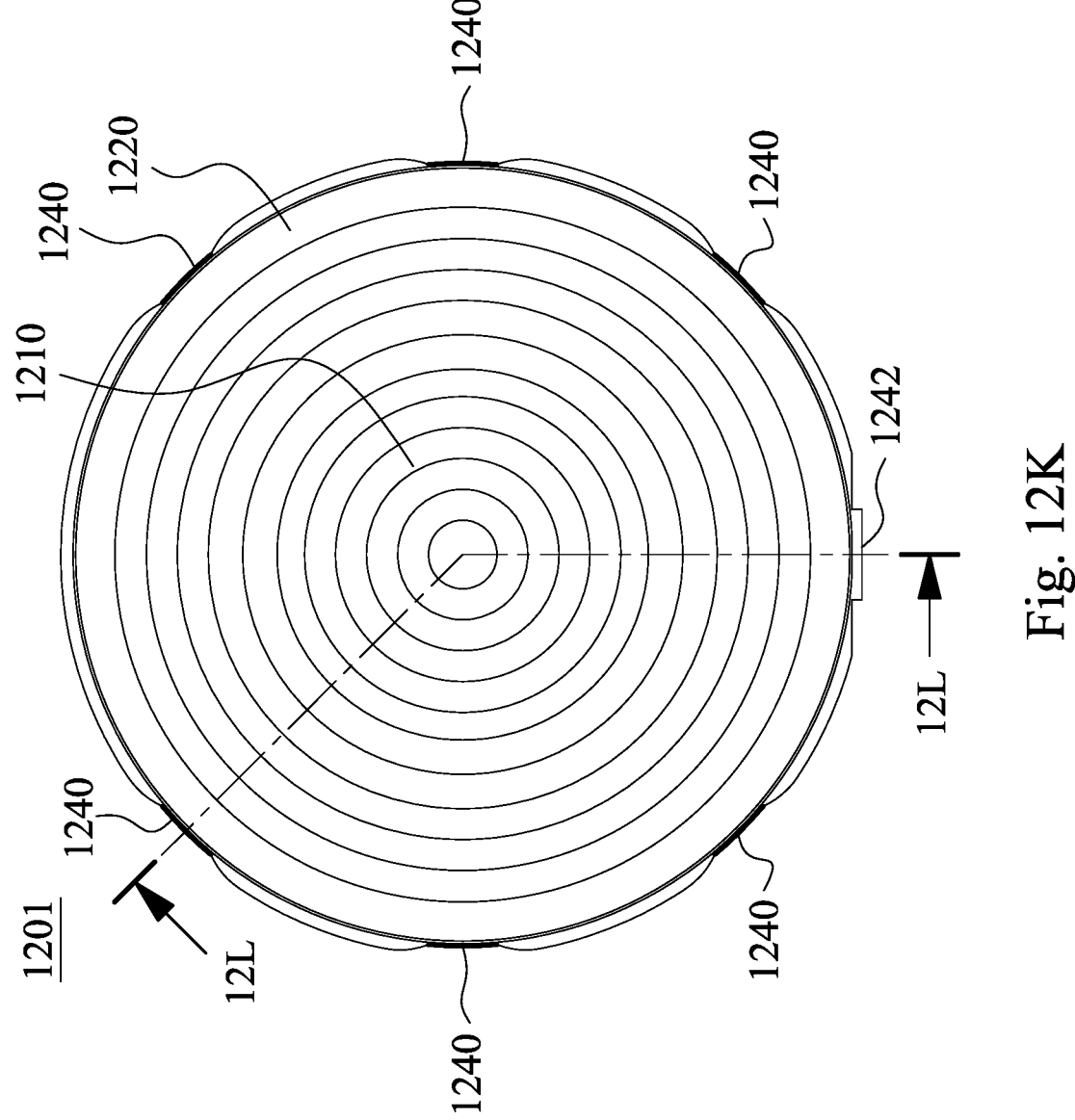
FIG. 12K is a schematic view of the plastic lens element according to the 3K example of the 3rd embodiment in FIG. 12A.
Figure 12L:
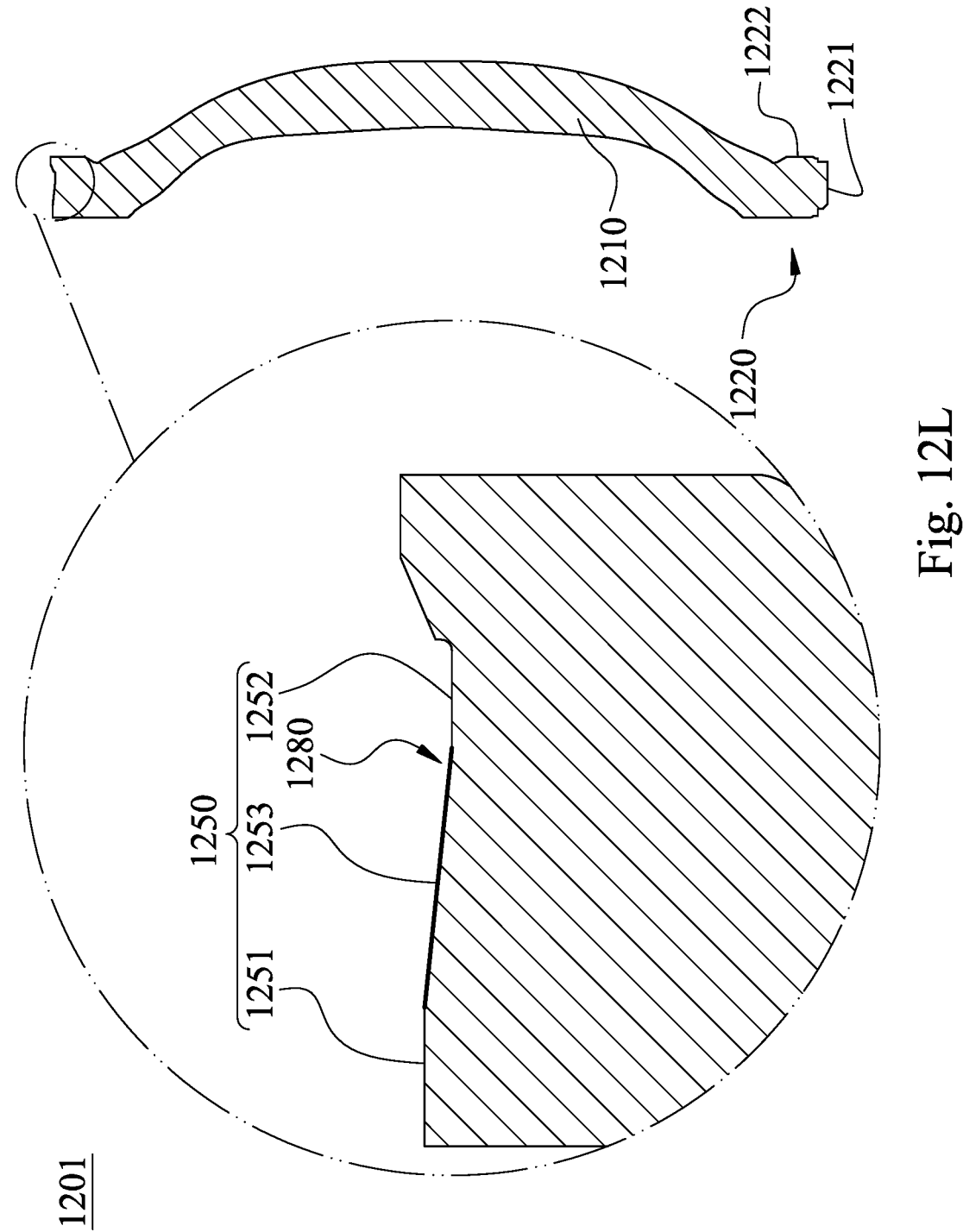
FIG. 12L is a cross-sectional view of the plastic lens element along line 12L-12L in FIG. 12K.

FIG. 12K is a schematic view of the plastic lens element 1201 according to the 3K example of the 3rd embodiment in FIG. 12A. FIG. 12L is a cross-sectional view of the plastic lens element 1201 along line 12L-12L in FIG. 12K. In FIGS. 12K and 12L, a number of the indented shape 1240 is six.

In particular, the difference among the 3F example of the 3rd embodiment, the 3G example of the 3rd embodiment, the 3H example of the 3rd embodiment, the 3I example of the 3rd embodiment, the 3J example of the 3rd embodiment and the 3K example of the 3rd embodiment is the number of the indented shape 1240.

It should be mentioned that the straight line with thicker width in FIGS. 12B, 12D, 12F, 12H, 12J and 12L is configured to indicate the range of the conical surface 1253.

Further, all of other structures and dispositions according to the 3G example of the 3rd embodiment, the 3H example of the 3rd embodiment, the 3I example of the 3rd embodiment, the 3J example of the 3rd embodiment and the 3K example of the 3rd embodiment are the same as the structures and the dispositions according to the 3F example of the 3rd embodiment, and will not be described again herein.

Figure 13A:
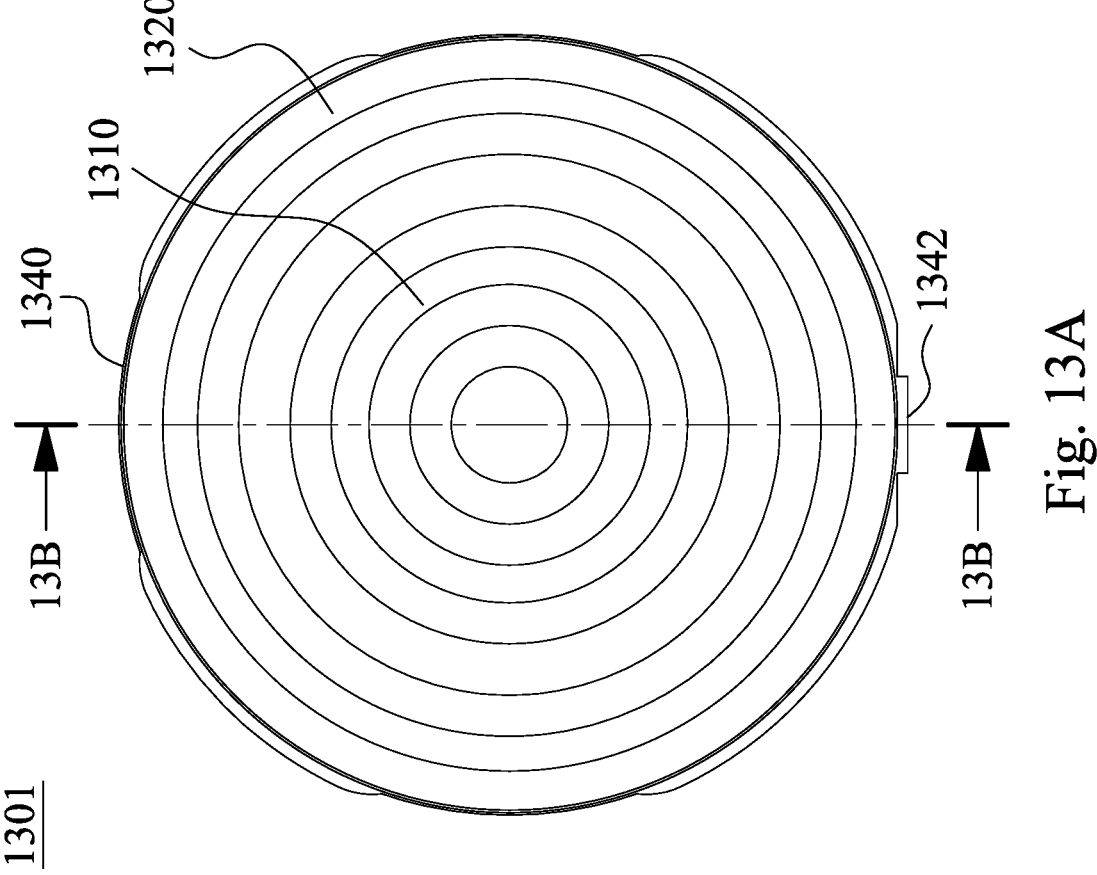
FIG. 13A is a schematic view of a plastic lens element according to the 3L example of the 3rd embodiment of the present disclosure.
Figure 13B:
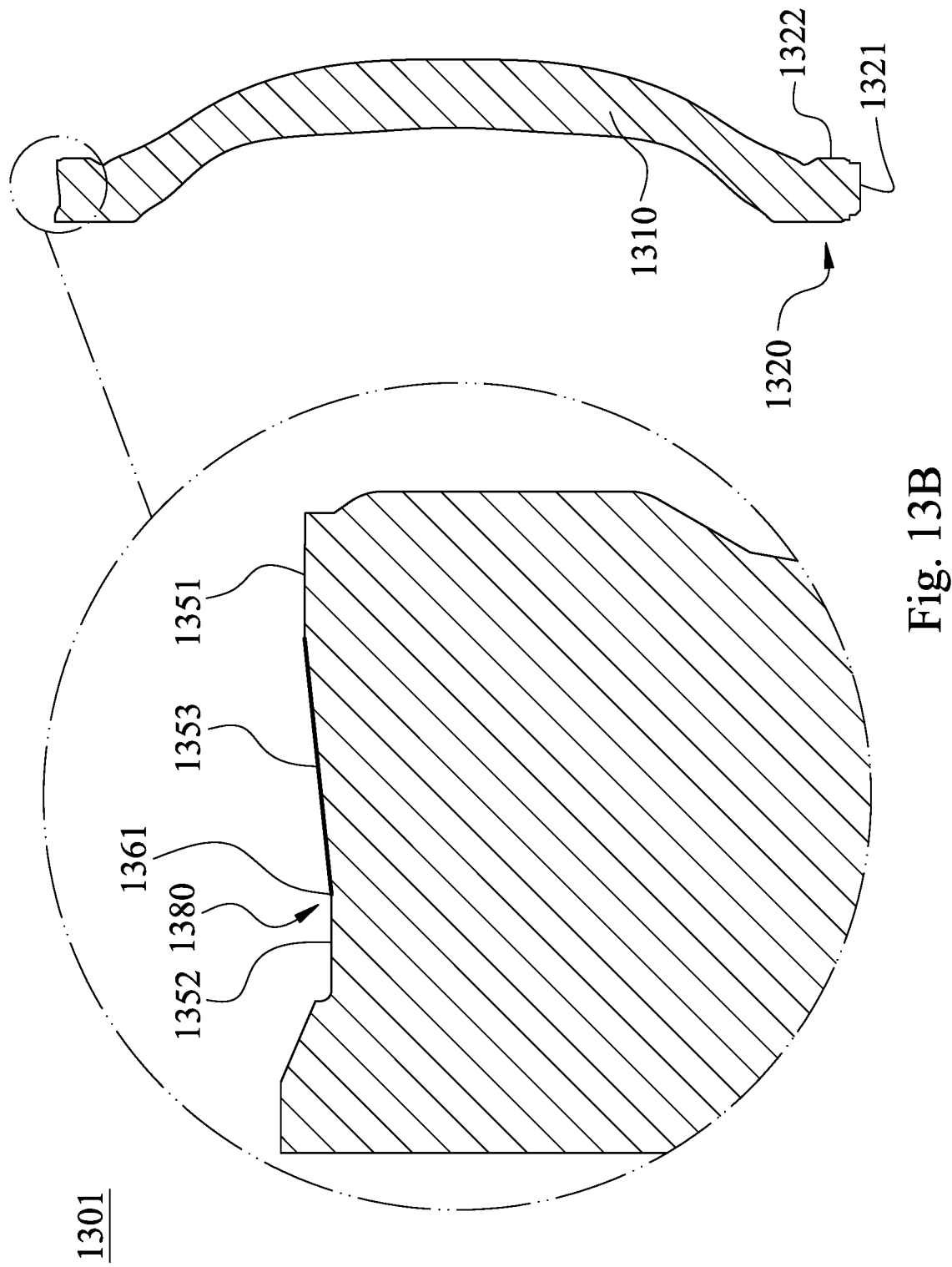
FIG. 13B is a cross-sectional view of the plastic lens element along line 13B-13B in FIG. 13A.
Figure 13C:
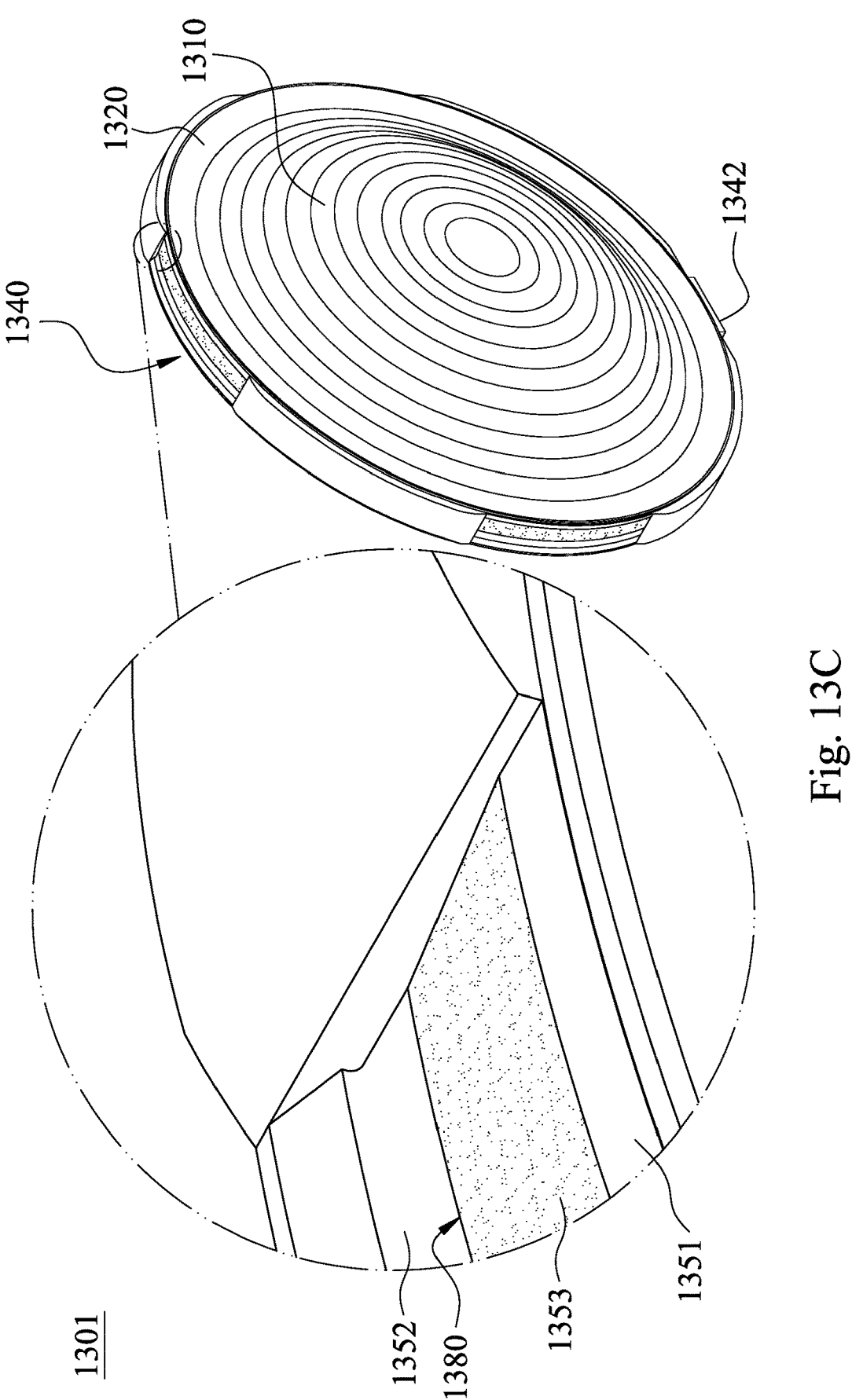
FIG. 13C is a partial enlarged view of the plastic lens element according to the 3L example of the 3rd embodiment in FIG. 13A.

FIG. 13A is a schematic view of a plastic lens element 1301 according to the 3L example of the 3rd embodiment of the present disclosure. FIG. 13B is a cross-sectional view of the plastic lens element 1301 along line 13B-13B in FIG. 13A. FIG. 13C is a partial enlarged view of the plastic lens element 1301 according to the 3L example of the 3rd embodiment in FIG. 13A. In FIGS. 13A to 13C, the plastic lens element 1301 has a section passing through an optical axis (its reference numeral is omitted), and the plastic lens element 1301 includes an optical effective region 1310 and a peripheral region 1320, wherein the optical axis passes through the optical effective region 1310, the peripheral region 1320 is circularly disposed on a periphery of the optical effective region 1310, and the peripheral region 1320 has an outer diameter surface 1321 and an annular lateral surface 1322. The outer diameter surface 1321 is farther away from the optical effective region 1310 than the annular lateral surface 1322 from the optical effective region 1310, and the annular lateral surface 1322 is located between the outer diameter surface 1321 and the optical effective region 1310. Furthermore, the peripheral region 1320 includes an indented shape 1340, a release notch (its reference numeral is omitted) and an air gap 1380.

The indented shape 1340 is dented from the outer diameter surface 1321 towards the optical effective region 1310, and the indented shape 1340 has a base surface (its reference numeral is omitted).

The release notch is dented from the base surface towards the optical axis, and the release notch has a top surface 1351 and a bottom surface 1352 via the section, wherein the top surface 1351 and the bottom surface 1352 are arranged along an extending direction of the optical axis, a conical surface 1353 is located between the top surface 1351 and the bottom surface 1352, and the conical surface 1353 is tapered from the top surface 1351 towards the optical axis in a direction towards the bottom surface 1352.

The air gap 1380 is formed on the indented shape 1340 via the conical surface 1353 and the bottom surface 1352, so that an overlap between the air gap 1380 and the indented shape 1340 is in extending directions parallel to the optical axis towards both an object side and an image side.

The indented shape 1340 can include a gate 1342. In particular, the gate 1342, which easily causes the assembling tolerance, is disposed on the indented shape 1340, so that the gate 1342 can be prevented from being the outermost structure of the plastic lens element 1301. Therefore, the assembling accuracy can be enhanced and the assembling tolerance can be decreased.

Further, a first step valley 1361 is formed between the conical surface 1353 and the bottom surface 1352, and the first step valley 1361 has an obtuse angle, and an angle range of the obtuse angle can be between 160 degrees and 179.5 degrees. By defining the angle of the conical surface 1353 as the gentle slope, the proper demolding resistance can be provided so as to avoid the condition of the reverse draft.

Figure 13D:
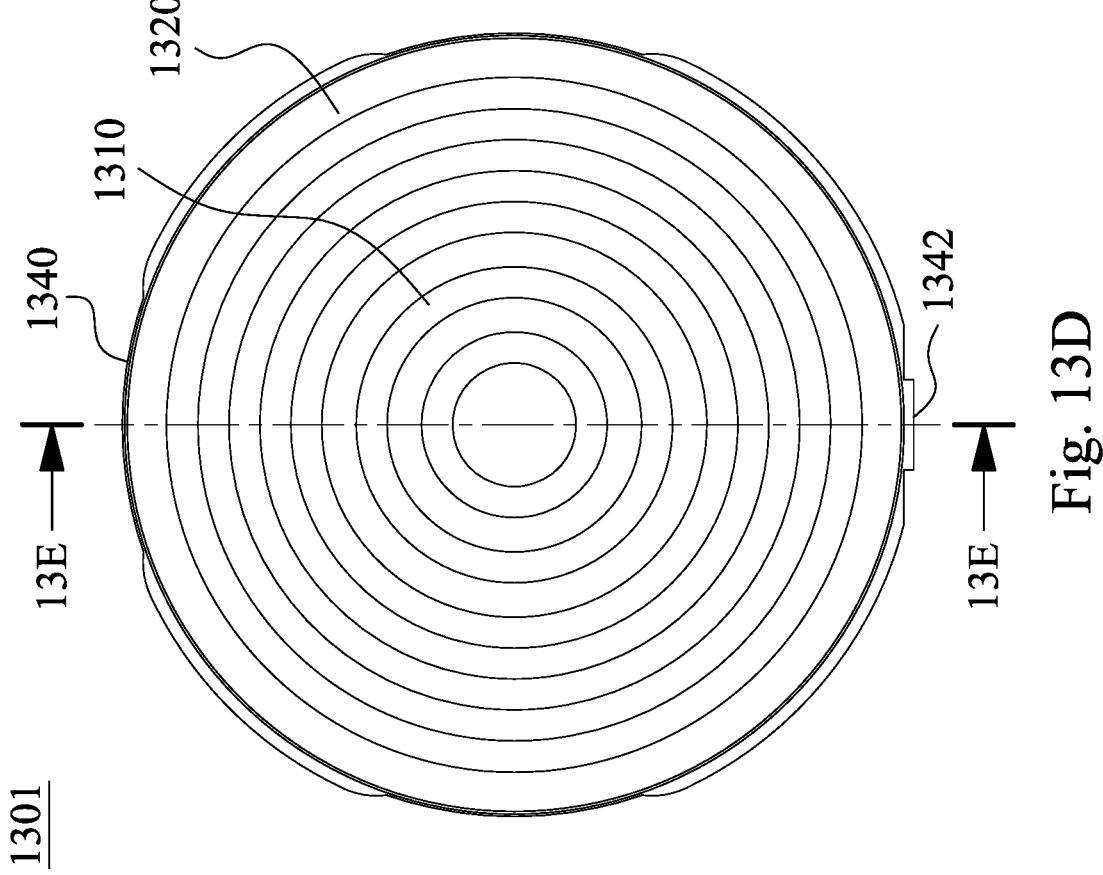
FIG. 13D is a schematic view of the plastic lens element according to the 3M example of the 3rd embodiment in FIG. 13A.
Figure 13E:
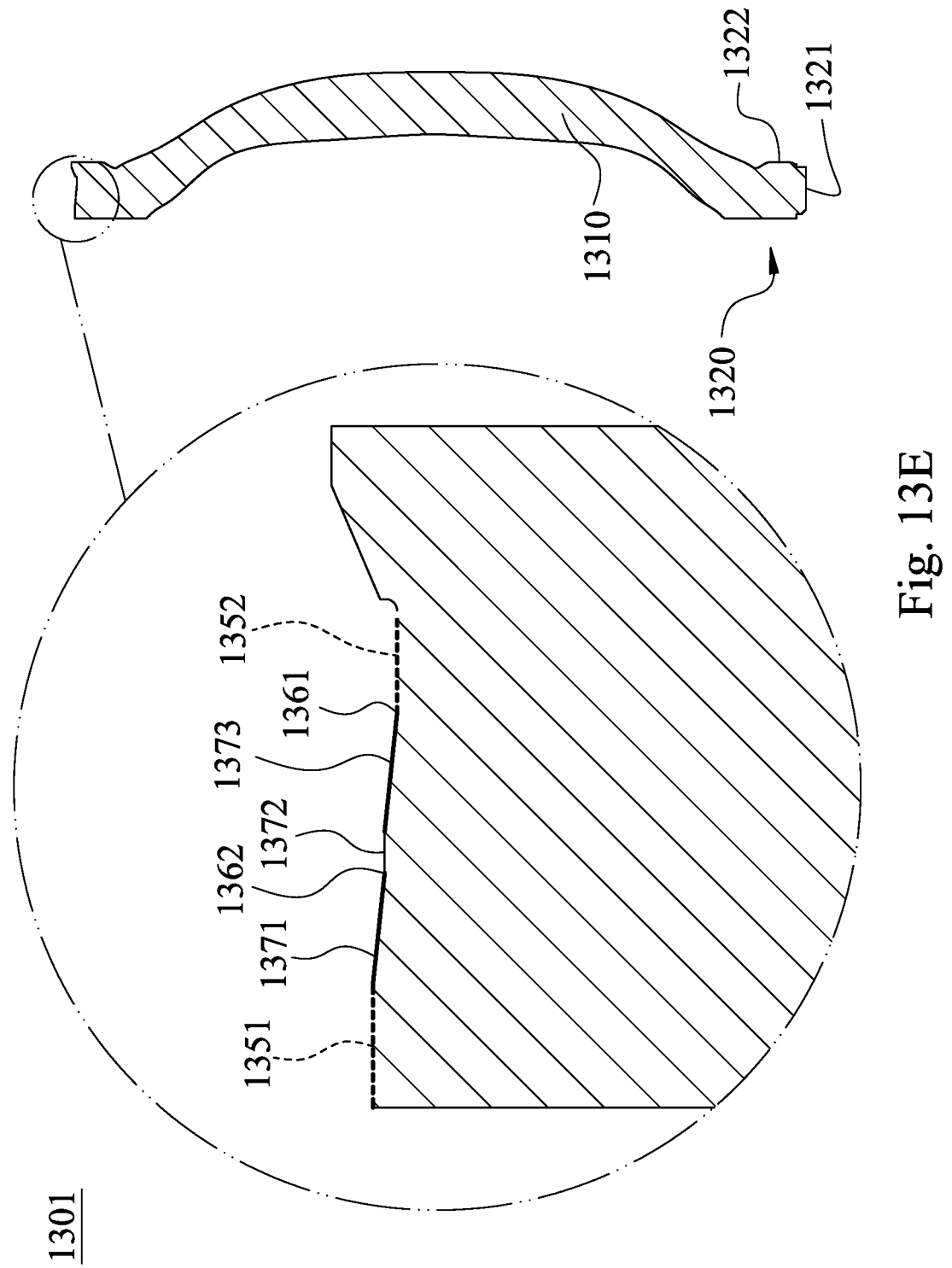
FIG. 13E is a cross-sectional view of the plastic lens element along line 13E-13E in FIG. 13D.
Figure 13F:
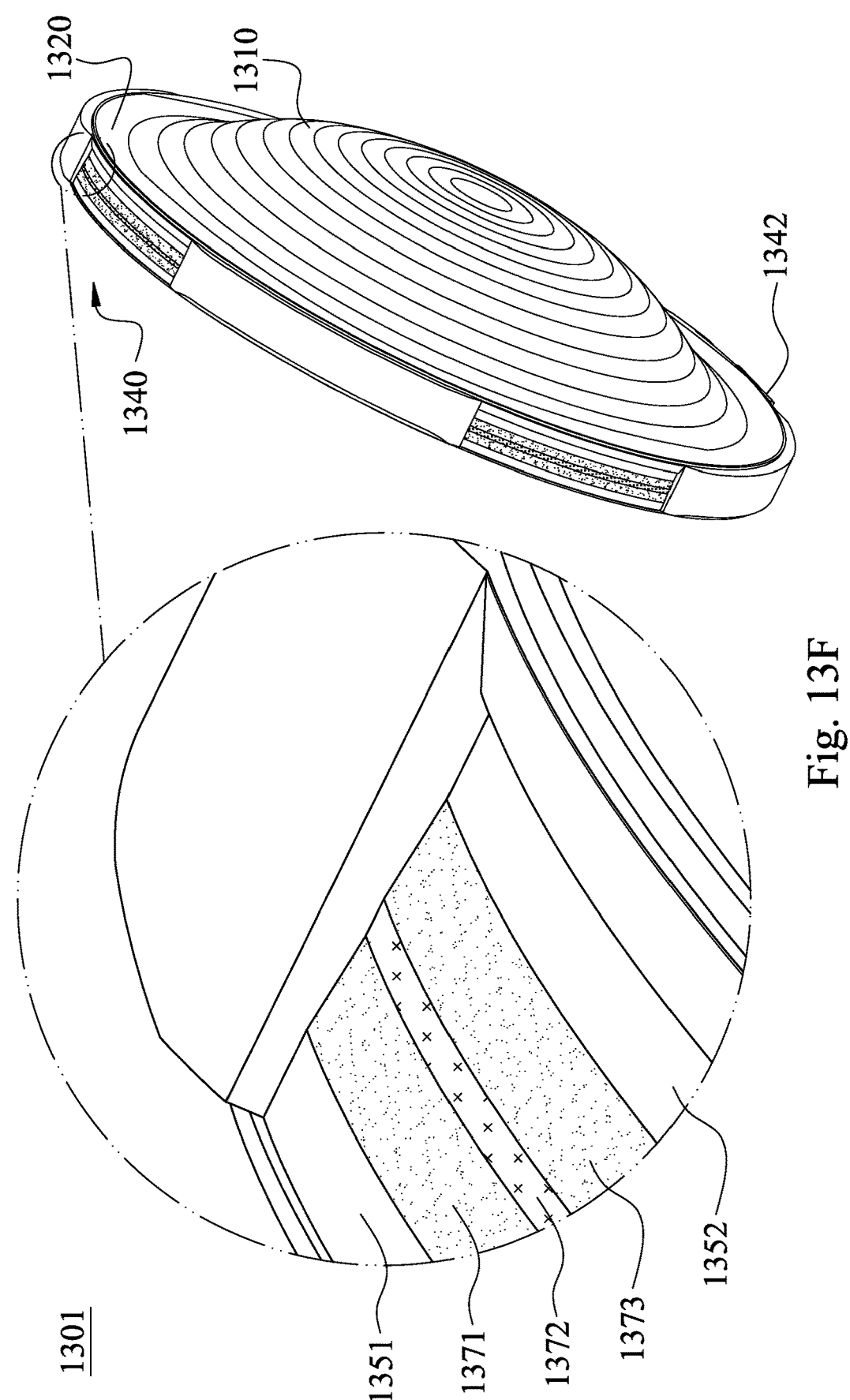
FIG. 13F is a partial enlarged view of the plastic lens element according to the 3M example of the 3rd embodiment in FIG. 13D.

FIG. 13D is a schematic view of the plastic lens element 1301 according to the 3M example of the 3rd embodiment in FIG. 13A. FIG. 13E is a cross-sectional view of the plastic lens element 1301 along line 13E-13E in FIG. 13D. FIG. 13F is a partial enlarged view of the plastic lens element 1301 according to the 3M example of the 3rd embodiment in FIG. 13D. In FIGS. 13D to 13F, the conical surface 1353 can include a first step surface 1371, a second step surface 1372 and a third step surface 1373, and the first step surface 1371, the second step surface 1372 and the third step surface 1373 are arranged in order along the optical axis, wherein the first step surface 1371 is located between the top surface 1351 and the second step surface 1372, the second step surface 1372 is located between the first step surface 1371 and the third step surface 1373, and the third step surface 1373 is located between the bottom surface 1352 and the second step surface 1372.

Further, a second step valley 1362 is formed between the first step surface 1371 and the second step surface 1372, the second step valley 1362 has an obtuse angle, and an angle range of the obtuse angle can be between 160 degrees and 179.5 degrees. The conical surface 1353 is formed via a plurality of step surfaces, so that the stress is dispersed to the position of the first step valley 1361 and the position of the second step valley 1362. Therefore, the excessive concentration of the stress can be prevented so as to avoid the problem of the demolding difficulty.

In particular, the difference between the 3L example of the 3rd embodiment and the 3M example of the 3rd embodiment is the step surface number of the conical surface 1353.

It should be mentioned that the straight line with thicker width in FIG. 13B is configured to indicate the range of the conical surface 1353, the straight line with thicker width in FIG. 13E is configured to indicate the range of the first step surface 1371 and the range of the third step surface 1373, and the dotted line is configured to indicate the range of the top surface 1351 and the range of the bottom surface 1352.

Further, all of other structures and dispositions according to the 3M example of the 3rd embodiment are the same as the structures and the dispositions according to the 3L example of the 3rd embodiment, and will not be described again herein.

4th Embodiment

Figure 14A:
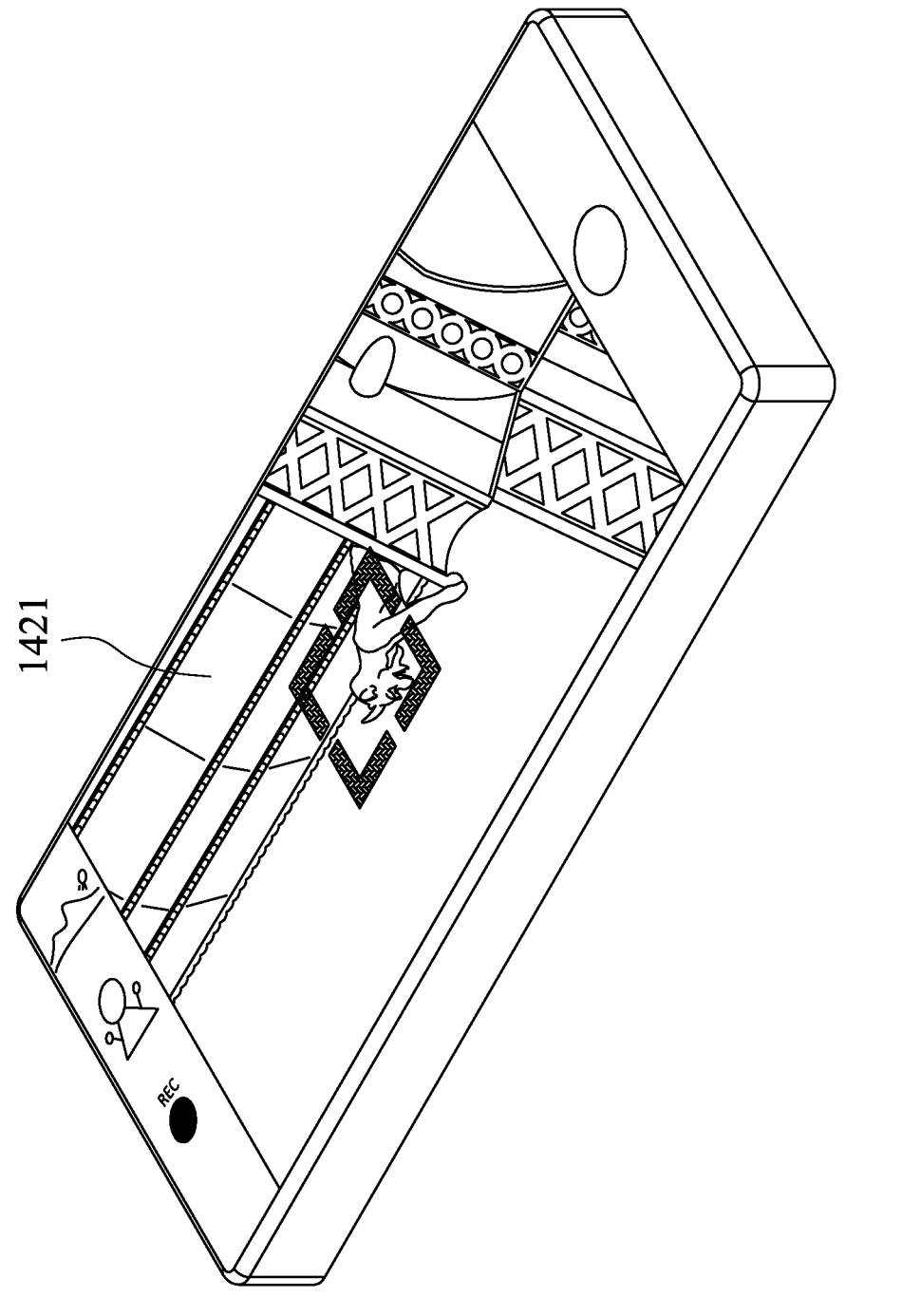
FIG. 14A is a schematic view of an electronic device according to the 4th embodiment of the present disclosure.

FIG. 14A is a schematic view of an electronic device 1400 according to the 4th embodiment of the present disclosure.

Figure 14B:
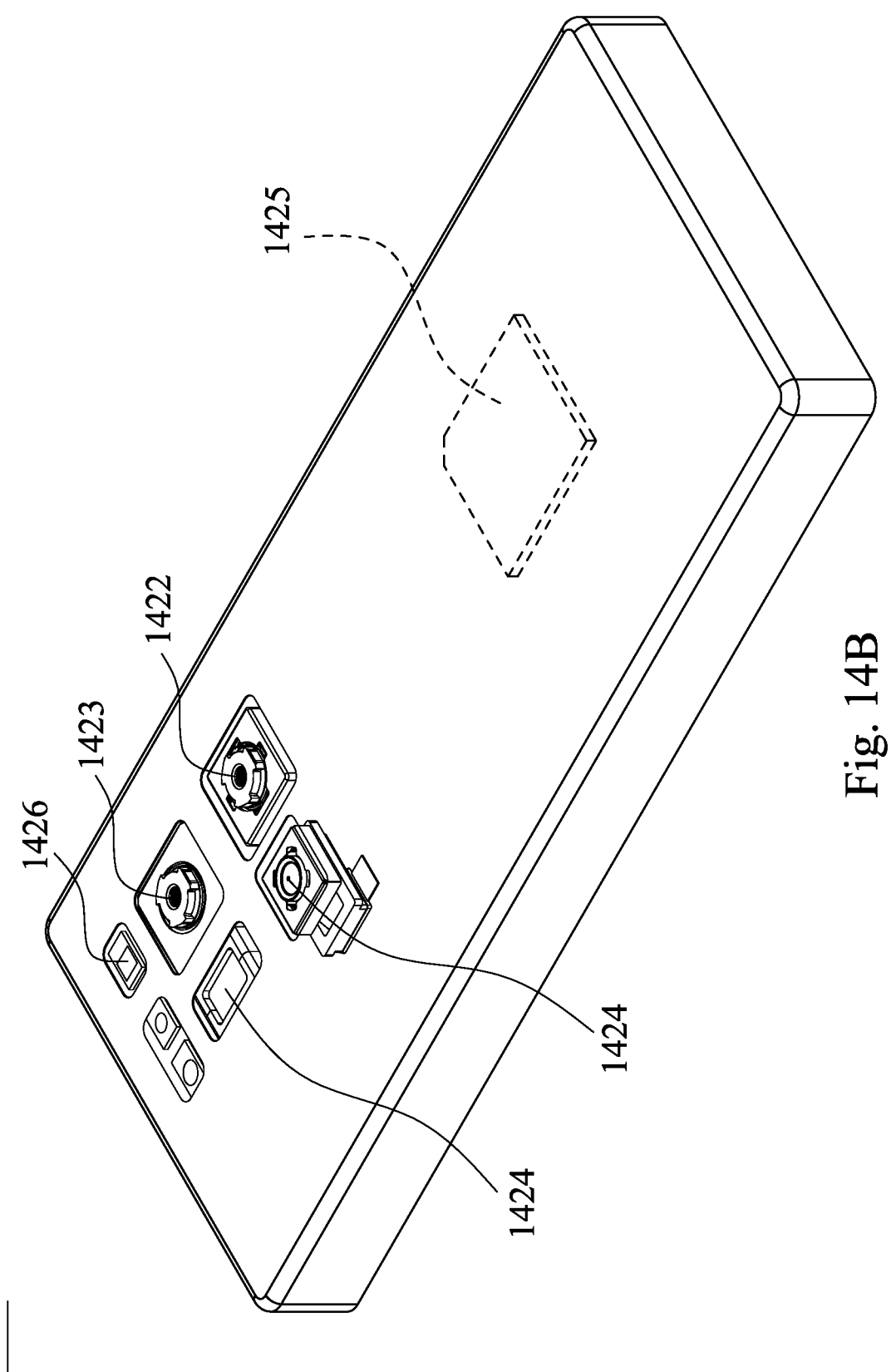
FIG. 14B is another schematic view of the electronic device according to the 4th embodiment in FIG. 14A.

FIG. 14B is another schematic view of the electronic device 1400 according to the 4th embodiment in FIG. 14A. In FIGS. 14A and 14B, the electronic device 1400 is a smart phone, which includes an optical imaging module and a user interface 1421, wherein the optical imaging module includes a plurality of lens elements (not shown), at least one of the lens elements is a plastic lens element, and the optical imaging module has an optical axis. Moreover, the optical imaging module can be an ultra-wide angle optical imaging module 1422, a high resolution optical imaging module 1423 and telephoto optical imaging modules 1424, and the user interface 1421 is a touch screen, but the present disclosure is not limited thereto. In particular, the plastic lens element can be the plastic lens element according to the aforementioned 1st embodiment to the 3rd embodiment, but the present disclosure is not limited thereto.

Users enter a shooting mode via the user interface 1421, wherein the user interface 1421 is configured to display the scene, and the shooting angle can be manually adjusted to switch the ultra-wide angle optical imaging module 1422, the high resolution optical imaging module 1423 and the telephoto optical imaging modules 1424. At this moment, the imaging light is gathered on an image sensor (not shown) of the optical imaging module via the optical imaging module, and an electronic signal about an image is output to an image signal processor (ISP) 1425.

In FIG. 14B, to meet a specification of the electronic device 1400, the electronic device 1400 can further include an optical anti-shake mechanism (not shown). Furthermore, the electronic device 1400 can further include at least one focusing assisting module (its reference numeral is omitted) and at least one sensing element (not shown). The focusing assisting module can be a flash module 1426 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the optical imaging module of the electronic device 1400 equipped with an auto-focusing mechanism and the optical anti-shake mechanism can be enhanced to achieve the superior image quality. Furthermore, the electronic device 1400 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 1421 and manually operate the view finding range on the user interface 1421 to achieve the autofocus function of what you see is what you get.

Moreover, the optical imaging module, the optical anti-shake mechanism, the sensing element and the focusing assisting module can be disposed on a flexible printed circuit board (FPC) (not shown) and electrically connected to the associated components, such as the image signal processor 1425, via a connector (not shown) to perform a capturing process. Since the current electronic devices, such as smart phones, have a tendency of being compact, the way of firstly disposing the optical imaging module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the optical imaging module can also be controlled more flexibly via the touch screen of the electronic device. According to the 4th embodiment, the electronic device 1400 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 1425, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 1400 can further include, but not be limited to, a display, a control unit, a storage unit, a random access memory (RAM), a read-only memory (ROM), or the combination thereof.

Figure 14C:
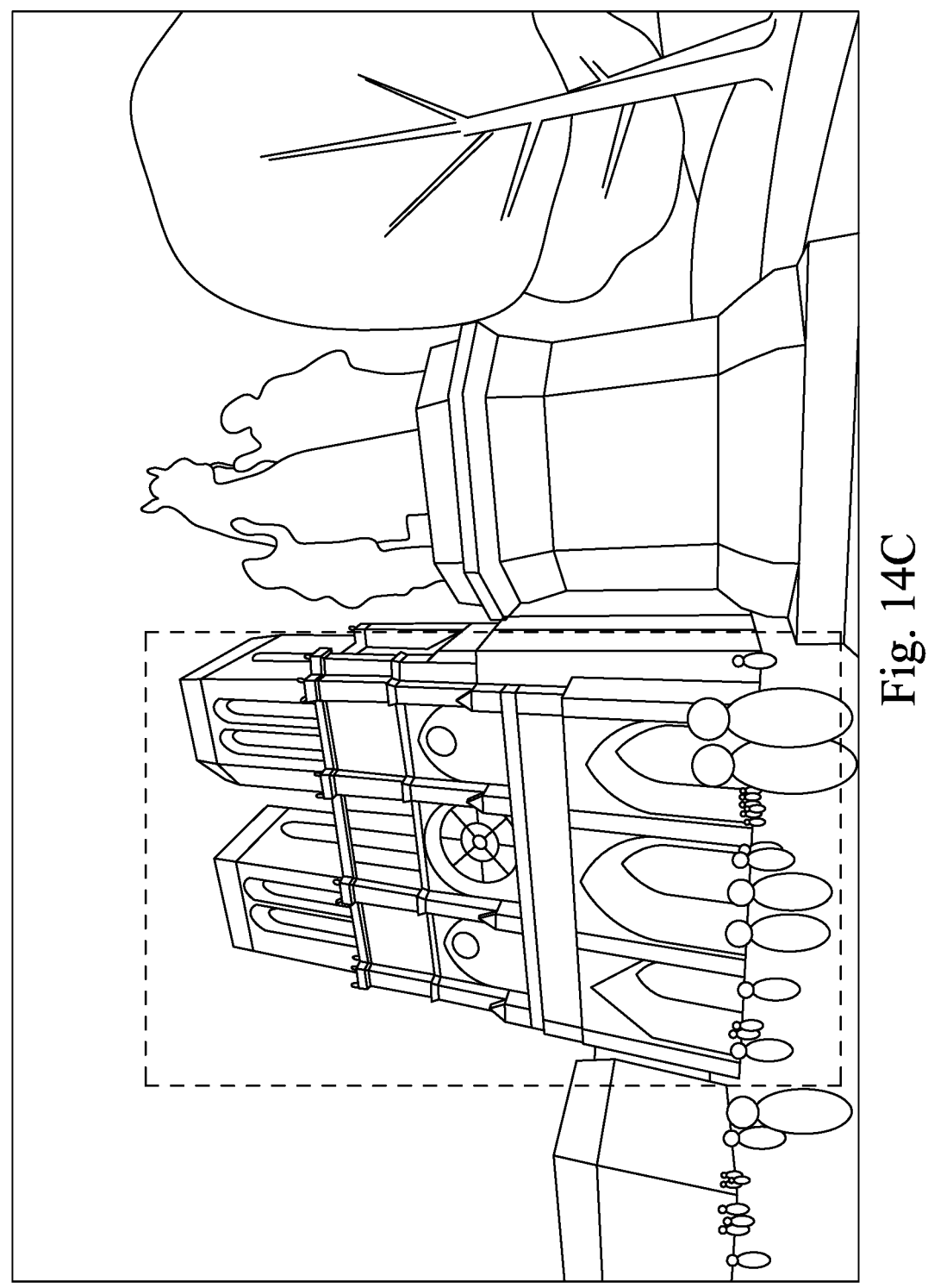
FIG. 14C is a schematic view of an image captured via the electronic device according to the 4th embodiment in FIG. 14A.

FIG. 14C is a schematic view of an image captured via the electronic device 1400 according to the 4th embodiment in FIG. 14A. In FIG. 14C, the larger range of the image can be captured via the ultra-wide angle optical imaging module 1422, and the ultra-wide angle optical imaging module 1422 has the function of accommodating wider range of the scene.

Figure 14D:
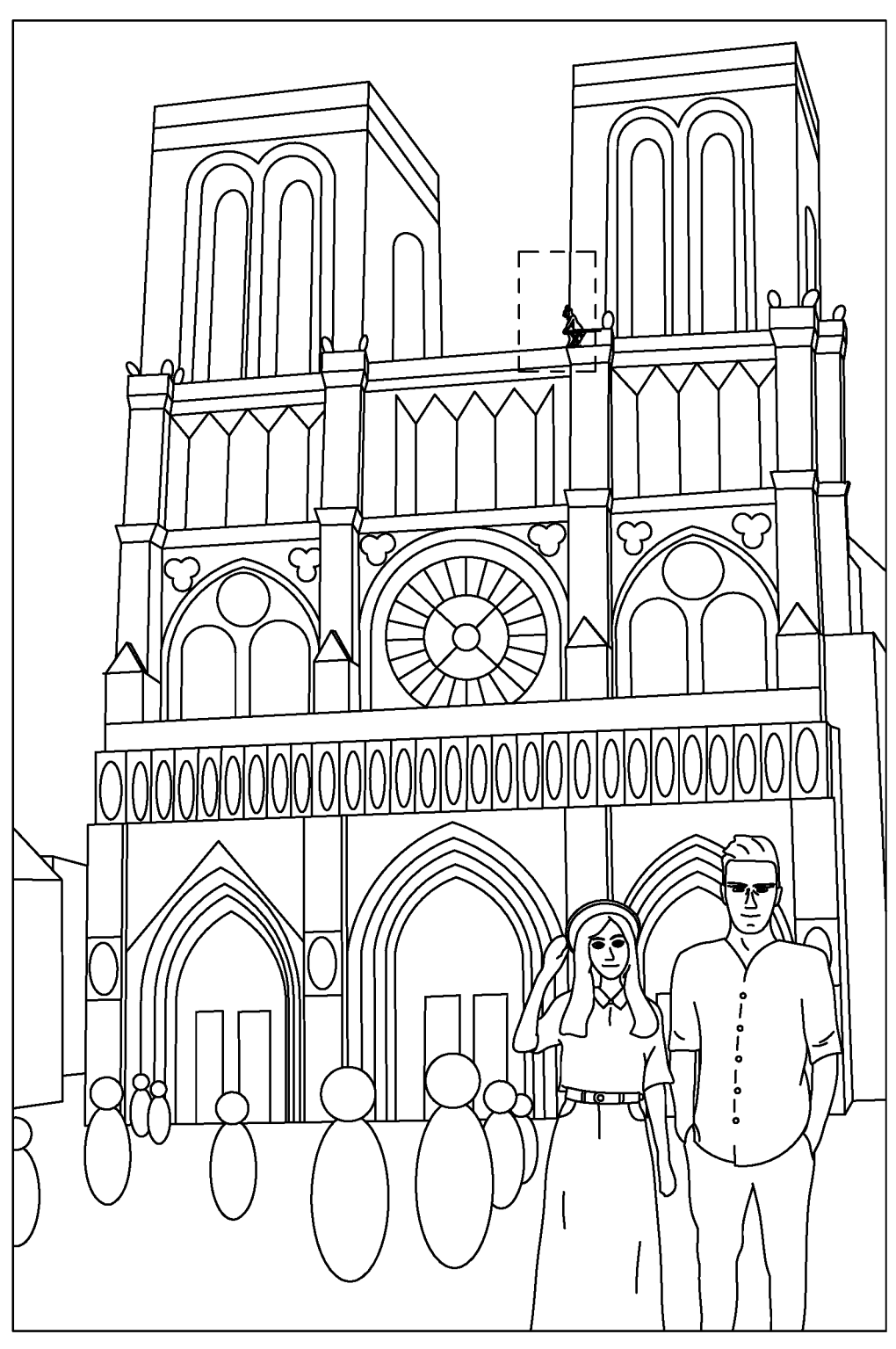
FIG. 14D is another schematic view of an image captured via the electronic device according to the 4th embodiment in FIG. 14A.

FIG. 14D is another schematic view of an image captured via the electronic device 1400 according to the 4th embodiment in FIG. 14A. In FIG. 14D, the image of the certain range with the high resolution can be captured via the high resolution optical imaging module 1423, and the high resolution optical imaging module 1423 has the function of the high resolution and the low deformation.

Figure 14E:
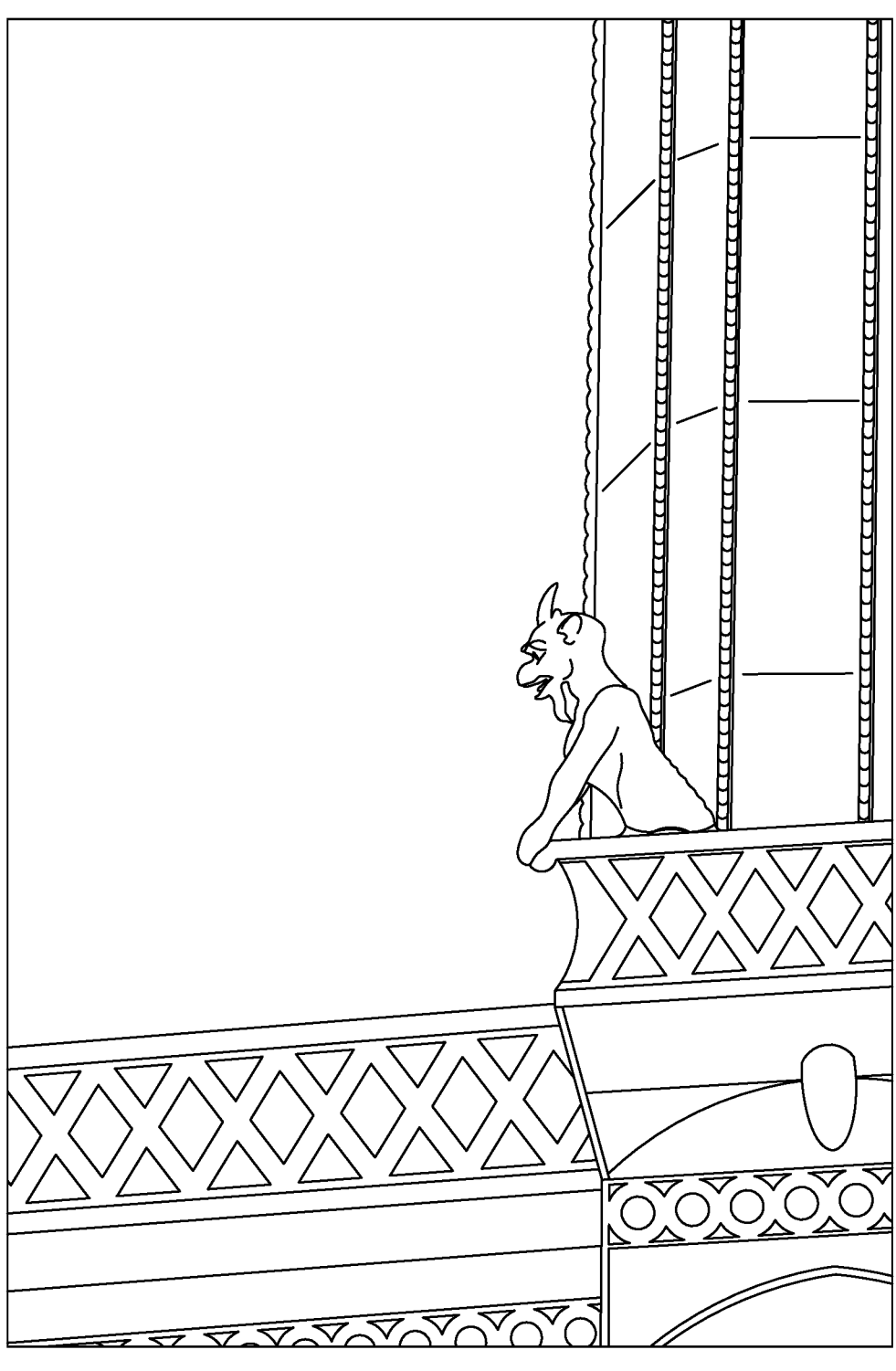
FIG. 14E is another schematic view of an image captured via the electronic device according to the 4th embodiment in FIG. 14A.

FIG. 14E is another schematic view of an image captured via the electronic device 1400 according to the 4th embodiment in FIG. 14A. In FIG. 14E, each of the telephoto optical imaging modules 1424 has the enlarging function of the high magnification, and the distant image can be captured and enlarged with high magnification via the telephoto optical imaging modules 1424.

In FIGS. 14C to 14E, the zooming function can be obtained via the electronic device 1400, when the scene is captured via the optical imaging module with different focal lengths cooperated with the function of image processing.

5th Embodiment

Figure 15:
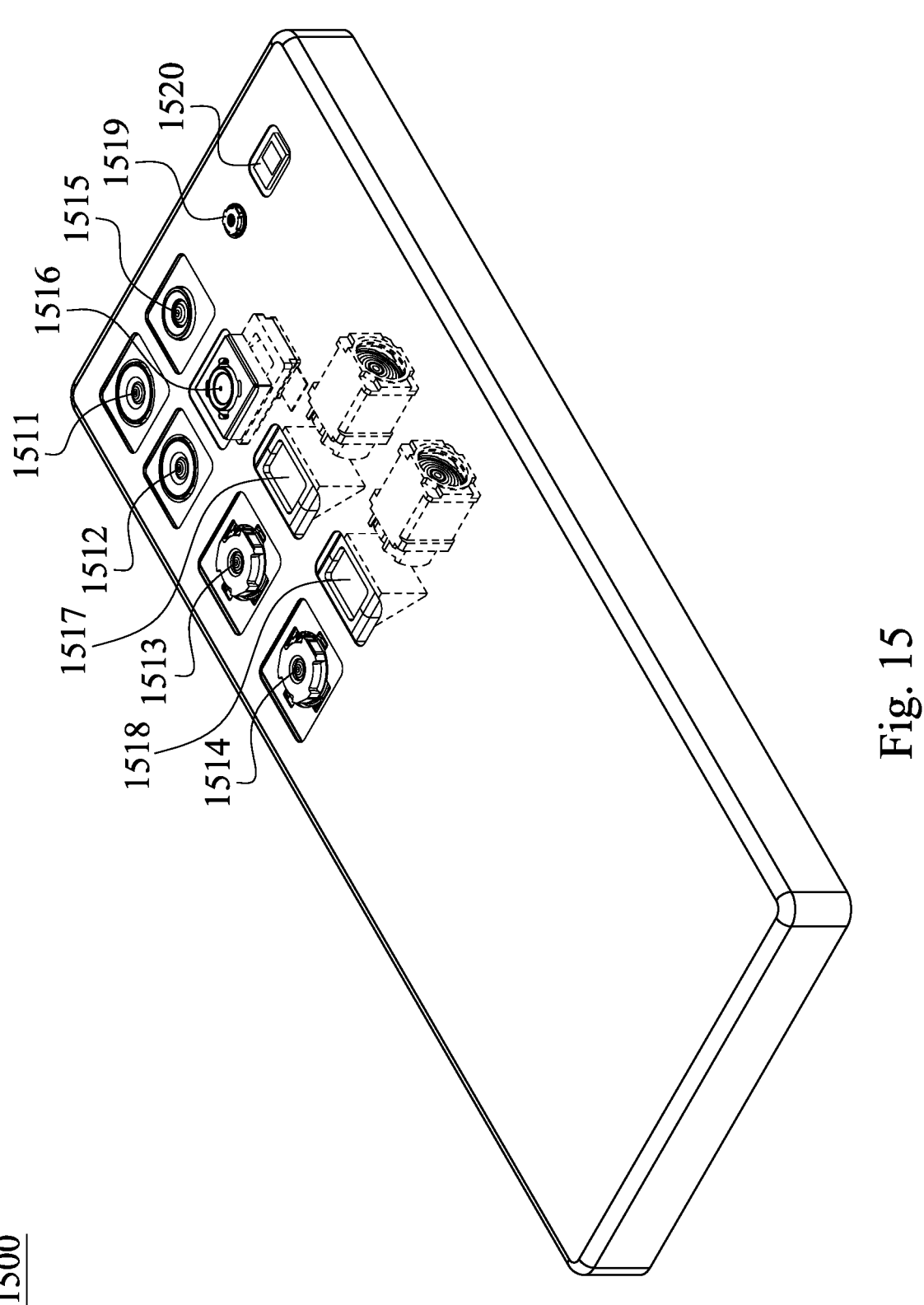
FIG. 15 is a schematic view of an electronic device according to the 5th embodiment of the present disclosure.

FIG. 15 is a schematic view of an electronic device 1500 according to the 5th embodiment of the present disclosure. In FIG. 15, the electronic device 1500 is a smart phone, which includes an optical imaging module, wherein the optical imaging module includes a plurality of lens elements (not shown), at least one of the lens elements is a plastic lens element, and the optical imaging module has an optical axis. Moreover, the optical imaging module can be ultra-wide angle optical imaging modules 1511, 1512, wide angle optical imaging modules 1513, 1514, telephoto optical imaging modules 1515, 1516, 1517, 1518 and a Time-Of-Flight (TOF) module 1519. The TOF module 1519 can be another type of the optical imaging module, and the disposition is not limited thereto. In particular, the plastic lens element can be the plastic lens element according to the aforementioned 1st embodiment to the 3rd embodiment, but the present disclosure is not limited thereto.

Further, the telephoto optical imaging modules 1517, 1518 are configured to fold the light, but the present disclosure is not limited thereto.

To meet a specification of the optical imaging module of the electronic device 1500, the electronic device 1500 can further include an optical anti-shake mechanism (not shown). Furthermore, the electronic device 1500 can further include at least one focusing assisting module (not shown) and at least one sensing element (not shown). The focusing assisting module can be a flash module 1520 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the optical imaging module of the electronic device 1500 equipped with an auto-focusing mechanism and the optical anti-shake mechanism can be enhanced to achieve the superior image quality. Furthermore, the electronic device 1500 according to the present disclosure can have a capturing function with multiple modes, such as taking optimized selfies, High Dynamic Range (HDR) under a low light condition, 4K Resolution recording and so on.

Further, all of other structures and dispositions according to the 5th embodiment are the same as the structures and the dispositions according to the 4th embodiment, and will not be described again herein.

6th Embodiment

Figure 16A:
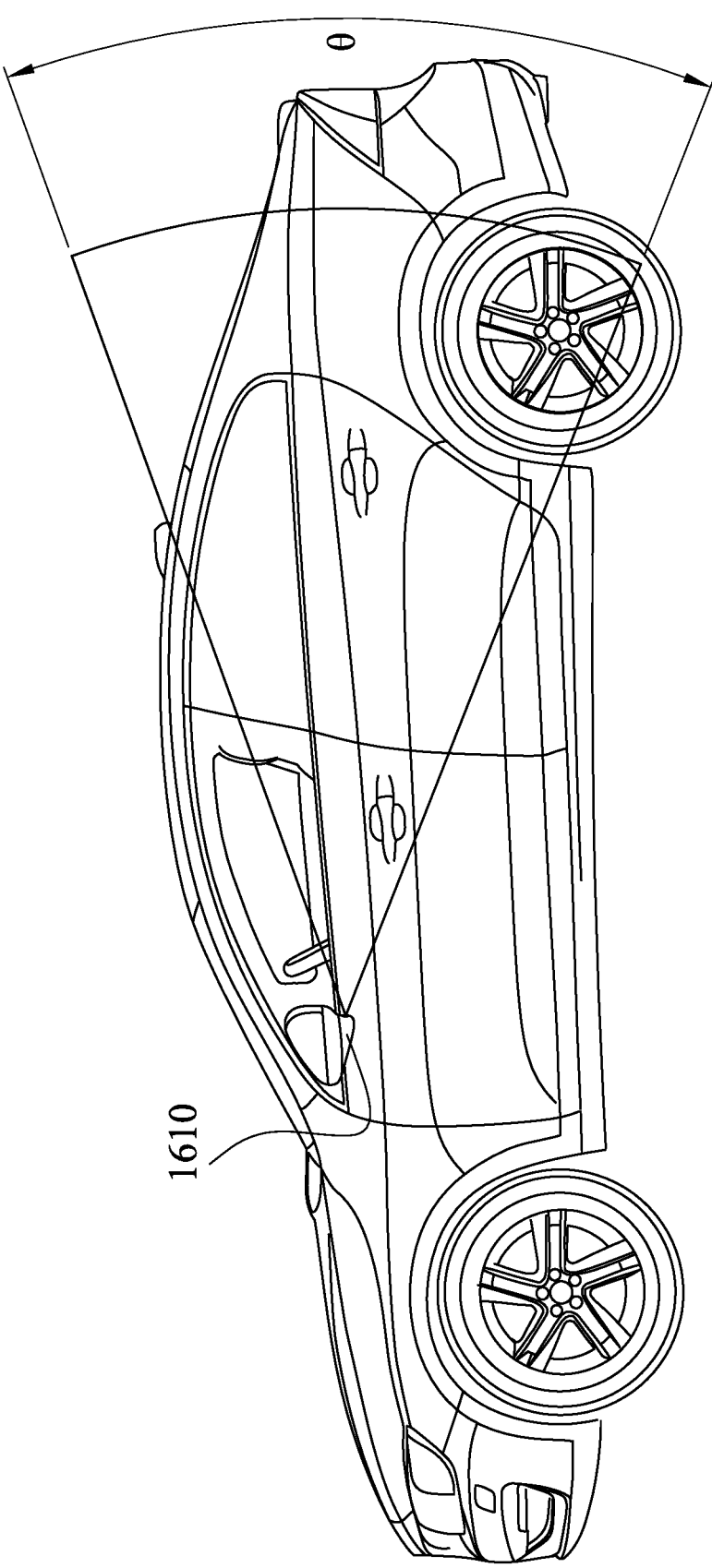
FIG. 16A is a schematic view of a vehicle instrument according to the 6th embodiment of the present disclosure.
Figure 16B:
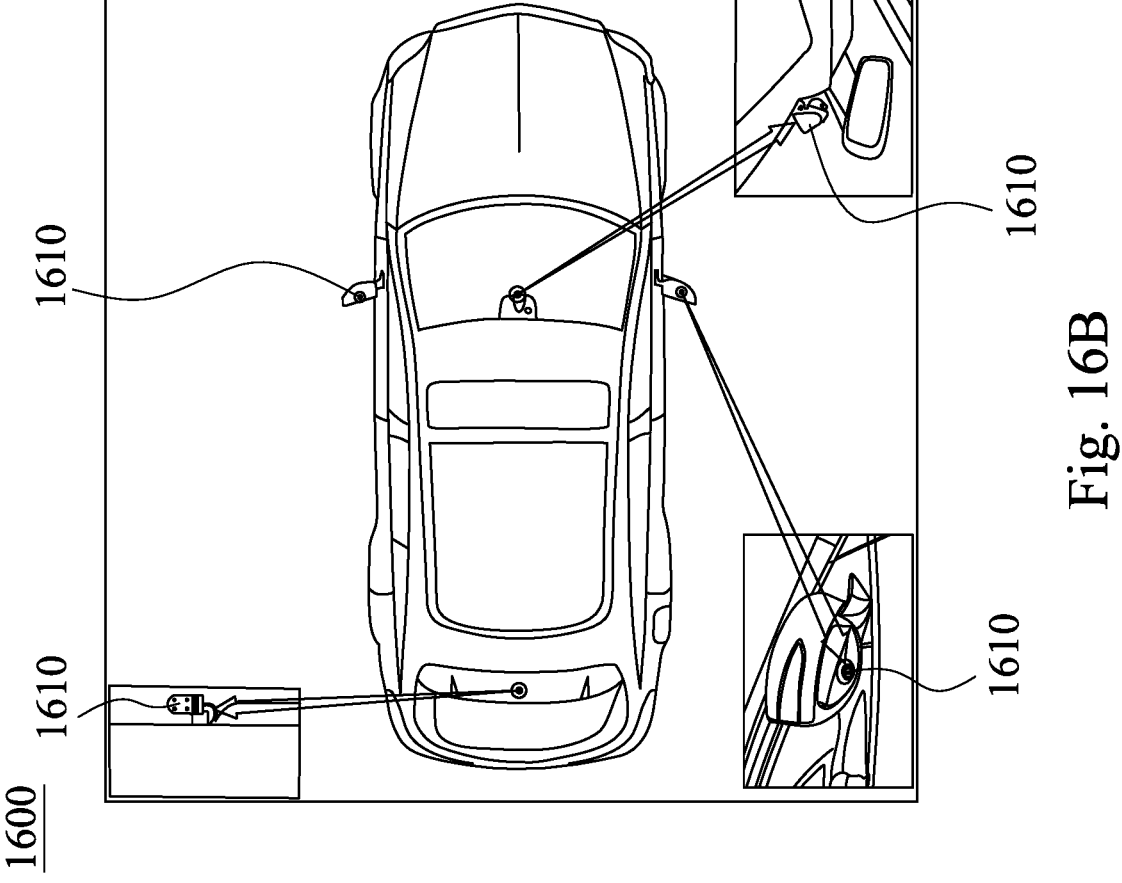
FIG. 16B is another schematic view of the vehicle instrument according to the 6th embodiment in FIG. 16A.
Figure 16C:
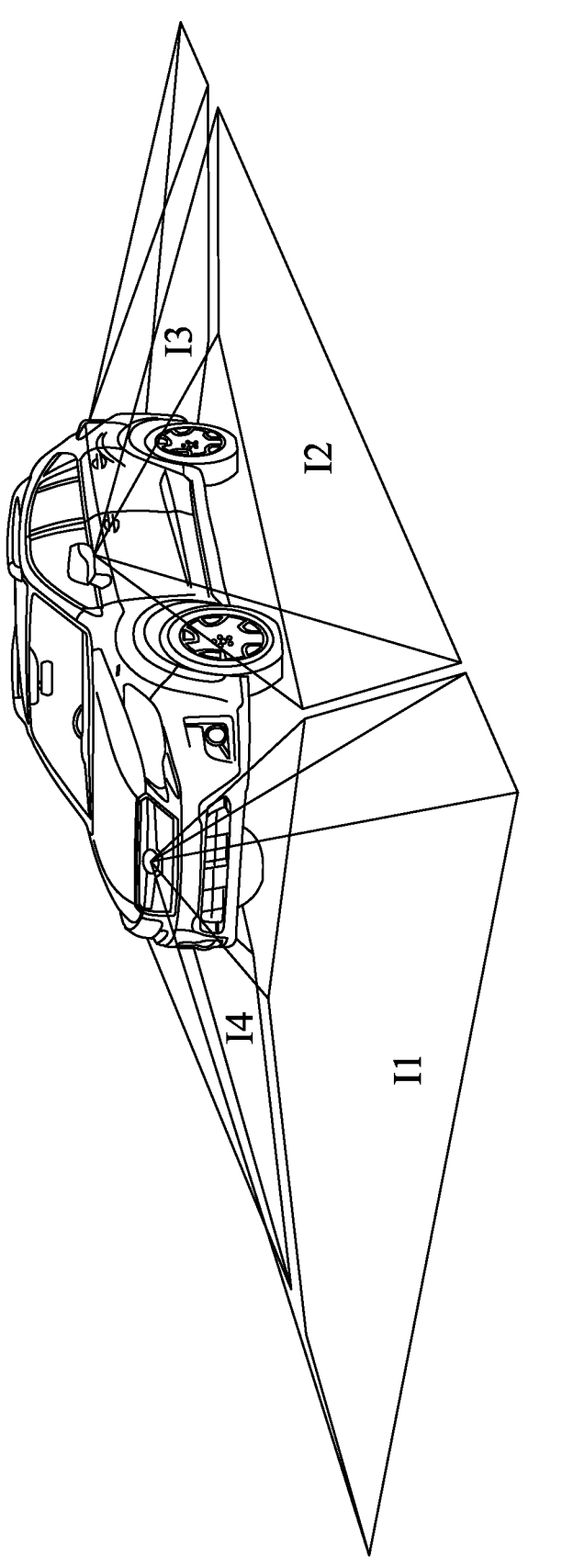
FIG. 16C is another schematic view of the vehicle instrument according to the 6th embodiment in FIG. 16A.

FIG. 16A is a schematic view of a vehicle instrument 1600 according to the 6th embodiment of the present disclosure. FIG. 16B is another schematic view of the vehicle instrument 1600 according to the 6th embodiment in FIG. 16A. FIG. 16C is another schematic view of the vehicle instrument 1600 according to the 6th embodiment in FIG. 16A. In FIGS. 16A to 16C, an electronic device (its reference numeral is omitted) is applied to the vehicle instrument 1600, and the electronic device includes a plurality of optical imaging modules 1610, wherein each of the optical imaging modules 1610 includes a plurality of lens elements (not shown), at least one of the lens elements is a plastic lens element, and each of the optical imaging modules 1610 has an optical axis. According to the 6th embodiment, a number of the optical imaging modules 1610 is six, and the plastic lens element can be the plastic lens element according to the aforementioned 1st embodiment to the 3rd embodiment, but the present disclosure is not limited thereto.

In FIGS. 16A and 16B, the optical imaging modules 1610 are automotive optical imaging modules, two of the optical imaging modules 1610 are located under rearview mirrors on a left side and a right side, respectively, and the aforementioned optical imaging modules 1610 are configured to capture the image information of a visual angle $\theta$. In particular, the visual angle $\theta$ can satisfy the following condition: 40 degrees$<\theta<$90 degrees. Therefore, the image information in the regions of two lanes on the left side and the right side can be captured.

In FIG. 16B, another two of the optical imaging modules 1610 can be disposed in the inner space of the vehicle instrument 1600. In particular, the aforementioned two optical imaging modules 1610 are disposed on a location close to the rearview mirror inside the vehicle instrument 1600 and a location close to the rear car window, respectively. Moreover, the optical imaging modules 1610 can be further disposed on the rearview mirrors of the vehicle instrument 1600 on the left side and the right side except the mirror surface, respectively, but the present disclosure is not limited thereto.

In FIG. 16C, another two of the optical imaging modules 1610 can be disposed on a front end of the vehicle instrument 1600 and a rear end of the vehicle instrument 1600, respectively. By disposing the optical imaging modules 1610 on the front end and the rear end of the vehicle instrument 1600 and under the rearview mirror on the left side of the vehicle instrument 1600 and the right side of the vehicle instrument 1600, it is favorable for the drivers obtaining the external space information in addition to the driving seat, such as the external space informations I1, I2, I3, I4, but the present disclosure is not limited thereto. Therefore, more visual angles can be provided to reduce the blind spot, so that the driving safety can be improved. Further, the traffic information outside of the vehicle instrument 1600 can be recognized by disposing the optical imaging modules 1610 on the periphery of the vehicle instrument 1600, so that the function of the automatic driving assistance can be achieved.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A plastic lens element, having a section passing through an optical axis, and the plastic lens element comprising:

an optical effective region, the optical axis passing through the optical effective region; and a peripheral region circularly disposed on a periphery of the optical effective region, and the peripheral region having an outer diameter surface and an annular lateral surface, wherein the outer diameter surface is farther away from the optical effective region than the annular lateral surface from the optical effective region, the annular lateral surface is located between the outer diameter surface and the optical effective region, and the peripheral region comprises:

a protrusive structure disposed on the outer diameter surface and adjacent to the annular lateral surface, and the protrusive structure extending towards a direction away from the optical axis;

an indented shape dented from the outer diameter surface towards the optical effective region, and the indented shape having a base surface; and a drafting part raised from the base surface towards the direction away from the optical axis, and the drafting part having a top surface and a bottom surface via the section, wherein the top surface and the bottom surface are arranged along an extending direction parallel to the optical axis, a conical surface is located between the top surface and the bottom surface, the conical surface is tapered from the top surface towards the optical axis in a direction towards the bottom surface, and the top surface, the conical surface, the bottom surface and the protrusive structure are arranged in order along a direction parallel to the optical axis.

2. The plastic lens element of claim 1, wherein the indented shape comprises a gate.

3. The plastic lens element of claim 1, wherein a first step valley is formed between the conical surface and the bottom surface, the first step valley has an obtuse angle, and an angle range of the obtuse angle is between 160 degrees and 179.5 degrees.

4. The plastic lens element of claim 3, wherein the conical surface comprises a first step surface, a second step surface and a third step surface, the first step surface, the second step surface and the third step surface are arranged in order along the optical axis, the first step surface is located between the top surface and the second step surface, the second step surface is located between the first step surface and the third step surface, and the third step surface is located between the bottom surface and the second step surface;

wherein a second step valley is formed between the first step surface and the second step surface, the second step valley has an obtuse angle, and an angle range of the obtuse angle is between 160 degrees and 179.5 degrees.

5. The plastic lens element of claim 1, wherein the optical effective region has a lens thickness adjacent to the optical axis, an extending direction of the lens thickness is parallel to the optical axis, and the plastic lens element has an outer diameter length passing through and vertical to the optical axis;

wherein the lens thickness is CT, the outer diameter length is L, and the following condition is satisfied:

$$9.1 < L/CT < 40.$$

6. The plastic lens element of claim 2, wherein the optical effective region has a lens thickness adjacent to the optical axis, an extending direction of the lens thickness is parallel to the optical axis, and the plastic lens element has an outer diameter length passing through and vertical to the optical axis;

wherein the lens thickness is CT, the outer diameter length is L, and the following condition is satisfied:

$$9.1 < L/CT < 40.$$

7. The plastic lens element of claim 1, wherein the optical effective region has a lens thickness adjacent to the optical axis, an extending direction of the lens thickness is parallel to the optical axis, and the peripheral region has a plurality of peripheral thicknesses parallel to the optical axis;

wherein the lens thickness is CT, a smallest one of the peripheral thicknesses is ETmin, and the following condition is satisfied:

$$0.01 < ET\min/CT < 0.5.$$

8. The plastic lens element of claim 2, wherein the optical effective region has a lens thickness adjacent to the optical axis, an extending direction of the lens thickness is parallel to the optical axis, and the peripheral region has a plurality of peripheral thicknesses parallel to the optical axis;

wherein the lens thickness is CT, a smallest one of the peripheral thicknesses is ETmin, and the following condition is satisfied:

$$0.01 < ET\text{min}/CT < 0.5.$$

9. An optical imaging module, having the optical axis, and comprising:
  a plurality of lens elements, at least one of the lens elements being the plastic lens element of claim 1.
10. An electronic device, comprising:
  the optical imaging module of claim 9.
11. A plastic lens element, having a section passing through an optical axis, and the plastic lens element comprising:
  an optical effective region, the optical axis passing through the optical effective region; and
  a peripheral region circularly disposed on a periphery of the optical effective region, and the peripheral region having an outer diameter surface and an annular lateral surface, wherein the outer diameter surface is farther away from the optical effective region than the annular lateral surface from the optical effective region, the annular lateral surface is located between the outer diameter surface and the optical effective region, and the peripheral region comprises:
    a protrusive structure disposed on the outer diameter surface and adjacent to the annular lateral surface, and the protrusive structure extending towards a direction away from the optical axis;
    an indented shape dented from the outer diameter surface towards the optical effective region, and the indented shape having a base surface; and
    a release notch dented from the base surface towards the optical axis, and the release notch having a top surface and a bottom surface via the section, wherein the top surface and the bottom surface are arranged along an extending direction of the optical axis, a conical surface is located between the top surface and the bottom surface, the conical surface is tapered from the top surface towards the optical axis in a direction towards the bottom surface, and the top surface, the conical surface, the bottom surface and the protrusive structure are arranged in order along a direction parallel to the optical axis.
12. The plastic lens element of claim 11, wherein the indented shape comprises a gate.
13. The plastic lens element of claim 11, wherein a first step valley is formed between the conical surface and the bottom surface, the first step valley has an obtuse angle, and an angle range of the obtuse angle is between 160 degrees and 179.5 degrees.
14. The plastic lens element of claim 13, wherein the conical surface comprises a first step surface, a second step surface and a third step surface, the first step surface, the second step surface and the third step surface are arranged in order along the optical axis, the first step surface is located between the top surface and the second step surface, the second step surface is located between the first step surface and the third step surface, and the third step surface is located between the bottom surface and the second step surface;
  wherein a second step valley is formed between the first step surface and the second step surface, the second step valley has an obtuse angle, and an angle range of the obtuse angle is between 160 degrees and 179.5 degrees.
15. The plastic lens element of claim 11, wherein the indented shape comprises two drafting parts protruding from the base surface towards a direction away from the optical axis, and a gap is located between the two drafting parts to form the release notch.
16. The plastic lens element of claim 11, wherein the optical effective region has a lens thickness adjacent to the optical axis, an extending direction of the lens thickness is parallel to the optical axis, and the plastic lens element has an outer diameter length passing through and vertical to the optical axis;
  wherein the lens thickness is CT, the outer diameter length is L, and the following condition is satisfied:

$$9.1 < L/CT < 40.$$

17. The plastic lens element of claim 12, wherein the optical effective region has a lens thickness adjacent to the optical axis, an extending direction of the lens thickness is parallel to the optical axis, and the plastic lens element has an outer diameter length passing through and vertical to the optical axis;
  wherein the lens thickness is CT, the outer diameter length is L, and the following condition is satisfied:

$$9.1 < L/CT < 40.$$

18. The plastic lens element of claim 11, wherein the optical effective region has a lens thickness adjacent to the optical axis, an extending direction of the lens thickness is parallel to the optical axis, and the peripheral region has a plurality of peripheral thicknesses parallel to the optical axis;
  wherein the lens thickness is CT, a smallest one of the peripheral thicknesses is ETmin, and the following condition is satisfied:

$$0.01 < ET\text{min}/CT < 0.5.$$

19. The plastic lens element of claim 12, wherein the optical effective region has a lens thickness adjacent to the optical axis, an extending direction of the lens thickness is parallel to the optical axis, and the peripheral region has a plurality of peripheral thicknesses parallel to the optical axis;
  wherein the lens thickness is CT, a smallest one of the peripheral thicknesses is ETmin, and the following condition is satisfied:

$$0.01 < ET\text{min}/CT < 0.5.$$

20. An optical imaging module, having the optical axis, and comprising:
  a plurality of lens elements, at least one of the lens elements being the plastic lens element of claim 11.

21. An electronic device, comprising:

the optical imaging module of claim 20.

22. A plastic lens element, having a section passing through an optical axis, and the plastic lens element comprising:

an optical effective region, the optical axis passing through the optical effective region; and a peripheral region circularly disposed on a periphery of the optical effective region, and the peripheral region having an outer diameter surface and an annular lateral surface, wherein the outer diameter surface is farther away from the optical effective region than the annular lateral surface from the optical effective region, the annular lateral surface is located between the outer diameter surface and the optical effective region, and the peripheral region comprises:

an indented shape dented from the outer diameter surface towards the optical effective region, and the indented shape having a base surface;

a release notch dented from the base surface towards the optical axis, and the release notch having a top surface and a bottom surface via the section, wherein the top surface and the bottom surface are arranged along an extending direction of the optical axis, a conical surface is located between the top surface and the bottom surface, and the conical surface is tapered from the top surface towards the optical axis in a direction towards the bottom surface; and an air gap formed on the indented shape via the conical surface and the bottom surface, so that an overlap between the air gap and the indented shape being in extending directions parallel to the optical axis towards both an object side and an image side.

23. The plastic lens element of claim 22, wherein the indented shape comprises a gate.

24. The plastic lens element of claim 22, wherein a first step valley is formed between the conical surface and the bottom surface, the first step valley has an obtuse angle, and an angle range of the obtuse angle is between 160 degrees and 179.5 degrees.

25. The plastic lens element of claim 24, wherein the conical surface comprises a first step surface, a second step surface and a third step surface, the first step surface, the second step surface and the third step surface are arranged in order along the optical axis, the first step surface is located between the top surface and the second step surface, the second step surface is located between the first step surface and the third step surface, and the third step surface is located between the bottom surface and the second step surface;

wherein a second step valley is formed between the first step surface and the second step surface, the second step valley has an obtuse angle, and an angle range of the obtuse angle is between 160 degrees and 179.5 degrees.

26. The plastic lens element of claim 22, wherein the indented shape comprises two drafting parts protruding from the base surface towards a direction away from the optical axis, and a gap is located between the two drafting parts to form the release notch.

27. The plastic lens element of claim 22, wherein the optical effective region has a lens thickness adjacent to the optical axis, an extending direction of the lens thickness is parallel to the optical axis, and the plastic lens element has an outer diameter length passing through and vertical to the optical axis;

wherein the lens thickness is CT, the outer diameter length is L, and the following condition is satisfied:

$$9.1 < L/CT < 40.$$

28. The plastic lens element of claim 23, wherein the optical effective region has a lens thickness adjacent to the optical axis, an extending direction of the lens thickness is parallel to the optical axis, and the plastic lens element has an outer diameter length passing through and vertical to the optical axis;

wherein the lens thickness is CT, the outer diameter length is L, and the following condition is satisfied:

$$9.1 < L/CT < 40.$$

29. The plastic lens element of claim 22, wherein the optical effective region has a lens thickness adjacent to the optical axis, an extending direction of the lens thickness is parallel to the optical axis, and the peripheral region has a plurality of peripheral thicknesses parallel to the optical axis;

wherein the lens thickness is CT, a smallest one of the peripheral thicknesses is ETmin, and the following condition is satisfied:

$$0.01 < ET\min/CT < 0.5.$$

30. The plastic lens element of claim 23, wherein the optical effective region has a lens thickness adjacent to the optical axis, an extending direction of the lens thickness is parallel to the optical axis, and the peripheral region has a plurality of peripheral thicknesses parallel to the optical axis;

wherein the lens thickness is CT, a smallest one of the peripheral thicknesses is ETmin, and the following condition is satisfied:

$$0.01 < ET\min/CT < 0.5.$$

31. An optical imaging module, having the optical axis, and comprising:

a plurality of lens elements, at least one of the lens elements being the plastic lens element of claim 22.

32. An electronic device, comprising:

the optical imaging module of claim 31.

* * * * *